United States Patent
Sánchez et al.

(10) Patent No.: US 10,472,633 B2
(45) Date of Patent: Nov. 12, 2019

(54) ANTISENSE OLIGONUCLEOTIDES FOR MODULATING HTRA1 EXPRESSION

(71) Applicants: F. Hoffmann-La Roche AG, Basel (CH); Roche Innovation Center Copenhagen A/S, Hørsholm (DK)

(72) Inventors: Rubén Alvarez Sánchez, Basel (CH); Roberto Iacone, Basel (CH); Peter Hagedorn, Hørsholm (DK); Susanne Kammler, Hørsholm (DK); Søren Ottosen, Hørsholm (DK); Sindri Traustason, Hørsholm (DK); Heidi Rye Hudlebusch, Hørsholm (DK); Lykke Pedersen, Hørsholm (DK); Marco Berrera, Basel (CH); Andreas Dieckmann, Basel (CH)

(73) Assignee: HOFFMANN-LA ROCHE INC., Little Falls, NJ (US)

(*) Notice: Subject to any disclaimer, the term of this patent is extended or adjusted under 35 U.S.C. 154(b) by 0 days.

(21) Appl. No.: 15/991,326

(22) Filed: May 29, 2018

(65) Prior Publication Data

US 2019/0055564 A1 Feb. 21, 2019

(30) Foreign Application Priority Data

Jun. 1, 2017 (EP) .................... 17173964
Dec. 21, 2017 (EP) .................... 17209407
Dec. 21, 2017 (EP) .................... 17209535

(51) Int. Cl.
| | |
|---|---|
| *C12N 15/113* | (2010.01) |
| *A61K 31/713* | (2006.01) |
| *A61K 31/7125* | (2006.01) |
| *A61K 31/712* | (2006.01) |
| *A61P 27/02* | (2006.01) |

(52) U.S. Cl.
CPC ........ *C12N 15/1137* (2013.01); *A61K 31/712* (2013.01); *A61K 31/7125* (2013.01); *A61P 27/02* (2018.01); *C12Y 304/21108* (2013.01); *C12N 2310/11* (2013.01); *C12N 2310/315* (2013.01); *C12N 2310/3231* (2013.01); *C12N 2310/3341* (2013.01); *C12N 2310/341* (2013.01); *C12N 2310/346* (2013.01); *C12N 2310/351* (2013.01); *C12N 2320/32* (2013.01)

(58) Field of Classification Search
None
See application file for complete search history.

(56) References Cited

U.S. PATENT DOCUMENTS

| | | | | |
|---|---|---|---|---|
| 2010/0303832 A1* | 12/2010 | Hageman | ............. | C12Q 1/6883 424/172.1 |
| 2015/0141320 A1* | 5/2015 | Krieg | ................. | A61K 31/7088 514/1.1 |
| 2018/0002701 A1 | 1/2018 | Iacone et al. | | |

FOREIGN PATENT DOCUMENTS

| | | |
|---|---|---|
| WO | WO9839352 | 9/1998 |
| WO | WO9914226 | 3/1999 |
| WO | WO00047599 | 8/2000 |
| WO | WO0066604 | 11/2000 |
| WO | WO0123613 | 4/2001 |
| WO | WO2004046160 | 6/2004 |
| WO | WO2006127913 | 11/2006 |
| WO | WO2007031091 | 3/2007 |
| WO | WO2007090071 | 8/2007 |
| WO | WO2007134181 | 11/2007 |
| WO | WO2008013893 | 1/2008 |
| WO | WO2008067040 | 6/2008 |
| WO | WO2008094370 | 8/2008 |
| WO | WO2008150729 | 12/2008 |
| WO | WO2008154401 | 12/2008 |
| WO | WO2009006460 | 1/2009 |
| WO | WO2009006478 | 1/2009 |
| WO | WO2009067647 | 5/2009 |
| WO | WO2010036698 | 4/2010 |
| WO | WO2010077578 | 7/2010 |
| WO | WO2011017521 | 2/2011 |
| WO | WO2011156202 | 12/2011 |
| WO | WO00008134 | 2/2012 |
| WO | WO2012038668 | 3/2012 |
| WO | WO2013036868 | 3/2013 |
| WO | WO2013154798 | 10/2013 |
| WO | WO2014076195 | 5/2014 |
| WO | WO2017075212 | 5/2017 |
| WO | WO2018002105 | 1/2018 |
| WO | WO-2018087200 A1 * | 5/2018 ........... C12Q 1/6862 |

OTHER PUBLICATIONS

Bakay et al., "A web-accessible complete transcriptome of normal human and DMD muscle," Neuromuscul. Disord., Oct. 2002, 12(Suppl. 1):125-141.
Baldi et al., "The HtrA1 serine protease is down-regulated during human melanoma progression and represses growth of metastatic melanoma cells," Oncogene, Sep. 2002, 21(43):6684-6688.
Bergstrom, "Unnatural Nucleosides with Unusual Base Pairing Properties," Current Protocols in Nucleic Acid Chemistry Jun. 2009, 37(1):1.4.1-1.4.32.
Caruthers et al, "Chemical synthesis of deoxyoligonucleotides by the phosphoramidite method," Methods in Enzymology, Jan. 1987, 154:287-313.

(Continued)

*Primary Examiner* — Tracy Vivlemore
(74) *Attorney, Agent, or Firm* — Fish & Richardson P.C.

(57) ABSTRACT

The present invention relates to antisense oligonucleotides (oligomers) that are complementary to HTRA1, leading to modulation of the expression of HTRA1. Modulation of HTRA1 expression is beneficial for a range of medical disorders, such as macular degeneration, e.g. age-related macular degeneration.

40 Claims, 18 Drawing Sheets

Specification includes a Sequence Listing.

(56) References Cited

OTHER PUBLICATIONS

Chien et al., "A candidate tumor suppressor HtrA1 is downregulated in ovarian cancer," Oncogene, Feb. 2004, 23(8):1636-1644.
Deleavey and Damha, "Designing chemically modified oligonucleotides for targeted gene silencing," Chemistry and Biology, Aug. 2012, 19(8), 937-954.
Dewan et al., "HTRA1 promoter polymorphism in wet age-related macular degenemt," Science, Nov. 2006, 314(5801):989-992.
Freier & Altmann, "The ups and downs of nucleic acid duplex stability: structure-stability studies on chemically-modified DNA:RNA duplexes," Nucl. Acid Res., Nov. 1997, 25(22):4429-4443.
Fritsche, et al., "Seven new loci associated with age-related macular degeneration," Nat Gen, Apr. 2013, 45(4):433-9.
GenBank Accession No. NC_022280.1, "Macaca fascicularis chromosome 9, Macaca_fascicularis_5.0, whole genome shotgun sequence," Jan. 25, 2016, 2 pages.
GenBank Accession No. NM_002775.4, "*Homo sapiens* HtrA serine peptidase 1 (HTRA1), mRNA," Apr. 30, 2016, 5 pages.
Grau et al., "Implications of the serine protease HtrA1 in amyloid precursor protein processing," Proc. Nat. Acad. Sci. USA., Apr. 2005, 102(17):6021-6026.
Grau et al., "The role of human HtrA1 in arthritic disease," J. Biol. Chem., Mar. 2006, 281(10):6124-6129.
Hansen et al., "Entropy titration. A calorimetric method for the determination of $\Delta G°(K)$, $\Delta H°$ and $\Delta S°$," Chemical Communications (London), 1965, (3):36-38.
Hirao et al., "Natural versus Artificial Creation of Base Pairs in DNA: Origin of Nucleobases from the Perspectives of Unnatural Base Pair Studies," Accounts of Chemical Research, Jan. 2012, 45(12):2055-2065.
Holdgate et al., "Measurements of binding thermodynamics in drug discovery," Drug Discov Today, Nov. 2005, 10(22):1543-1550.
Hou et al., "The Secreted Serine Protease xHtrA1 Stimulates Long-Range FGF Signaling in the Early Xenopus Embryo," Developmental Cell, Aug. 2007, 13(2):226-241.
International Search Report and Written Opinion for International Application No. PCT/EP2018/064221, dated Jul. 30, 2018, 18 pages.
International Search Report and Written Opinion for International Application No. PCT/EP2017/065937, dated Sep. 11, 2017, 11 pages.
Jones et al., "Increased expression of multifunctional serine protease, HTRA1, in retinal pigment epithelium induces polypoidal choroidal vasculopathy in mice," Proceedings of the National Academy of Sciences, Aug. 2011, 108(35):14578-14583.
Kumar et al., "Angiographic Features of Transgenic Mice With Increased Expression of Human Serine Protease HTRA1 in Retinal Pigment Epithelium," Invest. Ophthalmol. Vis. Sci., May 2014, 55(6):3842-3850.

McTigue et al., "Sequence-dependent thermodynamic parameters for locked nucleic acid (LNA)-DNA duplex formation," Biochemistry, May 2004, 43(18):5388-5405.
Mergny and Lacroix, "Analysis of thermal melting curves," Oligonucleotides, Dec. 2003, 13(6):515-537.
Mitsuoka et al., "A bridged nucleic acid, 2',4'-BNA COC: synthesis of fully modified oligonucleotides bearing thymine, 5-methylcytosine, adenine and guanine 2',4'-BNA COC monomers and RNA-selective nucleic-acid recognition," Nucleic Acids Research, Mar. 2009, 37(4):1225-1238.
Morita et al, "2'-O,4'-C-ethylene-bridged nucleic acids (ENA): highly nuclease-resistant and thermodynamically stable oligonucleotides for antisense drug," Bioorganic & Med.Chem. Lett., Jan. 2002, 21(1):73-76.
Nakayama et al., "Overexpression of HtrA1 and Exposure to Mainstream Cigarette Smoke Leads to Choroidal Neovascularization and Subretinal Deposits in Aged Mice," Invest. Ophthalmol Vis. Sci., Sep. 2014, 55(10):6514-6523.
Oka et al., "HtrA1 serine protease inhibits signaling mediated by Tgfbeta family proteins," Development, Mar. 2004, 131(5):1041-1053.
Pei et al., "Inhibition of cell proliferation and migration after HTRA1 knockdown in retinal pigment epithelial cells," Graefe's Archive for Clinical and Experimental Ophthalmology, Dec. 31, 2014, 253(4):565-572.
SantaLucia, Jr., "A unified view of polymer, dumbbell, and oligonucleotide DNA nearest-neighbor thermodynamics," Proc Natl Acad Sci USA, Feb. 1998, 95(4):1460-1465.
Seth at al., "Synthesis and biophysical evaluation of 2',4'-constrained 2'O-methoxyethyl and 2',4'-constrained 2'O-ethyl nucleic acid analogues," J. Org. Chem., Mar. 2010, 75(5):1569-1581.
Shirui Hou et al., "The Secreted Serine Protease xHtrA1 Stumulates Long-Range FGF Signalling in the Early Xenopus Embryo," Developmental Cell, Aug. 6, 2007, 13(2):226-241.
Sugimoto et al., "Thermodynamic Parameters to Predict Stability of RNA/DNA Hybrid Duplexes," Biochemistry, Sep. 1995, 34(35):11211-11216.
Tosi et al., "HTRA1 and TGF-β1 Concentrations in the Aqueous Humor of Patients With Neovascular Age-Related Macular Degeneration," Invest Ophthalmol Vis Sci., Jan. 1, 2017, 58(1):163-167.
Uhlmann, "Recent advances in the medicinal chemistry of antisense oligonucleotides," Curr. Opinion in Drug Development, Mar. 2000, 3(2), 203-213.
Vierkotten et al., "Overexpression of HTRA1 leads to ultrastructural changes in the elastic layer of Bruch's membrane via cleavage of extracellular matrix components," PlosOne, Aug. 2011, 6(8):e22959.
Xueting et al "Inhibition of cell proliferation and migration afterHTRA1 knockdown in retinal pigment epithelial cells," Graefe's Archive for Clinical and Experimental Ophthalmology, Dec. 2014, 253(4):565-572.
Yang et al., "A variant of the HTRA1 gene increases susceptibility to age-related macular degeneration," Science, Nov. 2006, 314(5801):992-993.
Zumbrunn and Trueb, "Primary structure of a putative serine protease specific for IGF-binding proteins," FEES Letters, Dec. 1996, 398(2-3):189-192.

\* cited by examiner

% HTRA1 reduction indicated for day 22

% HTRA1 reduction indicated for day 22

SEQUENCE LISTING

```
<160> NUMBER OF SEQ ID NOS: 231

<210> SEQ ID NO 1
<211> LENGTH: 2138
<212> TYPE: DNA
<213> ORGANISM: homo sapiens

<400> SEQUENCE: 1
caatgggctg   ggccgcgcgg   ccgcgcgcac   tcgcacccgc   tgccccgag    gccctcctgc        60 actctccccg   gcgccgctct   ccggccctcg   ccctgtccgc   cgccaccgcc   gccgccgcca      120
gagtcgccat   gcagatcccg   cgcgccgctc   ttctcccgct   gctgctgctg   ctgctggcgg      180
cgcccgcctc   ggcgcagctg   tcccgggccg   gccgctcggc   gcctttggcc   gcgggtgcc      240 cagaccgctg   cgagccggcg   cgctgcccgc   cgcagccgga   gcactgcgag   ggcggccggg      300
cccgggacgc   gtccggctgc   tgcgaggtgt   gcggcgcgcc   cgagggcgcc   gcgtgcgcc      360 tgcaggaggg   cccgtgcggc   gagggggctgc   agtgcgtggt   gccccttcggg   gtgccagcct      420
```

-continued

```
cggccacggt gcggcggcgc gcgcaggccg gcctctgtgt gtgcgccagc agcgagccgg      480
tgtgcggcag cgacgccaac acctacgcca acctgtgcca gctgcgcgcc gccagccgcc      540
gctccgagag gctgcaccgg ccgccggtca tcgtcctgca gcgcggagcc tgcggccaag      600
ggcaggaaga tcccaacagt ttgcgccata aatataactt tatcgcggac gtggtggaga      660
agatcgcccc tgccgtggtt catatcgaat tgtttcgcaa gcttccgttt tctaaacgag      720
aggtgccggt ggctagtggg tctgggttta ttgtgtcgga agatggactg atcgtgacaa      780
atgcccacgt ggtgaccaac aagcaccggg tcaaagttga gctgaagaac ggtgccactt      840
acgaagccaa aatcaaggat gtggatgaga aagcagacat cgcactcatc aaaattgacc      900
accagggcaa gctgcctgtc ctgctgcttg gccgctcctc agagctgcgg ccgggagagt      960
tcgtggtcgc catcggaagc ccgttttccc ttcaaaacac agtcaccacc gggatcgtga     1020
gcaccaccca gcgaggcggc aaagagctgg ggctccgcaa ctcagacatg gactacatcc     1080
agaccgacgc catcatcaac tatggaaact cgggaggccc gttagtaaac ctggacggtg     1140
aagtgattgg aattaacact ttgaaagtga cagctggaat ctcctttgca atcccatctg     1200
ataagattaa aaagttcctc acggagtccc atgaccgaca ggccaaagga aaagccatca     1260
ccaagaagaa gtatattggt atccgaatga tgtcactcac gtccagcaaa gccaagagc     1320
tgaaggaccg gcaccgggac ttcccagacg tgatctcagg agcgtatata attgaagtaa     1380
ttcctgatac cccagcagaa gctggtggtc tcaaggaaaa cgacgtcata atcagcatca     1440
atggacagtc cgtggtctcc gccaatgatg tcagcgacgt cattaaaagg gaaagcaccc     1500
tgaacatggt ggtccgcagg ggtaatgaag atatcatgat cacagtgatt cccgaagaaa     1560
ttgacccata ggcagaggca tgagctggac ttcatgtttc cctcaaagac tctcccgtgg     1620
atgacggatg aggactctgg gctgctggaa taggacactc aagacttttg actgccattt     1680
tgtttgttca gtggagactc cctggccaac agaatcctcc ttgatagttt gcaggcaaaa     1740
caaatgtaat gttgcagatc cgcaggcaga agctctgccc ttctgtatcc tatgtatgca     1800
gtgtgctttt tcttgccagc ttgggccatt cttgcttaga cagtcagcat tgtctcctc      1860
ctttaactga gtcatcatct tagtccaact aatgcagtcg atacaatgcg tagatagaag     1920
aagccccacg ggagccagga tgggactggt cgtgtttgtg cttttctcca agtcagcacc     1980
caaaggtcaa tgcacagaga ccccgggtgg gtgagcgctg gcttctcaaa cggccgaagt     2040
tgcctctttt aggaatctct ttggaattgg gagcacgatg actctgagtt tgagctatta     2100
aagtacttct tacacattgc aaaaaaaaaa aaaaaaaa                              2138
```

<210> SEQ ID NO 2
<211> LENGTH: 53384
<212> TYPE: DNA
<213> ORGANISM: homo sapiens

<400> SEQUENCE: 2

```
caatgggctg ggccgcgcgg ccgcgcgcac tcgcacccgc tgcccccgag gccctcctgc       60
actctccccg gcgccgctct ccggccctcg ccctgtccgc cgccaccgcc gccgccgcca      120
gagtcgccat gcagatcccg cgcgccgctc ttctcccgct gctgctgctg ctgctggcgg      180
cgcccgcctc ggcgcagctg tcccgggccg ggcgctcggc gcctttggcc gccgggtgcc      240
cagaccgctg cgagccggcg cgctgcccgc gcagccggag cactgcgag gcggccggg       300
cccgggacgc gtgcggctgc tgcgaggtgt gcggcgcgcc cgagggcgcc gcgtgcggcc      360
```

| | |
|---|---|
| tgcaggaggg cccgtgcggc gaggggctgc agtgcgtggt gcccttcggg gtgccagcct | 420 |
| cggccacggt gcggcggcgc gcgcaggccg gcctctgtgt gtgcgccagc agcgagccgg | 480 |
| tgtgcggcag cgacgccaac acctacgcca acctgtgcca gctgcgcgcc gccagccgcc | 540 |
| gctccgagag gctgcaccgg ccgccggtca tcgtcctgca gcgcggagcc tgcggccaag | 600 |
| gtactccgcc gcgctcctgg gcagctcccc actctctcca tcccagctcg gacctgcttc | 660 |
| tgcgggactg gtgggcaggt tgaggggcag cgaagcgttg tggggtggcc agggcaactc | 720 |
| tcggggacag gcaggtgggc cccggggtgg cggatttccg cgggctgcct cggaaccgag | 780 |
| cttcgcgccc agcccggggc cggttctgcg cccagacgat gccagtacgc ccggcctgca | 840 |
| ctctggggct cgagacgccg ggcgaccggc catggagtgc cctgagggca accacacagc | 900 |
| gcggggaccc caggacaaat aagaggaatg ggggcataaa ggaaggagag aagttcagga | 960 |
| ctgggaattg gcgcctcgca gagcggcttc aggaccacaa gaagtcattt cggttgcttt | 1020 |
| ttcttctatt tacgtcctcc gtccccttta aaattcactg ctttgatcac gggaccgctc | 1080 |
| agtgaaaact gtatgtaact cttttggaaa ggaacagtgt tgccggccc gccccggagt | 1140 |
| ttctccaaaa agtctacccc gagcagggaa cggtttggca ccgctctcgt ttcggcggcg | 1200 |
| ttgctgcctg tcttgctttc ctcgttttga gccagcccta caaaaatgaa agtggctcct | 1260 |
| tttgaataag ctgaatcggg ctttggatca cgaaatctgc agaggcggag aagggaccgg | 1320 |
| gttagtgatg aggaagaagt ctaccctct gttcctacag ccgcacacag gacctgttct | 1380 |
| ggcaggggag acgtggtga tgggggaagg agtggaatgg agcaatgtct aactctctcg | 1440 |
| cgggaccttc cggagagatg ctcctcatct tcaggcagag gccatgtgga aaataatat | 1500 |
| cgagttcagc agcggccagc cccgcgttgt aggaaccaga cagcggggct tggcagtgcg | 1560 |
| cttgggcgca gccgtgccgc tgctgccgga ccccagtgct gcctcctcaa cacgggcagt | 1620 |
| gccaggagag gggcataggg gagcacagtg cagagggact ggtctagagt ttactttata | 1680 |
| ggaatatggt tcggtgtgac caactagggc ttagcatagt ttggcttacg tggacgggaa | 1740 |
| gatgccagag ccgaactggg tgaaattcga gattgcgtat tcaccaaca caggagcaca | 1800 |
| gccctcggga aactcagcct agtcaggcag tagagagttg tcccggagag aagtgatcct | 1860 |
| gcagactcga aagggggcat gatgatagca cacgtctgtt gagcacccag tctgtgtgcc | 1920 |
| gggtgtgtta cctctgtgac tcatttggt caaacgagga ggcagttgct cctctctctc | 1980 |
| tctttttttt tcttaagaga cagggtctcc ctctgtcgcc catgctggag tgtagtggtg | 2040 |
| tgatcatggc tcactgcagc ctccgacccc tgggctcaat gattctcctg cttcagcctc | 2100 |
| ccaagtggct gggactacag gcggatgcca ccacacccag cttctcattc ccgtttaca | 2160 |
| gatagcggag ctaaggttga aaacttgcc caaggtcatt cagctggaat ttaaacccag | 2220 |
| acagcctcat tcagaggagt cagcccagca cttaactcca agggtgtggg agagggtca | 2280 |
| ggtgctgtaa atttcctggt gggctggacg tgcatccccc tcagagctgg aacagcata | 2340 |
| cacaaagcct aagacttgtt tggaggtgaa tagatcagtg tggctgggga acgttttggg | 2400 |
| agggcagcag gagtgagcca ggctggtggc ccagagtccc agggctgaag aggctggctg | 2460 |
| tgccccgtgc cctgtgcgca gatgttcttg aactggagca actcaaagcc tagtgtagtg | 2520 |
| tagggctgac ctagcagtgg agtgcggaat gcatccaggg tggagagttt agactactgc | 2580 |
| aataatctgg gtgtgaggcg acaacattga aaaagcatgt ttttgtccaa acaagccag | 2640 |
| ctgttactgg tctcgctgtt tgtggtctca tcgcacgggg tcctgagttg ctggcaccat | 2700 |
| gcgagccgcc taatttattg ctagtgaggc aagttgctta acaagttttg gagttggctg | 2760 |

```
agtccctgtg tggaggaaaa caggtccccc attggccatc gggctcacag cgggcccccg    2820
gtgtaccagt gaggggacag ccacagaggg ataagcatgg tggctttgaa aggagggaga    2880
gacagagtgg gtacaatgct tttcttatcc ctccctcctt cttttgcaaa tatttattga    2940
gctctgtagg gtgtctgaca ccgtttgcat gtttgtctgt ctggcacatc ggaggtactt    3000
ggtacgagtg gattagtgaa tgaataaatg aatgaatgaa gacaaacggg aggtgcttgc    3060
gatacacagc cattctgttt ttccttagtg gaaggcactg cttgctgcg ccccctctct      3120
ggatctcaca ctccacccct gacttttcgg aggtgtttcc gaggacaggc gcctgggagc    3180
cagcagactt cattcagtcc aagccaggct ccaggactca acagctggtg cccacgggca    3240
ggtcacttga cgtcactgtt aaatgaggtg aattggctgc ctgctctggc tggaagattg    3300
gcgggagagt cactttagct gccatggaca tgagcctttt ctaggggtgc cacttgacta    3360
gaggcctgga gttggagcaa gtcatacacg gatctggaga cagagctctc gaggcaggag    3420
cgggtgctgc gatttcaaat attataaggt ggctttgtct ggggcagagc atgccagggg    3480
atgagaggta gaaatgtcat cagatcaggg gtccccaggg aggtgactag cactttgggt    3540
cacagtagat ctttggatag aggaacatgt caccattcaa aggaaagcac tttcatctgt    3600
aagctgttta ttgaatagac ctcagagaac atctctgctc accgctctgg aaatgaaggc    3660
aaatcatcta tttcagaagt caatgcactg gcagggtttg gatgggaaag tatacaattc    3720
agctagagaa caaagatctg tcatctccag ctgtactggt cagatgatta caaaaaagaa    3780
aggaattgaa atactaatag ggtactaata atgagggcta acatatatgt tgtgcttatt    3840
ctatgccggg tgcatactaa ttcatttgat cctccggaca gtcctatgag tgagtgctgt    3900
agtcttccct gggttacagc tgggcagcta agtcacagag aagtaccttg ctcaggactg    3960
gtggtcccac acaactggat ggagagcctc gttcataacc accatgctgt gctgttgaca    4020
gagcaacaga gattttaaac caaccccagc taagccccag ctaatagctg aaataaacag    4080
ggctccagat ggctgtggct tagagatgga acaggacaga tcacagcctt cactctgcag    4140
gctcaggagc ctgaagacaa ggttgcctcc agttgccgtc agtgcagccc tcactaaaga    4200
aaagcaaaaa gagccgaggg actgtaggaa ggctgtttcc aagccagaga tccagacaaa    4260
ctgctcttga agagagaaag cccttccaga ttcccccatg tcccaaaaga ccagccggga    4320
ttccggacct ctgctaaaac atggacaaga agccaggaac gagacctgaa acagacttcc    4380
caaacagcag aagcctcatc catttctcct gctagtacat cctccaggaa agcccaccct    4440
actccatgca gcagcccaga caagcttgga ggtctgcaag ctgcagggt gcccagaaac      4500
tccaccctg gaggttttta ggatcgcctg ctcctggtct caccccagag cctctaaagg      4560
cagaggctgt atgtacatac ctggtgaaga accaagggct tagatggttg ctttacttct    4620
tggagccctg gaatgtttgt aaaatttact tttttttttg agacagtgtc tcgttctgtc    4680
gcctacgctg gagtgcagtg gcgcgatctc ggctcactgc aagctccacc tcccgggttc    4740
atgccattct cctgccttag cctccagagt agctgggact acaggcaccc gccaccacgc    4800
ccagctaatt ttttttgtatt ttttggtaga cgggggttt caccgtgtta gccaggatgg    4860
tctccatctc ctgaccttgt gatccgcccg ctttggcctc ccaaagtgct gggattacag    4920
gagtgagcca ctgcacccgt gccaaaatgt actttatta ggtgactctt tcgtgggaac      4980
ctcaaacaag caatcattgc tagctgagtg ctgaccctgt actgagctct ggggagacag    5040
ggttgaataa aacaaagtca ctgcccacag gtaacttata ttcaatacaa tgggggaaaa    5100
```

```
tacaatcact gcttccctgg ggttgtattt ttccattgtt aaagtgggca gtttgctcga    5160
gagtcatttt cactattggc aattcaaata cacctttgt cagttaaaaa acaagtgtgc     5220
cagggacctg agcttcatct tagggcaggg tgggtggaaa catttgtgag tctccagctt    5280
ttagtcacct gaaacttgga aacttggagg tcttttgagc agtttatgag tctctgcctg    5340
ctctggtcgg ctgccttctt ttattgctct gttggttttg ctaaagagtt aaaatattaa    5400
ggcttcataa aattaggaag ttaacaagct caaaaaccaa gtgtttgagt tacttcattc    5460
cactgagaga gctgtaaatg ggttgcattg aacttaaaa taactgcatt gagtaagtga     5520
tggtggcggg caccatgagc taactgtggt cagaagcctg atggcctccg ctttggggct    5580
ggattctccg tttggagctg tgtgatcctg gatgagtttc atgccttgga ttcagaaatc    5640
agactttcca tgagcttata tttcaagtga ataaatagct ctggtcaggc ttaatttgaa    5700
gaagaagtaa gcttggcagt gggtgagggt tccttggaag gccaactggg gcggaggggc    5760
tgagggcaag cggctctggc ccttcctggg gtgttacctg accaggtaac agctccctcg    5820
acctctcgga gcctcggcag tgaggggatt gggccagttg atctctgagg ctccttttaa    5880
ctagaatggt ctgggatttt tctaagaaaa caagtctttg aggaggttgt ggtcacctca    5940
ttcctaattt aaagcctggg gaggcttcct tatgagctac ttcttttcc taaattattg      6000 atggttaaag ccaaggctgg catcgaatag atgtgatcca tcttgagcct ggttgctttg    6060
tgtttcagct ttgtactggc tgctgaagtc cccgggagac cacaggggtg acatgttcat    6120
ctccaagaga tgagcttcca cgagactcat accccttgct ccttccctgg ggctccaagg    6180
cctttgggtc atctgaagtg agatacccct gtgtcatttc atcttttcct tctccacctt    6240
ctctgccgtt aaaaaaaaaa gaagaaagag aaaaatccta ttaatagaga aaccgagaag    6300
tgtagccatt ctgaatgtgt tccaaaagg ctcctggaag tggcatggaa gttacagtga     6360
ttcagcacta cttggtgacg tgtgcctaga accacagggg acattagcc aggacaacac     6420 gcctcaggac agaagtaagt ggctgcgaag aggcatgtcc atcactgccg gaaagatgca    6480
gagttcagtt tttggagtca gtgctgagag ttccatttct aaattcattc agagcattta    6540
tttaacacct actgtgtgct cagaagtgta tcaggtatgg ggactcagag gtaagggctg    6600
gtggcccctg atctcaaggt actcgtggta gatagtatga tgctcagctt aagggctggg    6660
cttctgaagt cggattgcca ttttctggat gtgtggtgtt tcttgggtga cttcatctct    6720
aagtctcagt ttccccatca gtaagataag agaagtaata gcagatacat acgtagctct    6780
tagggcattg cagaatggaa ggacctcctt atatgaaacg caaagcactg tgcctgatgc    6840
attgctagaa ctcaggcaat attagcgtgt tgtcattgtc atcatcatca tcatcatcat    6900
catcatcatc atcatcatct tcaaggcact gacaaaggag tcagctgtgt gggaggagtg    6960
ctgggacact cttgtctccc tggggatgag gtgggtgggt gggttaggaa atcttcacag    7020
agaaggaggg tgatgtgaga cttcgtccg ggagctgact cggaatttgc catctaatat     7080
gttggaaaag gttctctggg cagaggtatc caaagtcact ttgcctgtca cccttttgagg   7140 tcccagttgt tgcctatatc atgtgaccag tgtgtggctt ctcttgaatt aagagctgca    7200
tgtctggact gcctgggatt ttacagatgt catctcgtta actctccctg gagcttgtga    7260
cacccaggag atggcagttt atagaagccc tggcaccttc ttgaatgatg cttggtttgg    7320
tttctatgca ctgggaattc ctcacaagga aagatttgtc acatcttaag gaaggaaaaa    7380
aaggcaaatt tgggagtcca tggatacct attattttag attccaggac aaattgtcga    7440
ataagcacgt ttcataaaaa caatcctccg cagcatcccg tgacagcagc tggtccctcg    7500
```

```
ccacaggata attatgtctc cttgtgcaca caaaagtctc cgagggcata ttgttgtggc    7560
tggagtttct gataatttcc aaattgaaca acctcagtcc taatgagtca gaggcttgtg    7620
caatattttc aaacctcagg aacatctttt tcattagttg tgcaataaag atggtaggcc    7680
tatctctgtg atgagctgtt ttttttctc aaagtttgat gagattcgcc gtagaattcc     7740
ttctcacata gtcttgggca agattttacc cgatcttcca acacatgagt catctcatat    7800
cctgtgacta agaagagctg tctctttggt gccagttttc taagtgcagt caccacttga    7860
tggagacgga tggacacagt tgggattgcc caggcagatg ggcaatcttg ccagctagac    7920
ataggggagg gaagcctcaa tgttcagcgg tcacatctgc ttttctgtgg cacagagtga    7980
gctatacagg aatattgtat tctccaggac agttagggca gtgggaaatg tcatcaaaca    8040
gaacagtgac ccaaagagcc actgccactg ggtgctctgt gggagctggg cactgtgctc    8100
attgtgttat gggccttgct ttgttcttac cttgtagcca cccagagagg cagggcatta    8160
tccttgcttc ctagctgagg ccacagaaga ggctcctaga ggttagctgt aacttgtcca    8220
aggccagcca gtgcaaggag gcagagccag gatttgagcc catgtctgtt tcactcccaa    8280
actattcttc agatttcttt aagtcaagtg ttatttagaa atgttttgtt tattcatcaa    8340
atatttggtg ggtgtttcca gctatctttc tgttattaat ttctagttta attctattgt    8400
gggctgagaa tatattttgt atgatttcta ttctattacg tttgttaggg tgtattttct    8460
ggtctagaat gtggtctgtc ttggtgagtg ttccctgtgt gcttgagagg aatgtgtgtt    8520
ctgtcattgt tgaatggagt gttctataaa tgtcacttag gtctagtgga ttgatagtgc    8580
ggttcaggtc aactgtatcc ttcctgattt tctgcctact gatctatcaa ttcctgaaag    8640
agaagtgttg acgtctcctg agtctattct gaaacactga attgcggtct ccatgatgaa    8700
ccactagagt tagaaaacct gggtcctagc cccatttggg cctttgggat gactcccttc    8760
tgcctcagtt tcctcatcta caacaggggg acaatgatgc tgcctaggag acatcagcag    8820
gatactgtga agtccagtg gcataagggg tatggaggag cttcgtcaac tcctaaagct     8880
tcagtgctag gaatcctaaa gcattgaaat ccaaagatat aaggaatatg aaggagtttt    8940
gtcaattcct aatgcttcag tgctaggaat cctaaagcat taaagtccaa tgatataagg    9000
aatatgaagg agctttgtca actcctaaag cttcaatgct aggaatccta aagcattgaa    9060
gtccagtgat ataaggaata tgaaggagtt ttatcaactc ccaatgcttc agtgctagga    9120
atcctaaagc actgaagtcc aatgatacaa ggaatatgaa ggagctttgt caactcctaa    9180
agcttcagtg ctttaggagt cctaaagcat tgaagctgta agagattagg acctctagtt    9240
ggcaattcca gactcttcca ggactcctga tagagccaac accaagaata gtgaagccag    9300
aaggatggaa atagtaaaat gcctcctggg tgtcaaagca tgggtctcct ctgggcatgt    9360
tctcttgtcc tactgagaca tgatagctct tggccaaagt gactgaactt gaccctctgt    9420
ttcaggaagg ccaaatgcag ggttcactac catcatgtcc aagggcagat gcgttggtcc    9480
agaacatcag catcccaatc attataccaa gcaaacagcc gtctctgcct gcaccgtgga    9540
gagcacacgc tcctcctggg gtggcctgca tcctgtgttc ttctcaggcc gactttctgt    9600
ttaatgtttg ctggtcagga atggcctga gctgaggttc ttcagatccc agtctgacct      9660
ttctccacca gcatttgtgg ctctgaaaaa tatagcccag tgtggtttag ccccactgga    9720
tgaaacccag taggaaaagt ctgataatag cagaagacgc acaggaggaa gagtgaggat    9780
ttgagagcat ctgggaagga ccatgtgcct ggatatcgtt ctgtctgtgg gattctgtga    9840
```

```
cacttgtcat ttacagtctg ttcccatgga attctcatca ttggccaaac atatagtcct    9900
tctgtcctct gaaaaatatc attctgctcc gacctttcac acccatctct gaccacatca    9960
actccctgtt tgcatgcatc ttgtggatga aggacaccac tttacctgta aagacactgg   10020
tggcttccca aagccaccaa ctgacttgta gagaagacag aatcccagag tatgaaacct   10080
gagggtgaag ggtcctggca ggtcctagag ctcaacccct tcacttcacag gtggggaaac   10140 tgagggagcc aatgggaaca tgactctcac aagctgcaca gctcatctgt aggggccagt   10200
gtggagtctg tttgtcctga gacccagggc tgagcctttg agccctccgc atctcagccg   10260
catcctcctg ttggagcagt taggtgtttg ggagaggcca cggtccatgc tcatggtttt   10320
cctgtaaggc tggagaaaca ggccttgttc ccttagtctc tctaatcaaa atgaggttgc   10380
agaaaaccct tctccctact tctccctaaa ataatttcct tgggttagaa gatgactaaa   10440
agactattca tccgatgact gatgtctccc ttcaagagtt ataagcacat ataaatgcct   10500
ttgaatggta attataataa ttttgctgaa gggaaaatat cagtataaat atcatggtgg   10560
acacatggaa tgaggactga gatgcttcca tgtcttttca gctgtggtta gattttcttt   10620
aagcagaata tacaagtttt tcctctccta gcataaggac tcttttttttt tgtatctttt   10680 ctctctactt tttagacatg atggaaaatg catttataca tttgatgaca tattgtacta   10740
tctcagttgt ttaaaattat aaatgtaatt taatcatatg aaaaattaag aaaagaagat   10800
tcatatttca ccatcatctc cccagaaata tcatttcttt attactatta ttattattat   10860
tattattatt attattatta ttattatttt gagacagggt cttgctccat cacccaggct   10920
ggagtaaggg gcacgatctt gactccctgc aacctccacc tcccaggttc aagcagttct   10980
catgcctcag cctcctcagt agctgggatt acaggcctgc accaccacac ccagctacct   11040
tttatatttt taagtagaga cagtttcgcc atgttggcca gactggtctc gaactcctgg   11100
cctcaagtga ttggcctgct tcagcctccc aaagtgtggg gattacaggc atgagctacc   11160
atgcctggcc taattccatc atttctgtcc caagtgttgc caccgtttgg ttaactgttc   11220
ccctgttcac atccatttgg gccaaggttg caatgttaaa caatcctgag atggacattt   11280
tcatgtttat ggctatttct gtatctaggg tcattctctt aggagaggta ctaaggagta   11340
caaaaactgg gaagaaggat atggaatttt tatggatctg gtataaattg ccaaattatt   11400
ttccagaagg gttgtagcca tatttgttgc catcagctct agaatttcaa cctcgtaagt   11460
cactgaaaga aattctccca aaatcaatcc ttcaggaata atggaagaag atggtgccaa   11520
accccagcca ttctgctcac tgttagattc cttttttggt cttacaggtt acttttattc   11580
tcaggttgat ggctcttaga gttgagcaat gtttggggta gaataacgag cacttttaaa   11640
acttggttct acctggggag ggggtgagtt gtgatcacag acagtctcac ctgggagggg   11700
cttgggtgtt tgtcggcttg tccttctaac actcgtgtct caggcgagca gcctgggacc   11760
agtgaggtga cctgaaggct ggaggtcaca agctaagagg cgacagagaa cccaggtctc   11820
aggaagccca gcccagagct cgctgcactg agcctctcgg atgccagctc tgtccaggat   11880
gcgggaggag gccagactga tttggtctgt tttgaaaagt gatgaaaata tttattcaaa   11940
tgttttgtac tcataggcag aagtataaca ggagctgcat atacaaaatt attttctagt   12000
agtcacatta aaaagtaaa aagaaagaac acgattattt ttcttttttaa aacagcttta   12060 ttgagagata atttacatac tataaaattt accccttttaa agtgtacaat ttgctgttct   12120
tatatattca caatcatgca cgtatcacta ccagctccag gacactttca tcaccgtaaa   12180
aagaaacccc gtatccatta gtagccaccc catacttctc ctctgcccag ccctaggaaa   12240
```

```
ccaccggttc attttctatt tctatgaatt tgcttattct ggacatttca tataaatgga    12300
atcaaagaat acgtaacggg cttctgtctc ttagcataat gttttcaagg ttgtccacat    12360
tgtagcatgg atcattattt cattccattt tatgattaaa aatatgcctt ttaagggata    12420
cagggagacc agacgtctat tttatctccc ctccctgatg gggaatccta atttcagcct    12480
ggaaagtcac tgcgaaagtc taaactgcag aggtgatact gtttccactg gaagaaactg    12540
tagcacctga ctcaggaagc cagcattaaa accaagaata ttctatatgg atggggatta    12600
cgcactgaaa ggaaaacatg aggaaatgca cttttcagat ttattagatc atagaacttt    12660
tttggagctg gaaaggatgt cggaaaccgt ctagcctacc ccctcatctt accactgagg    12720
taactgaggc ccaggaaggg gaagtggctt gttttgggtc cggaccact  cttcatttct    12780 tatttgagcc aaagcttcct tctggcgtct gtctctgttt cacaagttcc cctcgcatgg    12840
gggctgggta ctgcttggaa gaactggctt cttccttgat acaggggctc gttcaccatc    12900
acctccctcc ctcacgtctc ttctgcctct ctgcagcctc aggccctcct cctgcaccag    12960
gggggcagac tcaacccggg tgggcactgc ctcccagtcc gtggccagag gctggagggc    13020
tagggagact gaacagcccc ggcagctcca gacataacaa cctatgttga ggagtcaggg    13080
caggaagcga acccagctga gaaatctgcg aaggtcagga ccagagccag acgcttatca    13140
agagcaaagt taatggtttt tgtgaaccga gcagtcagct gtttcccga  agataataat    13200 agacacatca tgttgggcat tcaggaggca tctgaaaaaa aaatgtgca  gtggaattga    13260 ttggaagctt ttccctaatg cataaaatag gccagaaaag actatcaaat gtaacagcac    13320
cgatcaaacc caatagatca agcaaggact gaaaaacaca atttttttt  tctttgccag    13380 tgagtctgaa aagtgatttt caatgacagg cgcctttaaa catagacaac ataaacaaca    13440
acatagttgt tctggaagag gcatcttttc ccagtaaagc caaagatgca gatctaggct    13500
gtgcttgtga ctgacagcac agtgaggggt tcacagccag ctggccaggt gcccccgaa    13560 agcacatttc gaatctactc tatttgagag agactgcctt agccttgttt gggtaagtct    13620
tcctccttca cttcacctgc cacagacttt tccaggcacc atctgctgca gtcttggccc    13680
agcccctgca acagttactg ctcaaggcac ccgggacatg caggacgggg gagcagcctg    13740
aggtctggcg tccggcgagc ttttcccact tggagccgtc tgggagactg tcccggaaag    13800
agaggggctg ccaacacttg gaagtgccaa tgtgtgctgc aagtcgaggc caggctcccg    13860
gctcccccgc ctcttcctcc ttgattcatt aaaaggaaag aaagaggcca cacgaaactc    13920
tcctgaattt catttctttg tttctatgca aagacagag  cgtggtcatt catcattcaa    13980
attttagcct ttttaaacaa ataataattc ctgcttgtga attcagtgta ttttaacaag    14040
agtaggtctg agggccgttg gccgtgtctt tccttagatt tgcagacagc ggccctgatg    14100
gtgcataggg tttcaggttt cctttagacc tcagctggct gcctgggcca ccacttagca    14160
atgccattgt cctcctgtg  cattttcttt gcagaattcg aggaaatcca gtcgcacagg    14220
cccctctgtg cccatgtccc cggcgccctg gaatgtgcag taccagcagc agcgattaga    14280 atggggtgtct ggtttcccgg aatgtgcaag gtctggcttc tgtttctgct gcctccatgc    14340
cccagaccag tgctgggccg ggctctgggc tggagccgtg gctgacaagt ttccttggaa    14400
tttaatggag cgggccagac agcatgcagc cactcaaact gaaaacctgg gaaagaaatg    14460
agtgttgtgg ggcagctttg ctgcattcac tgggtcatat atgcttcttt ttcttttcct    14520
caggcaaccc ctcttgcaga caggaggccc cctcccctt  cgcttcatgc ctcactggcc    14580
```

```
attaggaacc ttttaaaact gatttctctc ctgaccctca gagagaacat agtccaagtt    14640
ccctggagga ggaggaagcg ctctgtgttt ctctgcagtt cacggctcag ttaaatgcag    14700
cctacgtgct gtcttttccc actcctctgc ctgctcccgt tgtgcttctc atgatcattc    14760
tcaaattcag cgagaaacct cacaaaggga gcttttctta gggaagagtc atccttggcc    14820
tcccgaatgt ggaccagccc ctctccccag ctgcacagca tcaggttagt taaccacctg    14880
cctccatctg ggtcctgtct ggacaggcct actcacacct gctgcaggca tccaacttgc    14940
cctcaggtgc ctgtggctcg tccagagggg tggagcccac attccagtcc tgacaggtaa    15000
agttcagtgg cggggaccct gcatttagtg taaagatcaa tattccaggt cctctcttcc    15060
tgccacccag cgactggccg tttgcaggca ctcggtccca gttgtcctgg gcctgcagcc    15120
cttgcattct ctctgctttg tctctgctat tgcacccctg ccccatcaga aatgcaggtg    15180
ggggggcctt ccgctgggac agtgagagac tgggtagtaa ggggagcgct agagggatgg    15240
ttgcgcttgc atccagccct gactgcattc gctctccccc gcctctctgt gaaggtgctg    15300
agctgtgagt ggaaccaagt ggatgagagt ggccttgggc acctgccgat aaatttcccg    15360
gtgtgtcttc tcctcctggg agtcccatct ggatttgggt ctggatttat ttattcagca    15420
agtagcctct ttatagttac tttttttttt tttttttttt tgagatggag tttcactttg    15480
tcacccaggc tggagtgcac tggcgcaatc ttggctcact gcaagctccg ccttccaggt    15540
tcacgccatt ctcctgcctc agcctcccga gtagctggga ccacaggtgc ctgccaccat    15600
gcctggctaa ttttttgtat tttagtaga gactgggttt cactgtgtta gccaggacgg    15660
tctcgatctc ctgacctcat gatctgccca ccttggcctc ccaaagcgct gggattacag    15720
gtgtgagcca ccatgcccgg cctgtagtta cttttaattt agccatgctc ggggctgaag    15780
gggatgccaa agaaatataa gatgagcccc tcagacggct aaagatgaag atgaggcctc    15840
cagtatgtac ctcccacata cacccccagga aattctgggt gtcactggat tctggacctc    15900
ccaaaagctg ctggcacctg gaggatgggg ccccgaggct ggacctcact cctgctgggt    15960
tgctggactg ggaaagtact gatggcagct gaggagtgtg tcccagactt cactgagcca    16020
ttcccaaaga ttattccaag ttctcctgac actgcactgg aggcctgctg tgctggcctt    16080
ctttatttac agtttctgac tggtgtctag cagccctgcc agagagagcg gcagtgtgtc    16140
tgcaggcgac caggagaaat gtctcaggct ttagagcagg actttgagca catagctgtg    16200
ggggcccagc aggctgtctc ctgcacggtt acttctcctt gtcctttcat ggtcgagagg    16260
ttgctgcctg gcccttcaag tgaggatggg acatgctatc cattggcctt aatttccaac    16320
ctctgcatga tgcattttat gctcctgcct ttgaaagaac ttttattttc ttgtcattta    16380
tgcccagacc ccacatggca gaaggaaggg aggctgggac aggggaggcg gataagctgc    16440
cgctgacaga cctgcccagt ttcttagctc atcccggcct ccatcctggt gagcagacac    16500
tggcccaatc cagccatatt tttggctgag tttctgtctt cacatctcat ccttaaccct    16560
gaatcctggc catagttggt actgggttgt attcttattt gtaatcttta agtaggaat     16620 acctttgctg gtatttaaag tggaagaaat caggtgaaga atcacaagtg atttgcaaac    16680
tggaagagac attagaatgt aaatgtgagg aagcgtcagc atgagggct tgcctgggct     16740 gcacagcttg ccttggctgg agtatgcact gttctggcat tgcagagagg atgggtacct    16800
tgcctccctg caggtggggg actgtatcag ccccgcaga ctgctcctgg gctcctgagt     16860
ttgacagatt tttttttttt ttttttgaga cggactctca ctctgttgcc caggctggag    16920
tgcagtggtg cgatctcggc tcactgcaag ctccacctcc tgggttcacg ccattctcct    16980
```

```
gcctcagcct cccgagtagc tgggactaca ggcgcctgcc accacgcctg gctaattttt   17040 tgtatttttta gtagagacag ggtttcaccg tgttagccag gatggtctcg atttcctgac   17100
ctcatgatct gcctgccttg gcctcccaaa gtgctgggat tacaggcttg agccactcgc   17160
ccggctgagt ttgaccagat taaggcagca tctccagtgg cacctgagca gctcctgaga   17220
tgcttttctg tgctaaatct ggatttgggg tattaaatca aatgaatttg aaatgcaggc   17280
acagctggcc ccatgggcat ggacctgtgc agtcacacct tgccccgtgt tcagaagggt   17340
gctgtgcctg ttttaatgct ctgctgttgc tctcttgaga ttcttaataa ttttttgaaca   17400 aagggcccca catactcatt ttgtactggg tactgcatat tatgtagcta gtcttgaatc   17460
taggacagtg cattaaaatg ccattgattg gatcaatctg ctcttgcaac tgatttgaat   17520
tttgggaaca tgctgtttcc tgtgaataaa ggaggattca tttcttttcc ctcgaataca   17580
ctgcgttctg ttttccaaat tagctctacg tatcaactca gctgagaaat tggaagcggg   17640
gattgttctg gctggaaggg aaggttagat tgttaatcct gcatcctggc cctgatctca   17700
ccgagtgtga agcatgttcc cacaatggtg tgggctgcgg ggggctggag gctggctgag   17760
aaggtgggga ccaaggaggg aggctagcct gggagccaga cagatggggt taggctcttg   17820
cttttgccac tcgccagctc tgaggcttag ggcaacatga tttaattctc tgatccttgt   17880 tttttttcatc tttctgtaga ctggtgatga gatgcaccct gcaggcttgc aggcttgcag   17940
gagtaattaa aggtaatatt tgtgcctatt attgggcttg acatatagta gatgctctac   18000
aataaataga tcctattatt cttattgata atatttatttt attgctaaca ttgaaggttg   18060
ggtgggattt gactagctgg aggcgaggag aatgagatca tccaggccgg aaggaaaaga   18120
gacatgaatg cagggggatg gggtggagca ctttggaggt gtggggagag gtctgcaggg   18180
tgggagttgt gcattaagga gtcgtgggga gagtggagga atcagtgcca catggtgaat   18240
gagaggggat cgtgggcccg aggagatggc gatggctgcg gggatcctgc aggaagttta   18300
tgtgccccaa agtggcatta tcagttaggg ggagacactg aagacagagg tgaggcctgc   18360
ctgaattagc gtagagtggg attcttggaa gcttcagaag cttgagaaga gccacttgga   18420
ggtgttgaaa tgcacctggg agggacgtgg ggacccagct ctgggctgag agctgggaga   18480
cggaaacgca ggtgaccttg gccttgaaga tggggcatga tatttagtgc tttatgtgca   18540
atctcaccta ggactcccaa gccctttgga gtaggtgata ttagctccgt gttacagaaa   18600
gggagactga ggctgaagca gggacattca tgatctgaag tcacacagct gtacggggca   18660
gaagtgggca tggaggcatt aacttagagc cgaaaggtgt gacctttctt agtgtggctg   18720
gccccacggg gaacgtgtgt gggttggagt acaacttggt gttcctaccc atcccagatg   18780
ctctgcgttt gtgaacccca gttgccacat cagggcgggc gagggcagga agctctgcag   18840
ggagaaggga caagggacag agccaagaac aggggcagtg ccccagggtc ctgcaggggc   18900
aatgaagggg gttggcacac ctgggttagt tgctggccag tgtggggaga gagctggcct   18960
gggagtctaa tgggaatgcc agggaaagct gccttggtcc cctaaagtga agcccccatg   19020
ctggccatgg agtgttggtg attgagggtc cctgctagtt gtctggccga ggcagcatgt   19080
cctataggca tagctctggt gtcctgctgg cgtggcgtga gtgcccctca tgctgggagc   19140
cagccctgtg ctctggaggg aggtggtggg aggacaaggg acagtgggac ctgccacctg   19200
agcaggaatt ggcaccttct cccactggca ggtccaggtt ttatggaatc tgaaacttgt   19260
acaattcagt ataccctctt caagaaaaac accccctcaaa attatgaata taacattagg   19320
```

```
tatgaaacta ttattgatat agattgaaaa aagaaaatgc ccaaaatgac aaacttcaga    19380
aaatagacaa atactgcaaa catcacaaaa tcagaaaaat aagattaaaa aaagctaact    19440
gctgaacact ccgtcatctt gaaaatgccc ctctctcctc ctctatttt tggctgtgaa     19500 ctctttgctc accttttcat gtgacaatgc ttttgtaata tttcctacag agaaaataga    19560
ataatttatt attacttta ttgttttgg attattatta tgatcaattc aatattttc      19620 tgctacccac acactcactg tcttctgtcc aacctctggc ctgcaccagg gaaccagca    19680 gtttcccctg ccataggtg tccctggaga ccacacatat agcaggatag atatagcaat    19740
ttaactagac acagaaggga cttcaaagcc acaaatatat ctcatttaac ctgaacaaaa    19800
tgattatcca gttttacttt tcccttagcc tcttcccca aatgctggca gccaccctga     19860
tgggatagat gtgtgacaga gggcaagaga ccgtggcccc aaccagctgc agcttcactc    19920
tttcatttct gtatactctc tacaagctgt gatgatagca ctttgctagg gcccctcaca    19980
gggcagatgg agggctccac gctgaagctt tgtggatgtt tgctgtctat ccacctctgc    20040
tccttgtgcc tatgcaggga ttcaggccca accactgcag agagcccaag agcatcaggc    20100
agaggttccc aaactgtcat gattggtggc acctttagta gttgatacgg tttggttgtg    20160
tcctcaccca aatctcatct tgaattccca catgttgtgg gagggacccg gttggtggta    20220
attgaatcat gggggcagat cttttcccgca ctgttctcat gatagtgaat aagtctccca    20280
agatctgttg gctttataaa ggggagtttc cctgcacaag ctctctctct gactgctgcc    20340
atccatgtaa gacatgacat gctcctcctt gcctcccacc atgattgtga ggcttcccca    20400
gccacgtgga actggaagtc aataaaacc tccttctttt gtaaatcacc cagtctcagg    20460
tatgtcttta tcagcagtgt gaaaatggac taatacagta gtgcagtcat tttttcatgg    20520
tccccagtaa ggccaaaaaa tacccaacag ttccatttat caattagtgg aggccaaaca    20580
atttgataag tatttgtgtc cctataacac agtggtcatt aaaaaaagac attttaatt     20640 cattattcaa taagcatgat tacttatgaa tgggatatgt gcacctgttg ggtgtcacat    20700
gacctttcaa atcttggagt cagattggac accaccatgc ccatttccag ttcaactctg    20760 attttttgtgt ggtacatgct ttttatcaca gtgactgcca gaaatccaac ttcatatgga    20820
atcatgaaaa gggatgtagt gtgatctgat ttcaaaacta tgatcaatct agagctagtt    20880
tacaaggtgt ctaacagtga tcaagtatca ctgtatttcc ctagaaaacc tgaaatatcg    20940
atgaattttc tgtggcactc tggggtccct tggggcacac tatgggaacc atgggattag    21000
gaccataagg atatgatttt ggcttcttcc tgcctcagat ctaatcttta cctggcattt    21060
ttgccttaaa gatgaaagaa gcatacattt tgatgtattt aaagcacata ttcggccagg    21120
tgcggtggct cacacctgta gtcccagcac tttgggtggc tgaggcaggc agatcacaag    21180
gttggaagtt tgagaccagc ctgaccaaca tggtgaaacc ccatctctac taaaaataca    21240
aaaaatagct gggtgtggtg gcatgtgcct gtaatcccag ctactcagga ggctgaggca    21300
ggagaatcac ttgaacccag gaggcagagg ttgcagtgaa ccaagattgc accactgcac    21360
tccagcctgg gctacagagc aagactctgt ctcaaaaaaa aaaaaaaaaa aaaaaagca    21420 catattcatt ttgtgcttat tcttttgaga gaaacacaga taaagcccta tcctttaatt    21480
catactcccc atactgtgat tttcattttt actgcaacaa attttgttca gtgtgataat    21540
gaatgtcaaa cacttaatgc cttgctcttt tcagtaacat gacatattgg agaataatga    21600
ctgaagctta tctacactgc ctacgtcgt tttcttccac cttgaaagaa gttgttgaaa     21660
gtaattaaga agtattatgt gtaaaactcc agggatgatg tgcttcaagg aagcaacatt    21720
```

```
tatgaagttg tgtgcttgac tagtagttta taaagaggaa agacgaatca tttattgtct   21780
tgggattgaa tcttggcaat ttttaaacta taaagttaca ggaaatgttg gctgctctta   21840
atgggccatt tgttgtgtta aaaatcagta atgagaaata tttactaggt aagtggaaag   21900
atccatctct ataaattgtt gtaacttacc attttacaaa tcttagttac tcagtttttc   21960
tgcttaaaaa tgaaatcatg tagcactgta taagtcattc agttttttat tttggagaat   22020
tactctggat tgtctaggct ctgtgctctc cacatatatt tttgaaatag tttgtgaatt   22080
tctacaaaaa ctcctgctca gaattttcac tgagagtatg cttaatctat gggttaattt   22140
gtgagaaatt gatagcttaa caatagtgaa tcttctgatc tacaagtgtg gtatttctct   22200
ccatttattt aggtcttctt tattttgata gcgttttgta gctttcaatg tacagatctt   22260
gcaaatatct tgttaaatat ttccctaatt acttgatatt tatttttgat gctgttatag   22320
ttatatttta aaaattttga ttccaattgt tgctaataca tagaaatgaa attatttatt   22380
gacctcttat cctgtgacat tgataaacgc agtcatatat tcgtagtttt ctagaatttt   22440
tctatataga ctatcatata tatcatctgc aaataaagac ggttttacat tttcctttcc   22500
aatctctatg ccttttgttt ctttctcatg cctcattgtg tggtccatta ctgaacggca   22560
gccagttcca gctttctgtt caattaagga gcaggtaaaa tggccaggcc ttgacctttc   22620 aggggcttc ccgtcctcat tgccttctgc tgcctcagtt ctggcttaac agaacagtgt    22680
ggggaggagg catggtcctt acctactagg gcgttacttg gccttcttca ggttggttgc   22740
ttcgtcaggt ttaagagctc acctgggctg cagttcaggc taggttatct gctgacctgg   22800
ccctgtctcc cttctgtagt gtctgtgggg taccctttgta agctagggag aagagacaca  22860
cgtgaaggcc agaaaaaaca gcctgccaca cagcttccct ggatcatacc ttcgcagtga   22920
catgacgacg tcgttaggag gcgccgaggt ggctgagtgg gtctccagac acctcccttt   22980
acctctctgc tgtgccactg atgtgtgact tgcttacacc tatgcagagc tgccactgag   23040
cagcactgtg gccagtcctt tggatttttct tcttctaaaa ttgtatgccg tggcttgatc  23100
aagcatttca tatacagtag atcatgaaat cagcatagaa aacacattga ggtaggtggt   23160
gttaccacat tttatggatg agaggctaac acttggagga gtcaggtaac atgtccaagg   23220
ccacacagct agtgagtacc ctgctgaggg tcacactctg gtccatctga ggccagagcc   23280
tgtgccagcc ttctcctcat gctgatagac gaggaaacag aaagaaggag cagtggacgc   23340 ccccacectc tgtcccctga acccctttgga gagtaggcag tggcagagcc agcctgggcc  23400
catctatggg aattctccat cgggattgac tcctctggaa ggaagacagt tgacccacag   23460
ttgagatcac agcagatggg ccagccaggg tgtctgtaga ccatcaggca gtggccactc   23520
catgtagttt aatggacaag ccctttttaat ggaacaggaa tctaacactg aaccaagctg  23580
cttttagaca cacttttatt cctcactctg aaatggcgtt tggacaagcc aaatatttct   23640
tcttctttca gttgacattt tgtccatctt tgaactgtta gttgatgctt cttctgttta   23700
gttattcctg ttctattttc ctgttgccac tagtccaccc agggatggta agaatggaag   23760
tcaatggttg cttttttcatc tgagatgcac cacgaaggct tgtcagtcag ccttgtcata   23820
tggtctgtgc tcccactgct ccttcttctt gtttcctcat ctgcagaatt tggagagtcc   23880
tggacctgat ctcaaatttc acatgttatt tatcttcctg cagcacgctg gggagaggaa   23940
gagacaggga catagaaggt tggagctgga acagacttca catctcattc cagaggcatt   24000
tggtccatct tacagatgag gaaatggagg ctgctcagtg gactgaggct ggaactgggc   24060
```

| | | | | | |
|---|---|---|---|---|---|
| cttccagtgg | ccaggccaga | tcctccttga | tctcccttgt | tgctttcctg | gtgggaagac | 24120 |
| cctggaacca | ctttatgtga | ctgtgtgaga | agggaactgc | ctctcatttt | acccagcaaa | 24180 |
| atccaccttc | aatccatctt | catttttgcc | cctggtgtgg | gcaaattctc | ccatacctaa | 24240 |
| ttcaggaagc | cagaaagagg | aagtgagtta | atgatcctta | gtgggaaggc | gctggtaatg | 24300 |
| gtccttcttg | tgagagtttc | tgaaacacca | cgctgtctct | gtgttctggc | ctggctggag | 24360 |
| ttaaacctct | tcttggcctt | tccccaggaa | gctggtctga | ggaagcccag | atgcgtttgt | 24420 |
| ttacagctgt | ctggtgacat | tcgccaggct | ctgttttcag | aaggaacatt | tccattccct | 24480 |
| tatttacacc | tcccattgga | gtgctcgggg | ggacacacca | attatttgca | actacctgga | 24540 |
| aacctaggag | ggtagcagat | ctgtaggagg | ccagtgttga | agtgagaagc | tgtagatctg | 24600 |
| gtgacactgt | gggcttggga | gggcttgccc | agatctgtta | cttatactct | ctattaagaa | 24660 |
| acttcagtgt | ccatggagaa | gttatttaaa | gtctgcgagc | ctcagtttcc | ccatatataa | 24720 |
| tatgggaagg | atacctgatt | ttcctattcc | acatgaaggt | agaaaaaatt | aaattaaggc | 24780 |
| agccaatgaa | agggttttga | aagcaaaaat | aataatatga | tactgttctg | aatttgttaa | 24840 |
| attattcttc | caagtagttg | cagatctttt | tctgtacctt | agaaaaaaac | catgctatgt | 24900 |
| aaaaggagat | gattccaatc | tttaaataaa | gcaactcaga | ggtcagggc | taggacagaa | 24960 |
| aacggccctt | tgttcacaga | agcgctctca | cttccaagaa | agcaagcgtg | ggagaggcag | 25020 |
| gtggtcctcc | cgatgtccct | gtgccccatg | gtgtcaagct | gggttactat | ggcccttcgt | 25080 |
| gacccagtgc | agcagggatg | tgggaaccag | tgggtgtgaa | gctgtgacgg | gtcacaagag | 25140 |
| ggctgggacg | tctcacagct | tttacttata | gcctagagcc | tggggaaggg | ttgccactct | 25200 |
| agtgatgaga | gaggcgtgtg | tgtgtgtgtg | tgtatgcgtc | tgtatgtatg | tgtgcatttg | 25260 |
| catgtatata | tgtgtgactg | tatgtatgtg | cacatctgtg | agtatatgaa | tgtgtgtgga | 25320 |
| agtgtgtata | ggtgtttatg | tgacagtttg | tgtgtaaatg | tgggtgtatg | tgtgggtgtg | 25380 |
| tttatgcatg | tacatctgtg | ggtgtgtatg | catagtgtgt | atgtgtgagt | ttgtgtgtgt | 25440 |
| gtgtgcattt | gcatctctgt | gtatatatgc | atgtgtgtta | ggggcaggca | cacaggcctg | 25500 |
| ttggtaaatg | agacacaaaa | tacctacaaa | atacaaaatg | tgagacagga | aatacaagcc | 25560 |
| ccagttactc | attttcagt | gcaacagaca | taagattacc | atgtgaaatt | gctatgaaag | 25620 |
| tttccgaaag | cttcctgtca | attcgtagtg | agcagctagc | agaggagtgc | gggtccctgg | 25680 |
| agcctgcttg | tgcaacgctg | agctagtcca | aggggaaga | atggggtgca | tggctctcag | 25740 |
| ctgcagacca | gcctggaacc | tctccagcct | gctttagcag | agacttgtta | agaggtagca | 25800 |
| gcaggtggca | agattaggag | ccggagtagt | aggctaaggc | tgcacttcca | gggacacact | 25860 |
| gcctctgcca | ccacccgtgc | cacgaaaatg | ggagcccagg | accctgaatc | tctagcagtc | 25920 |
| cgtttctgaa | tcagttacct | tgggtatgtg | cctctggttg | atggaaacta | acttgtagcc | 25980 |
| ctgctgggtg | agagcctcac | atcgggacat | gtgacagctt | tgttgaaagt | agctttggaa | 26040 |
| acgcccacca | cgtggggcca | ctcactgtaa | tataaacggt | catgcatcac | tgagcaacag | 26100 |
| ggatacgttc | tgagaaatgc | gtcgttaggc | gatttcatca | ctgtgggaat | gttacagagt | 26160 |
| gtgcctacgc | aaacctagat | ggcagagccc | actccacacc | taggccagat | ggcagagcct | 26220 |
| gttgtttcta | ggatgcacgc | ccgtacagta | ggttactgta | ctgaatactg | taggcagttg | 26280 |
| taacaatggt | gagtatttgt | gtattcaaac | atagaaaagg | tatagtaaaa | acaatggtgt | 26340 |
| tatggtccgc | ggctggctga | aacgttatgt | ggtgcatgac | tgtaggtata | aagcattaca | 26400 |
| gttgtttgat | ttttctcttt | ttctcaccca | cagtcttaag | gcacctctta | tgccttttgt | 26460 |

```
ctgggatgtc ccgggcaggg ttggaacgtg tggttaaggc atggcggaaa ctgctttggg    26520
gacagacgat ggcctcagct tgccttgggg tgtcagtggg aaagatagga gctgcccctt    26580
tgccttcgtg tttcttcgta ataatctcag atgtacccgt ctggtgggcc tctcctagaa    26640
aaagccccgg tgctctttgc tcctgcggtg tttctcagga gggttgttgc ttctttgtaa    26700
tggtggggac tcagggaagg gacgcaggca gagggtgatg ccacatcaaa aagggaccct    26760
tggctgggtg tggtggctta cgcctgtaat cctagcactt tgggaggccg aggcaggtgg    26820
atcacctgag gtcaggagtt cgagaccagc ctggccaacg tggtgaaacc cggtccctag    26880
taaaaataca aaaatacaaa ggtggtgggt gcctgtaatc ccagttactc agtaggctga    26940
ggcagaagaa tcgcttgaac cggagaggtg gaggttgtga tgagccaaga ttgcgccatt    27000
gcactccagc ctgggtgaca gagtgcgact ccatctaaaa ataaactgaa aaaaaacaaa    27060
aaacaaactt gggccatcag cttcttggaa aggctggtgt gaggttgaag catttgctgg    27120
tgcctctgct caacgttttt gtggtgaacc tgagcaaaga ggttatcatt agtggatttt    27180
actgccttac ctgggtgggc actcccttgg gaggtggatg gacatttgca gctgagccca    27240
ggtgggggaa ttgcgctcac tccgccttca gaattccaaa ggctgggcat gcatcttggc    27300
ttcctctaac ccatgtcttt ctctaggtgg ccacagcaga gtgtcattaa gtatctattc    27360
tttgcttttg ttctcagggc aggaagatcc caacagtttg cgccataaat ataactttat    27420
cgcggacgtg gtggagaaga tcgcccctgc cgtggttcat atcgaattgt ttcgcaagta    27480
aagagagcct tccttttcc tataacctcc gaagctttca ccgccactag caaaacatga    27540
gagctatttt tgagatacat taaagtgtca agtgtcact gaatatcttc ctacttaaga    27600
taagtgtgtc tcccttagaa cattttccct attcgactat ataaatctac attcttgacc    27660
cttctgaatg tttaaagaac ctcgggctct gaagagattc tctaagaata tttttgtaagt    27720 ggaagttttt gatgcatgca aaaaattggc aggatgttta gtgtttaaat gctaagcccg    27780
atatataaag gagcgatggc taggtgtgtg tggctgttgc acaacccatt aatcaatgcg    27840
ttgaagcgtt cattttaagg tgctacaggc ttaagtgtgt actcctttgg attttaggct    27900
tccgttttct aaacgagagg tgccggtggc tagtgggtct gggtttattg tgtcggaaga    27960
tggactgatc gtgacaaatg cccacgtggt gaccaacaag caccgggtca agttgagct    28020 gaagaacggt gccacttacg aagccaaaat caaggatgtg gatgagaaag cagacatcgc    28080
actcatcaaa attgaccacc aggtaagggt gttctcgcct gcagaggtga gttctcagat    28140
gccccggaac acccttggca aaggcaccag agctctctga ttgcagctga ttctcggggg    28200
gcactgaagc cagtctgagc cagtcacagg agggccttga ggagatgctg agtatggcct    28260
gggggtgtgg gagaggaagg ggctcaggaa aacttctgta aggagccaga taaagtttt    28320 taaaataatg tttttaaatgt ttgtcaaaga aagcaataga tttgtaaaga aattagtagg    28380
taagtagtga aaattgattc tccttcccat tcccaatcct gtggcaactc ttgttacaga    28440
ttttatttat cctccacaga tacatcatgc gttcacaatg aacatagaat ttactgggtt    28500
ttagactgag ccatccttaa cttgtcaaca gttactttga aaacaaacca gctctcccaa    28560
attgggtttt tgcggggtta tgagatgtgt ttcaaaagaa tgtttcgtac tttaaacatc    28620
ttggaaaact tgaattaaaa cagagctaat ggatttcttc tttccagacc ttctcagagc    28680
ttttagtatg ctagtgtgca cgtggcttgc ctacaaaagg gtgttgactg aactatttgc    28740
ccaaattata atcatttgag tatacagctt tttgtggggg caggcagaac tgagacatac    28800
```

```
caaaatcagt ttgggaaatg ctgtatttga aaatgctttc tatttaaata ttctctttgc    28860
aatcattttt gctctgttga tttgcttagc aaagtcttca tgtctgggac aatatccatt    28920
tcttactgac tcatcaaaaa cccccactcg acacgtcgat gagagaggtt ttgtttgctg    28980
tgtggcatgt tcagtgaaag cgtggttttcc agtttcttca catccttata attttctaga    29040
cttcagatgg agggaacaat cagaggaggc tggaatcctg cctctgacca aggaaaagac    29100
cagaggctga gccaggtggg gtctcttgtc cagccctctg cttgcctcgc tttacctggg    29160
tgtgggctga gtaattccag acaagcgtgg aattaatctg gctgtttgtg ctgttcagtg    29220
gcacgctggt tacacctcct tctggaaaca actctgcgtg tgctgtttgg gtggtaggat    29280
tccgggtctc cttctccgtc tttttataac atcaagttgc tgcccagctc aggctccttt    29340
acggccagtc ttcagaaaac caccagctaa cacatttact accctccttc cccgatgttc    29400
ctgtagcttc tctatggctg ggtggccagg catggccgaa gaggctctgg gtagatatag    29460
gctctgtgcc cggtgtgtgt aactggcctt gagtgaggct gcagttgtgt gttatttcta    29520
ttaggtcact gtggaatttc tagcgacaac taatctttca aagtgtgttt attggtcaca    29580
ggattattgg gccagcctct gccttcattc ttttcacct aatctgcata atagctgtgt      29640
tatccccatt ttagagaaga agaaacaggg gctcagagaa gtctagtaac ctgtgtgagg    29700
ccacacagca aacacctcat gaccctgccc tcctaaggca gcccatggct actgctggag    29760
ggatagaggc cggccccgtg gtttgatggg acagcttgac cttaaacagc ccatgggaag    29820
gcgggtgcat ctggtttagg aacaggctgc tagaaaggta tccaggatgt ggtagtctca    29880
ccggaaggag ccagtcagaa tagcacagcc tgtggccacg cgtgggacct gttcagcctc    29940
atggagcttt gggaggcagc cagcagcagg gcatgggctg tgtgcaggcg aggcgctggc    30000
ctggacgccg cccccactgc gtaacttcgt gtttggaatg cgtgggcaca taccgtgcgg    30060
ctgcttctgg ccggggata ttctttcca atttgagcc aaggtggaga ctgtctcctc        30120
gtgccatccc tggcatgtcc tggcaagacg tgaacgatct caatagacga gctttgcaga    30180
gtgtgtctga cctgactcct gctgtcttgg gagtttagct cttcagccag cagcatgctg    30240
tttgacatgt gtttcaagcc ccccaagaaa gggtgcttga aatttaaaat tgaactgatg    30300
tggcttttca aaatggaatt ggaaatgaaa ggatattaaa ttgcagacac ccacacaaaa    30360
gactggtttc cactgactaa actgcttttt tttgctgata gtagttgaaa gtagggagag    30420
taacagcatc tcttccagct ttttctcttt tgttcccttg ttttgatgat gggttatttc    30480
gggggaagct ctggctggcc ttgctttgtg tcatcttagg gataacaaag aggatgaaag    30540
agatcaggaa aaccgagaag gcagaacaga accagcagaa actgtgcttg aggaatgaaa    30600
atcacctaca cggctccttg tcatatgaga ctgtggccca gcctcctgca aagccattta    30660
agagtaaccc agtgaagctg gtgagactgc ctgccgcgtc cgtgggccca gtgactaact    30720
cggtggctta tcatctgggc ccagctcctc ccctggcatc ctgatttcac ttggaggggc    30780
ccccgttgtc cttcataaac atgtttattt cattttattt ttatgttttg agacagagtt    30840
ttactgttgc ccaggctgga gtgcagtggc gccatctccg ctcactgcaa cctccacctc    30900
caggactcaa gtgattctcc tgcctcagcc tcctgagtgg ctgggactac aggcgtgcac    30960
caccatgcct ggctactttt tgtattttta gtagagaccg ggttttgcca tgttggccag    31020
gctggtctca aactcctgac ctcaggtgat ccacctgcct cagcctccca aagtgctggg    31080
attacaggtg tgagccattg cgcgtggctg taaacgtgat attcttgaga ctttcagtga    31140
aataagaatt gccacggaca tctgtggtca ttgtccactt gccactcacc tacccccttt    31200
```

```
tctggcagca acagccggca tttcacatgt ccatcatcgg acagcgtagg tgggaccatc   31260
agtcatggtg tcctaccctc tgtggccaag gagtggacac aggacccagt tagggcaagc   31320
agaggctccc cttggaatcg caaagtgaag ctggatgcca cccacagaga ctaacatggt   31380
gaagctgctg tagcccctgc tgttgagccc ccagcactgc ctgagttctt gcactttgtg   31440
agtccagttt aatatctgct tttcctccca ttcttggagc tcccctcaca tctccagtgg   31500
cttgaagttg ccagagatgt ttctgggctt gtgaccaaat gactccttt  ctgcttctca   31560 ctgctgagca gacacatgtg cgctcacttt gcctgctgag tcttgggacc cggaagagct   31620
tttgggagac aatcacggac cagcccctc  ttgcctgccc tgctgtctcc ctccaagcag   31680
gaggtgagaa ggtgtccacc tgcagccccg gccaggcatc cctttctgtg cttctgccca   31740
aatctgaaat tccctctcc  ttgggaccca cgactgggc  cagcctgcct ggggagggaa   31800
tcccagctgc agaaagtcgg gacagtgtgc gtgtaaacat gttaatagaa agcagctttg   31860
agggcagact agttcagctt cagttacaaa ctctttccaa atgcgtttaa catgagccac   31920
tggctgtgcg cagcatatgt caagctttca tccaatggtg gcattttgtc cctgcgggt   31980 tttttttcc  tgagcagttt ggggcagggg tgggacagg  gagagagaaa agtaaaaaga   32040
gagcagtttg gtttcttcag gctggagtac aaggcagagg taatgggatg tattgaagaa   32100
ggtaggaggg aaagttactt tagctacagc tatttgtcca gctgtgctga ttaagaaact   32160
tggagaaaag catctttgga atcatgtcct tcccatctta tatacagcct ttgcagattt   32220
cctgctgttc tgagagagat ctgaactcct taccaggacc ttgagggccc cacctgattg   32280
ggcacccctc actctctctg cccctcctcc ccttcccctc ctccctcct  ttctccaccc   32340 ccacctgctc tgctcagaca ccccttcctt ggttgcttcc cacaggccag ggctgtcccc   32400
tggggccttg gctgttcccc tcccaggagc gcccctctcc agctcctcat gcagccaacc   32460
ttcctgtcct tcaggcctct gattaaattc tgccttagac atctctcccc accccgctgt   32520
gtgaggtagc gccccatgcc ccagtcccct caactccact gcctcacttt ggggacacat   32580
caccccaggg acaactgcat tccactcttg gttttccct  cctcgtctat ttatcacaat   32640
ttagagtcgc ctcactcatt tgtcaaatga agttcatctc tgcagctgga ctgcggggtt   32700
gggggcacat ccggctgtcg gtcctcaggt aggaggtgct tggcaacctt gttcagagta   32760
ggacgttcac agctgtctgc cccggaggaa gcaagggcac ccgccacatg gatgaaattg   32820
aggggaaggc acccgggct  cctgcatcga gcttccctcc tatattcaat gaggaaatga   32880
ccctgcagaa ggctggctgc agatgcccct gcctcccggc tttgcctgct ggagtttga   32940 tggacacgtg gtcctgtcag ggctacagca ggtctatggt ctttggtaac ggaaagcgct   33000
ggtgaaacag tgagctttcc cgtgggtgct tttccctgac gccaacaacc aggtaaatat   33060
ttggaaacgg ccttgttgag gcttgtgagg tggttttcct ccctcccctg taggcctgcg   33120
ccaccccccc aaccccacgg ccacctttgg gccagatggc acccacagac ctgtttgaag   33180
tggccacaga gggagccctc tgggcgctgg ggccgctgtg tttgcagagg gtcctcttac   33240
tgctgagctg gctggtgcag tgagaaggaa ggccgacacc cctgatcctc atcaagttca   33300 gacggggtc  actgcgggtg agggggctgg ggccttttac atgtcccggg agctgctgag   33360
caggccactc ttctccaggc caccagaact tggccctgcg catggtgaat cttccctgag   33420
tcagctgagt gaggggttc  aggcagcccc ccgggacatg gcagtggcgg ggagtggact   33480
ggggtggtgc ttgccatgac tcacgccggt tctcctcagg caaccggatg gtcagatgcg   33540
```

```
ctgactcagt ggcctgagct cgtccaaaag cgaatcagag aacacagggc ctgggctcac    33600
ccgctgccct cttctggagt catctgtcac tcatcctcat gaaggaagcg cctgggagcc    33660
tggaatgcac atcgcactgc cccagctccc ctcttgtttc tgtgttttc cattttggat     33720 tctttccccc aacgccttct gtactgggca ttttgtggtc tcttctttt ctccgagaac     33780 tctgagggct accattgcat ttgctaatga tgccacagac ggtgttgacg ttatgaggct    33840
tctattactg tattgatttt taccattttt aggggacgg gaatcaatat ttcatgaggg     33900
aatgtgaagc cagacagtga agtagaagct ggcttttatt ttgtgccagg ctttgtccag    33960
aggcgggtgg ggacgtggct cctaagctct tgattgcagc tccttctggc ttgggaaacg    34020
tttcagttcc ccaaactctc agaactggat cccctgtgtg ttctctggcc cggattcaag    34080
aacttagttg attgtcaagg aaattctttg gctatatttt tctcttaata tggtaatgcc    34140 tttttttcact ctggcactct cttttcaggg aattggatta agactattat ttatgggtct   34200
gacaaagcag ttcccaagtt gttgggactg gatttgttta ggaatgtctc ctgtcctctt    34260
cattgagggg ggaatacaaa ttgcttccat ttgacagttt atcaagtgtg tgacagagta    34320
tcagagtcca gggttggcca actacagcca gtagtccaaa gctggccctc tgttgttgta    34380
aataaagttt tattgggaca tggtcatgct cacttattta ggtagagtgt atggctgcat    34440
tcagtctaca ccagcagagt taaatagttg tgatgaagac cacgtggccc gtgaagccaa    34500
aaatatttgc ttcctggccc tttacaggaa aaaaattccc agcccagtg gcaggcaatt    34560 aacaccttgt cctcgaggag ctgaaagtgg ctggaggcag gaatgcttat aagaaccaag   34620
cgaggtgaag cactaggtgg ccgcggcgag caggaagaga agctgatttt gtttgccctt    34680
tcgtttgcca gagattgtgg gttctttttt tttttttttt tttttttttt ttttttgcaga   34740 gatgaagctt tgatcttgtc acaatagcag agggaggcct tattttgtc tatttctctg    34800 tgacattggt agaaaggact ttgtcagaat ccaagctat ttggcaatta ccaattttg     34860 agatcctaat ggatctttcg aggtctagtt tgttcattct tttagtgatt ccttgttaat    34920
tccctgattt tataaatgtg tgttgaacat ctgtcttggc caaatacttc ttaggtgctg    34980
aggatgcagc aatagtgggc aaagccatgg ggcttaagat ctagtgtggg aaatgggtga    35040
tgtaaagtaa atatggcgat aagtacagtg cacgaagcaa acaagtgaag gggtagaagg    35100
tatcaggctg caaagacagc agatagtgta ggcagggaat cttatctgag ggggtgacat    35160
ctaagctgag atggaaagga cagtgagagc cagccaagga aacaagttgg gtgacaagag    35220
ttgcaggtgg agttgcttaa tttcccactt ctgctcagcc tgcagatcct ggatcttgga    35280
ctaattgcaa actgtcattt cctcgtgagt ttattagaac cctccagaac aagtttctgg    35340
ttagctagtt tctctgtgtg ttgtctcatt tcttgttggt tctggttctt tggggttcct    35400
actcatactc tggaaagctc cagtgtctta agtagtcagt ctcccaagag tctgaaagca    35460
caaagattca caatgatacg atcacctctc aatcatagca gcattgatgc agttccgtag    35520
ctggtttcct aaagccatcc agatctcttt ctgtggcaag agagaaataa gaccttctgg    35580
tgaattgagg actaattatc ctaataaaca tgcgaattaa cagttccttt ggttaaacaa    35640
agcaccagaa tctgataatg ggaacatgtg actcatggta tttccttctt tgctttatct    35700
accaggcagc tcacagaaac cactggcctt ccctgtgttc ccattttatg tcataaatat    35760
atatttaatt aacttattat aaaaggcct ttgttcattg accatatcaa attattctta    35820
tatagaagag gttatacatg ttttaaacat tttaaaataa atctgaaaag aatgctacat    35880
cctgggcaac ttccctgcat ttggggctca agaagctct atgtggttat gggtaatgag    35940
```

```
gagccagagt gccttcaggg cagttcagca gatgctgaaa ggctgctgtg tgctgttcgc   36000
tgggcccacc aaatagagta ggactgagcc cctgtccacc atgacagccg ggagatacaa   36060
gctgttccct ttgcctccct gagccctgag ctttatagcc tatagacagc tgaaaagcag   36120
gctgcatccg ttacccagtc agttacccag acccaaatgc caggccttgg ctaacccag    36180 ttattaccta attttaatat cccaatggat gttttaagac ctggctggtt cattctttca   36240
tttatttact tattcattga ttttgtaaat atttctggag catctgccat ggccacatgc   36300
tgttgtagca gcatcagcca ctctgaagtt ggtggatgaa aggggatgca tcaaaggcgc   36360
tgatgtatgg aggagacgca agttagactt gaccaagaca atattattcc tcctctggat   36420
gccccgaata tatacagtca ttagctgtcg ggcccccatg tggcactgtt gacattttgt   36480
ggtttaaaca ctgaagagta agggaatatt ggaaatggca acatctgat atagtgtaaa    36540 ggagactaaa tattttgatg gtgttcataa acaccgagga ggaaagtctt ttcattttt    36600 tcatttgtgt gctctctctt tctctgtttt tgcacactgt cctctgttct ccttctcctt   36660 ctcttttcc tttttctcc cttcatctcc ccatttatct gatctctccc acctgaaccc     36720
cttctaccct gctgccctcc tgtccattct accttctcta ctcccctccc tagacagtag   36780
taatcacatg tcagttggag aaacatgatg gcaacttggt cacaccgttc ttctcagtct   36840
gtatatgtcg gtgatctcag tgcccatctg gcagatcctt cctgccctgg ctcttctgct   36900
cactgcgacc acccttgact tgtgatcac tgataacctt caccttctct aatctaaatc    36960
ccaagcttct cactcttggt ccaccactc ccagccttgt ccgttctgaa ccctgaacgg     37020
aagctgaatg gaaccctgaa cggaagggtt ctgaagctgt tcagaaccct gaatggaagc   37080
tgaaatatca atgggccatt gcttttcaca gtcctctgtg aaagattact ggccaagcca   37140
gcatctggag aattcctggt ccaccactc cctgtctgga gaagctggaa cagccagctg    37200
catgagcatg tgacccgtgt actcacaggc cctgtgccct gagctcgctg ttttaatttt   37260
atctttgaat ttgtatttt gtgaataaag ccctatgagc taatggagca tgctcaggga    37320
acttggggct ttagctcagg ctggattcct cctgctgcct ccccagtccc tggtcccctg   37380
agaactccag ccccatctga ccttcccttc cctgtctcta tgcaggggtc attgctaccc   37440
tctatccctg gaaaggatgt aggcacaggg cagttctagg ttccagcttg ggcaccgctt   37500
aacatcttgg tggtgcaggg atcaggctga tgataccgtg gttgttctgt gggctactgg   37560
gcagggtcaa gccactccca ccctgatcca ggtacctaat gcacccgaca cagaagcggc   37620
agtgtccttg gggtcatcca ttatccatgt gttggaggag tgggaccccta gggaagatgc   37680 ttggctcgac ttccccaccc ctagccaggg cacaatcaga ggtccagggg ctggtgggca   37740
caatgccaag tcgtgaggcc tccagtgtct gcgctcactg tcccataaat aaccacagta   37800
ataactagca aatcaaaaac attgtgatag gtcgagagag acagcatgtg aagaaagga    37860 aaaagctttc tattttagta cctttaacag tgctttctgt atgctttatg aacaaggagc   37920
ctgcattttt attttgcact gggctctgct aattttgtag ctggtcctgc cccctagtag   37980
ctcaagtcag caaatctttg gttcatctga gtccacagtc cgctgacccg cccttttca    38040 cagttcctcc cctgcccatg tgctcacttc cctccttacc cagcttggcg cactccctca   38100
agcaagtctt tggatgctga catccccgt aaacaaccct tctgcggcct ggtttgattt     38160
tccttaggag acatgcaagt tctatagcac tgtttcttgc tgggtatgga ggatgtgcta   38220
ttttgtccat tgcatatttt ttaaagaaaa tgaaaggtta gcataactgt ttccagaagg   38280
```

```
cacattgaat cactcagttg agtcccagcc agttgctgca atgttagcct ttgaagcaaa    38340
cttgaaccaa cacaggacca gcctagaagt cccagcctcc agaaatgatg cagtggattc    38400
tgcagattca gcaacaacaa tattttgta actcaagagc acttagtaat tttcaaagga    38460
gagaaagaag taattgactt ggcttattag gttgaaaaag agttgccaac ttttctttg     38520
gttttgatgt tattggtttt tttttatttt tcttttctcc aagcttcagg gaatgagatt    38580
gaatgagcac tcaagtgcta ctaggcagaa ccctgaatgg aaggaagctg aaataccgat    38640
gggtcattgc ttttcacagt cctctatgaa agattactgg ccaagccagc atctggagaa    38700
ttctaggaac gcccctcct cttgcagcag tataagtttg cggggatcat ctgaccccat      38760
tggggagttg tatgaaaaag gggatttatt ggggaccctg ttgcctgttt ggatcttact    38820
tacatttaac tattgtctgc taatggattt tttggaaagc aaccaggttt ccgtaaaga     38880
atagctaatt gtcagagctg agatgaccat tggagatcac tgggctcaac tccctaattt    38940
tagaggtgct aaaaccgcaa tccagagaag ctaatcaagt ggttcaaggt tgtagactga    39000
gttcatatag gaccaagacc cagcccagat gtcctactgt ctgggacagt gttctctcag    39060
catacgtgga gcctgagggg gtaatgtgtg tgcgtgtgtg tgcatgtatg catatacaca    39120
taggtgtttt gcctaagttt tcacttctgc cccaccttgg ttgatcttgg agaatgagcc    39180
tgaggcgcgc tgtcaacctg ggggcctcat tcagcacagg cccaactttt ctgccctggg    39240
ggagttccag cagttatggt tcatctgtgg ttcagttatg gaactcacac cacacatagt    39300
gcccccaaaa ccgaggctgc gtgcacagac ctcccctccc ttcccgtggt gggcccctgc    39360
ttgggttctt cctaaacttc ccctttgccc tgctctgtgt tataccctct ctggtcccct    39420
gtccctgtgg agtgatccgg ggcacaaggg cagctgtttc ccgctgacc tctgtgtgcc     39480
ctgagcatct ggaggtggg gagcaggctg gtgagaagaa cacctggagt ggaggttggg     39540
gtcagggagg gtcccagtcc cggtaccacc cccacctgct gtgggacctg cagtcccctc    39600
atcagcagaa cggctatgaa gccatcctgc ccatccacag ggtggtgggt cgtgaaggct    39660
gcatacctgg cagagcggga gaagctctgg gaagatgccg gacacgcgcc gtgggagtga    39720
tttccctgcc ttgcccagat tctgctccca tcacctgaac ctgcctgtca ccaccatgga    39780
actgctgtga ccattgcttt cctttaagc agattagcag acatctcctg ctccaccctg     39840
ccaaacaaac aaacaaacaa gcaaacaaac aaacaaaaat gtgcatgagg gagtatggac    39900
tgtagagtc ttttctaaac attgttaggt gcttgtattg ggatcctctc ttaaaatgaa     39960
ccatattccc caggctttgg atgacactca tggttgccca ccctccaact tccttccctg    40020
ctggcagagc cctgggtttg ttttagttcc aaccctgacc ccaccgcatt cctgactcag    40080
gcaaattcgc agggtccaat gcagtcaggg gagccacgtt ccctcctcca acgagtgctg    40140
aggtcgctgc ttgattggat actgccgatg acctacgagg aggagggtgc cagggcgctt    40200
ttgggacttt gcttttctgg agagatgctt ccacagcatg gtcatggaca cagtcacgtc    40260
ttgatgtgat gtctggaatg gtggtggccg tcttgtggct gtgagaacag gctgaggttg    40320
attggatgga gggaaggaag gagccttgtt cttgatgctg tctgtgagcc tttgagttat    40380
cagcctggta ccaccagcc cttggacaga tatctactct acatactcca tttgagttt     40440
tttttttttt tttttttttt tttttttttt gtcacttgca gttgaaaaca ccctaattga    40500
tacacacaaa ctattttag tgctggtctg tgtttggccc ttatgaaga ctctgggctg      40560
agctgcccat ggtgagggag gtggactttg tgttttctta ctgctctgtg tcctggtggc    40620
ttgtttgtgt ctctgcccat gagacaaaag ccgagagggc aagggcagat tttcttaatc    40680
```

```
atatgttccc tgcaccaagc tcataggaga cactcactga atggttgttg agagagttct   40740 cttcacgga  ggcaatgttt tgtgaaacga tgctgcttgt tgttgtctgt tggttgtaat   40800
atgcatgaac actaagagcc atctttaatc atgctgtggg ccgcctcttc caaggtgtta   40860
gcattactcc cactacctgg tcagcatcct gcctatggct aggactttgc aatttacata   40920
gatatggtgg ggagacctgg agcccatggc caggactctg acaccctcac tggatctgtt   40980
tctacatcta cctggatggc cgtctaggac attagaggat ttgtgtcttc ctaaagtccc   41040
tctgttgaga gacttctggc tctgttaaga ggacactatt tagcattgtg agtccctgca   41100
ggctgggggc cagtgggcgt ttttcttcta gatgccccct ctcttcttct ggcctcccag   41160
gcttcctgct cctgagattg tgagaactgg cctgtgctgg gctcactgca gaaagactgt   41220
cgtccccaaa ggttttgcac caaacttgag ctacaagatc ttttagggg  acctgagatc   41280 tccgcctggg ctctatgaga gcaggcatgg gttgtttttg ccccgtcact gcagtcatgc   41340
ccacacttgc atttttctttt cccccagca gtgtgaggat ctggcatgag gagtgggact   41400
cgcgtgccct ctttcttctc ctcttccctc tggccttttc atccgtcagt gggggacaga   41460
tgtttgccct gtttacttct aggcttactg tggggctcca gggagatggt gaagtggcca   41520
aggagaggag ctgccacctt caagacggcc tgtggccggt gccgctttaa agggagactc   41580
agaggtgctt tgctgtgggt ggcgcgggaa ccagcctggg gacagcagtg cagaggcctt   41640
ggactcagag tgcgtgggcc ccgcggggct tcacggcgcc tgtggctgtg cacttccagc   41700
catatctgtg ctgcatctct tccacattcc cccatggagc tgatgtctag acagctatgg   41760
aattaaatgc tcaattaccg agtaggaatt tggccagcag aggtatagct gctgagtaga   41820
cagactcgag gtgaggctca cggctgagaa caggccccat ctggctttgg aatgagctga   41880
ggtgcccgat gctcctgcag ccagtggctc ctgtggggag ctgggccgt  gacccccaaa   41940 aggcagcttg acctcatgga ccaccataaa tctggcctgg tcaacatctc tgccagacat   42000
cattcccttg caaagatttc tgcctgtgat tggaattctg gatgaacatg tactgggcgt   42060
gtgggtctga cagctgggaa gcttgttctc ttgtttagcc aggctgccca tcatctgtaa   42120
gcctcagtat ccacatcttt aaaatggggg gaaaatatag ctcaactcct aatggtgcca   42180
tgagaatact ttgtcacctg ccaggcaaaa gcttattcct ttcacagaaa tccagggttt   42240
acaatgtgag acccctcccc actccgccgc atgtgtctgc ttgcttttt  ctgtcttagg   42300 gttgcccttc atgagctagg aaatgtctga gtggatgaaa acctaaacga gatgatcact   42360
ggtggtgccc attggtgcag cctttgccta aatggctact tacgtagcca catttcctcg   42420
tctgtgttca ggtgaggact ggttcctggg cagactgcct gggtttgcat cacgggtgtc   42480
catcttgtcg aagcccatgt ggtcacccaa gtgtgactga gccaggcttg cccacggggt   42540
gctctgggcc ccattttcgg cagcaggcag cgtcccctgg aggcctggcc ctccccggga   42600
gcatggggag tagcgcctat gggcaagcag cctgcagcct ccatccctgc ctgggggctc   42660
ccccgcccca gcctcacagc ttctccaaaa gtgtttgtct ccttgccgca tcctctaggc   42720
ctgagctcag acggtggaaa agaagagctg gaaggagagt tgcctttcag tctctctgcc   42780
ttctgaggtc tcctgagaca tagagcctgg gcctgcctcc ctttctagga ggcgccaagg   42840
ggtggtaaga ataggggatg agtgagatgt gaattaggat ccccacagca agccctgcct   42900
cgtaactttc tgatgggttt tcaatgtgtg gtgaagcaga cgcctgctgg gccccttcc   42960 tgagttgagt ttgacctcct gcctcctgtc tatctccttg ggcagccagg ccaccccgct   43020
```

```
ccattaacct gtgccacccc atcccttta c ctgtcgcaag cccagccctg aaggcctcaa   43080
aggcctggtc ttccagccag tccagggcct gaagggatgg cagtgtccct ggtggacctc   43140
ccctggtgtg gcctagtgca catcccagcc ctgcctcctg ccccgcctgc acgccatgag   43200
tgctgaagtc atgcctggca ggggctgctg gcccaggccc agagtaaaca cactgcgctg   43260
agctcgctgg tgtgctgctg gatgctgatg agcttgagga gtgtgggaag tgagcatggg   43320
gctgagtaga gatgcggcag gcctgcacct ccccgcagct gccctgcatg ctccagcctc   43380
aggcagccac acagggaaag ggtcacccac tgtcagggca gacctttacc atggctgggt   43440
gacacgggct ggctgtggaa aggtgtttgg tggttcccgc tgttggattt gcacaggccc   43500
agatgctcac agcaaaacca cacctagat  ggtgcttaca ggagccagcg ggtattcaaa   43560
gagctgttca gatcttaagt tgcttcattc tcacagtgga ccattgaggt agctgtacgt   43620
tagtcccatt ttccagatga gaaaactgag gacctgagtg gtcataagct caggccctca   43680
tctaaatcac gcagcctggc cccaggtgtg tgctcttgac catggacagt gctctcctgg   43740
tcctcttggt atctgtgatc tgagggacct tcctcctcct cagtctcgta tagtcagttt   43800
taggtcttgg actctgtctt catatcccdt tctcccttcg tgagctttct cacccagcac   43860
cttccttatt tggtgtgtgt tggggggatat ttgtggtgtg gcgtggcact gtgtagtgga   43920
tgagagagtc tgttttttccg atcccagtcc caggtttcaa accctgctct gtctcgagtc   43980
acccagaatc ttggaccctc agtttcctca tctgttaaat gggcatggtg gtcacccac   44040
ctcatcagct agtgtctgct ccatccctgg tggaggagat gactcaagta accctgggt   44100
tccacctgcc ccaccccact ggtccctgg  ctctttcttt gttgagatag acgaatgtga   44160
ggctctggag ttgcagttcc cacgagggct ggggtggctg tctgatttct gggcctggtc   44220
catgttgttc agggcagctg ctcgttctaa gtgaataaag gctgaaggaa ctcgggaggt   44280
ctgctcggct ccgaggaagg cagagaggga aagggccccg atgccttccc tgatagagct   44340
agggaggccc ttctgtggtt cccccagct  ccttggcctg ggtgaccctg gagctggctt   44400
ctgttccatt ttgttgtgca gagttgtttg agactcctgg cttttgcctgg cctttgtggg   44460
acgctggaga tcagggcttc tggagttggc caattagcct gcccagacca ggaagcacag   44520
gtggctgaca gagggccgtt tcaggagagg agagacagcc tacctattcg gtcttgctgt   44580
ccccatgctc catccctgcc cctgaccagt gtggccctgt actcagcata ggcgtgcacc   44640
tgagtcagta cagttccctg cccgcagagc accccaaata ttccaggcct caggacggat   44700
gtgcacatga tgagtcgggg caggtttcac tgcctgtagc ttgggatcct tcctggggc   44760
ttggttctct agggccatcc ccagcagtct caccccaaac cctaaattca tgttgtcttc   44820
ctctgtctct tggcctcaag gtttcagagt gagtctgtgc tgatagcttc aagatgtgat   44880
gagaccccga cttggcctcc agttacctcc ccacggtttc cttggtgtgt gtgtggcttc   44940
agtgttcact ggctcccgca cggcttgcaa tgtgtggatt acgggtggga gggaaatcca   45000
gtcctgcccg cagcaaaggg atgttagttg tgagctcagt tccccaccgg gcctggtgtt   45060
tccaaatagc ccgtcactgt ccctgcttgg ttttccatga tatctgtgcc tttacctatt   45120
tggttaaatt aaaccaactc agcaacgcca gccattgtgg tttcagggca agctgcctgt   45180
cctgctgctt ggccgctcct cagagctgcg gccgggagag ttcgtggtcg ccatcggaag   45240
cccgttttcc cttcaaaaca cagtcaccac cgggatcgtg agcaccaccc agcgaggcgg   45300
caaagagctg gggctccgca actcagacat ggactacatc cagaccgacg ccatcatcaa   45360
cgtgagcctc tgtccctctg cgggtgggga ttggggcaga gttttgccag ggggagagga   45420
```

```
gtcagcatag gtcttagccc ctgactttgt tgtagtctgc gtgaagggat ggaactagac   45480
caagccatgt ggattctagt gccagcagca tggcagggt cacatggcgg ggacggtgac    45540
accggagcag gtggacagcc agcctcctcc caggaggaag aagttgtatt gggtgcttta   45600
gggtgattgc agttggcttc tgggcttcag agagaaaatc tccctgttta cggcacctct   45660
aaaactttct gaaaattgtt aaggtcattt ttttccggca aaatattagg ttaatgggaa   45720
tgaatctcag agaagaatcg tgcccccac tctaggcacc gtgctcagga aacgaccagg    45780
cagggacata gattgaacca tgttatgaca cgatttgtaa ccttttcatt tctgtttaat   45840
tgcagtatgg aaactcggga ggcccgttag taaacctggt aaggtctttt aaacctatgt   45900
taggtcattt gttttatct atgtatacgc tgttttttgt ttgtttgttt gttgtttgtt    45960 tgttttgag caggggtc ttttcaaaca taaggttgcc aaagtgtatt ataaattcct       46020
ttaaaatggc tctgtaaatg tactgcgtgc ttgcaaatga ccctacggat cttttctgga   46080
aagagtaagg caggccggag gtgagggttg gaaatgttat gccagagaac acacttgtgt   46140
ctcagagtta caggtaaaca ccgtgaaatt cagggccaat gcaggagtaa ggtgaaggtc   46200
actaaaaatg ctggccagtc accgaaagca cctcctccaa attaaatctc ctgggctgct   46260
gaaggagctg gctgggctca tacacatttt ctcttggcca ggaatcctcc cttaaggcct   46320
ggctggaatg aggaggagtt acccacccac aaagatatca cttaagtctt cccttaaata   46380
cttgagcaga aaaagtgaag ccttagaaca cagaccagca gagctagagg gcagctctgg   46440
ggccatttat agagggcagc tctggggcca tttatagagg gcagctctgg ggccatttat   46500
aggggctgtc tttagcaagg cccagtgtga tggcacctcc tagatggtgc cttggcatca   46560
ggtactgaca tctcagcact cctgggaagt gtgcacttgg cagctttctc ttcccagcag   46620
aggggcagct gtgctcccag ctctgtcctc tgcctcccg cgcagcactt ggggatggag    46680
tggagatggc tttgctggta atgaagcatg acagccctaa gctctagggt tgtttccccc   46740
tgaagtcagc agagtcatct taagatcatt agacatggga gaagcaggaa ggtgtgggca   46800
gccacctaaa ggagtttgag cctttggaaa cgtattcctt gtgaaacagg agcaaatcat   46860
atcgtgcatt ttgaaactat ctgtgcttac cgtgaggtga gcacccagtg ccgacctgga   46920
gtatgtgcga ttcttccaca gctgcgcgtg gctcgcgctg cctgggtgtc ctgatgcctc   46980
tctccctgct gccacgggga tcccctcctt gcatctcccc acttcgatct ctgaaatagc   47040
tcagggactt cttcaggca tattctctct gggtgtgtac ctgccggtaa agcttcacga    47100
ttcagtaagc cgtgtccttc ttgcttttca ggacggtgaa gtgattggaa ttaacacttt   47160
gaaagtgaca gctggaatct cctttgcaat cccatctgat aagattaaaa agttcctcac   47220
ggagtcccat gaccgacagg ccaaaggtag gcaaggccca cacagccctg gggactccgg   47280
agatggggcc tgaagctcag ctgcccttg ggacttgggg aagggaaaag cggcagcccc    47340
taggactagc caagccgtct ctgatccaga agtgaacggg aatgcacatt actaaatccc   47400
tcgcagaagg tcacagacat ttcaccattt ttgtcctctg atcatggcaa tgtcacttga   47460
gtcagtctaa tatgtaccag gcatgatcct aggtgacttg tgtacattat ttcactttct   47520
ttatgtatgt cacttaattc ttttgcccta tcagttagga attactagtc ccattttgct   47580
gatgagaaaa cggttcaggg agatcattct gcaaacgttt attgccccat ctgctctaag   47640 tcaagcagg agcttggcag tggacagctc aactgggcc tggggctcaa caggggcctt     47700
tgccggtgtg actttatgt tctgttgggg gatgggaagg ctgacagtaa ataatcaaac    47760
```

```
acataagata ctattagtgc tcccaagaaa acgatcagg gtggccgtca agggagcgac    47820
tggaggggca gctggtggag atggtgtggc caggaaatgc cttccaagct gaggtctgag    47880
tgaggaggaa ccagcgggca gggatgtggg gggaacactc cagaaggaaa gacagaggac    47940
tcagcatagt tgagtgagca caaggcccct gaagtggcct gagggccgga gcacagtgac    48000
agcatggagt tccccggggt ggaaagaggc caaggccggg cgagcaggct cacagcaggc    48060
cgtggtgagg gacctgggtt gcatcctaac gacatttaag aacagggaag tttatgatct    48120
gattgatgtc actgaaagga cactctgatg gctgcgggga gtctgctgga ggggttgctg    48180
gaagttgggg accggttaag gggctctccc agccatctgg atgagacatg ctggggtctc    48240
agacaagggt ggtggcagtg gaggtgggac agaggggtca cattccagat atatatgggg    48300
ggtagagcaa gcttgggaa gggccagctg tcaggatgag gccatgagga attaagggtc    48360
atgcccaggt acctgaccat taattgaaac aatgggactt tcccaaggtc ccccagaggg    48420
gaggggtcca gaccaggatt tgagccgcaa cctcagtgta cccttctgtg gcccttcctg    48480
caacctgggg gattgggccc ccggcccctg gtgtccccag cacccccacc aactgggctg    48540
accttctgct gtccctttgt tgtctcacca ggaaaagcca tcaccaagaa gaagtatatt    48600
ggtatccgaa tgatgtcact cacgtccagg tgggtaaaca ggatgcgtgt ctgtgtctta    48660
aattttaata aacctgaact tcagaaggtg ctcacgggca ccctgaaaag agaaaccta    48720 tgctgcctta agacgtctca gtttctgctt ataatgaagt agcatcggga aagaggacag    48780
gtcattagcc ttggccccct tgtttggttt taacctgtgt ttttgcattc tgagctggtt    48840
ttcttcactg gcagcaggcc ctccggtgta gaaggttctg ccctcctctt tgaaggcagg    48900
cctgaacagt gtgtgcgtgg tggggctgtt gattcactct ggctcacgtc ttccttaccc    48960
cacattctgt tgaaacccac attccaggag ggccccaagc cctcccgca gctctaggca    49020 ctctgctttc gttgctctgc agctcgtggg ccgcggctcc aggaatgcca gggcaggtcc    49080
agcgcaggga agtgaatgac tgatgtgctt gttttcccg agctggtgga attgcggcct    49140
gtggttggca ggctcatggc atcctggtgt tctaaactgg atgaaaaatt ctggtgtaat    49200
ctcatgagtc ctggtagtag actcacctgg catggctaaa actgtcagag gtaaagtagg    49260
taaagactag aatatagtaa cagatagatt aatgtgttca ttactatgat gaattaatga    49320
ttcactcact gtgaaagtat taatatattt tgatacatgt tatgaatggt ggtccctttc    49380
ttagcactcc agaagatgga gccatttgtc aaggttaaag tgtcccctca gttgtttgcc    49440
tttgaaacta cgaggtgtag ggaaagatgg taagcccttg gtgcccagct tcctgggttc    49500
ctgtccctgc tctgatatgt cctgccttgt gaccttggga acgatatgac ccctgagtgc    49560
ctcagtttcc tcctcttcag gatagggatg acagcgcagg tgcttctgat gtgtggccag    49620
gctcagatca gggagtggtg gcagggttca ccagccacag tgatgccagc cactatgtat    49680
cacacgtact gggccaggtg ccttactggg atgatctcat ctgatcctca caactcatgt    49740
tgtagggtac tgttattatc cccatttttgc aggtgaggaa atgaaggcac agagaagtta    49800
agcaactgtc cgaggtcaca cagctagcaa atggccgagc tagggctgca aaccaggcca    49860
accactgtac tttactgact ccttagtaat agctactatt aattaagaaa taataacaat    49920
gatgatggct gggtgcggtg gctcacatct gtaatcccag cactttggga ggccaaggcg    49980
ggcagatcac ttgaggccag gagttcgaga ccagcctggc caatttgtga aaccctgttt    50040
ctactaaaaa tataaaaaat tagccgggct tggtggcagg cacctgtaat cccagctact    50100
cgggtggctg aggcaggaga attgcttgaa cccgggatat gtaggttgca gtgaactgag    50160
```

```
atcgtaccac tgcactccag cctgggcgac agagcaagac tctgtctcaa aaaaaaaaaa    50220
ataaataaaa aaaataaata aataataaag cactttcctt gctgttacca agtaaatctt    50280
tgactctggt agacaggcaa ttttaatttt aaaataggat cagaattcct ggaggaattt    50340
taccttagac ctaaggagaa gacgggaact ggtgagagct gagttttgcg tgaggaaggc    50400
ctggtgtttc ttcacactaa cacgggtgct ttttctctgg agcagcaaag ccaaagagct    50460
gaaggaccgg caccgggact tcccagacgt gatctcagga gcgtatataa ttgaagtaat    50520
tcctgatacc ccagcagaag cgtgagttgg agtcgttttc tcttttccca atattcttgt    50580
tgttcctgtg ggggtagcag gaagagggag cgctgttcct tttctactgg ctcagatgat    50640
tatgttgatc cttgacagac gtggtcggac gttgcttgtc attcctgctg gccaggcctt    50700
ccgacctggc tcggctcggg actcatccat aggagggtgc cttctgtctt caaaagtcct    50760
tgctccacga ggaccctcca gatggacaga gcaatagcag actcgtaatg agtctctgag    50820
atggcccggc tggccagaga gagggtttca ggaacagtgt ccccaagccc tcacttggtg    50880
gtccttttct aggcttcagg acccttctct tcctggagtc ttccagaatg tctctgacaa    50940
ttaggcccat acctgtcaac acctccagaa aaataaccca agtgatatca aagtaacatg    51000
acaagaagta gctcaaccat ccatcagggt ttgttacctg tattggcgga atatccagag    51060
aaaagtgcga gaccagggac cagcaaatgt gccttggggg ctggatctgg cccactgcct    51120
gcttttatat ggagctgtgg gctaagaata gttttttgcat tttatttttta tttttactta    51180 ttttttattt tcataggttt ttgggggaac aggtggtatt tggttacatg agtaagttct    51240
ttggtggtga tttgtgaggt tttggtgcac ccatcaccca agcagtgtac actgaaccca    51300
atttgtagtc ttttatccct catccctgtc ccagcctttc ccttgagtc cccagagtcc    51360 attgtatcat tcttatgcct ttgtgtcctc gtagcttagt tcccacttat gagaacattt    51420
aaatggttga aaaaatcctg aaataagaat agtattttgt gacatgttaa atttgtatga    51480
aattcaaatt tcagtgtcca ctgtaatttg gtttatgaca tctatggtgg cttttgtgct    51540
ggaacagcag agttgagtag cttcaacaga gaccatatgt actgcaaagc ctaaaatatt    51600
tcctatggag ccctttacag aaaaagtttg cagacccttg tgctagccca tgaaggacca    51660
tgacagcgtt ttgacgctga gctatataag agctacagtt atagtggcaa ccacacaaag    51720
gaagtgcctc ttaacagaaa cattccgccc accctatag gaactgcatt ctgagttgca    51780
atacccatta taagcaagtt ggccagatag tggccaacta tctggcagat atctggccaa    51840
ctacgtggca gatagtacct ggtacatcct tccccacttt ggggtcaatc ttgaccttg    51900 atctccttgg ggtcataaag ccacacaagt gttagtaggc atttctacag tggacacaat    51960
ggatgattta gcctaaaaat ctcaaaagga gcccagcatc ctgcacatg catgtaatcc    52020 cagctactca ggaggctgaa gcagaaggat cccttgagcc caggagttcg agactagctt    52080
gggcaacaat tgagacccca tctcaaaaaa aaaaaaaaa aaaaaaaag agtgggaaa    52140 aaagaacatt attaaaaaaa aaaaccttaa aaagtaatcc aatctaccga tggtttattt    52200
tttattttat tttatttttt ttgagatgga atcccactct gtcacccagg ctggagtgca    52260
gtggcacaat cttggctcac tgcaacctcc acctcctggg ttcaagtgaa tctcttgcct    52320
cagcctctga gtagctggga ttacaggtgc ccaccaccaa acctggctct tttttttttt    52380 tttttttgtaa tttagtagaa gacgggcttt caccatgttg gccaggctgg tcttgaactc    52440
ctgacctcag gtgatccacc tgcctcagcc tcccaaagtg ctgggattac aggcatgagc    52500
```

| | |
|---|---|
| caccgtgcct gacccactga tggtttgaat tattctaagt tcgccaccgt ccaatcctgt | 52560 |
| ttgctctggg cttttaggtt ctaagctgtg cctctgtcca tgtaaagtca gaccaggagg | 52620 |
| aatggaaaca cgaaacattg ccattgtgtt tccctttgtg ttgcagtggt ggtctcaagg | 52680 |
| aaaacgacgt cataatcagc atcaatggac agtccgtggt ctccgccaat gatgtcagcg | 52740 |
| acgtcattaa aagggaaagc accctgaaca tggtggtccg caggggtaat gaagatatca | 52800 |
| tgatcacagt gattcccgaa gaaattgacc cataggcaga ggcatgagct ggacttcatg | 52860 |
| tttccctcaa agactctccc gtggatgacg gatgaggact ctgggctgct ggaataggac | 52920 |
| actcaagact tttgactgcc attttgtttg ttcagtggag actccctggc caacagaatc | 52980 |
| cttcttgata gtttgcaggc aaaacaaatg taatgttgca gatccgcagg cagaagctct | 53040 |
| gcccttctgt atcctatgta tgcagtgtgc ttttcttgc cagcttgggc cattcttgct | 53100 |
| tagacagtca gcatttgtct cctcctttaa ctgagtcatc atcttagtcc aactaatgca | 53160 |
| gtcgatacaa tgcgtagata gaagaagccc cacgggagcc aggatgggac tggtcgtgtt | 53220 |
| tgtgcttttc tccaagtcag cacccaaagg tcaatgcaca gagaccccgg gtgggtgagc | 53280 |
| gctggcttct caaacggccg aagttgcctc ttttaggaat ctctttggaa ttgggagcac | 53340 |
| gatgactctg agtttgagct attaaagtac ttcttacaca ttgc | 53384 |

<210> SEQ ID NO 3
<211> LENGTH: 2123
<212> TYPE: DNA
<213> ORGANISM: Macaca fascicularis

<400> SEQUENCE: 3

| | |
|---|---|
| atgggctggg ccgcgcggcc gcgcgcactc gcacccgctg cccccgaggc cctcccgcac | 60 |
| tttccccggc gccgctctcc ggccctcgcc ctgtcagccg ccacggccgc cgccgccgcc | 120 |
| agagtcgcca tgcagatccc gcgcgccgcg ctgctccac tgctgctact gctgctgctg | 180 |
| gcggcgcccg cctcggcgca gctgtcccgg gccggccgct cggcgccttt ggccaccggg | 240 |
| tgccccgagc gctgcgagcc ggcgcgctgc ccgccgcagc cggagcactg cgagggcggc | 300 |
| cgggcccggg acgcgtgcgg ctgctgcgag gtgtgcggcg cgccgagggg cgccgcgtgc | 360 |
| ggcctgcagg agggcccgtg cggcgagggg ctgcagtgcg tggtgccctt cggggtgcca | 420 |
| gcctcggcca cggtgcggcg acgcgcgcag gctggcctct gtgtgtgcgc cagcaacgaa | 480 |
| ccggtgtgcg gcagcgacgc caacacctac gccaacctgt gccagctgcg cgccgccagc | 540 |
| cgccgctccg agaggctgca ccggccgccg gtcatcgtct gcagcgcgg cgcctgtggc | 600 |
| caagggcagg aagatcccaa tagtttgcgc cataaatata actttattgc ggacgtggtg | 660 |
| gagaagatcg cccctgccgt ggttcatatt gaattgtttc gcaagcttcc gtttctaaa | 720 |
| cgagaggtgc cggtggctag tgggtctggg tttattgtgt cggaagatgg actgatcgtg | 780 |
| acaaatgccc acgtggtgac caacaagcac cgggtcaaag ttgagctgaa gaatggtgcc | 840 |
| acctatgaag ccaaaatcaa ggatgtggat gagaaagcag acattgcact gatcaaaatt | 900 |
| gaccaccagg gtaagttgcc tgtcctgctg cttggccgct cctcagagct gcggccggga | 960 |
| gagttcgtgg tcgccatcgg aagcccgttt tcccttcaaa acacagtcac caccgggatc | 1020 |
| gtgagcacca cccagcgagg cggcaaagag ctggggctcc ggaactcaga catggactac | 1080 |
| atccagaccg acgccatcat caactatgga aactcgggag gccgttagt aaacctggac | 1140 |
| ggtgaagtga ttgaattaa cacttttgaaa gtgacagctg gaatctccctt tgcaatccca | 1200 |
| tctgataaga ttaaaaagtt tctcaccgag tcccatgacc gacaggccaa aggaaaagcc | 1260 |

```
atcaccaaga agaagtatat tggtatccga atgatgtcac tcacgtccag caaagccaaa    1320
gagctgaagg accggcaccg ggacttccca gacgtgatct caggagcgta tatcattgaa    1380
gtaattcctg ataccccagc agaagctggt ggtctcaagg aaaacgacgt cataatcagt    1440
atcaatggac agtcggtggt ctccgccaat gacgtcagcg atgtcattaa aagggaaagc    1500
accctgaaca tggtggtccg taggggtaac gaagacatca tgatcacagt gattcccgaa    1560
gaaattgacc cataggcaga ggcatgagct ggacttcatg tttccctcaa agactctccc    1620
gtggatgacg gatgaggact ctgggctgct ggaataggac actcaagact tttgaccgcc    1680
attttgtttg ttcagtggag actccctggc caacagaatc cttcttgata gtttgcaggc    1740
aaaacaaatg taatgctgca gatccgcagg cagaagctct gcccttctgt atcctatgta    1800
tgcagtgtgc ttttcttgc cagcttggtc cattcttgct tagacagcca gcatttgtct    1860
cctcctttaa ctgagtcatc atcttagacc aactaatgca gtcgatacaa tgcgtagata    1920
gaagaagccc cacgggagcc gggatgggac ggggcgcgtt tgtgcttttc tccaagtcag    1980
cacccaaagg tcaatgcaca gagaccccgg gtgggtgaac actggcttct gaaatggcca    2040
gagttgactc ttttaggaat ctctttggaa ctgggagcac gatgactctg agtttgagct    2100
attaaagtac ttcttacaca ttg                                           2123

<210> SEQ ID NO 4
<211> LENGTH: 52575
<212> TYPE: DNA
<213> ORGANISM: Macaca fascicularis

<400> SEQUENCE: 4
atgggctggg ccgcgcggcc gcgcgcactc gcacccgctg ccccgaggc cctcccgcac     60 tttccccggc gccgctctcc ggccctcgcc ctgtcagccg ccacggccgc cgccgccgcc    120
agagtcgcca tgcagatccc gcgcgccgcg ctgctcccac tgctgctact gctgctgctg    180
gcggcgcccg cctcggcgca gctgtcccgg gccggccgct cggcgccttt ggccaccggg    240
tgccccgagc gctgcgagcc ggcgcgctgc ccgccgcagc cggagcactg cgagggcggc    300
cgggcccggg acgcgtgcgg ctgctgcgag gtgtgcggcg cgccggaggg cgccgcgtgc    360
ggcctgcagg agggcccgtg cggcgagggg ctgcagtgcg tggtgccctt cggggtgcca    420
gcctcggcca cggtgcggcg acgcgcgcag gctggcctct gtgtgtgcgc cagcaacgaa    480
ccggtgtgcg gcagcgacgc caacacctac gccaacctgt gccagctgcg cgccgccagc    540
cgccgctccg agaggctgca ccggccgccg gtcatcgtct tgcagcgcgg cgcctgtggc    600
caaggtactc tgccgcgctc ctgggcagca ccccattctc tccatcccag ctcggacctg    660
cttctgcgga actggtgggc agaccgaggg gcagcgaagc gttgcggggt ggccagggca    720
actctcgggg acaggcaggt gggccccggg gtggcggctt ccgcgggct gcctcggaaa    780 cgagcttcgc gccagcccg ggccggttct gcgcccagac gatgccggtg cgccgggcct    840
gcactctggg gctcgagacg cctggcgacc tgccgcggag cgccctgagg gcagccacac    900
agcgcgggga gccgaggaca aataaggagga gtgggggcat aaagggagga gagaagttca    960
ggactaggaa ctggagcctt gcagagcggc ttcaggacca caagaagtca tttctgttgc    1020
tttttctatt tgcttcctcc gtccccttta aaatgcatta ctttgatcac gggaccgctc    1080
cgtgaaaact gtatgtaact cttttggaaa ggaagagtgt ttgccggccc cgccggagt    1140 ttccccaaaa agtctacccc gggcagggaa cggtttggca tcgcactcgt ttcggcggcg    1200
```

-continued

```
ttgctgcctg tgttgctttc ctcgttttga gccagcccta caaaaatgaa agtggctcct    1260
tttgaataag ctgaatcggg ctttggatca cgaaatctgc agaggcgtag aagggaccgg    1320
gttagtaatg aggaaggagc ctacccctcc ctcctgccgc acacaggacc tgttcggcag    1380
gggagatggt ggtgatgggg gcaggagtgg agtggagcaa tgtctaactc tctcgcggga    1440
ccttccggag agatgcttcc catcttcagg cagaggccat gtggaagaat aatatcgagt    1500
tcagcggcgg ccagtcccgc ggtgtagaac cagccagcgg ggcttggcag tgcgcttagg    1560
cgcagccatg cggctgctgc ccgaccccag cgctgcctcc tcaactcggg cagtgccagg    1620
agaggggcat aggagagcac agtgcagagg gactggtcta gattttactt tataggaata    1680
tggttcagta tgaccaacta ggacttggca tagtttggct tacatggacc ggaaggtgcc    1740
agagccgaat tgggtgaaat tcagattgt gtatttcact aacgcaggag cacagccctc     1800
gggaaactca gcctagttag gcagtagaga gttgtcccgg agacaagtga tcccgcagac    1860 tagaaatgg gcatgatgat agcacacgcc tattgagcac tcagtctgtg tgccgggtgt     1920
gttacctctg tgacctcatt tggtctcacg aggagggagt ttctcctctc tctctctctc    1980
tttttcttct taagagacag ggtctccctc tgtcgcccag gctggagtat agtggtgtga    2040
tcatggctca ctgcagcctc ccaccctgg actcaatgat tctcctgctt cagcctccca     2100
agtggctggg gctacaggcg gatgccacca cacccagctt ctcattcctg ttttacagat    2160
agcggaactt aggttgaaaa acttgcccaa ggtcactcag ctggagttta aacccagata    2220
gcctcattca gaggagtcag gccagcactt aactccaagg gtgtgggaga gggtcaggt     2280 gctgtaaatt tccgggtggg ttggacgtgc atccccctca gagccgggaa cagcatacac    2340
aaagcctaag acttgtttgg aggtgaatag atcagtgtgg ctgggggatg tttggggagg    2400
gcagcaggag tgagccaggc tgctggccca gagtcccagg gctgaagagg ctggctgtgc    2460
cccgggccct gtgtgcagat gttcttgaac tggggcaact caaagcctag tgtagtgtag    2520
ggctgaccta gcagtggtgt gcggaatgca tccagggtgg agagtttaga ctactgcaat    2580
aatctgggtg tgaggcaaca acattgaaaa agcatgtttt tgtccaaaac aagccagctg    2640
ttactggtct cgctgtttgt ggtctcattg cacgggtcc tgagttgctg gcaccatgcg     2700
agtcgcctaa tttattgcta gtgaggcaag ttgcttaata agctttggag ttggctgagt    2760
ccctgtgtgg aggaaaacag gtcccccatt ggccatcagg ctcacggcgg gccccggtgt    2820
accagtgagg ggacagccac agagggataa gcatggtggc tttgaaagga gggagagaca    2880
gagtgggtac aatgctgttt ttatccctcc ctccttcttt tgcaaatatt tgttgagctc    2940
cgtagggtgt ctgacaccgt ttgcatgttt gtctggcaca ccagaggcac ttggtacgag    3000
tggattagtg aatgaataaa tgaatgaatg aagacaaatg ggaggtgctt tcgatacaca    3060
gccattctgt ttttccttag tggaaggcac tgctttgctg cgcccctct ctggatctca     3120 ctctccaccc ttgactttcc ggaggtgttt ccgaggacag gcgcctggga gccagcagac    3180
ttcattcagt ccaagccagg ctccaggact cagcagctgg tgcctacggg caggtcactt    3240
gacgtcactg ttaaatgagg tgaattggct gcctgctctg gctcgaagat tggcgggaga    3300
gctactttag ctgcaatgga catgagcctt ttcatgggt gccacttgac tagaggcctg     3360
aagttggagc aaggcacaca cagatctgaa gacagagctc tcgaggcagg agcgggtgct    3420
gtgatttcaa atattacaag gaggcttgt ctggggcaga gcatgcgagg ggatgagagg     3480
tagaaatgtc atcagatcag gggtctccag gcaggtgacc agtactttgg gtcatggtag    3540
atctttggat agaggaacgt gtcaccattc aaaggaaggt actttcattt gtaagctgtt    3600
```

```
taatgaatag acctcagaga acatctctgc tcaccgctct ggaaatgaag gcaaatcatc   3660
tatttcagaa gtcaatgcac tggcagggtt tggatggcaa agtatacaat tcaactagag   3720
aacaaagatc tgtcatctcc agctctgctg gtcagatgat tacaaaaaag aaagggattg   3780
aaatactaat aggatacaaa taatgagggc taacatatat gttgtgctta ttctgtgctg   3840
ggtgcatact aactcatttg atcctcctga cagtcctgtg agtgagtgct gtagtcttcc   3900
ctgggttaca gctgggcaac taagtcacag agcagtacct tgctcaggac tgctggtccc   3960
acacaactgg atccagagtc tcgttcataa ccagcatgcc gtgccgttga cagagcaaca   4020
gagattataa accaccccca gctaagcccc agctaatagc tgaaatcaac agagctccag   4080
atggctgtgg ccttgagatg aaacaggaca gatcacagcc ctcactcagc aggctcaggt   4140
tgacagggtt gcctccagtt gccatcagtg cagccctcac taaagaaaag caaaagaac    4200 cgagggactg taggaaagct gtttccacgc cagagatcca gacagcaaac tgctcttgaa   4260
gagagaaagc ccttccggat tcccccatgt cccaaaagac cagccacgat tccagacctc   4320
tgctaaaaca cggacaagaa gccaggatca aaacctgaaa cagacttccc aaacagcaga   4380
accctcatcc atttctcctc ctagtacatc ctccaggaaa ggccacccga ctcctgacag   4440
gagcccagac aagcttggag gtctgcaagc tgcaggggtg cccagaaact ccgcctctgg   4500
tggtttttag tattgcctgc tcctggtctc accccagagc ctctgaaggc agaggctgta   4560
cgtacatacc tggtgaagaa ccaagggctt agacggttgc tttacttctt ggaggcctgg   4620
atggtttgta aaatttattt atttattaat tttttttttt tgaaacagag tcttgctctg   4680
tcgcccaggc tggagtgcag tggcgcgatc tcggctcact gcaagctctg agacctcgcg   4740
agttcacgcc attctcctgc ctcagcctcc caagtagctg ggactgcagg cacccgccac   4800
catgcccggc taatttttttt ttgtattttt tagtagatac gaggtttcac cgtgttagcc   4860
aggatggtct tgatctcctg acctcgtgat ccgcctgcct tggcctccca aagtgctggg   4920
attacaggtg tgagccactg cgccggccca aaatgtactt tatttaggtg attctttcat   4980
gggagcctca aacaagcaat cattgttagc tgagtgctga ccctgtgctg agctctgggg   5040
agacagggtt gaataaaaca aagtcactgc ccacagggaa cttacattca atacattcag   5100
tgcaatcact gcttccccag gttgcatttt tccattgtta gagtgggcgg tttgctagag   5160
agtcatttcc actgttggca attcaaatac accttttgtc acttaaaaaa caggtgtgcc   5220
gggacctgag cttcatctta gggtaggatg ggtggaaaca gttgtgagtc tccagttttt   5280
agtcacccga aacttggaaa cttggaattc ttttgagcag tttatgaggc tctgcctgct   5340
ctggtcagct gccttctttt attgctctgt tggttttgct aaagagttaa aatattaagg   5400
tttcgtgaaa ttaggacgtt aacaagctca aaaaccaagt gtctgagtta cttcattcca   5460
ctgagagagc tgtaaatggg ttgcattgga acttaaaata actgcattga gtaagcgatg   5520
gtggcgggca ccatgagcta actgtggtca gaagcctgac agcctctgct ttggggctgg   5580
attctccgtt tggagctgtg tgatcctgga cgagtttcat gccttggatt tagaaatcag   5640
actttccatg agcttatatt tcaagtgaat aaatagctct ggtcaggctt agtttgaaga   5700
agaagtgagc ttggcagtgg gtgagggttc ctcggaaggc cagctgggt ggaggggctg    5760 aggacaagcg gctctggccc ttcccggggtt gttacctgat caggtaacgg ctccctcgac   5820
ctcttgcagc ctcggcagta aggggattgg gccagttgat ctctgaggct ccttttaact   5880
ggaatggtct gtgattcttg taagaaaaca agtctctgag gaggttgtgg tcgcctcatt   5940
```

```
cctaatttaa aggttgggaa ggcttcctta agagctactt cttttcccta aattattgac    6000
ggttaaagcc aaggctggca tcgaatggat gtgatccatc ttgagcctgg ttgctttgtg    6060
tttcagcttt gtactggctg ctgaaagtcc ccaggagacc acagggtgtga catgttcatc    6120 cccaagagat gagcttccaa gagcctcata cctcttgctc cttccctgga gcctccaggc    6180
ctttgggtag tcggaagtga gatacctttg tgtcatttca tcttttccat ctccaccttc    6240
tctgccattg aaaaaaaaaa aaaggaaag aaaaatccta ttaatagaga aaccgagaag    6300
tgtagccatt ctgaatgtgt ttccaaaagg ctcctggaag tggcatggaa gttggagtga    6360
ttcagcacta cttggtgacg tgtgcctaga accatagggg acattagcc aggacaacac     6420 gcctcaggac agaagtaagt ggctgtgaag aggcatgtcc gtcactgctg aaaggcgca    6480 gagttcagct tttggagtca atgctgagag ttccacttct aaattcattc agagcattta    6540
tttaacacct actgtgtgct tcgaagtgta ccaggtacgg ggactcagag gtaaggacta    6600
gtggcccctg atctcaaggt actggtggta gatagtgtga tgctcagctt aagggctggg    6660
cttctgaagt cggattacca ctttctgaat gtgtggcttt tcttgagtga cttcatctct    6720
aagtctcagt ttccccatca gtaagataat agaagtaata gcagatacat acatagctct    6780
tagggcattg cagaatggaa ggacctcctt atatgaaacg caaagcactg tgcctgatgc    6840
attgctagaa ctcaggcaat attagcatgt tgtcattatc attatcatca tcatcatctt    6900
caagacactg acaaaggagt cagctgtatg ggaagagtgc tgagacgctc ttgtctccct    6960
ggggatgagg tgggtgggtg ggttaggaaa ccttcacaga aaggagggt gatgtgagac    7020 ttgtgtctgg gagctgactc ggaatttgcc atctactatg ttggaaaagg ttctctgggc    7080
agaggtatcc aaagttgcct tgactataca cctctgaggt cccagttgtt gcctatatca    7140
tgtgaccagt gtgtggcttc tcttgaatta agagctgcat gtctggactg cctgggattt    7200
tacagatgtc atcttgttaa ctcttcctgg agcttgtgac acccagaaga tggcagttta    7260
tagaagccct gggaccttct tgaatgatgc ttggtttggt ttccatgctc tgggaattcc    7320
tcacaaggaa agatttgtca catcttaagg aaggaaaaaa aggcaaattt gggagtccat    7380
ggatacccta ttatttttaga ttccaggaca aattgtcgaa taagcacatt tcataaaaac    7440
aatcctccgc agcatcccgt gacagcagct ggtccctcac cacaggataa ttatgtctcc    7500
ttgtgcacac aaaagtctcc gagggcatat tgttgtggct ggagtttctg ataatttcca    7560
aattgaacaa cctcagtcct aatgagtcag aagcttgtgc aatattttca aacctcagga    7620
acatcttttt cattagttgt gcaataaaga tagtaggcct atctctgtga tgagctgttt    7680 ttttttttc tcaaagtttg atgagattcg ctgtagaatt ccttctcaca tagtcttggg    7740
caagatttta cccgatcttc caacacatga gtcatatcat atcctgtgac taagaagagc    7800
tgtctctttg gtgccagttt tgtaagcaca gtcaccactt ggtggagacg gatggacaca    7860
gttgggattg cccaggcaga tgggcagtct tgccaagcag acatagggga gggaaggctc    7920
aatgttcagc ggtcacatct gcttttctgt ggcagagtga gctatacagg aatattgtat    7980
tctccaggac agttagggca gtgggaaatg tcaccaaaca gaacagtgac ccaaagagct    8040
gctgccactg ggtgctctgt gggagctggg cactgtgctc tttgtgttat gggccttgct    8100
ttgttcttaa cttgtagcca cccagagagg tagggcatta gccttgcttc ctagctgaga    8160
ctacagaaga ggctcctaga ggttagctgt aatttgtcca aggtcagcca gtgcaaggag    8220
gcagagccag gatttgagcc catgtctgtc tcactcccaa actattcttc agatttcttt    8280
aagtcaagtg ttatttagaa atgttttgtt tattcgtcaa atatttggtg gatgtttcca    8340
```

```
gctatctttc ggttattaat ttctagttta attccattgt gggctgagaa catattttgt   8400
atgatttcta ttctattaca tttgttaggg ggtattttct ggtctagaat gtgatctgtc   8460
ttggtgagtg ttccctgtgt gcttgagaag aatgtgtgtt ctgtcgttgt tggatggagt   8520
attctataaa tgtcacttag gtctagtgga ttgatagtgc cattcaggtc aactgtatcc   8580
ttcctgattt tctgcctcct gatctatcag ttcctgaaag agaagtgctg acgtctcctg   8640
agtctattct gaaacactgg attgcggtct ccatgatgaa ccactagagt tagaaaacct   8700
gagtcctagc cccatttggg cctttgggat gactcccttc caccctcagtt tcctcaacta   8760 caacaggagg acgatgatgc ttcccaggag acatcaacag gatactgtga cataagggat   8820
atgaaggagc tttgtcaact cctaaagttt caatgctagg aatcctaaag cattgaagtc   8880
caatgatata aggaatatga aggagctttg tcaactccta aagcttcagt actgggaatc   8940
ctaaagcact gaagtccaat gatataagga atatgaagga gctttgtcaa tgcctaaaac   9000
ttcagtgctt caggagtcct aaagcattga agctttaaga gattaggacc tctagttgac   9060
aattccagac tcttccagga ctcctgatag agccaacacc aagaatagtg aagccggaag   9120
gatgcaaata gtaatatgtc tcctgggtgt caaagtgtgg gtctcctctg ggcatgttct   9180
cttgtcctac tgagacatga tagctcttgg ccaaagtgac tgaacttgac cctctgtttc   9240
aggaaggcca aatgcagggt tcaccactgt catgtccaag ggcagatgct ttggtccaga   9300
acatcagcat cccagtcatt ataccaagca agctgcaatc tctgcctgca ccgtggagag   9360
cgcacgctcc tcccagggtg gcctgcatcc tgtatcctgc atcctgtgtt cttctcaggc   9420
cgactttctg tttaatgttt gctggtcagg aaatggcctg agctgaggtt tctcagatcc   9480
cagcctgacc tttctccacc agcatttttg gctctgaaaa atatagccca gtgtggttta   9540
gccccactgg atgaaaccca ataggaaaag tctgataata gcagaggagg cgtaggagga   9600
agggtgagga tttgagagca tctgggatgg accatgtgtg tggatattgt tctgtctgtg   9660
ggattgtgtg acacttctca tttacagtct gttcccttgg aagtcccatc attggccaaa   9720
catatagtcc ttctgtcctc tgaaaagtat cattctgctc ctacctttga caaccatctc   9780
tgaccacatc aactccctgt tttcatgcat cttgtggatg aggacaccac cttacctgta   9840
aggacactgg tggcttccca aagccaccaa ctgacttgta gagaagacag aatcccagag   9900
tatgaagcct gagggtgaag ggtcctggca ggtcctagag cccaacccctt cacttcacag   9960 gtggggaaac tgagggagcc aatgggaaca tgactctcac aagccacaca gctcatctgt  10020
aggggccagt gtggagtctg tttatcttga gacccagggc tgagtctttg agccctcccc  10080
atctcagcca catcctcctg ttggagcagt taggtgtttg ggagaggcca tggtccatac  10140
tcatggtatt cctgtaaagc tggagaaaca ggccttgctc ccttagtctc tctaatcaaa  10200
atgaggttgc agaaaaccct tctccctact tctccctaaa ataatttcct tgggttagaa  10260
gatgactaaa aagctattca tctgatgact gatgtctccc ttcaagagtt ataagcacat  10320
ataaatgcct ttgaatggta attataataa ttttgctgaa gggaaaatat cagtataaat  10380
atcatggtgg actcactgat gaatgaggac tgaaatgctt tcatgtcttt tcagctgtgg  10440
ttagattttc tttgagcaga gtatacaagt ttttcctctc ctagcataaa gacttttttt  10500
ttgtatcttt tctctctact gtttagacat gacagaaaat gcatttatac atttgatgac  10560
atattgtact atctcagttc tttaatatta taaatgtaat ttaattctat gaaaaattaa  10620
gaaaagaaga ttcatatttc accattacca tctctccaga aatactatta ttattattat  10680
```

```
tattttgaga cagagtcttg ctctgttgcc caggctggag tcaggggcac gatcttggct    10740
cactgaaacc tctacctccc aggttcaagc agttctcatg cctcagcctc ctcagtagct    10800
gggattacag gcccacacca ccacacccag ctacctttta tattttttaag tagagacagt    10860 tttgccatgt tggccaggct ggtctcgaac cctggcctc aagtgattgg cctgcttcgg     10920
cctcccaaag tatgggaatt acaggcatga gctactatgc ctggcctaat tccatcattt    10980
ctgtcccaag tgttgccacc atttggttaa ctgttcccct gtccacatcc atttaggcca    11040
aggttgcgat gttaaacaat cctgagatgg acattttcat gtttatggct atttctgtat    11100
ctagggtcat tctcttagga gaggtactaa gaagtacaga aactggaaag aaggatatgg    11160
aatttttatg gttctggtat aaattgccaa attatttttcc agaaaggttg tagccatatt    11220
tgttgacatc agctctagaa tttcaacctc gtaagtcact gaaagaaatt atcccaaaag    11280
cagtccttca ggaataatgg aagaagatgg tgccgaaccc agccattctg ctcactgtta    11340
gattactttt ttggtcttac aggttacttt cattctcagg ttgattgctc ttaacagttg    11400
agcaatgttt ggggtagaat aatgagcact tttccaattt ggttctacct ggttgagttg    11460
tgatcacagg cagtctcacc tgggagggc ttgggtggtt gtcagcttgt ccttccaaca     11520
ctcgcgtctc aggcgagcag cctgggacca gtgaggcgac ctgagggctg gaggtcacaa    11580
actaggaggt aacagagaac ccaggtctca ggaagcccag tccagggctc gctgcagtaa    11640
gcctctcgga tgccagctct gtccaggatg cgggaggagg ccagactgat ttggtctgtt    11700
ttgaaaagtg atgaaaatat ttattcaaat gttttgtaca cataggcaga agtataacag    11760
aagctgcata tacaaaatca ttttctagta gtcacattaa aaaagtaaaa agaaacaaag    11820
aacattattt ttcttttttaa aacagcttta tcgagagata atttacatac tataaaattt    11880
accccaagtg tacaatttgc tgttcttatg tattcacaat catgcaccta tcactaccaa    11940
ctccagaaca ctttcatcac cctaaaaaga aaccccgtat ccattagtag ccaccacgta    12000
cttctcctct gtccagccct aggcaaccac cggttcattt tctgtttcta tgaactggct    12060
tattctggac atttcatata aatggaatca acaatacgt aactggcttc tgtgtcttag     12120
cataatgttt tcaaggttgt ccacgttgta gcagggatca ttatttcatt ccattttatg    12180
attaaaaata ggtctttttta tggatacagg gagaccagac ttctattta tctcccctcc    12240 ctgatgggga atcctaattt cagcccggaa ggtcactgtg aaagtctaaa cgcacaggtg    12300
atactgactg gttccattgg aagaaactgt agcacctgac tcaggaagcc agcattaaaa    12360 ccaagaaatat tctatacgga tggggattac gcactgaaag gaaacatga ggaaatgcac     12420 ttttcagatt tattagatca cagaacttct ttggagctgg aaaggatttc ggaaaccgtc    12480
tagcctaccc cctcgtctta ccactgaggt aactgaggcc caggaagggg aagtggcttg    12540
ttttgggtcc gggaccactt ttcatttctt atttgagcca aagcttcctt ctggtgtctg    12600
tctctgtttc acaagttccc gttgcatggg tgctgggtat tgcttgaaag gactggcctc    12660
ttccttgata caggggctcg ttcactgtca cctccctccc tcacgtctct gtgcccctc     12720 tgcagccgca ggccctcctc ctgcaccagg ggggcacact caacccgggt gggcactgcc    12780
tcctagtctg cggccagagg ctgggaggct ggggagactg aacagccccg gcagctccag    12840
acataacaac ctatgttgag gagtcggtgc aggaagcgaa cccagctgag aaatctgcga    12900
aggtcaggac cggagccaga cgcttatcaa gaggaaagtt aatggtgttt ttgtgaactg    12960
agcagtcagc tgtttccctg aagataataa tagcacatc atgttgggca ttcaggaggc     13020
atctaaaaaa aaattgtgca gtggaattga ttggaagctt ttccctaata cataaaatag    13080
```

```
gccagaaaag actatcaaat gtaacagcac cgatcaaacc caagcactca ccatagatcc   13140
aagcaaggac tgaaaaacac gaattttttt ttttttttt tccgccagtg agtctgaaaa   13200
gtgattttca atgccaggcg cctttaaaca cagacaacat aaacaacaac atagttgttc   13260
tggagaaggc atcttttccc ggtaaagcca aagatgcaga tctaggctgt gcttgtgact   13320
gacagcacag agagggttc acagccagct ggccaagtgc cccccgaaag cgcatttcga   13380
atctgctcta tttgagagag actgtcttag ccttgtttgg gaaagtcttc ctccttcact   13440
tcacctgcca cagacttttc caggcaccat ctgctgtagt cttggcccag tccctgcaac   13500
agttactgct gaaggcaccc gggacatgca agacggggga gcagcctgag gtctggcgtc   13560
cggcaagctt ttcccacttg gagccgtctg ggagactgtc ccggaaacag aagggctgcc   13620
aacacttgga agtgccaatg tggactgaaa gttgaggaca ggctccgggc tcccccacct   13680
cttcctcctt gattcattaa aaggaaagaa agaagccaca cgaaactctc ctgaatttca   13740
tttatttcta tacaaaagac agagcgtggt cattcatcat tcaaattta acctttttag   13800 acaaataata attcctgctt gtgaattcag tgtatttaa caagaatagg tctgagggcc   13860
attggccatg ggagacaccg aaggctggct ttccttagat ttgcagacag tggccctgat   13920
ggtgcatagg gtttcaggtt tcctttagac ctcagctggc tgcctgtgcc accacttagc   13980
aatgccattg tctttcctgt gcattttctc tgcagagttc gaggaaatcc agtcgcgcag   14040 gccctctgc cccatgtcc ccggcgccct ggaatgtgca gtaccagcag cagcgattag   14100 aatggggtc tggtttcccg gaatgtgcaa ggtctcactt ctgtttctgc tgcctccatg   14160
ccccagacca gtgctgggcc gggctctggg ctgcagccat ggctgacaag tttccttgga   14220
atttaatgga gcggggcaga cagcatgcag ccactcaaac tgaaaacttg ggaaagagat   14280
gtgtgttctg gggcagcttt gctgcattcg ctgggccgta catgcttctt tttcctttcc   14340
ccaggcaacc cctcttgcag acaggaggcc ccatctcctt tcgcttcatg cctcattggc   14400
cattaggaac cttttaaaat tggtttctct cctgacccctc tgagagaaca tagtccaagt   14460
tccctggagg aagaggaagc gctctgtttc tctgcaattc acggctcatt taaatgcagc   14520
ccacgtgctg tctctcccca ctcctctgcc tgctcccctt gtgcttctca tgatcattct   14580
caaatttagt gagaaacctc acaaagggag ttttcttag ggaaaagtca tccttggcct   14640
cctgaacgtg gaccagcccc tctccccagc tgcacagcat caggttagtt aaccacctgc   14700
ctccatctgg gtcctgtctg gacaggccta ctcacacctg ctgcaggcgt ccgacttgcc   14760
ctcaggtgcc tgtggctggt tcagaggggt ggagcccaca ttccagtcct gacagctaaa   14820
gttcagcgag aggaccctgc attcagtgta aagatcaata ttccaggtcc tctcttcctg   14880
ccacccagag actggccgtt tgcaggcact cggtcccagt tgccctgggc ctgcagccct   14940
tgcattctct ctgctttgtc tctgctgttg caccccctgcc ccatcacaga tgcaggttgg   15000
gggaccttcc gctgggaagt gagaggctgg gaagtaagag gagcactaga gggatggttg   15060
agctcgcatc cagccttgac tgcattcgct ctcccccacc tctctgtaaa ggtgctgagc   15120
tgtgagtgga accaagtgga tgagagtggc cccgggcacc tgccgataag tttcccggtg   15180
tgtcattttc tcctgggagt cccatctgga tttggttctg gatttattta ttcagcaagt   15240
agcctctttg tagttacttt taatctagcc atgctcgggg ctgaagggga tgccaaagaa   15300
atatacgatg agcccctcag acagcataaa ggtgaagatg aggcctccag catgtacccc   15360
ccaacatata ccccaggaaa ttctgggtgt gactggattt tggacctacc aaaagctgct   15420
```

-continued

```
ggtgcctgga ggatggggcc ccgaggctgg acctcactcc tgctgggtta ctgggctggg    15480
aaagtactga tggcagctga ggagtgtgtc ccagacttca ctgagccatt cccaaagatt    15540
atttcaagtt ctcctgaccc cgcactggag gcctgcggtg ctggccttct ttatttacag    15600
tttctgactg gtgtctagca gccttgccag agagagtggc agtgtgtctg caggcgacca    15660
ggagaaatgt cccaggcttt agggcaggac tgagcatata gcggtggggg cccagcaggc    15720
agtctcctgg acagttactt ctccttgtcc ttacatggtc gggaggttgc tgcctggctt    15780
ttcaagcgag gatggaacgt gctatccatg ggccttaatt tccaacttct gcatgatgca    15840
ttttgtgctc ttgcctttga aaaacgtttt ttattttctt gtcactgatg cccaaaccca    15900
catggcagaa ggaagggagg ctgggacagg ggaggcgatg agctgccgct gacggacctg    15960
cccagtttct tagctcatcc cggcctccat cctggtgagc agacactggc ccaatccagc    16020 catattttg gctgagtttc tgtcttcaca tctcatcctt tccctgggat cctggcaatt    16080
gttggtactg ggttgtattc ttatttgtaa tctttaaagt aggagtacct ttgctggtat    16140
ttaaagtgga ggaaatcagg tgaagagtca caagtgattt gcaagctggg agagacatta    16200
gaatgtaaat gtgaggaagc gtcagcatga ggggcttgcc tgggctgcac agcttgcctt    16260
gcctggagca tgcactgttc tggcattgca gggaggatgg ctaccttgcc tccctgcagg    16320
tgggggactg tgtcagcccc tgcggactgc tcctgggctc ctgggtttga ccagattaag    16380
gcagcatctc cagtagcacc ggagcagctc ctgagacgct tttctgtgct aaatctggat    16440
tttgggtatt aaatcaaatg aatttgtaat gcagtcacac attgccctgt gttcagaagg    16500
gtgccgcacc tgttttaatg ctctgctatt gctcccttgg gagtcttaat aattttgaa    16560 caaagggccc cacatactca tttcgcactg ggcactgcat attatgtagc tagtcttgaa    16620
tctaggacag tgcattaaaa tgccattgat tggatcaatc tgctcttaca actgatttga    16680
attttgggaa catgctgttc cctgtgaata aaggaggatt catttctttt ccctcgaata    16740
cactgcgttc tgttttccaa attagctcta cttatcaact ctgctgagaa attggaaggc    16800
gggattgttc tggctggaag ggaaggttag attgttaatc ctgcgtcctg gccctgatct    16860
cacaaagtgt gaagcatgtt cccacaatga tgtgggctgc aggggctgg aggctggctg    16920 agaaggtggg gaccaaggag ggaggccagc ctgggagcca gacagatggg gtcaggctct    16980
cgcttttgcc actcgccagc tctgaggctt tgggcaacat gatttaattc tctgatcctt    17040 gttttttca tctttctgta gactggtgat aagatgcacc ctgcaggctt gcaggaaaaa    17100
ttagagataa catttgtgcc tattattggg cttgacatat agtagatgct atacaataaa    17160
taggtcctgt tattcttatt gataatatta ttttattgtc aacattgaag gttgggtggg    17220
atttgactag ctgcggggga ggagaatgag atcatccagg ccggaaggaa aagaggcatg    17280
aatgcagggg gatggggtga aacactttgg aggtgtgggg agaggtctgc agggtgggag    17340
tgtgcattaa ggagttctgg ggagagtgga ggcatcagtg ccacatggca aatgagaggg    17400
aatcgtgggc ccgaggagat ggagatggct gtggggatcc ggcaggaagt ttatgtgccc    17460
caaagtggca ttgtcagtta gggggagaca ctgaagacag aggtgaggcc tgcctgaatt    17520
agcgcagagt ggcattcttg gaaacttcag aagcttgaga agagccactt ggaggtgttg    17580
aaatgtacct gggagggatg tggggacctg gctctggtct gagagctggg agacggtaac    17640
ccaggtggcc ttggccttga agatgggca tgatatttag tgctttatgt gcagtctcac    17700
ctaggactcc caagccctgt ggagtaggtg atattagctc cgtgttacag aaaggggac    17760 tgaggctcaa gcagggacag gcacggtctg aagtcacaca gctgtaaggg gcagaagtgg    17820
```

```
gcatggaggc attaacttag agccgaaagg tgtgaccttc cttagggtgg ctggccccac   17880
ggggaatgtg tgtgggttgg agtacaattt ggtgttccca cccatcccag atgctctgcg   17940
tttatgaacc caagtttcca catcagggca ggcgagggca ggaagctcta cagggagaag   18000
ggacaaggga cagagccaag aatgggggca gggcccagg gtcccgtgca gggacaatga    18060
agggagttgg cacacgtggg ttagctgctg acagtgtgg ggagagagct ggcctgggag    18120
tctaatggga atgccaggga aagctgcctt ggtcccctaa agtgaagccc ccatgctggc   18180
cacggagtgt tggtgactga gggtccctgc tagctgtctg gccaaggcag tgtgtcctat   18240
aggtgtagct ctggtgtcct gctggcatgg cgtgagtgcc cctcatgctg agagccagcc   18300
ctgtgctctg gagggaggtg gtgggaggag gagggacagt aggaaattgc cacctgagca   18360
ggaattggca ccttctccca ctggcaggtc caggttttat ggaatctgaa acttgtacaa   18420
ttcaggatac tctcttcaag aaaaaaaaaa aaaacccctta aattatgaat ataacattag  18480
ggatgaaact attatttata tagattgaaa agagaaaatg cccaaaatga caaacttcag   18540
aaaatatacc aatactgcaa acatcacaaa atccagaaaa acaagattaa aaaaagctaa   18600
ctgctgaaca ctccttcatc ttgaaaatgt ccctgtctcc tcctctattt tttggctgtg   18660
aactctgctc acctttcac atgacaatgc ttttgtaata tttcctaaag agaaaataga   18720
ataatttatt attacttta ttattttttg gattattgtt atgatcaagt caatattttt    18780
ctgctaccca cacactcact gtcttctgta caacctctgg cctgcaccag gggaaccagc   18840
agggtgagca gtagggtgtc cctggagacc acacatatag caggatagac acagcaattt   18900
aactagacac agaagggact tcaaagcaca caaatgtatc tcatttaacc caaacaaaat   18960
gattatccag ttttactttt cccttagcct cttcccccaa atgccggcag ccaccctgat   19020
gggatagatg tgtgacagag ggcaggagac cgtggcctca accagctgca gcttcactct   19080
ttcaattcta catactctct acaagccgtg atgatagcac tttgctaggg cccctcacag   19140
ggcagatgga gggctccatg ctgaagcttt gtggatgttt gctgtctatc cacttctgct   19200
ccttgtgcct atgcagggat tcaggcccaa ccactgcaga gagcccaaga gcatcaggct   19260
cccaaactgt catggttggt ggcacccttta gtagttgata cggtttggtt gtgtcctcac   19320
ccaaatctca tcttgaattc ctacatgttg tgggagggac ctggtgggag gtaattgaat   19380 catggggca ggtcttttcct gcactgttct catgatagtg aataagtctc ccaagatctg   19440
atggctttgt aaaggagagt ttccctgcac aagctctctc tgccttctgc catccatgta   19500
agatgtgact tgctcctcct tgccttctgt catgattgtg aggcttcccc agccacgtgg   19560
aactgtaagt ccaattaaac ctctttcttt tgtaaattgc ccagtctcag gtatgtcttt   19620
atcagcagtg tgaaaatgga cgaatacagt agtgcagtca tttcttcatg gtcctcagta   19680
aggccaaaaa atacccaaca gttccgttga tcaatcagtg aggtccaaac aatttgataa   19740
gtatttgtgt ccctacaaca cagtggtcat taaaaaaaga catttaatt tcattattca    19800 ataagcatga ttacttatga atgggatgtg tgcacctgtt gggtgtcaca tgacctttca   19860
aatcttggaa tcagtttgga caccaccatc cccatttcca gttcaacact gatttttgtg   19920
tggtacattc tttttgtcac agtgactgcc agaaatccaa cttcatatgg actcatgaaa   19980
agagatgtag cgtgatctga tttcaaaact atgattgatc tagagttagt ttacaaggtg   20040
tctaacagtg atcccgtatc actgtatttc cccagaaaac ctgaaatatc gatgaatttt   20100
ctgtggtatt ctggggtccc ttggggcaga ctatgggaac catggcatta gaaccataag   20160
```

```
gacacgattc tggcttcttc ctgcctcaga tccagtcttt acctggcatt tttgccttaa   20220
agatgaaagc agcatacatt ttgatgtatc taaagcacat attcggccag gcatggtggc   20280
tgacacctgt agtcccagca ttttgggtga ggcgggcaga tcacaaggtc ggaagttcga   20340
gaccagcctg accaacatgg tgaaaccccg tctctactga aaatacagaa aatagctggg   20400
tgtggtggtg ggtgtctgta atcccagctg ctgaggaggc tgaggcagga gaatcacttg   20460
aacccaggag gcagaggttg cagtgagccg agattgcacc actgcactcc agcctggggg   20520
acacagccag attctgcctc aaaaaaaaaa aagcacatat tccactttgt gcttattctt   20580
ttgagagaaa cacagataaa agtctatcct ttaattcata ctccccatac tgtgattttc   20640
attttactg caacaaattg tgttaagtgt gataatgaat gtcaaacact taatgccttg    20700
ctcttttcag taacatgaaa tattggagaa taatgactga agcttacctg cactgcgtat   20760
gtctcttttc ttcctccttg aaggaagttg ttgaaagttg ttaagaagta ttatgtgtaa   20820
aactctaggg atgatgtgct ttaaggaagc aacatttatg aagttgtgtg cttgactagt   20880
agtttataaa gagggaagac gaatcattta ttatattggg attgaatcct ggcaattttt   20940
aaactataaa gttacaggaa atgttggcta ctcttaatgg gccatttatt gtgttaaata   21000
tcagcaatga taaatattta ctaggtaagt ggaaagatcc atctctataa gttgttgtaa   21060
cttaccattt tacgaatctt agttactcag ttttctgtt taaaaatgaa atcatgtagc    21120
actgtataag tcattcagtt ttttcttttg gagaattact ctggattgtc taggctctgt   21180
gttctccaca tatattttag aaatagtttg tgaatttcta caaaaaatcc tgctcggaat   21240
tttcactggg agtatgctta atctatgggt caatttgtga gaaattgata gcttaacaat   21300
agcgaatctt ctgatccaca agtgtggtat ttctctccat ttatttaggt cttctttatt   21360
ttgatagcat tttgtagctt tcagtgtaca gatcttgcaa atatcttgtt aaatatttcc   21420
ctaattattc gatatttatt tttgatgctg ttatagttat attttaaaaa ttttgattcc   21480
aattattgct aatacataga aatgcaatta tttattgacc tgttatcctg tgacattgac   21540
aaacacagtc atatattcgt agatttctag aattttttcta catagactat catatatatc   21600
atctgcaaat aaagacagtt ttacattttc ctttccaatc tcgatgcctt ttcttctttt   21660
ctcatgcctc attgtgtggt ccattactga acggcagcca gttccagctt tctgttcaat   21720
aaaggagcag ttaaagggc caggccttga ccttgctgga ggcttcccat cctcattgcc    21780
ttctgcttcc tcagttctgg cttaacagaa cagtgtgggg aggaggcatg atccttacct   21840
actagggcgt tacaatggcc ttcttcaggt tggttgattc atcaggttta agcgctcacc   21900
tgggctgcag tcaggctaga ttatctgctg accttgccct gtctcctttc tgtagtgggg   21960
tacccttgta agctagggag aagagataca ggtgaaggcc ggaaaaacca gcctgccaca   22020
cagcttccct ggatcatacc ttcgcagtga tatgacgaca ctgttaggag gagcggaggt   22080
ggctgagtgg gtctccagac acctcccttt acctctctgc tgtgccactg atgtgtgacg   22140
tgcttgcacc tatacagagc tgccactgag cagcaccgtg gccagtcctg tggatttttct  22200
tctttctaaa ttgtatgcca tggcttgatc aaacatttca tatacagtag atcatgaaat   22260
cagcatagaa aacacattga ggtagatggt gttaccacat tttatggatg aggggctaac   22320
acttggagaa gtgaggtaac acgtccaagg ccacacagct agtgagcacc atgctgaggg   22380
tcacactctg gtccatctga ggccagagac tgtgcacagc cttctcctca tgctgagtgg   22440
cctggacacc cccacccctct ttcccctgaa ccccttggag agtgggcagt ggcagaacca   22500
acctgggccc atctatgggg attctccatt gggattgacc cgtctggaag gaagacagtt   22560
```

```
gacccacagt taagatcaca gcagatgggc cagccagggt ttctgtagaa catcaggcag    22620
tggccactcc atctagtttc atggatgagc cttttttaata gaacaggaat ctaacactga   22680
accaagctgc ttttagacac acttttattc ctcactctga aatggcattt ggacaagcca    22740
aatatttctt cttctttcag ttgacatttt gtccatcttt gaacagttag ctgatgtttc    22800
ttctgtttag ttatttctgt tctattttcc tgttgccact ggtccaccca gggatggtaa    22860
gaatggaagt caatggttgc tttttcatct gggatgcgtc acgaaggctc agtcaggctt    22920
gtcatatggt ctgtgctccc actgctcctt cttttctgttt cctcatctac agaatttgga   22980
gagtcctgga cctgatctca aatttcacat gttctttatc ttcctgcagc acgctgggga    23040
gagggagaga cagggattcc atcacagaag gttggagctg agcagactt cacagctcat     23100 tctagaggca tttggtccat cttcacagct cattctagag gcatttggtc catcttcaca    23160
gctcattcta gaggcatttg gtccatcttc acagctcatt ctagaggcat tggtccatc    23220 ttacagatga ggaaatggag gctgccaggg ggactgaggc tggaactggg ccttccagtg    23280
gccaggccag atcctccttg gtctcccttg ttgctttcct ggtgggcaga ccctggagcc    23340
actttctgtg actgtgtgag aaggcgactg cccagcaaaa tccatcttca atccatcttc    23400
atttttgcct ctggcgtggg cagattctcc catacctaat tcgggaagcc agaaagagga    23460
agtcagttaa tgatccttag tgggaaggtg ctagtaatgg tccttctcgt gagtttctga    23520
aacaccacgc cgtctctgtg ttgctggccc ggccggagtt aaacctcttc ttggcctttc    23580
cccaggaagc tggtctgagg aagcccagat gcgtttgttt acagctgtct ctggtgacgt    23640
tcgccaggct ctgtgttcag aaggaacatt tccattccct tatttacacc tcccactgga    23700
gtgctcgagg agacacacca attatttcca actacctaga aacctgggag ggtagcagat    23760
ctgtaggggg ccggtgttga agcgagaagc tgtaaatctg gtgacactgt gggcttggga    23820
gggcttgccc ggatctacct gttacttata ctctctatta agaaatttta gtgtccatgg    23880
agaagttatt taaagtctgc gagcctcagt ttccccatat ataatatggg aaggatacct    23940
gattttcctg ttccacagga aggtagaaaa aattaaatta aggcaactga tgaaagggtt    24000
ttgaaagcaa aaataataat atgatactgt cctgaatttg ttaaattatt cctcctagta    24060
gttgcggatc ttttctgta ccttagaaaa ccatgctatg taaaaagaga tggttccagt     24120
cttaaaataa agcagctcag aggtcagggg ccaggacaga agggggccct tgttcacag    24180 atgcgctttc acttctgaga aagcaagtgt gggagaggca ggtggtcctc cagatgtccc    24240
tgtgccccat ggtgtcaagt tgggttacta tggccccttg tgacccagcg tggtagggat    24300
gtgggagcca gtgggtatgg aactgtgatg ggtcacaaga gggctgggac gtctcacagc    24360
ttctacttac agcctagagc ctggggaagg gctgccacct tagtggtaag agaggcatgt    24420
atgtgagtgt gtgtgtgtgt gtgtgtgcat ttgtatgtat atatgtgtga ctctgtgtgt    24480
atgtgcacat ctgtgagtat atgaattgtg tggaagtgtg tataggtgtt tatgtgacag    24540
tctgtgtatg agtgtgggtg tatgtgtgtg ggtgtgttta tgtgtgtacg tgtgtgggtg    24600
tgtatgcata gtgtgtatgt gtgagtttgt gtgtgtgtgc ctgtgcatct ctgtgtgtat    24660
atgcatgtgt gttaggggca ggcacacagg cctgttggta aatgagacac aaaataccta    24720
caaaatacaa aatatgagac aggaaataca agccacagtt attcattttt caacgcaaca    24780
gacataagat taccatgtga aattgctctg aaagtttcca aaagcttcct gtcaattcgt    24840
agagagcagc taacaaagga gtgcgggtcc ctggagcctg cttgtgcagc attgagctat    24900
```

```
tccaaggggg aagaatgggg tgcatggctc ttagctgcag accagcctag aagccctcca   24960
gcctgcttga gcagacttgt taagaggtag cagcaggtgg cagagattag gagctggagt   25020
agtaggctaa gggtgcactt ccagggacac actgcctctg ccaccacccg tgccaccaaa   25080
atgggagccc agaaccctga atctctagca gcctgtttct gaatcagtta ccttgggtgt   25140
gcgcctctgg tcgacagaaa ctaactttta gccctcctgg gtgagagcct cacatcggga   25200
catgtgacag ctttgttgaa agtagctttg gaaacgccca ccacgtgggg ccactcactg   25260
tagtataaac ggtcatgcac cactgagtga cagggatacg ttctgagaaa tgcatcgtta   25320
ggcgatttca tcactgtggg aatgttacag agtgcgccta tcaaacctag atgccatagc   25380
ccactacaca cctaggccag atggtagagc ctgttgtttc taggctgcat gcctgtacag   25440
taggttactg tactgaatac tgtaggcggt tgtaacaatg gtgagtattt gcgtatccaa   25500
acatagaaaa ggtacagtaa aaacaatggc gttatggtcc acggttggct gaaatgttat   25560
gtggtgcatg actgtaggta taaagcatta tggtcgtttg attttcctct ttttctcacc   25620
cacagtctta aggcacctct tatgcctttt gtctgggatg tcccgggcag ggttggaaca   25680
tgtggttaag gcatggtgga aactgctttg gggacggacg atggcctcag cttgccttgg   25740
ggtgtcagtg ggaaagatag gagctgcccc tttgccttca tgtttcttcg taataatctc   25800
agatctaccc atctggtgag cctctcctag agaaaagccc cggtgctcct tcgctcctgc   25860
ggtgtttctc aggagggttg cttctttgta atggtgggga ctcagggaag ggacgcaggc   25920
agagggtgat accacatcac aaagggaccc ttggctgggt gcggtggctc atgcctataa   25980
tcctagcact ttgagaggct gaggcaggtg gatcacctga ggtcaggagt tcgagaccag   26040
cctggccaac atggtgaaac tctgtctcta ctaaaaatac aaaaattagt caggcatggt   26100
ggtgggtgcc tgtaatccca gctactcagt aggctgaggc agaagaatcg cttgaacccg   26160
ggaggtggag gttgcagtga gccaagattg caccattgcg ctccagcctg ggcaacagag   26220
cgtgactcca tctcaaaaag aaaacaaaca aacaaaaaca caaacaaaca acaacaaaaa   26280
atacttgggc catcagcttc ttggaaaggc tggtgtgagg tagaagcatt tgctggtgcc   26340
tctgctcgac accagagcag aggtgatttt ttggtgactc tgttgagagc agagaacctg   26400
agcaaagagg ttatcatgag tggattttac tgccttactt gggtgggcat tcccttggga   26460
gttcgatgga catttgcagc tgagcccagg caggggaact gtgctcactc cgccttcaga   26520
attccaaagg ctgagcatgc attttggctt cctctaaccc atgtctttct ctaggtgacc   26580
acagcagagt atcattaagt atctattctt tgcttttgtt ctcagggcag gaagatccca   26640
atagtttgcg ccataaatat aactttattg cggacgtggt ggagaagatc gcccctgccg   26700
tggttcatat tgaattgttt cgcaagtaaa gagagccttc cttttttccta taacctctga   26760 agctttcacc gccactagca aaacatgaga gctctttttg agacacatta aagtgtcaaa   26820
gtgtcactga atatcttcct actttaagat aagtgtgtct cccttcaaac atttgcccta   26880
ttcgactcta tgaatctaca gtcttaaccc ttctaaatgt ttaaagaacc tcgggctctg   26940
aagagattcc ctaagaatat tttgtaagtg aaattgtttg atgcatgcaa aaaattggca   27000
gattgtttag tttttaaatg ttaagcccaa tatataaaga agcgattgct aggtgtgtgt   27060
tgctgttgca gaacccattc attaatcaat gtgttgaagc gttcatttta aggtgttgca   27120
ggcttaagtg tgtacttctt tggatttttag gcttccgttt tctaaacgag aggtgccggt   27180
ggctagtggg tctgggttta ttgtgtcgga agatggactc atcgtgacaa atgcccacgt   27240
ggtgaccaac aagcaccggg tcaaagttga gctgaagaat ggtgccacct atgaagccaa   27300
```

```
aatcaaggat gtggatgaga aagcagacat tgcactgatc aaaattgacc accaggtgag   27360
tatgttttcg cctgcagagg tgagttctca gatgccctgg aacacccttg gcaaaggcac   27420
cagagctctc tgattgcagg tgattctcag ggggcactga agccagtcta aaccagtcac   27480
aggagggcct tgaggagatg ctgagtatgg cctgggcgtg tgggagaggc aggggctcag   27540
gagagcttct gtaaggagcc agataaaagt ttttaaaata atgttttaaa tgtttatcaa   27600
agaaagcaat agatttgtaa agaaattagt aggtaagttg tgaaaattga gtctccttcc   27660
cattcccgat cctgtggcaa cccttgttac agattttatt tatcctccac agatacgtca   27720
tgcattcaca gtgaacatag aatttactgg ggtttagact gagccatcct taacttgtca   27780
acagttactc tgaaaacaaa ccagctctcc caaattgggg ttttgcaggg taatgaggtg   27840
tgtttcagaa caatattcca tactttatat atcttggaaa ccttgagtta aaacagagct   27900
aatggatttc ttcttcccag accttctcag agcttttagt atgctagtgt gcacgtggct   27960
tgcctacaaa agggtgttga ctgaactatt tgcccaaatt ataatcattt gagtatacag   28020
cttttttttg gagggggggag gggcagaact gagccatacc aagatcaatc tggcaaatgc   28080
tgtatttgaa aatgctttct atttaaatat tctctttgca atcattttg ctgttgaatt   28140 gcttagcaaa gtcttcatgt ctgggacaat atccatttct tactgactca tcaaaaaccc   28200
ccactcgaca ctttgatgag agaggtttta tttgctgtgt ggcatgttca gtgaaagcgt   28260
ggtttctagt ttcttcacat ccttgtaatt ttctggactt cagacggagg gaacaatcag   28320
aggaggttgg aatcctgcct ctggccaagg aaaagaccag agactgagcc agttggggtc   28380
tcttgtccag ccctctgctt gcctcccttt acctgggtgt gggctgagta attccagaca   28440
agcgtagaat taatcaggct atttgcgctg ttggatggca tgctgggtac atctccttct   28500
ggaaacagct ctgcgtgtgc tgtttgggtg gtaggattct gggtctcctc tgtctttta   28560 tggcatcaag ttgctgccca gcccaggctc ctttacggcc agtcttcaga aaaccaccag   28620
ctaacacatt tacaaccctc cttccccgat gttcctataa cctctctatg gccgggtggc   28680
caggcacggc caaagaggct cagggtagat atagggtctg tgtccggtgt gtgtaactgg   28740
ccttgagtga ggctgcagtt gtgtgttatt tctattaggt cactgtggaa tttctagcaa   28800
caactaatct ttcaaagtgt gtttattggt cacaggatca ttgggccagc ctctgccttc   28860 gttcttttc acctaatctg cataatagct gtattatccc catttagag aagaagaaac   28920 agggactcag agaagtctag taacctgtct gagaccacac agcaaacacg tcatgaccct   28980
gccctcctaa ggcagccagg ctactgctcc caacgtgtcc aagcccatgg ctattgttgg   29040
agggatacag gctggcccca tggaatgatg ggacagcttg accttaaaca gcccatggaa   29100
aggtgggtgc atctggttta ggaacaggct gctagaaagg tatccaggat gtggtagtct   29160
caccggaagg agccagtcag aatagcacag cctgtggcca cgcgtgggc ctgttcagcc   29220 tcacagagcc tttgggaggc agccagcagc agggcatgag ctgtgtgcag gcaaggcgct   29280
ggcctggacg ccgcccccac tgagtaactt cgtgtttgga atgcgtgggc ataccgtg   29340 cagctgcttc tggccggcgg atattctttt ccaattttga gccaaggtgg agactgtctc   29400
ctcgtgtcat ccctggcatg tcctggcaag acacgaacga tctcaataga caagctttgc   29460
agagtgtgtc tgacctgact cctgctgtcc tgggagctga gctcttcagc cagcagcatg   29520
ctgtttgaca tgtgtttcaa gtcccccaag aaagggtgct tgaaatttaa aattgaactg   29580
atgtggcttt tctaaatgga attggaaatg aaaggatatt aaattgcaga caaccacaca   29640
```

```
aaagactggt ttccactgac taaactgctt ttttttgctg atagtagttg aagtaggga      29700 gagtaacagc atctcttcca gctctttctc ttttgttccc ttgttttgat gatgggttat      29760
ttcgggggag gctctggctg gccttgcttt gtgtcacctt agggataaca aagaggatga      29820
aagagatcag gaaacagag aaggcagaac agaaccagca gaaactgtgc ttgaggaatg       29880
aaaatcacct acatggctcc ttgtcgtatg agactgtggc ccaacctccc ccaaagccac      29940
ttaagagtaa cccagtgaag ctggtgagac tgcctgccgc gtccatgggc ccagtgacta      30000
gcttggtggc ttatcatctg gacccagctc ctcccctggc atcctgattt cacttggagg      30060
gtcctccatt gtccttcata aacgtgttta ctttattttt ttttattttt tgagacagag      30120
ttttactgtt gcctaggctg gagtgcagtg gtgcaatctc cgctcactgc aacatccacc      30180 tccaggctc aagtgatttt cctgcctcag cctcctgagt gactgggacc acaggcacgc       30240
accaccatga ctggctgatt tttgtatttt tagtagagac agggttttgc catgttggcc      30300
aggctggtct caaactcctg acctcaggtg atccacctgc ctcagcttcc caaggtgctg      30360
ggattacagg tgtgagccac tgtgcgtggc tataaatgtg atattcttga ctttcagt       30420 gaaataaaaa ttaccatgga cacctgtggt cattgtccac ttgccaccca cctaccccc      30480 ttactggcag cagcagccag catttcacat ctccgtcatc ggacagcgta ggtgggccca      30540
tcagtcatgg tgtcctaccc tctggtgcca aggagcggac acatgaccaa gttagggcaa      30600
gcagaggctc cccctggaac tgcaaagtga agccggatgt cacccacaga gactaacatg      30660
gtgaagctgc tgtaggccct gctcttgaga ccccagcact gtctgagttc ttgcactttc      30720
tgagtccagt ttcatatctg cttttcctcc cgttcttgga gctcccctca catctccagt      30780
ggcttgaagt tgccagagat gtttctgggc ttgtgaccaa atgactcctt ttctgcttct      30840
cactgctgag cagacacatg tgcgctcact ttgcctgctg agtcttggga cccggaagag      30900
ctcttgggag acgctcacgg agcagccccc tcttgccggc cctgctgact ccctccaagc      30960
aggaggggag aagccctggc tgggcatccc ttaatgtgct tctgcccaaa tctgaaactc      31020
ctctttcctc gggacccacg accgtggcca gcctgcctgg ggagggaatc ccagctgcag      31080
aaagtcggga cagtatgcgt gtaaacatgt taatagaaag cagctttgag ggcaaactag      31140
ttcagcttta gttacaaact ctttccaaat gtgtttgaca tgagccactg ccagtgtgca      31200
gcatatgtca agctttcatc caatggtggc attttgtccc aacgggtttt ttttttttcct      31260 gagcagtttg gggcaggggt ggggagaggg agagagaaaa gtaaaagag agcagtttgg       31320 tttcttcagg ctggagtaca aggtagagat aatgggatgt gttgaagaaa gtaggaggga      31380
aagttacttt agttacagct gtttgtccag ctgtgctgat taagaaactt ggagaaaagc      31440
atctctggaa tcatgtcctt cccatcttgt atatagcctt tgcagatctc ctgcggttct      31500
gagagagatc tgaactgctt accagggcct tgagggcccc atctgattgg gcaccctccc      31560
tccctctggc cctcctcctc ttcccctcct cccctccttt ctctgccccc acctgctctg      31620
ctcagacacc ccctgctcgg ttacttccca caggccaggg ctgtcccctg gggccttggc      31680
tgttcccctc ctaggagcac ccctctccag ctcctcatgg agccaacctt cccatccttc      31740
aggcctctga ttaaattctg ccttagacat ctctccccac cccactgtgg gaggtgacgc      31800
cccatgcccc agtctcctca atcccaccgc gtcactctgg ggacacatca ccccagggac      31860
aactgcattc cactcttggt ttttccctcc ttgtctattg atcacaattt agagtcgcct      31920
cactcatttc tcagtcattt gtcaaatgaa gtccatttct gccgctagac tgcggggttg      31980
gggacacatc cggctgatcg gtcctcaggt aggaggtgct tggcaacttt gtcccgagta      32040
```

```
ggacgttcac agctgtctgc cctggaggaa gcaagggcac ccaccacgtg gatggaattg    32100
aggggaaggc acccgcggct cctgcatcga gcttccgtcc tatattcaat gaggaaatga    32160
ccctgcagca ggctggctgc agatgcccct gccatcccgc tttgcctgcc tggagtttga    32220
tggacatgtg gtcctgtcag ggctgcagca ggtctgtggt cttttggtaat gcaaagcgct    32280 ggggaaacag tgagctttcc tgtgggtgct tttctctgac gccaacaacc aggtaaatat    32340
ttggaaacgc ccttgttgag gcttgtgagg tggttttcct ccctcccctg taggcctgcg    32400 ccaccctcc aaccccccgg ccaccttcag gccagatggc acccacagac ctgtttgaag    32460
tggctggaca gggagccctc tgggcgctgg ggccgctgtg tttgcagagg gtcctcttac    32520
tgctgagctg gctggtgcag cggggaggcc aacacccctg atcctcatca agttcagagg    32580
ggagtcaccg cgggtgaggg gcctgggcc ttttacatgt cctgggagct gctgggcagg    32640
ccgctcttct ccaggccacc agaacttggc cctgcatgtg gcgaatcttt cctgagtcag    32700
ctgagtgagg ggggttcagg cagcccccg ggacgtggca gtggttgggg atgggagtgg    32760
gctggtgcgt gccatgactc acgccggttc tcctcaggca agctgatggt cagacgtgct    32820
gactcagtgg cctgagctcg tccaaaagtg aatcagagaa cgcagggcct gggctcaccc    32880
actgccctct cctggagtca tctgtcactc atcctcatga aggaagcgcc tgggagcctg    32940
gaatgcactt cgcactgccc cagctcccct cttgttctg tgttttttcca ttttggattc    33000 tttccccca ctccttctgt actgggcatt ttgtggtctc ttcttttttct ccgagaactc    33060 tgagggctac cattgcattt gctaatgatg ccacagacgg tgttgatgtt atgaggcttc    33120
tattactgta ttgattgtta ccattttag ggggacagga atcaatattt catgagggaa    33180
tgtgaagcca gacagtaaag tagaagctgg cttttatttt gtgccaggct ttgtccagag    33240
gcgggtgggg acgtggctcc tcagctcttg actgcagctc cttctggcat gggaaacgct    33300
tcagttcccc aaactctcag agctggagac cctgtgtgtt ctctggcccg gattcaagaa    33360
cttagttgat tgtcaaggaa attctttggc tatattttc tcttaatatg gtaatggctt    33420
ttttcactct ggcactctct tttcagggaa tcggattaag actattattt atggttctga    33480
aaaagcagtt cccaagttgg tgggactgga tttgtttagg aatgtctcct gtcctcttca    33540
ttgagggggg aatacaaatt ggttccattt gacagtttat caagtgtgtg acagagtatt    33600
agagtccagg gttggccaac tacagccagt agtccaaagc tggccctcta tctgttgttg    33660
taaataaagt tttattggga cctggtcatg ttcacttatt taggtagagt ctatggctgc    33720
tttcattctg caccagcaga gttaaatagt tgggatgaag accacatggc ccatgaagtc    33780
aaaaatattt gcttcctggc cctttatagg aaaaaattgc cagccccagt ggtaggcaat    33840
ttacaccttg tcctagagga gctgaaagtg gctggaggca ggaatgctca taagaaccaa    33900
gcgaggtgaa gcactaggta gctgcgggga gcggaagaga agctgattag ctgattttgt    33960
ttgccctttc ttttccagag attgtgggtt ttttttttt tttgcagaga tgaagctttg    34020
gtcttgccac aatagcagag ggaggcctta tttttgtcca tttctctatg acattggtag    34080
aaaggagttt gtcagaattc caagctattt ggcaattatc caattttgag atcctaatgg    34140
atctttcaag gtctagtttg ttcattcttt tagtgattcc ttattaattc cctgatttta    34200
tacatatgtg ttgaacatct gtcttggcca aatacttgtt aagtgctgag gatgcagcca    34260
cagtgggcaa agccatgagg cttaagatct agtgtgggaa acgggtgaag taaagtaaat    34320
atggcaataa gtacagtgca tgaagcaaac aggtgaaggg gtagaaggcc tcgggctgca    34380
```

| | |
|---|---:|
| aagatagtag atagtgtaag cagggaatct tatctgaggg gtgacatcta ggctgagatg | 34440 |
| gaaaggacag tgagagccag ccaaggaaac aagctgggtg acaagagttg caggtggagt | 34500 |
| tgcttaattt cccatttctg ctcagcctgc agaacctaga tcttggacta attgcaaact | 34560 |
| gtcatttcct tgtgagttta ttagaaccct ccagaacaag tttctggtta gctagtttct | 34620 |
| ctgtgtgttg ctcatttctt gttggttctg gttctttggg gttcctactc atactccgga | 34680 |
| aagctccaat gtcttaagta gtcagtctcc caagagtctg aaagcacaaa gattcacaat | 34740 |
| gatacgatca cctctcagtc atagcagcat cgatgcagtt ccgtagctgg tttcctaaag | 34800 |
| ccatccagac ctctttctgt ggcaagagag aaataagacc ttctggtgaa ctgaggacta | 34860 |
| attatcctaa taaacatgtg aattaacagt tcctttggtt aaacaaagca ccagaatctg | 34920 |
| ataatgggaa catgtgactc acggtatttc cctctttgct ttatctacca ggcagctcac | 34980 |
| gaaaccactg gccttccctg tgttcccatt ttatgtcata aatatatgtt taattaactt | 35040 |
| attataaaag gccctttgtc atggaccata tcaaattatt cttatataga agaggttata | 35100 |
| catgttttaa acattttaaa ataaatctga aagaatact acatcctggg caacttcccc | 35160 |
| gcatatgggg ctcaaagaag ctctatgtgg ttatgggtaa ggcggagtca gagtgccttc | 35220 |
| agtgtagttc agcagatgct gagaggctgc tgtgtgctgg actctgatcc cactaaatag | 35280 |
| agtagggctg agcccctgcc caccatgaca gcctggagat acaagctgtt ccctttgcct | 35340 |
| ccctgagccc tgagctttat agcctataga cagctgaaaa gcaggctgca tcggttaccc | 35400 |
| cgtcagttac ccagacccaa atgccaggcc ttggctaacc ccagttatta cctaatttca | 35460 |
| agatcctaat gtatctttta agacctggct tgttcattct ttcatttatt tacttactca | 35520 |
| ttgattttgt aaatatttat ggagcatctg ccgtgctaca tgctgttgta gcagcatcag | 35580 |
| ccaccctgaa gttggtggat gaaagggggac agatcaaagg ggctgatgta tggaggagac | 35640 |
| acaagttaga cttgaccaag acaatcttat tcctcctctg gatgccacga atatatacag | 35700 |
| tcattagctg ttgggccccc atgaagactg ttgacatttt gtggtttaaa cactgaagag | 35760 |
| taagggaatg ttggaaatgg caaacatctg atatagtgta aagaagacta aatattttgg | 35820 |
| tggtgttcat aaaacactgag gaggaaagtc gtttcatttt gttcatttgt gtgctctctc | 35880 |
| tctctctctg ttatggcaca ttatcctctg ttctccttct cctttctctt tccttttttt | 35940 |
| ctcccttcat ctccccactt ctctgatctc tcccacctga accgcttcta ccctgctgcc | 36000 |
| ctcccatcca tcctacctcc tctacttccc tccctagaca gtagtaatca catgtcagtt | 36060 |
| ggagaaacat gatggcgact tggtcacacc gttcttctca gtctgtatat gttggtgatc | 36120 |
| tccgtgccca tctggtagat ccctccttcc ctggctcttc tgctcaccac aaccacccctt | 36180 |
| gactttgtga tcgctgataa ccttcacctt ctctaatctg aatcccaagc ttctcagtcc | 36240 |
| tggcccacca cctcccctcc tcatccactc cgaaccctga acggaagctg aatggaaccc | 36300 |
| tgaacggaag ggttctgaag ctgttgagaa ccctgaacgg aagctgaaat atcaatgggt | 36360 |
| cattgctttt cacagtcctc tgtgaaagat tactggccaa gccagcatct ggagaattcc | 36420 |
| tggtctaccg cctccctgtc tggagaagct ggaagagcca gctgcatagg gcatgtgacc | 36480 |
| catgtactca caggccctgt gccctgagct cactgtttta attttatctt tgaatttgta | 36540 |
| tttttgtgaa taaagtccta tgagctaatg gagcatgctc agagaacttg gggatttagt | 36600 |
| tcaggctgga ttcctcctac tgcctcccca atccctggtc ccctgagacc tccagcccca | 36660 |
| cctgaccttc ccttccctgt ttctatgcag cgatcattgc tacccctccat ccctggaagg | 36720 |
| ggtataggca cagggcagtt ctaggttcca acttgggcac cgcataacat cttagtggtg | 36780 |

```
cagggttcag gctgatgatg ccatggtggt tctgtgggct actgggcagg gtcaagccgc   36840
tctcaccctg atccaggtac ctaatgcacc ctgacacaga agtggcagtg tccttggggt   36900
catccattat ccatgtgttg gaggagtggg cccttaggga agatgcttgg ctcaacttcc   36960 ccaccctag ccagggcacg atccgaggtc caggggttgg tgggcacgag gccaagtcgt    37020
gaggcctcca gtgtctgcac tcactgtccc gtaaataacc acaacaataa ctagcaaacc   37080
aaaaccagtg tgataggttg agagagacag aatgtggaag aagggaaaaa gctttatatt   37140
ttagtacctt taacagtgct ttctgtatgc tttatgaaca aggagcctgc atttgcattt   37200
tgcactgggc tctgctaatt ttgttgctgg tcctgctccc tagtagcccg agtcagcaaa   37260
tctttggttc atctgagtcc acagtgcatt gacccgccct ttttcacagt tcctcccctg   37320
cccatgtgct cacttccctc cttacccagc ttggctcact ctctcaagca agtctttgga   37380
tgctgacatc cccctaaac aaccttctg cggcctggtt tgattgtcct taggaggcgt     37440
gcaagttcta tggcactgct tcttgctggg tatagaggat gtgctatttt gtccattgca   37500
tattttttaa agaaaatgaa aggttagcat aactgtttcc agaaggcaca ttgaatcact   37560
cagttgagtc ccagccagtt gctgcagcgt tagcctttga agcaaacttg aaccaacaca   37620
ggaccagcct ggaagtccca gcctccggaa acgatgcagt ggattctgca gattcagcaa   37680 caaaatatt tttgtaactc aggaacactt cgtaattttc aaaggcgaga aagaagtaat    37740
tgacttggct tattaggttg aaaaagagtt gccaattttt tctttggttt tgttgttatt   37800 gtttttgtt ttttttcttt tctccaagct tcagggaatg agattaaatg agcactgaag    37860
tgctactagg cagaacctga atggaaggaa gctgaaatac tgatgggtca ttgcttttca   37920
cagtcctcta tgaaagatta ctggccaagc cagcatctgg agaattctag gaatccccc    37980 tcctcttgca gcggtataag tttgcgggaa tcatctcacc ccactgggga gttgtatgaa   38040
aaaagggatt tattagggac cctgttgcct gtttggatct taccaattta actattgtct   38100
gctaatggat gttttggaaa gcaaccaggt tttctgtaaa gaacagctaa ttgtcagagc   38160
tgagatgacc atgggagatc actgggctca actcctaatt ttagaggtgg taaaaccgca   38220
acccagagaa gctgatcaag tgggccaagg tcgtagactg agttcataca ggaccaagac   38280
ccagccctga tgtcctgcta tctgggacag tgttctcccg gcacacgtgg agcctgaggg   38340
ggtaatgtgt gtgtgtgtgt gtgtgtgtgt gtgtgtgtat gtacatgtac tcatatacac   38400
ataggtgttt tgcctaggtt ttcacttctg ccccaccttg gttgatcttg gagaatgagc   38460
ccgaggcgca ggtgcgctgt cagcctgggg gcttcactca gcacaggccc aacttttctg   38520
ctctggggga gttccagcag ttatggttca tctgtggttc agttatggaa cccacaccac   38580
acgtagcgcc cccaaagccg aggctgcatg cacagacctc ccctcccttc tcgtggtggg   38640
cccctgcttg gattcttccc aaacttctcc tttgccctgc tctgtgttat acccactctg   38700 gtccctgtc cctgtggagt gatccagggc acaaggacag ctgtttcact gctggccgct    38760
gtgtaccccg agcatctggg aggtggggag cgggctgggg agaagaacac ctggagcgga   38820
ggttgggatc agggagggcc gcagtcccgg taccaccacc acctgctgtg ggacctgcag   38880
tctcctcatc agcagaacag ctgtgaagcc atcctgcccg tccacagggt ggtgggttgt   38940
gaaggctgca tacctggcag agctggagaa gctctgggga gatgctggac atgcacgcta   39000
ggagtggttt ccctgccttg cccagactct gctcccatca cctgaacctc cctgtcacca   39060
ccacggaact gctgtgacca ttgctttctt cttaagcaga ttaacagaca tctcctgccc   39120
```

```
caccccgcca aacaaacaaa tgaacaaaca aaaaacgtgc ttgaaggagt atgaacttat   39180
acagtctttt ctaaacactg ttaagtgctg gtattgggat cttcttttaa aatgaaccat   39240
attccccagg ctttggatga cactcatggt tgcccaccct ccaacttcct tccctgctgg   39300
cagaaccctg ggtttgtttt cgttccaccc ccgaccccac tgcattcctg actcaggcaa   39360
atctgcaggg tccagtgcag tcagggggcc acgttccctc ctccaacggg tgctgaggtc   39420
gctgcttgat tggatgctgc tgatgacctg cgaggaggag ggcgccaggg cacttttggg   39480
actttgctct tctgaagaga tgcttccaca gcacggtcgc agtcacgtct tgatgtgatg   39540
tctggaatgg tggtggccgt cttgtggctg tgagaacagg ctgaggttga ttggatggaa   39600
ggaaggaagg atccttgttc ttgacactgt ctgtgagcct tcaggttatc gccctggcac   39660
cacccagccc ttggagtaga cacctgtcta ctctacatac tccatttgga gttgggtttt   39720
ttggtcactt gcagttgaaa gcaccctaac tgatatacac aaactatttt tagtgcgggt   39780
ctgtgtttgg cccttatgga agactttggg ctgagctgcc catggtgagg agacggact   39840
tcgtgtcttc ttaccactct gtgtcctggt ggcttgtatg tgtctctgcc catgaggcaa   39900
aagcctaaag ggcaagggcg gatttcttta atcggatgtt ccttgcacca agcacatagg   39960
agacactcaa cgaatggttg ttgagagagt tctctttcac ggaggtggtg ttttgtgaaa   40020
cgatgctgcc aggcctgctt gttatttgtc tgttggttgt aatctgcatg aatgcaaaga   40080
gccatcttta atcatgctgt ggaccagcct cttccaaggt attagcatga ctcccactac   40140
ctgctcagca tcctgcctat ggctaggact ttgtaattta catagatacg ctggggagac   40200
agggagccca tgaccaggac tctgacaccc tcactggagc tgtttctaca tctaccctgg   40260
gtggctgtct aggacattag gcgattcgtg tcttcctaaa gtccctctgt tgagagactt   40320
ctggctctgt tgagaggaca ctatttagca ttgtgagtcc ctgcaggctg ggggccagtg   40380
ggcattttcc ttctagatgt ccctctctt cttctggcct cccaggcttc ctgctcctga   40440
gactgtgaga actggcctgt gctgggctca ctgcagaaag accgtcgtct ccaaaggtct   40500
tgtgccaaac ttgagctaca agctctttag ccgggcctga ggtctccgcc tgggctctgg   40560
gagagcagca gtggctgttt ctgccccctc actgctgtca tgcccacact tcacttgcat   40620
tttcttcgcc ccccagccgt gtgagaatct ggtatgagga gtgggactca cgtgccctct   40680
ttcttctcct cttcccttg gccttttcat ctgtcagtgg aggacagatg tttgccccgt   40740
ttacttctag gctcactgtg gggctccagg gagatggtga agtggccaag gagaggagct   40800
gccaccttca agacggcctg tggccagtgc tgctttaaag ggagactcag agatgctttg   40860
ctgtgggtgg cgcgggaacc agcatgggga cagcagtgca gaggccttgg actcagagtg   40920
cgtgggcccc acggggcttc acggcgcctg tggctgtgca cttccagcct tatctgtgct   40980
gcatctcctc cacattcccc tgtggagctg atgtctagac agctatggaa ttaaatgctc   41040
aattaccgag taggaatttg gccagcagag gtatagctgc ggagcagaca gactcgaggt   41100
gaggctcacg gctgagaacg ggccccacct ggctctggaa tgagctgagg ggccccatgc   41160
tcctgcagcc agtggctcct gtggggagtt ggggcagtga ccccaaaag gcagtttgac   41220
ctcatggaga gccataaatc tggcctggtc accatctctg caacacatca ttccattgca   41280
aagatttctg cctgtgattg gaattctggg tgaacgtgta ctgggcatgt gggtctgaga   41340
gctgggaagc ctgttctctt gtttagccag gctgccatg ggctgtgagg agtgcccca   41400
tctctgagcc tcagtttcca catcttttaaa atggggggaa aatacagctc aactcctaag   41460
ggtgccgtga aagtactttg tcacctgcca ggcaaaggct cattcctttc acagaaatgc   41520
```

```
aaggtttaca atgtgagacc cctccctact tcgccgcatg tgtccgcttg cttttttctg    41580
tcttagggtt gccctacatg agctaggaaa tgtctgagtg aataaaaacg taaacgagat    41640
gatcactggt ggtgcccatt ggtgcagcct ttgcctaaat ggccactacg tagccacatt    41700
ttctcgtctg tgttcaggtg aggactggtt cctggggaga ctccctgggt tcacattatg    41760
ggtgtctatc ttgtcgaagc ccatatggtc acccaagtgt gactgaacca tggggtgctc    41820
tgggccccat ttttggcagc aggcagcatc ccctggaggc ctggccctcc ccaggagcat    41880
ggagagcagt gcccatggac aagcagtctg cagcctccat ctcctcctcc ctgcccgggg    41940
ggctcccccg ccccagcctc gcagcttctc caaaagtgtt tgtctccttg ccgcatcctc    42000
tgggcctgag ctcagatggt ggaaaagaag agctggaagg agagttgcct ttcggtctgt    42060
ctgccttctg aggtctcctg agacatacag gctgggcctg cctccctttc taggaggcgc    42120
cgatgggtgg taaggatagg ggataagtga gatgtgaatg aggatcacca cagcaagccc    42180
tgactcataa cttttttgatg ggttttcaat gtgtggtgaa gcaggcgcct gctgggcccc    42240
cttcctgagt tgagcttgat ctcctgcctc ctgtctgtct ccttaggcag ccaggctacc    42300
ctgctccagc aacctgtgcc accccgtccc tttacctgtc ccaagcccag ccccgaaggc    42360
ctcaaaggcc tggccttcca gccagtccag ggcctgaagg gatggcagtg tccctggtgg    42420
acctccccca gcatggcgta gcgcacatcc cagcccctgcc tcctgccccg cctgcacgcc    42480
atgaatgctg aagtcatgcc tggcaggggc tgctggcccg ggcccagagt aaacaggctg    42540
cgctgagctt gctggtgtgc tgctggatgc tgatgagctt gaggagtgtg ggaagtcagt    42600
gtggggccga gtagggatgc tgcaggcctg catctccccc cagctgccct gcacgctcca    42660
gcctcaggca accccacagg gaaagggtca cccactgtca gggcagacct ttaccatggc    42720
tgggtgacat gggctggctg tgggaaggtg gttggtggtt cccctgttg gatttgcaca    42780 ggcccagatg ctcacagcaa aactaacacc tagatgatgc ttataggagc cagcgggtaa    42840
tcaaagagct gttcagatct tcatttgctt cgttctcaca gtggaccatt gaggtagctg    42900
tatgttagtc ccattttcca gatgggaaaa ctgaggacct gagtggtcgt aagctcaggc    42960
ccctatctaa atcacacagc ctggccccag gtctatgctc ttgaccatgg acagtgctct    43020
cctggtcctc ttggtatctg tgatctgagg gaccttcctc ctcctcagtc ttgtatagtc    43080
agttttaggt cttagactct ttcttcacat cccttttcttc tttcgggagc tctctcaccc    43140
agcaccttcc ttatctagta tgtgttgggg gatatttgtg gcatgatgtg gcgctgtgta    43200
gtggatgaga gagtctgttt tccggtttc agccccaggt ttcaatccct gctctgtctc    43260
aagtcaccca gactcttgga ggctcagttt cctcatctgt taaatgggca tggtggtcac    43320
ctcacctcat cagctggtgt ctgctccatc cctggtggag gagatggctc aagtaacccc    43380
ttggttccac ctgccccacc ccactggtcc cctggctctt tctttttttga gatagacaaa    43440 cgtgaggctc tggatttgca gttcccacga gggctgggt ggctgtctgc tttctgggtc    43500
tggtccatgt tttccagggc agctgctcgt tctaagtgaa caaaggctga aggaactcag    43560
gaggtttgct cggctccgag gatggcagag agggaagggg tgccgatgcc ttccctgata    43620
gagctgggga ggcccttctg tggttccccc cagctccttg gcttgggtga ccctggagct    43680
gacttctgtt ccattttgtt gtgcagagtt gtttgggggct cctggctctg cctggccttt    43740
gtgggccact ggagatcagg gcttctggag ttggccaatt agcccgccca gcccaggag    43800 cacaggtgtc tgatggaggg cctttttcagg agaggagaga tggcccgcct gttgggtctt    43860
```

```
gctgtcttgg gtcctggagg ccttgctgtc cccatgctcc atccatgccc ttgaccaatg   43920
tggccctgta ctcagcatag gcatgcacct gagtcagtgc aattccctgt ccacagagca   43980 cccaaatat  tccaggcctc aggatgggtg tgcacatgat gagccgggca ggtttcacca   44040
cctgtagctt gggatccttc ccggggcttg gttctcgaag gctgcccag  gcagtcacac   44100 cccaaaccct aaattcatgt tgtcttcctc tgtctcttgg cctcaaggtt tcagagtgag   44160
tctgtgctga tagcttcaag atgtgatgag accccgactt ggcctccagt tccctcccca   44220
cggtttcctt ggcgtgtgtg cggcttcagt ggtcactggc tcccacacag cttgtaatgt   44280
gtggattacg ggtgggaggg aagtccggtc ctgcctgcag caaagggatg ttagtcgtga   44340
gctcagttcc ccatcgggcc tggtgtttcc aaatggcccg gcactgtccc tgcttggttt   44400
tccatgatat ctgtgccttt acccatttgg ttaaattaaa caattcagc  aatgccagcc   44460 attgtggttt cagggtaagt tgcctgtcct gctgcttggc cgctcctcag agctgcggcc   44520
gggagagttc gtggtcgcca tcggaagccc gttttccctt caaaacacag tcaccaccgg   44580
gatcgtgagc accacccagc gaggcggcaa agagctgggg ctccggaact cagacatgga   44640
ctacatccag accgacgcca tcatcaacgt gagcctctgt ccctctgcgg gtggggcttg   44700
gggcagggtt ttgccagagg agaggagtca gcatcggtct ctgacttcct tgtagtctgg   44760
gtgaaaggat ggaactagac caagccatgt ggatcctagt gccagcagca cgacagggt   44820 cacacgcgg  ggacagtgac actggagcag gtggacagcc agcctcctcc caggaggaag   44880
aagttgtgtt gggtgcttta gggtgattgc agttggcttc tgggcttcag agagaaaatc   44940
tccccattta cggcacctct aaaactttct gaaaattgtt aaggtcattt ttttccagca   45000
aaatattagg ttaatgggaa tgaatctcag agaagaatca tgccccacac tgtagacacc   45060
atgctcagga gacggccagg cagggacata gattggacca cgttatgaca caatttgtaa   45120
cctttccatt tctgtttaat tgcagtatgg aaactcggga ggcccgttag taaacctggt   45180
aacgtatttt aaacgttatg tcgtttgttt ttatttatgt acacactgtt tttgttttgt   45240 tttgttttt  gatgtagggg gtcttttcaa acataagctt gccaaagcgt gttatcaagt   45300
ttctttaaaa tgagctctgt gaatgtactg catgcttgca aatgacccta tggatctttt   45360
ctggaaagag taaggcaggc tggaggtgag ggttggaaat gttatgccag agagcacact   45420
tgtgtctcag agttacaggt aaacacagtg aaattcaggg ccaatgcagg agtaaggtga   45480
aggtcaccaa aagtgctggc cggtcactga aagagcctcc tccaaattaa atctcctggg   45540
ctgctgaagg agctggctgg gctcatacac actttctctt ggccaggaat cctcccttaa   45600
ggcctggctg gaatgaggag gagttaccca cccacaaaga tatcatttaa gtctacccyt   45660
aaatacttga gcagaaaaag tgaagcctta gaacatagac catcagcgct agagggcagc   45720
tccggggccg ttcatagagg gcagctccgg ggccatttgt aggggccgtc tttagtaagg   45780
ccttggcatc aggtactgac atcccagcac tcgtgggaag tgcgcacggg gcgatgtatc   45840
cccgcttggc agctttccct tcccagcaga ggggcagctg tgctcccagc tctgccctcc   45900
gcctcccccg cagcaccctg gggatggagt ggagacggct ttgcgggtaa tgaagcatga   45960
cagccctaag ctctagggtt gttccccctc aagtcagcag agtcatctta agatcattag   46020
aaatgagaga agcaggaagg tgtaggcagc cactagagg  actctgagcc tttggaaacg   46080
tattccttgt gaaacaggag caaataatat cgtgcatttt gaaactatct gtgcttaccg   46140
cgaggtgagc acccagtggc gacctggagt gtgtgcgatt cttccacagc tgcgcgtggc   46200
ctacgctgcc tgggtgtcct gatgcctctc tccctgctcc cccggggatc ccctccatgc   46260
```

```
agctccccgc ttcaatctct gaaatagctc agtgacttct ttcatgcaca ttctctttgg   46320
gggtgtacct gccggtaagc cttcacgatt cagcaagccg tgtccttctt gcctttcagg   46380
acggtgaagt gattggaatt aacactttga aagtgacagc tggaatctcc tttgcaatcc   46440
catctgataa gattaaaaag tttctcaccg agtcccatga ccgacaggcc aaaggtaggc   46500
aaggcccaca tagcccrggg gactccggag attcggcctg aagctcaact gcccttrggg   46560
aattggggaa gggaaaagtg gcagcccta  agactagcca agccgtcttc gatccagaag   46620
tgaacaggaa tgcacattac taaatccctg gtagaaggtc acagacattg cgccatttt    46680
gtcctccgat catgacaatg tcacttgagt cagtctaata tgtaccagac acgatcctag   46740
gtgatttctg tccattattt cactttattt atgtatgtta cttaattctt ttgccctatc   46800
agttaggaat tactagtccc attttgctga tgagaaaaca ggttcaggga gatcattcta   46860
caaacattta ttgcctaagt caagcaggga gcttggcagt agactgccca actggagcct   46920
ggggctccgc tgaggccttt gccggtgtgt gtttatgttc tgttggggga tgggaaggct   46980
gacagtaaat aatcagacac attagatact attagtgctc ccaagaaaac agatcagggt   47040
ggctggcaag ggagtgactg gacaggcagt tggtagagat ggtgtggcca ggaaatgcct   47100
cccaaactga ggtctgagtg aggaggagcc agcaggtagg gatgtggggg gaacactcca   47160
gaaggaaaga cagaggactc agcatagctg agtgagcaca aggcccctgg agtggcctgg   47220
gggccggagc acagtgacag catggaggtc tctggggtgg aaagctcgcc aaggccaagc   47280
aagcaggctc acagcgggcc atggtgaggg gcctggggtg catcctaacc gcatttaaga   47340
acagggaagt tcatgatctg attgatgtca ctgaaaggac actctgatgg ttgggggag    47400
tctgctggag gagttgctgg aagttgggga ccggagaagg agctctccca gtcatctgga   47460
tgagacacgc tgggggctca gacaagggtg gtggcagtgg aggtgggaca gaggggtcac   47520
attccaggta tacatggggg tagcgcaagc ctggggaagg gccagctgtc aggatgaggc   47580
catgaggaat tgaggatcat gcccaggtat ctgaccatta actgaacgat gagactttcc   47640
tgaggtcccc cagaggggag gggtccaaac caggattcga gccgcaacct ccgtgtgccc   47700
ttctgtggcc cttcctgcaa cctggggggat tgggcccca gccctggtg  tccccagcat   47760
acccaccaac tgggctgacc ttctgccgtc cctttgttgt ctcaccagga aaagccatca   47820
ccaagaagaa gtatattggt atccgaatga tgtcactcac gtccaggtgg gcaaacagga   47880
tgcgtgtgtg tgtcttaaat tttaataaac ctgaacttca gaaggtgctc acgggcaccc   47940
ctgaaagaga aagcttatgc agccttaaga catctcagtt tctgcttata atgaagtagc   48000
atcaggaaag aggacaggtc atcagccgtg gcccctttgt ttggttttat cctgtgtttc   48060
tgcattctga gctggttttc ttcattggcg gctggccctc cagtgtagaa ggttctgccc   48120
tcctctttga aggcaggcct gagcagtgcg tgtgtggtgg ggctgttgat tcattctggc   48180
tcatgtcttc cttaccccat attctgttga aacccacatt ccaggagggc cccaagcccc   48240
tcccacagct ctaggcactc tgctttcatt gctctgctct gcggcagctc gtgggccgtg   48300
gctgcaggaa tgccagggca ggcccagtgc agggaagtga atgactgatg tgcttgtttt   48360
ccccgagctg gtggaactgc ggcctgtggt tgcaggctc  acggcatcct ggtgttttaa   48420
cctggatgaa aaattctggt gtaatctcgt gagtcctggt agtatagact caactggcgt   48480
ggctgaaact gtcagaggta aagtaggaaa agactagaat atactaacag gtagattaat   48540
gtgttcatta ctatgatgaa ttaatgattc actcactgtg aaagtattaa tatattttga   48600
```

```
tacacattat gaatgatggt cccttcttc gcactccaga agatggagcc acttgtcaag   48660
gttaaagtgt ctcctcagtt gtttgccttt ggaactagaa ggtggaggga agatgggag   48720
gcccttggcg cccagctccc tgggttcctg ttccagctct gatacttcct gccttgtgac   48780
cttgggaacg atatgacccc tgagtgcctc agtttcctcc tcttcaggat ggggatgaca   48840
gcgcaggtgc ttctggtggt agcggtgatc accagccaca gtgatgccag tcactatcta   48900
ggccgggtgc tttactgggg tgacctcatc tgatcctcac aactcatatt gtagggtact   48960
gttattatcc ccgtttcgca ggtgaggaaa tgaaggcaca gagaggttaa gcaaccgtct   49020
ggggtcacgc agctagcaaa tagcagagct agggctacaa accaggccaa ccactatact   49080
ttacggactc cttagtaata gctactgtta attaagaaat aataacaatg atgatggctg   49140
cgcattgctg gctcacacct gtaatcccag cactttggga ggctgaggcg ggcagatcag   49200
ttgaggccag gagttggaga tcagcctggc caatttgtga aaccctgtct ctactaaaaa   49260
tatgaaaaat ttagctgggc ttggtggcag gcacctgtaa tctcagctac tcgggtggct   49320
gaggcaggag aattgcttga acccaggaaa tagaggttgc agtgaactga gatcgtgcca   49380
ttgcactcca gcctgggtga tagagcaaga ctctgtctca aaaaaaaaaa aaaagaaaag   49440
aaaagaaaag aaataataat aatgatgaaa gcactttcct tgctgttacc aagtaaatct   49500
ttgactctgg tagagaggca attttaaaat aggatcagaa ctcctggagg aattttacat   49560
tagacccagg gagaagaagg gaactggtga gagcttgagt tttgcctggg gaaggactgg   49620
tgtctcttca cactaacacg ggtgcttttt ctctggagca gcaaagccaa agagctgaag   49680
gaccggcacc gggacttccc agacgtgatc tcaggagcgt atatcattga agtaattcct   49740
gatacccag cagaagcgtg agttagagtc attttccctt attttcccctt ttcctaatat   49800
tcttgttgct cctgtagggg tagcaggaag agggagcgct gttccttttc tactggctca   49860
gatgacagtg ttgatccttg acagatgtgg tcggacgttg ctggtcattc ctgctggcca   49920
ggccttctga cctggctcgg cttgggactc atccatagga gggtgccttc tgtcttcaaa   49980
agtccttgct ccactaggac cctccagatg acagagcaa tagcagactc ataatgagtc   50040
tctggctggc cagagagagg gtttcaggaa cagtgtcccc aagccctcac gtggtggtcc   50100
tgttctaggc ttcgggaccc ttctcctcct ggagtcttcc agattgtctc tgacagttag   50160
gcccataccct gtcaacacct ccagaaaaat aacccaagtg atatcaaagt aacatgacaa   50220
gaagtagctc aaccatccat cagggtttgt tacctgtatt ggaatatcca gaaaaaagtg   50280
ctagaccagg ggccagcaat tgtgccctgg ggctggatct ggcccactgc ctgcttttat   50340
atggagctgt ggactaagaa taattttgc attttattc tattttact tatttttaa   50400
atttttatt ttcataggtt tgggggaac aggttgtatt tggttacatg aataagttct   50460
ttggtggtga tttgtgagat tttggtgcac ccatcaccca agcagtatac actgaaccca   50520
atttgtagtc ttttatccct caccctgtc ccagccttc ccattgagtc cccagagtcc   50580
attgtataat tcttatgcct ttgtatcctc atagtttagc tcccacttat gagtgagaac   50640
atttaaatag ttgaaaaaat cctgaaataa gaatagcatt ttgtgacttg ttatatttgt   50700
atgcaattca aatttcagcg tccactgaaa tttggtttat gacatctttg gtggcttttg   50760
tgctggagca gccgagttga gtagcttcaa cagagaccat atatacggca aagcctaaaa   50820
tatttcctat ggacctcttt acagaaaaag tttgcagacc cttatgctgg cccatatgaa   50880
ggaccatgac agcgttttga cgctgaccta tataagagct acagttatag tggcaaccac   50940
acaaaggaag tgcctcttaa cagaagcatt ctgcccaccc ttgtaggaac tgcattctga   51000
```

```
gttgcaatac cctttataag caagttggcc atggtcacgc tacatggcag atagtacctg   51060
gtacatcctt ccccactttg gggtcaatct tgacctttga tctccttggg gtcataaggc   51120
catacaagtg ttagtaggca tttctagagt ggacataatg gatgagttag cctaaaaatc   51180
tcaaaaggag cccagcatca tggcacctgc ttgtaatccc agctattcag gaggctgag    51240 cagaaggatc ccttgagccc aggagttcaa gactagcttg ggcaacaaat gagaccccat   51300
ctcaaagaaa aaaaaaagg tgggggaaga acattataat aataataata ataataataa   51360
aaaccttgat aagtatccag tctaccaatg gtttatttt tatttttatta ttattatttt   51420 ttgagatgga atctcactct gttgcccagg ctggagtgca gtggcaaaat cttggcttac   51480
tgcaacctcc acctcctggg ttcaagtgaa tctcttgcct cagcctctga gtagctggga   51540
ttacaggtgc ccaccaccaa acctggctct tttgttttgt aatttttagta gaaccagggc   51600 tttgccatgt tggccaggct ggtcttgaac tcctgacctc aggtcatcca cctgcctcag   51660
cctcccaaag tgctaggatt acaggcatga gccactgtgc ccggcccact gatggtttga   51720
attattctaa gttccaccac atccaatcct gtttgctctg ggcttttagg ttctaaactg   51780
tgcctctgtc catgtaaagt cagatcagga ggaatggaga catgaaacat tgctattgtg   51840
tttccctttg tgttgcagtg gtggtctcaa ggaaaacgac gtcataatca gtatcaatgg   51900
acagtcggtg gtctccgcca atgacgtcag cgatgtcatt aaaagggaaa gcaccctgaa   51960
catggtggtc cgtaggggta acgaagacat catgatcaca gtgattcccg aagaaattga   52020
cccataggca gaggcatgag ctggacttca tgtttccctc aaagactctc cgtggatga   52080 cggatgagga ctctgggctg ctggaatagg acactcaaga cttttgaccg ccatttgtt   52140 tgttcagtgg agactccctg gccaacagaa tccttcttga tagtttgcag gcaaaacaaa   52200
tgtaatgctg cagatccgca ggcagaagct ctgcccttct gtatcctatg tatgcagtgt   52260
gcttttctct gccagcttgg tccattcttg cttagacagc cagcatttgt ctcctcct    52320 aactgagtca tcatcttaga ccaactaatg cagtcgatac aatgcgtaga tagaagaagc   52380
cccacgggag ccgggatggg acggggcgcg tttgtgcttt tctccaagtc agcacccaaa   52440
ggtcaatgca cagagacccc gggtgggtga acactggctt ctgaaatggc cagagttgac   52500
tcttttagga atctctttgg aactgggagc acgatgactc tgagtttgag ctattaaagt   52560
acttcttaca cattg                                                    52575

<210> SEQ ID NO 5
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 5
agttaaagga ggagacaaat                                                20

<210> SEQ ID NO 6
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 6
tcagttaaag gaggagacaa                                                20
```

```
<210> SEQ ID NO 7
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 7
ctcagttaaa ggaggagaca                                               20

<210> SEQ ID NO 8
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 8
ctcagttaaa ggaggagac                                                19

<210> SEQ ID NO 9
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 9
actcagttaa aggaggagac                                               20

<210> SEQ ID NO 10
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 10
actcagttaa aggaggaga                                                19

<210> SEQ ID NO 11
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 11
actcagttaa aggaggag                                                 18

<210> SEQ ID NO 12
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 12
gatgactcag ttaaaggagg                                               20

<210> SEQ ID NO 13
<211> LENGTH: 20
<212> TYPE: DNA
<213> ORGANISM: artificial
<220> FEATURE:
<223> OTHER INFORMATION: Oligonucleotide nucleobase sequence motif
```

```
<400> SEQUENCE: 13
atgatgactc agttaaagga                                          20

<210> SEQ ID NO 14
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 14
tgatgactca gttaaagg                                            18

<210> SEQ ID NO 15
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 15
gatgatgact cagttaaagg                                          20

<210> SEQ ID NO 16
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 16
gatgatgact cagttaaag                                           19

<210> SEQ ID NO 17
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 17
tatcgactgc attagttgg                                           19

<210> SEQ ID NO 18
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 18
gtatcgactg cattagttgg                                          20

<210> SEQ ID NO 19
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 19
tcgactgcat tagttg                                              16

<210> SEQ ID NO 20
```

<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 20
tcgactgcat tagttg                                                      16

<210> SEQ ID NO 21
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 21
tcgactgcat tagttg                                                      16

<210> SEQ ID NO 22
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 22
tatcgactgc attagttg                                                    18

<210> SEQ ID NO 23
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 23
gtatcgactg cattagttg                                                   19

<210> SEQ ID NO 24
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 24
tgtatcgact gcattagttg                                                  20

<210> SEQ ID NO 25
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 25
atcgactgca ttagtt                                                      16

<210> SEQ ID NO 26
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 26

```
atcgactgca ttagtt                                                    16

<210> SEQ ID NO 27
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 27
atcgactgca ttagtt                                                    16

<210> SEQ ID NO 28
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 28
tatcgactgc attagtt                                                   17

<210> SEQ ID NO 29
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 29
gtatcgactg cattagtt                                                  18

<210> SEQ ID NO 30
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 30
tgtatcgact gcattagtt                                                 19

<210> SEQ ID NO 31
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 31
ttgtatcgac tgcattagtt                                                20

<210> SEQ ID NO 32
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 32
tatcgactgc attagt                                                    16

<210> SEQ ID NO 33
<211> LENGTH: 16
<212> TYPE: DNA
```

```
<213> ORGANISM: artificial
<220> FEATURE:
<223> OTHER INFORMATION: Oligonucleotide nucleobase sequence motif

<400> SEQUENCE: 33
tatcgactgc attagt                                                   16

<210> SEQ ID NO 34
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 34
gtatcgactg cattagt                                                  17

<210> SEQ ID NO 35
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 35
tgtatcgact gcattagt                                                 18

<210> SEQ ID NO 36
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 36
gtatcgactg cattag                                                   16

<210> SEQ ID NO 37
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 37
gtatcgactg cattag                                                   16

<210> SEQ ID NO 38
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 38
gtatcgactg cattag                                                   16

<210> SEQ ID NO 39
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 39
tgtatcgact gcattag                                                  17
```

```
<210> SEQ ID NO 40
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 40
ttgtatcgac tgcattag                                                 18

<210> SEQ ID NO 41
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 41
attgtatcga ctgcattag                                                19

<210> SEQ ID NO 42
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 42
tgtatcgact gcatta                                                   16

<210> SEQ ID NO 43
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 43
tgtatcgact gcatta                                                   16

<210> SEQ ID NO 44
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 44
attgtatcga ctgcatta                                                 18

<210> SEQ ID NO 45
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 45
ttgtatcgac tgcatt                                                   16

<210> SEQ ID NO 46
<211> LENGTH: 16
<212> TYPE: DNA
<213> ORGANISM: artificial
<220> FEATURE:
```

```
<223> OTHER INFORMATION: Oligonucleotide nucleobase sequence motif

<400> SEQUENCE: 46
ttgtatcgac tgcatt                                                    16

<210> SEQ ID NO 47
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 47
attgtatcga ctgcat                                                    16

<210> SEQ ID NO 48
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 48
attgtatcga ctgcat                                                    16

<210> SEQ ID NO 49
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 49
attgtatcga ctgcat                                                    16

<210> SEQ ID NO 50
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 50
acgcattgta tcgact                                                    16

<210> SEQ ID NO 51
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 51
acgcattgta tcgact                                                    16

<210> SEQ ID NO 52
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 52
tacgcattgt atcgac                                                    16
```

```
<210> SEQ ID NO 53
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 53
tacgcattgt atcgac                                                     16

<210> SEQ ID NO 54
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 54
ctacgcattg tatcgac                                                    17

<210> SEQ ID NO 55
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 55
tctacgcatt gtatcgac                                                   18

<210> SEQ ID NO 56
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 56
atctacgcat tgtatcgac                                                  19

<210> SEQ ID NO 57
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 57
tatctacgca ttgtatcgac                                                 20

<210> SEQ ID NO 58
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 58
ctacgcattg tatcga                                                     16

<210> SEQ ID NO 59
<211> LENGTH: 16
<212> TYPE: DNA
<213> ORGANISM: artificial
<220> FEATURE:
<223> OTHER INFORMATION: Oligonucleotide nucleobase sequence motif
```

-continued

```
<400> SEQUENCE: 59
ctacgcattg tatcga                                                     16

<210> SEQ ID NO 60
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 60
tatctacgca ttgtatcga                                                  19

<210> SEQ ID NO 61
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 61
tctacgcatt gtatcg                                                     16

<210> SEQ ID NO 62
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 62
tctacgcatt gtatcg                                                     16

<210> SEQ ID NO 63
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 63
tctacgcatt gtatcg                                                     16

<210> SEQ ID NO 64
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 64
atctacgcat tgtatcg                                                    17

<210> SEQ ID NO 65
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 65
tatctacgca ttgtatcg                                                   18

<210> SEQ ID NO 66
<211> LENGTH: 20
```

```
<212> TYPE: DNA
<213> ORGANISM: artificial
<220> FEATURE:
<223> OTHER INFORMATION: Oligonucleotide nucleobase sequence motif

<400> SEQUENCE: 66
tctatctacg cattgtatcg                                            20

<210> SEQ ID NO 67
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 67
atctacgcat tgtatc                                                16

<210> SEQ ID NO 68
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 68
atctacgcat tgtatc                                                16

<210> SEQ ID NO 69
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 69
tatctacgca ttgtatc                                               17

<210> SEQ ID NO 70
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 70
ctatctacgc attgtatc                                              18

<210> SEQ ID NO 71
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 71
tctatctacg cattgtatc                                             19

<210> SEQ ID NO 72
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 72
```
ttctatctac gcattgtatc                                                20

<210> SEQ ID NO 73
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 73
tatctacgca ttgtat                                                    16

<210> SEQ ID NO 74
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 74
tatctacgca ttgtat                                                    16

<210> SEQ ID NO 75
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 75
ctatctacgc attgtat                                                   17

<210> SEQ ID NO 76
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 76
tctatctacg cattgtat                                                  18

<210> SEQ ID NO 77
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 77
ttctatctac gcattgtat                                                 19

<210> SEQ ID NO 78
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 78
ctatctacgc attgta                                                    16

<210> SEQ ID NO 79
<211> LENGTH: 16
<212> TYPE: DNA
<213> ORGANISM: artificial

```
<220> FEATURE:
<223> OTHER INFORMATION: Oligonucleotide nucleobase sequence motif

<400> SEQUENCE: 79
ctatctacgc attgta                                              16

<210> SEQ ID NO 80
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 80
tctatctacg cattgta                                             17

<210> SEQ ID NO 81
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 81
ttctatctac gcattgta                                            18

<210> SEQ ID NO 82
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 82
ttctatctac gcattgt                                             17

<210> SEQ ID NO 83
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 83
tcttctatct acgcattgt                                           19

<210> SEQ ID NO 84
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 84
ttcttctatc tacgcattgt                                          20

<210> SEQ ID NO 85
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 85
ttcttctatc tacgcattg                                           19
```

```
<210> SEQ ID NO 86
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 86
ttctatctac gcattg                                                    16

<210> SEQ ID NO 87
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 87
cttctatcta cgcatt                                                    16

<210> SEQ ID NO 88
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 88
tcttctatct acgcatt                                                   17

<210> SEQ ID NO 89
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 89
ttcttctatc tacgcatt                                                  18

<210> SEQ ID NO 90
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 90
tcttctatct acgcat                                                    16

<210> SEQ ID NO 91
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 91
ttcttctatc tacgcat                                                   17

<210> SEQ ID NO 92
<211> LENGTH: 18
<212> TYPE: DNA
<213> ORGANISM: artificial
<220> FEATURE:
<223> OTHER INFORMATION: Oligonucleotide nucleobase sequence motif
```

```
<400> SEQUENCE: 92
cttcttctat ctacgcat                                                 18

<210> SEQ ID NO 93
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 93
ttcttctatc tacgca                                                   16

<210> SEQ ID NO 94
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 94
cttcttctat ctacgca                                                  17

<210> SEQ ID NO 95
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 95
gcttcttcta tctacgca                                                 18

<210> SEQ ID NO 96
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 96
cttcttctat ctacgc                                                   16

<210> SEQ ID NO 97
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 97
gcttcttcta tctacg                                                   16

<210> SEQ ID NO 98
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 98
cgtggggctt cttcta                                                   16

<210> SEQ ID NO 99
```

```
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 99
tgacttggag aaaagcacaa                                                    20

<210> SEQ ID NO 100
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 100
ctgacttgga gaaaagcac                                                     19

<210> SEQ ID NO 101
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 101
agagtcatcg tgctcc                                                        16

<210> SEQ ID NO 102
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 102
aagtacttta atagctcaaa                                                    20

<210> SEQ ID NO 103
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 103
aagtacttta atagctcaa                                                     19

<210> SEQ ID NO 104
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 104
gaagtacttt aatagctcaa                                                    20

<210> SEQ ID NO 105
<211> LENGTH: 16
<212> TYPE: DNA
<213> ORGANISM: artificial
<220> FEATURE:
<223> OTHER INFORMATION: Oligonucleotide nucleobase sequence motif

<400> SEQUENCE: 105
```

```
tactttaata gctcaa                                                    16

<210> SEQ ID NO 106
<211> LENGTH: 18
<212> TYPE: DNA
<213> ORGANISM: artificial
<220> FEATURE:
<223> OTHER INFORMATION: Oligonucleotide nucleobase sequence motif

<400> SEQUENCE: 106
aagtacttta atagctca                                                  18

<210> SEQ ID NO 107
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 107
gaagtacttt aatagctca                                                 19

<210> SEQ ID NO 108
<211> LENGTH: 19
<212> TYPE: DNA
<213> ORGANISM: artificial
<220> FEATURE:
<223> OTHER INFORMATION: Oligonucleotide nucleobase sequence motif

<400> SEQUENCE: 108
agaagtactt taatagctc                                                 19

<210> SEQ ID NO 109
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 109
aagaagtact ttaatagctc                                                20

<210> SEQ ID NO 110
<211> LENGTH: 17
<212> TYPE: DNA
<213> ORGANISM: artificial
<220> FEATURE:
<223> OTHER INFORMATION: Oligonucleotide nucleobase sequence motif

<400> SEQUENCE: 110
gaagtacttt aatagct                                                   17

<210> SEQ ID NO 111
<211> LENGTH: 20
<212> TYPE: DNA
<213> ORGANISM: artificial
<220> FEATURE:
<223> OTHER INFORMATION: Oligonucleotide nucleobase sequence motif

<400> SEQUENCE: 111
taagaagtac tttaatagct                                                20

<210> SEQ ID NO 112
<211> LENGTH: 16
<212> TYPE: DNA
```

```
<213> ORGANISM: artificial
<220> FEATURE:
<223> OTHER INFORMATION: Oligonucleotide nucleobase sequence motif

<400> SEQUENCE: 112
gcaatgtgta agaagt                                                         16

<210> SEQ ID NO 113
<211> LENGTH: 275
<212> TYPE: DNA
<213> ORGANISM: Homo sapiens

<400> SEQUENCE: 113
gacagtcagc atttgtctcc tcctttaact gagtcatcat cttagtccaa ctaatgcagt         60
cgatacaatg cgtagataga agaagcccca cgggagccag gatgggactg gtcgtgtttg        120
tgcttttctc caagtcagca cccaaaggtc aatgcacaga gaccccgggt gggtgagcgc        180
tggcttctca acggccgaa gttgcctctt ttaggaatct cttggaatt gggagcacga         240 tgactctgag tttgagctat taaagtactt cttac                                   275

<210> SEQ ID NO 114
<211> LENGTH: 282
<212> TYPE: DNA
<213> ORGANISM: Homo sapiens

<400> SEQUENCE: 114
gacagtcagc atttgtctcc tcctttaact gagtcatcat cttagtccaa ctaatgcagt         60
cgatacaatg cgtagataga agaagcccca cgggagccag gatgggactg gtcgtgtttg        120
tgcttttctc caagtcagca cccaaaggtc aatgcacaga gaccccgggt gggtgagcgc        180
tggcttctca acggccgaa gttgcctctt ttaggaatct cttggaatt gggagcacga         240 tgactctgag tttgagctat taaagtactt cttacacatt gc                           282

<210> SEQ ID NO 115
<211> LENGTH: 266
<212> TYPE: DNA
<213> ORGANISM: Homo sapiens

<400> SEQUENCE: 115
gacagtcagc atttgtctcc tcctttaact gagtcatcat cttagtccaa ctaatgcagt         60
cgatacaatg cgtagataga agaagcccca cgggagccag gatgggactg gtcgtgtttg        120
tgcttttctc caagtcagca cccaaaggtc aatgcacaga gaccccgggt gggtgagcgc        180
tggcttctca acggccgaa gttgcctctt ttaggaatct cttggaatt gggagcacga         240 tgactctgag tttgagctat taaagt                                             266

<210> SEQ ID NO 116
<211> LENGTH: 235
<212> TYPE: DNA
<213> ORGANISM: Homo sapiens

<400> SEQUENCE: 116
caactaatgc agtcgataca atgcgtagat agaagaagcc ccacgggagc caggatggga         60
ctggtcgtgt tgtgcttttt ctccaagtca gcacccaaag gtcaatgcac agagaccccg        120
ggtgggtgag cgctggcttc tcaaacggcc gaagttgcct cttttaggaa tctctttgga        180
attgggagca cgatgactct gagtttgagc tattaaagta cttcttacac attgc             235
```

```
<210> SEQ ID NO 117
<211> LENGTH: 229
<212> TYPE: DNA
<213> ORGANISM: Homo sapiens

<400> SEQUENCE: 117
caactaatgc agtcgataca atgcgtagat agaagaagcc ccacgggagc caggatggga      60
ctggtcgtgt ttgtgctttt ctccaagtca gcacccaaag gtcaatgcac agagaccccg     120
ggtgggtgag cgctggcttc tcaaacggcc gaagttgcct cttttaggaa tctctttgga     180
attgggagca cgatgactct gagtttgagc tattaaagtt acttcttac                 229

<210> SEQ ID NO 118
<211> LENGTH: 20
<212> TYPE: DNA
<213> ORGANISM: Homo Sapies

<400> SEQUENCE: 118
cttcttctat ctacgcattg                                                  20

<210> SEQ ID NO 119
<211> LENGTH: 275
<212> TYPE: DNA
<213> ORGANISM: Homo Sapies

<400> SEQUENCE: 119
gtaagaagta ctttaatagc tcaaactcag agtcatcgtg ctcccaattc caaagagatt      60
cctaaaagag gcaacttcgg ccgtttgaga agccagcgct cacccacccg gggtctctgt     120
gcattgacct ttgggtgctg acttggagaa aagcacaaac acgaccagtc ccatcctggc     180
tcccgtgggg cttcttctat ctacgcattg tatcgactgc attagttgga ctaagatgat     240
gactcagtta aggaggaga caaatgctga ctgtc                                  275

<210> SEQ ID NO 120
<211> LENGTH: 282
<212> TYPE: DNA
<213> ORGANISM: Homo Sapies

<400> SEQUENCE: 120
gcaatgtgta agaagtactt taatagctca aactcagagt catcgtgctc ccaattccaa      60
agagattcct aaaagaggca acttcggccg tttgagaagc cagcgctcac ccacccgggg     120
tctctgtgca ttgacctttg ggtgctgact tggagaaaag cacaaacacg accagtccca     180
tcctggctcc cgtggggctt cttctatcta cgcattgtat cgactgcatt agttggacta     240
agatgatgac tcagttaaag gaggagacaa atgctgactg tc                        282

<210> SEQ ID NO 121
<211> LENGTH: 266
<212> TYPE: DNA
<213> ORGANISM: Homo Sapies

<400> SEQUENCE: 121
actttaatag ctcaaactca gagtcatcgt gctcccaatt ccaaagagat tcctaaaaga      60
ggcaacttcg gccgtttgag aagccagcgc tcacccaccc ggggtctctg tgcattgacc     120
tttgggtgct gacttggaga aaagcacaaa cacgaccagt cccatcctgg ctcccgtggg     180
gcttcttcta tctacgcatt gtatcgactg cattagttgg actaagatga tgactcagtt     240
aaaggaggag acaaatgctg actgtc                                          266
```

<210> SEQ ID NO 122
<211> LENGTH: 235
<212> TYPE: DNA
<213> ORGANISM: Homo Sapies

<400> SEQUENCE: 122
gcaatgtgta agaagtactt taatagctca aactcagagt catcgtgctc ccaattccaa      60
agagattcct aaaagaggca acttcggccg tttgagaagc cagcgctcac ccacccgggg     120
tctctgtgca ttgacctttg ggtgctgact tggagaaaag cacaaacacg accagtccca     180
tcctggctcc cgtggggctt cttctatcta cgcattgtat cgactgcatt agttg          235

<210> SEQ ID NO 123
<211> LENGTH: 229
<212> TYPE: DNA
<213> ORGANISM: Homo Sapies

<400> SEQUENCE: 123
gtaagaagta actttaatag ctcaaactca gagtcatcgt gctcccaatt ccaaagagat      60
tcctaaaaga ggcaacttcg gccgtttgag aagccagcgc tcacccaccc ggggtctctg     120
tgcattgacc tttgggtgct gacttggaga aaagcacaaa cacgaccagt cccatcctgg     180
ctcccgtggg gcttcttcta tctacgcatt gtatcgactg cattagttg                 229

<210> SEQ ID NO 124
<211> LENGTH: 20
<212> TYPE: DNA
<213> ORGANISM: Homo Sapiens

<400> SEQUENCE: 124
atttgtctcc tcctttaact                                                  20

<210> SEQ ID NO 125
<211> LENGTH: 20
<212> TYPE: DNA
<213> ORGANISM: Homo Sapiens

<400> SEQUENCE: 125
ttgtctcctc ctttaactga                                                  20

<210> SEQ ID NO 126
<211> LENGTH: 20
<212> TYPE: DNA
<213> ORGANISM: Homo Sapiens

<400> SEQUENCE: 126
tgtctcctcc tttaactgag                                                  20

<210> SEQ ID NO 127
<211> LENGTH: 19
<212> TYPE: DNA
<213> ORGANISM: Homo Sapiens

<400> SEQUENCE: 127
gtctcctcct taactgag                                                    19

<210> SEQ ID NO 128
<211> LENGTH: 20
<212> TYPE: DNA
<213> ORGANISM: Homo Sapiens

<400> SEQUENCE: 128
gtctcctcct ttaactgagt                                                         20

<210> SEQ ID NO 129
<211> LENGTH: 19
<212> TYPE: DNA
<213> ORGANISM: Homo Sapiens

<400> SEQUENCE: 129
tctcctcctt taactgagt                                                          19

<210> SEQ ID NO 130
<211> LENGTH: 18
<212> TYPE: DNA
<213> ORGANISM: Homo Sapiens

<400> SEQUENCE: 130
ctcctccttt aactgagt                                                           18

<210> SEQ ID NO 131
<211> LENGTH: 20
<212> TYPE: DNA
<213> ORGANISM: Homo Sapiens

<400> SEQUENCE: 131
cctcctttaa ctgagtcatc                                                         20

<210> SEQ ID NO 132
<211> LENGTH: 20
<212> TYPE: DNA
<213> ORGANISM: Homo Sapiens

<400> SEQUENCE: 132
tcctttaact gagtcatcat                                                         20

<210> SEQ ID NO 133
<211> LENGTH: 18
<212> TYPE: DNA
<213> ORGANISM: Homo Sapiens

<400> SEQUENCE: 133
cctttaactg agtcatca                                                           18

<210> SEQ ID NO 134
<211> LENGTH: 20
<212> TYPE: DNA
<213> ORGANISM: Homo Sapiens

<400> SEQUENCE: 134
cctttaactg agtcatcatc                                                         20

<210> SEQ ID NO 135
<211> LENGTH: 19
<212> TYPE: DNA
<213> ORGANISM: Homo Sapiens

<400> SEQUENCE: 135
ctttaactga gtcatcatc                                                          19

<210> SEQ ID NO 136
<211> LENGTH: 19
<212> TYPE: DNA
<213> ORGANISM: Homo Sapiens -continued

```
<400> SEQUENCE: 136
ccaactaatg cagtcgata                                              19

<210> SEQ ID NO 137
<211> LENGTH: 20
<212> TYPE: DNA
<213> ORGANISM: Homo Sapiens

<400> SEQUENCE: 137
ccaactaatg cagtcgatac                                             20

<210> SEQ ID NO 138
<211> LENGTH: 16
<212> TYPE: DNA
<213> ORGANISM: Homo Sapiens

<400> SEQUENCE: 138
caactaatgc agtcga                                                 16

<210> SEQ ID NO 139
<211> LENGTH: 18
<212> TYPE: DNA
<213> ORGANISM: homo sapiens

<400> SEQUENCE: 139
caactaatgc agtcgata                                               18

<210> SEQ ID NO 140
<211> LENGTH: 19
<212> TYPE: DNA
<213> ORGANISM: homo sapiens

<400> SEQUENCE: 140
caactaatgc agtcgatac                                              19

<210> SEQ ID NO 141
<211> LENGTH: 20
<212> TYPE: DNA
<213> ORGANISM: homo sapiens

<400> SEQUENCE: 141
caactaatgc agtcgataca                                             20

<210> SEQ ID NO 142
<211> LENGTH: 16
<212> TYPE: DNA
<213> ORGANISM: homo sapiens

<400> SEQUENCE: 142
aactaatgca gtcgat                                                 16

<210> SEQ ID NO 143
<211> LENGTH: 17
<212> TYPE: DNA
<213> ORGANISM: homo sapiens

<400> SEQUENCE: 143
aactaatgca gtcgata                                                17

<210> SEQ ID NO 144
<211> LENGTH: 18
<212> TYPE: DNA
<213> ORGANISM: homo sapiens
```

```
<400> SEQUENCE: 144
aactaatgca gtcgatac                                                  18

<210> SEQ ID NO 145
<211> LENGTH: 19
<212> TYPE: DNA
<213> ORGANISM: homo sapiens

<400> SEQUENCE: 145
aactaatgca gtcgataca                                                 19

<210> SEQ ID NO 146
<211> LENGTH: 20
<212> TYPE: DNA
<213> ORGANISM: homo sapiens

<400> SEQUENCE: 146
aactaatgca gtcgatacaa                                                20

<210> SEQ ID NO 147
<211> LENGTH: 16
<212> TYPE: DNA
<213> ORGANISM: homo sapiens

<400> SEQUENCE: 147
actaatgcag tcgata                                                    16

<210> SEQ ID NO 148
<211> LENGTH: 17
<212> TYPE: DNA
<213> ORGANISM: homo sapiens

<400> SEQUENCE: 148
actaatgcag tcgatac                                                   17

<210> SEQ ID NO 149
<211> LENGTH: 18
<212> TYPE: DNA
<213> ORGANISM: homo sapiens

<400> SEQUENCE: 149
actaatgcag tcgataca                                                  18

<210> SEQ ID NO 150
<211> LENGTH: 16
<212> TYPE: DNA
<213> ORGANISM: homo sapiens

<400> SEQUENCE: 150
ctaatgcagt cgatac                                                    16

<210> SEQ ID NO 151
<211> LENGTH: 17
<212> TYPE: DNA
<213> ORGANISM: homo sapiens

<400> SEQUENCE: 151
ctaatgcagt cgataca                                                   17

<210> SEQ ID NO 152
<211> LENGTH: 18
<212> TYPE: DNA
```

<213> ORGANISM: homo sapiens

<400> SEQUENCE: 152
ctaatgcagt cgatacaa                                                      18

<210> SEQ ID NO 153
<211> LENGTH: 19
<212> TYPE: DNA
<213> ORGANISM: homo sapiens

<400> SEQUENCE: 153
ctaatgcagt cgatacaat                                                     19

<210> SEQ ID NO 154
<211> LENGTH: 16
<212> TYPE: DNA
<213> ORGANISM: homo sapiens

<400> SEQUENCE: 154
taatgcagtc gataca                                                        16

<210> SEQ ID NO 155
<211> LENGTH: 18
<212> TYPE: DNA
<213> ORGANISM: homo sapiens

<400> SEQUENCE: 155
taatgcagtc gatacaat                                                      18

<210> SEQ ID NO 156
<211> LENGTH: 16
<212> TYPE: DNA
<213> ORGANISM: homo sapiens

<400> SEQUENCE: 156
aatgcagtcg atacaa                                                        16

<210> SEQ ID NO 157
<211> LENGTH: 16
<212> TYPE: DNA
<213> ORGANISM: homo sapiens

<400> SEQUENCE: 157
atgcagtcga tacaat                                                        16

<210> SEQ ID NO 158
<211> LENGTH: 16
<212> TYPE: DNA
<213> ORGANISM: homo sapiens

<400> SEQUENCE: 158
agtcgataca atgcgt                                                        16

<210> SEQ ID NO 159
<211> LENGTH: 16
<212> TYPE: DNA
<213> ORGANISM: homo sapiens

<400> SEQUENCE: 159
gtcgatacaa tgcgta                                                        16

<210> SEQ ID NO 160
<211> LENGTH: 17

```
<212> TYPE: DNA
<213> ORGANISM: homo sapiens

<400> SEQUENCE: 160
gtcgatacaa tgcgtag                                                    17

<210> SEQ ID NO 161
<211> LENGTH: 18
<212> TYPE: DNA
<213> ORGANISM: homo sapiens

<400> SEQUENCE: 161
gtcgatacaa tgcgtaga                                                   18

<210> SEQ ID NO 162
<211> LENGTH: 19
<212> TYPE: DNA
<213> ORGANISM: homo sapiens

<400> SEQUENCE: 162
gtcgatacaa tgcgtagat                                                  19

<210> SEQ ID NO 163
<211> LENGTH: 20
<212> TYPE: DNA
<213> ORGANISM: homo sapiens

<400> SEQUENCE: 163
gtcgatacaa tgcgtagata                                                 20

<210> SEQ ID NO 164
<211> LENGTH: 16
<212> TYPE: DNA
<213> ORGANISM: homo sapiens

<400> SEQUENCE: 164
tcgatacaat gcgtag                                                     16

<210> SEQ ID NO 165
<211> LENGTH: 19
<212> TYPE: DNA
<213> ORGANISM: homo sapiens

<400> SEQUENCE: 165
tcgatacaat gcgtagata                                                  19

<210> SEQ ID NO 166
<211> LENGTH: 16
<212> TYPE: DNA
<213> ORGANISM: homo sapiens

<400> SEQUENCE: 166
cgatacaatg cgtaga                                                     16

<210> SEQ ID NO 167
<211> LENGTH: 17
<212> TYPE: DNA
<213> ORGANISM: homo sapiens

<400> SEQUENCE: 167
cgatacaatg cgtagat                                                    17

<210> SEQ ID NO 168
```

```
<211> LENGTH: 18
<212> TYPE: DNA
<213> ORGANISM: homo sapiens

<400> SEQUENCE: 168
cgatacaatg cgtagata                                                       18

<210> SEQ ID NO 169
<211> LENGTH: 20
<212> TYPE: DNA
<213> ORGANISM: homo sapiens

<400> SEQUENCE: 169
cgatacaatg cgtagataga                                                     20

<210> SEQ ID NO 170
<211> LENGTH: 16
<212> TYPE: DNA
<213> ORGANISM: homo sapiens

<400> SEQUENCE: 170
gatacaatgc gtagat                                                         16

<210> SEQ ID NO 171
<211> LENGTH: 17
<212> TYPE: DNA
<213> ORGANISM: homo sapiens

<400> SEQUENCE: 171
gatacaatgc gtagata                                                        17

<210> SEQ ID NO 172
<211> LENGTH: 18
<212> TYPE: DNA
<213> ORGANISM: homo sapiens

<400> SEQUENCE: 172
gatacaatgc gtagatag                                                       18

<210> SEQ ID NO 173
<211> LENGTH: 19
<212> TYPE: DNA
<213> ORGANISM: homo sapiens

<400> SEQUENCE: 173
gatacaatgc gtagataga                                                      19

<210> SEQ ID NO 174
<211> LENGTH: 20
<212> TYPE: DNA
<213> ORGANISM: homo sapiens

<400> SEQUENCE: 174
gatacaatgc gtagatagaa                                                     20

<210> SEQ ID NO 175
<211> LENGTH: 16
<212> TYPE: DNA
<213> ORGANISM: homo sapiens

<400> SEQUENCE: 175
atacaatgcg tagata                                                         16
```

```
<210> SEQ ID NO 176
<211> LENGTH: 17
<212> TYPE: DNA
<213> ORGANISM: homo sapiens

<400> SEQUENCE: 176
atacaatgcg tagatag                                                        17

<210> SEQ ID NO 177
<211> LENGTH: 18
<212> TYPE: DNA
<213> ORGANISM: homo sapiens

<400> SEQUENCE: 177
atacaatgcg tagataga                                                       18

<210> SEQ ID NO 178
<211> LENGTH: 19
<212> TYPE: DNA
<213> ORGANISM: homo sapiens

<400> SEQUENCE: 178
atacaatgcg tagatagaa                                                      19

<210> SEQ ID NO 179
<211> LENGTH: 16
<212> TYPE: DNA
<213> ORGANISM: homo sapiens

<400> SEQUENCE: 179
tacaatgcgt agatag                                                         16

<210> SEQ ID NO 180
<211> LENGTH: 17
<212> TYPE: DNA
<213> ORGANISM: homo sapiens

<400> SEQUENCE: 180
tacaatgcgt agataga                                                        17

<210> SEQ ID NO 181
<211> LENGTH: 18
<212> TYPE: DNA
<213> ORGANISM: homo sapiens

<400> SEQUENCE: 181
tacaatgcgt agatagaa                                                       18

<210> SEQ ID NO 182
<211> LENGTH: 17
<212> TYPE: DNA
<213> ORGANISM: homo sapiens

<400> SEQUENCE: 182
acaatgcgta gatagaa                                                        17

<210> SEQ ID NO 183
<211> LENGTH: 19
<212> TYPE: DNA
<213> ORGANISM: homo sapiens

<400> SEQUENCE: 183
acaatgcgta gatagaaga                                                      19
```

```
<210> SEQ ID NO 184
<211> LENGTH: 20
<212> TYPE: DNA
<213> ORGANISM: homo sapiens

<400> SEQUENCE: 184
acaatgcgta gatagaagaa                                                    20

<210> SEQ ID NO 185
<211> LENGTH: 19
<212> TYPE: DNA
<213> ORGANISM: homo sapiens

<400> SEQUENCE: 185
caatgcgtag atagaagaa                                                     19

<210> SEQ ID NO 186
<211> LENGTH: 16
<212> TYPE: DNA
<213> ORGANISM: homo sapiens

<400> SEQUENCE: 186
caatgcgtag atagaa                                                        16

<210> SEQ ID NO 187
<211> LENGTH: 16
<212> TYPE: DNA
<213> ORGANISM: homo sapiens

<400> SEQUENCE: 187
aatgcgtaga tagaag                                                        16

<210> SEQ ID NO 188
<211> LENGTH: 17
<212> TYPE: DNA
<213> ORGANISM: homo sapiens

<400> SEQUENCE: 188
aatgcgtaga tagaaga                                                       17

<210> SEQ ID NO 189
<211> LENGTH: 18
<212> TYPE: DNA
<213> ORGANISM: homo sapiens

<400> SEQUENCE: 189
aatgcgtaga tagaagaa                                                      18

<210> SEQ ID NO 190
<211> LENGTH: 16
<212> TYPE: DNA
<213> ORGANISM: homo sapiens

<400> SEQUENCE: 190
atgcgtagat agaaga                                                        16

<210> SEQ ID NO 191
<211> LENGTH: 17
<212> TYPE: DNA
<213> ORGANISM: homo sapiens

<400> SEQUENCE: 191
atgcgtagat agaagaa                                                       17
```

<210> SEQ ID NO 192
<211> LENGTH: 18
<212> TYPE: DNA
<213> ORGANISM: homo sapiens

<400> SEQUENCE: 192
atgcgtagat agaagaag                                         18

<210> SEQ ID NO 193
<211> LENGTH: 16
<212> TYPE: DNA
<213> ORGANISM: homo sapiens

<400> SEQUENCE: 193
tgcgtagata gaagaa                                           16

<210> SEQ ID NO 194
<211> LENGTH: 17
<212> TYPE: DNA
<213> ORGANISM: homo sapiens

<400> SEQUENCE: 194
tgcgtagata gaagaag                                          17

<210> SEQ ID NO 195
<211> LENGTH: 18
<212> TYPE: DNA
<213> ORGANISM: homo sapiens

<400> SEQUENCE: 195
tgcgtagata gaagaagc                                         18

<210> SEQ ID NO 196
<211> LENGTH: 16
<212> TYPE: DNA
<213> ORGANISM: homo sapiens

<400> SEQUENCE: 196
gcgtagatag aagaag                                           16

<210> SEQ ID NO 197
<211> LENGTH: 16
<212> TYPE: DNA
<213> ORGANISM: homo sapiens

<400> SEQUENCE: 197
cgtagataga agaagc                                           16

<210> SEQ ID NO 198
<211> LENGTH: 16
<212> TYPE: DNA
<213> ORGANISM: homo sapiens

<400> SEQUENCE: 198
tagaagaagc cccacg                                           16

<210> SEQ ID NO 199
<211> LENGTH: 20
<212> TYPE: DNA
<213> ORGANISM: homo sapiens

<400> SEQUENCE: 199
ttgtgctttt ctccaagtca                                              20

<210> SEQ ID NO 200
<211> LENGTH: 19
<212> TYPE: DNA
<213> ORGANISM: homo sapiens

<400> SEQUENCE: 200
gtgcttttct ccaagtcag                                               19

<210> SEQ ID NO 201
<211> LENGTH: 16
<212> TYPE: DNA
<213> ORGANISM: homo sapiens

<400> SEQUENCE: 201
ggagcacgat gactct                                                  16

<210> SEQ ID NO 202
<211> LENGTH: 20
<212> TYPE: DNA
<213> ORGANISM: homo sapiens

<400> SEQUENCE: 202
tttgagctat taaagtactt                                              20

<210> SEQ ID NO 203
<211> LENGTH: 19
<212> TYPE: DNA
<213> ORGANISM: homo sapiens

<400> SEQUENCE: 203
ttgagctatt aaagtactt                                               19

<210> SEQ ID NO 204
<211> LENGTH: 20
<212> TYPE: DNA
<213> ORGANISM: homo sapiens

<400> SEQUENCE: 204
ttgagctatt aaagtacttc                                              20

<210> SEQ ID NO 205
<211> LENGTH: 16
<212> TYPE: DNA
<213> ORGANISM: homo sapiens

<400> SEQUENCE: 205
ttgagctatt aaagta                                                  16

<210> SEQ ID NO 206
<211> LENGTH: 18
<212> TYPE: DNA
<213> ORGANISM: homo sapiens

<400> SEQUENCE: 206
tgagctatta aagtactt                                                18

<210> SEQ ID NO 207
<211> LENGTH: 19
<212> TYPE: DNA
<213> ORGANISM: homo sapiens

<400> SEQUENCE: 207
tgagctatta aagtacttc                                           19

<210> SEQ ID NO 208
<211> LENGTH: 19
<212> TYPE: DNA
<213> ORGANISM: homo sapiens

<400> SEQUENCE: 208
gagctattaa agtacttct                                           19

<210> SEQ ID NO 209
<211> LENGTH: 20
<212> TYPE: DNA
<213> ORGANISM: homo sapiens

<400> SEQUENCE: 209
gagctattaa agtacttctt                                          20

<210> SEQ ID NO 210
<211> LENGTH: 17
<212> TYPE: DNA
<213> ORGANISM: homo sapiens

<400> SEQUENCE: 210
agctattaaa gtacttc                                             17

<210> SEQ ID NO 211
<211> LENGTH: 20
<212> TYPE: DNA
<213> ORGANISM: homo sapiens

<400> SEQUENCE: 211
agctattaaa gtacttctta                                          20

<210> SEQ ID NO 212
<211> LENGTH: 17
<212> TYPE: DNA
<213> ORGANISM: homo sapiens

<400> SEQUENCE: 212
gctattaaag tacttct                                             17

<210> SEQ ID NO 213
<211> LENGTH: 19
<212> TYPE: DNA
<213> ORGANISM: homo sapiens

<400> SEQUENCE: 213
gctattaaag tacttctta                                           19

<210> SEQ ID NO 214
<211> LENGTH: 20
<212> TYPE: DNA
<213> ORGANISM: homo sapiens

<400> SEQUENCE: 214
gctattaaag tacttcttac                                          20

<210> SEQ ID NO 215
<211> LENGTH: 18
<212> TYPE: DNA
<213> ORGANISM: homo sapiens

<400> SEQUENCE: 215
ctattaaagt acttctta                                                 18

<210> SEQ ID NO 216
<211> LENGTH: 19
<212> TYPE: DNA
<213> ORGANISM: homo sapiens

<400> SEQUENCE: 216
ctattaaagt acttcttac                                                19

<210> SEQ ID NO 217
<211> LENGTH: 20
<212> TYPE: DNA
<213> ORGANISM: homo sapiens

<400> SEQUENCE: 217
ctattaaagt acttcttaca                                               20

<210> SEQ ID NO 218
<211> LENGTH: 19
<212> TYPE: DNA
<213> ORGANISM: homo sapiens

<400> SEQUENCE: 218
aaagtacttc ttacacatt                                                19

<210> SEQ ID NO 219
<211> LENGTH: 20
<212> TYPE: DNA
<213> ORGANISM: homo sapiens

<400> SEQUENCE: 219
aaagtacttc ttacacattg                                               20

<210> SEQ ID NO 220
<211> LENGTH: 17
<212> TYPE: DNA
<213> ORGANISM: homo sapiens

<400> SEQUENCE: 220
aagtacttct tacacat                                                  17

<210> SEQ ID NO 221
<211> LENGTH: 18
<212> TYPE: DNA
<213> ORGANISM: homo sapiens

<400> SEQUENCE: 221
aagtacttct tacacatt                                                 18

<210> SEQ ID NO 222
<211> LENGTH: 19
<212> TYPE: DNA
<213> ORGANISM: homo sapiens

<400> SEQUENCE: 222
aagtacttct tacacattg                                                19

<210> SEQ ID NO 223
<211> LENGTH: 20
<212> TYPE: DNA
<213> ORGANISM: homo sapiens

```
<400> SEQUENCE: 223
aagtacttct tacacattgc                                              20

<210> SEQ ID NO 224
<211> LENGTH: 16
<212> TYPE: DNA
<213> ORGANISM: homo sapiens

<400> SEQUENCE: 224
agtacttctt acacat                                                  16

<210> SEQ ID NO 225
<211> LENGTH: 19
<212> TYPE: DNA
<213> ORGANISM: homo sapiens

<400> SEQUENCE: 225
agtacttctt acacattgc                                               19

<210> SEQ ID NO 226
<211> LENGTH: 16
<212> TYPE: DNA
<213> ORGANISM: homo sapiens

<400> SEQUENCE: 226
gtacttctta cacatt                                                  16

<210> SEQ ID NO 227
<211> LENGTH: 17
<212> TYPE: DNA
<213> ORGANISM: homo sapiens

<400> SEQUENCE: 227
gtacttctta cacattg                                                 17

<210> SEQ ID NO 228
<211> LENGTH: 18
<212> TYPE: DNA
<213> ORGANISM: homo sapiens

<400> SEQUENCE: 228
gtacttctta cacattgc                                                18

<210> SEQ ID NO 229
<211> LENGTH: 16
<212> TYPE: DNA
<213> ORGANISM: homo sapiens

<400> SEQUENCE: 229
tacttcttac acattg                                                  16

<210> SEQ ID NO 230
<211> LENGTH: 17
<212> TYPE: DNA
<213> ORGANISM: homo sapiens

<400> SEQUENCE: 230
tacttcttac acattgc                                                 17

<210> SEQ ID NO 231
<211> LENGTH: 20
<212> TYPE: DNA
```

```
<213> ORGANISM: homo sapiens

<400> SEQUENCE: 231
caatgcgtag atagaagaag                                              20
```

ANTISENSE OLIGONUCLEOTIDES FOR MODULATING HTRA1 EXPRESSION

RELATED APPLICATIONS

This application claims priority to EP 17173964.2, filed Jun. 1, 2017, 17209407.0, filed Dec. 21, 2017 and 17209535.8, filed Dec. 21, 2017. The contents of which are hereby incorporated by reference in their entireties.

FIELD OF INVENTION

The present invention relates to antisense oligonucleotides (oligomers) that are complementary to HTRA1, leading to modulation of the expression of HTRA1. Modulation of HTRA1 expression is beneficial for a range of medical disorders, such as macular degeneration, e.g. age-related macular degeneration.

BACKGROUND

The human high temperature requirement A (HTRA) family of serine proteases are ubiquitously expressed PDZ-proteases that are involved in maintaining protein homeostasis in extracellular compartments by combining the dual functions of a protease and a chaperone. HTRA proteases are implicated in organization of the extracellular matrix, cell proliferation and ageing. Modulation of HTRA activity is connected with severe diseases, including Duchenne muscular dystrophy (Bakay et al. 2002, Neuromuscul. Disord. 12: 125-141), arthritis, such as osteoarthritis (Grau et al. 2006, JBC 281: 6124-6129), cancer, familial ischemic cerebral small-vessel disease and age-related macular degeneration, as well as Parkinson's disease and Alzheimer's disease. The human HTRA1 contains an insulin-like growth factor (IGF) binding domain. It has been proposed to regulate IGF availability and cell growth (Zumbrunn and Trueb, 1996, FEES Letters 398:189-192) and to exhibit tumor suppressor properties. HTRA1 expression is down-regulated in metastatic melanoma, and may thus indicate the degree of melanoma progression. Overexpression of HTRA1 in a metastatic melanoma cell line reduced proliferation and invasion in vitro, and reduced tumor growth in a xenograft mouse model (Baldi et al., 2002, Oncogene 21:6684-6688). HTRA1 expression is also down-regulated in ovarian cancer. In ovarian cancer cell lines, HTRA1 overexpression induces cell death, while antisense HTRA1 expression promoted anchorage-independent growth (Chien et al., 2004, Oncogene 23:1636-1644).

In addition to its effect on the IGF pathway, HTRA1 also inhibits signaling by the TGFβ family of growth factors (Oka et al., 2004, Development 131:1041-1053). HTRA1 can cleave amyloid precursor protein (APP), and HTRA1 inhibitors cause the accumulation of Aβ peptide in cultured cells. Thus, HTRA1 is also implicated in Alzheimer's disease (Grau et al., 2005, Proc. Nat. Acad. Sci. USA. 102: 6021-6026).

Furthermore, HTRA1 upregulation has been observed and seems to be associated to Duchenne muscular dystrophy (Bakay et al. 2002, Neuromuscul. Disord. 12: 125-141) and osteoarthritis (Grau et al. 2006, JBC 281: 6124-6129) and AMD (Fritsche, et al. Nat Gen 2013 45(4):433-9.)

A single nucleotide polymorphism (SNP) in the HTRA1 promoter region (rs11200638) is associated with a 10 fold increased the risk of developing age-related macular degeneration (AMD). Moreover the HTRA1 SNPs are in linkage disequilibrium with the ARMS2 SNP (rs10490924) associated with increased risk of developing age-related macular degeneration (AMD). The risk allele is associated with 2-3 fold increased HTRA1 mRNA and protein expression, and HTRA1 is present in drusen in patients with AMD (Dewan et al., 2006, Science 314:989-992; Yang et al., 2006, Science 314:992-993). Over-expression of HtrA1 Induces AMD-like phenotype in mice. The hHTRA transgenic mouse (Veierkottn, PlosOne 2011) reveals degradation of the elastic lamina of Bruch's membrane, determines choroidal vascular abnormalities (Jones, PNAS 2011) and increases the Polypoidal choroidal vasculopathy (PCV) lesions (Kumar, IOVS 2014). Additionally it has been reported that Bruch's membrane damage in hHTRA1 Tg mice, which determines upon exposure to cigarette smoke 3 fold increases CNV (Nakayama, IOVS 2014)

Age-related macular degeneration (AMD) is the leading cause of irreversible loss of vision in people over the age of 65. With onset of AMD there is gradual loss of the light sensitive photoreceptor cells in the back of the eye, the underlying pigment epithelial cells that support them metabolically, and the sharp central vision they provide. Age is the major risk factor for the onset of AMD: the likelihood of developing AMD triples after age 55. Smoking, light iris color, sex (women are at greater risk), obesity, and repeated exposure to UV radiation also increase the risk of AMD. AMD progression can be defined in three stages: 1) early, 2) intermediate, and 3) advanced AMD. There are two forms of advanced AMD: dry AMD (also called geographic atrophy, GA) and wet AMD (also known as exudative AMD). Dry AMD is characterized by loss of photoreceptors and retinal pigment epithelium cells, leading to visual loss. Wet AMD, is associated with pathologic choroidal (also referred to as subretinal) neovascularization. Leakage from abnormal blood vessels forming in this process damages the macula and impairs vision, eventually leading to blindness. In some cases, patients can present pathologies associated with both types of advanced AMD. Treatment strategies for wet AMD require frequent injections into the eye and are focused mainly on delaying the disease progression. Currently no treatment is available for dry AMD. There is therefore an unmet medical need in the provision of effective drugs to treat macular degenerative conditions such as wet and dry AMD. WO 2008/013893 claims a composition for treating a subject suffering from age related macular degeneration comprising a nucleic acid molecules comprising an antisense sequence that hybridizes to HTRA1 gene or mRNA: No antisense molecules are disclosed. WO2009/006460 provides siRNAs targeting HTRA1 and their use in treating AMD.

OBJECTIVE OF THE INVENTION

The present invention provides antisense oligonucleotides which modulate HTRA1 in vivo or in vitro. The invention identified cryptic target sequence motifs present in the human HTRA1 mRNA (including pre-mRNA) which may be targeted by antisense oligonucleotides to give effective HTRA1 inhibition. The invention also provides effective antisense oligonucleotide sequences and compounds which are capable of inhibiting HTRA1, and their use in treatment of diseases or disorders where HTRA1 is indicated.

SUMMARY OF INVENTION

The present invention relates to oligonucleotides targeting a mammalian HTRA1 nucleic acid, i.e. are capable of inhibiting the expression of HTRA1 and to treat or prevent diseases related to the functioning of the HTRA1. The oligonucleotides targeting HTRA1 are antisense oligonucleotides, i.e. are complementary to their HTRA1 nucleic acid target.

The oligonucleotide of the invention may be in the form of a pharmaceutically acceptable salt, such as a sodium salt or a potassium salt.

Accordingly, the invention provides antisense oligonucleotides which comprise a contiguous nucleotide sequence of 10-30 nucleotides in length with at least 90% complementarity, such as fully complementary to a mammalian HTRA1 nucleic acid, such as SEQ ID NO 1, SEQ ID NO 2, SEQ ID NO 3 or SEQ ID NO 4.

In a further aspect, the invention provides pharmaceutical compositions comprising the oligonucleotides of the invention and pharmaceutically acceptable diluents, carriers, salts and/or adjuvants.

The invention provides LNA antisense oligonucleotides, such as LNA gapmer oligonucleotides, which comprise a contiguous nucleotide sequence of 10-30 nucleotides in length with at least 90% complementarity, such as fully complementary to a HTRA1 nucleic acid, such as a sequence selected from the group consisting of SEQ ID NO 1, SEQ ID NO 2, SEQ ID NO 3 or SEQ ID NO 4.

The invention provides for an antisense oligonucleotide comprising a contiguous nucleotide region of at 10-30, such as 12-22, nucleotides, wherein the contiguous nucleotide region is at least 90% such as 100% complementary to SEQ ID NO 113.

The invention provides for an antisense oligonucleotide of 10-30 nucleotides in length, wherein said antisense oligonucleotide comprises a contiguous nucleotide region of 10-30, such as 12-22, nucleotides which are at least 90% such as 100% complementarity to SEQ ID NO 113:

5'
GACAGTCAGCATTTGTCTCCTCCTTTAACTGAGTCATCATCTTAGTCCAA

CTAATGCAGTCGATACAATGCGTAGATAGAAGAAGCCCCACGGGAGCCAG

GATGGGACTGGTCGTGTTTGTGCTTTTCTCCAAGTCAGCACCCAAAGGTC

AATGCACAGAGACCCCGGGTGGGTGAGCGCTGGCTTCTCAAACGGCCGAA

GTTGCCTCTTTTAGGAATCTCTTTGGAATTGGGAGCACGATGACTCTGAG

TTTGAGCTATTAAAGTACTTCTTAC 3'.

The reverse complement of SEQ ID NO 113 is SEQ ID NO 119:

GTAAGAAGTACTTTAATAGCTCAAACTCAGAGTCATCGTGCTCCCAATTC

CAAAGAGATTCCTAAAAGAGGCAACTTCGGCCGTTTGAGAAGCCAGCGCT

CACCCACCCGGGGTCTCTGTGCATTGACCTTTGGGTGCTGACTTGGAGAA

AAGCACAAACACGACCAGTCCCATCCTGGCTCCCGTGGGGCTTCTTCTAT

CTACGCATTGTATCGACTGCATTAGTTGGACTAAGATGATGACTCAGTTA

AAGGAGGAGACAAATGCTGACTGTC.

The invention provides for an antisense oligonucleotide comprising a contiguous nucleotide region of at 10-30, such as 12-22, nucleotides, wherein the contiguous nucleotide region is at least 90% such as 100% complementary to SEQ ID NO 114.

The invention provides for an antisense oligonucleotide of 10-30 nucleotides in length, wherein said antisense oligonucleotide comprises a contiguous nucleotide region of 10-30, such as 12-22 nucleotides which are at least 90% such as 100% complementarity to SEQ ID NO 114:

5'
GACAGTCAGCATTTGTCTCCTCCTTTAACTGAGTCATCATCTTAGTCCAA

CTAATGCAGTCGATACAATGCGTAGATAGAAGAAGCCCCACGGGAGCCAG

GATGGGACTGGTCGTGTTTGTGCTTTTCTCCAAGTCAGCACCCAAAGGTC

AATGCACAGAGACCCCGGGTGGGTGAGCGCTGGCTTCTCAAACGGCCGAA

GTTGCCTCTTTTAGGAATCTCTTTGGAATTGGGAGCACGATGACTCTGAG

TTTGAGCTATTAAAGTACTTCTTACACATTGC 3'.

The reverse complement of SEQ ID NO 114 is SEQ ID NO 120:

GCAATGTGTAAGAAGTACTTTAATAGCTCAAACTCAGAGTCATCGTGCTC

CCAATTCCAAAGAGATTCCTAAAAGAGGCAACTTCGGCCGTTTGAGAAGC

CAGCGCTCACCCACCCGGGGTCTCTGTGCATTGACCTTTGGGTGCTGACT

TGGAGAAAAGCACAAACACGACCAGTCCCATCCTGGCTCCCGTGGGGCTT

CTTCTATCTACGCATTGTATCGACTGCATTAGTTGGACTAAGATGATGAC

TCAGTTAAAGGAGGAGACAAATGCTGACTGTC.

The invention provides for an antisense oligonucleotide comprising a contiguous nucleotide region of at 10-30, such as 12-22, nucleotides, wherein the contiguous nucleotide region is at least 90% such as 100% complementary to SEQ ID NO 115.

The invention provides for an antisense oligonucleotide of 10-30 nucleotides in length, wherein said antisense oligonucleotide comprises a contiguous nucleotide region of 10-30, such as 12-22 nucleotides which are at least 90% such as 100% complementarity to SEQ ID NO 115:

5' GACAGTCAGCATTTGTCTCCTCCTTTAACTGAGTCATCATCTTAGTC

CAACTAATGCAGTCGATACAATGCGTAGATAGAAGAAGCCCCACGGGAGC

CAGGATGGGACTGGTCGTGTTTGTGCTTTTCTCCAAGTCAGCACCCAAAG

GTCAATGCACAGAGACCCCGGGTGGGTGAGCGCTGGCTTCTCAAACGGCC

GAAGTTGCCTCTTTTAGGAATCTCTTTGGAATTGGGAGCACGATGACTCT

GAGTTTGAGCTATTAAAGT 3'.

The reverse complement of SEQ ID NO 115 is SEQ ID NO 121:

ACTTTAATAGCTCAAACTCAGAGTCATCGTGCTCCCAATTCCAAAGAGAT

TCCTAAAAGAGGCAACTTCGGCCGTTTGAGAAGCCAGCGCTCACCCACCC

GGGGTCTCTGTGCATTGACCTTTGGGTGCTGACTTGGAGAAAAGCACAAA

CACGACCAGTCCCATCCTGGCTCCCGTGGGGCTTCTTCTATCTACGCATT

GTATCGACTGCATTAGTTGGACTAAGATGATGACTCAGTTAAAGGAGGAG

ACAAATGCTGACTGTC.

The invention provides for an antisense oligonucleotide comprising a contiguous nucleotide region of at 10-30, such as 12-22, nucleotides, wherein the contiguous nucleotide region is at least 90% such as 100% complementary to SEQ ID NO 116.

The invention provides for an antisense oligonucleotide of 10-30 nucleotides in length, wherein said antisense oligonucleotide comprises a contiguous nucleotide region of 10-30, such as 12-22 nucleotides which are at least 90% such as 100% complementarity to SEQ ID NO 116:

5' CAACTAATGCAGTCGATACAATGCGTAGATAGAAGAAGCCCCACGGG

AGCCAGGATGGGACTGGTCGTGTTTGTGCTTTTCTCCAAGTCAGCACCCA

AAGGTCAATGCACAGAGACCCCGGGTGGGTGAGCGCTGGCTTCTCAAACG

GCCGAAGTTGCCTCTTTTAGGAATCTCTTTGGAATTGGGAGCACGATGAC

TCTGAGTTTGAGCTATTAAAGTACTTCTTACACATTGC 3'.

The reverse complement of SEQ ID NO 116 is SEQ ID NO 122:

GCAATGTGTAAGAAGTACTTTAATAGCTCAAACTCAGAGTCATCGTGCTC

CCAATTCCAAAGAGATTCCTAAAAGAGGCAACTTCGGCCGTTTGAGAAGC

CAGCGCTCACCCACCCGGGGTCTCTGTGCATTGACCTTTGGGTGCTGACT

TGGAGAAAAGCACAAACACGACCAGTCCCATCCTGGCTCCCGTGGGGCTT

CTTCTATCTACGCATTGTATCGACTGCATTAGTTG.

The invention provides for an antisense oligonucleotide comprising a contiguous nucleotide region of at 10-30, such as 12-22, nucleotides, wherein the contiguous nucleotide region is at least 90% such as 100% complementary to SEQ ID NO 117.

The invention provides for an antisense oligonucleotide of 10-30 nucleotides in length, wherein said antisense oligonucleotide comprises a contiguous nucleotide region of 10-30, such as 12-22 nucleotides which are at least 90% such as 100% complementarity to SEQ ID NO 117:

5' CAACTAATGCAGTCGATACAATGCGTAGATAGAAGAAGCCCCACGGG

AGCCAGGATGGGACTGGTCGTGTTTGTGCTTTTCTCCAAGTCAGCACCCA

AAGGTCAATGCACAGAGACCCCGGGTGGGTGAGCGCTGGCTTCTCAAACG

GCCGAAGTTGCCTCTTTTAGGAATCTCTTTGGAATTGGGAGCACGATGAC

TCTGAGTTTGAGCTATTAAAGTTACTTCTTAC 3'.

The reverse complement of SEQ ID NO 117 is SEQ ID NO 123:

GTAAGAAGTAACTTTAATAGCTCAAACTCAGAGTCATCGTGCTCCCAATT

CCAAAGAGATTCCTAAAAGAGGCAACTTCGGCCGTTTGAGAAGCCAGCGC

TCACCCACCCGGGGTCTCTGTGCATTGACCTTTGGGTGCTGACTTGGAGA

AAAGCACAAACACGACCAGTCCCATCCTGGCTCCCGTGGGGCTTCTTCTA

TCTACGCATTGTATCGACTGCATTAGTTG.

In some embodiments the antisense oligonucleotide of the invention is not of sequence 5' gcaatgtgtaagaagt 3' (SEQ ID NO 112). In some embodiments the antisense oligonucleotide of the invention does not comprise or consist of sequence 5' gcaatgtgtaagaagt 3'. In some embodiments the antisense oligonucleotide of the invention does not comprise or consist of 10 or more contiguous nucleotides present in sequence 5' gcaatgtgtaagaagt 3'. In some embodiments the oligonucleotide of the invention is other than 5' GCAatgtgtaagaAGT 3', wherein Capital letters represent LNA nucleosides (beta-D-oxy LNA nucleosides were used), all LNA cytosines are 5-methyl cytosine, lower case letters represent DNA nucleosides, DNA cytosines preceded with a superscript m represents a 5-methyl C-DNA nucleoside. All internucleoside linkages are phosphorothioate internucleoside linkages.

The invention provides an antisense oligonucleotide which comprises a contiguous nucleotide region of at least 10 contiguous nucleotides present in any one of SEQ ID NOs 5-111. The invention provides an antisense oligonucleotide which comprises a contiguous nucleotide region of at least 12 contiguous nucleotides present in any one of SEQ ID NOs 5-111. The invention provides an antisense oligonucleotide which comprises a contiguous nucleotide region of at least 14 contiguous nucleotides present in any one of SEQ ID NOs 5-111. The invention provides an antisense oligonucleotide which comprises a contiguous nucleotide region of at least 15 or 16 contiguous nucleotides present in any one of SEQ ID NOs 5-111. The invention provides an antisense oligonucleotide, wherein the contiguous nucleotide sequence of the oligonucleotide comprises or consists of a nucleobase sequence selected from the group consisting of any one of SEQ ID NOs 5-111.

The invention provides an antisense oligonucleotide which comprises a contiguous nucleotide region of at least 10, or at least 12, at least 13, or at least 14 or at least 15 or at least 16 contiguous nucleotides present SEQ ID NO 118: 5' CTTCTTCTATCTACGCATTG 3'. The reverse complement of SEQ ID NO 118 is SEQ ID NO 231: CAATGCGTAGATAGAAGAAG.

The invention provides an antisense oligonucleotide which comprises a contiguous nucleotide region of at least 10, or at least 12, at least 13, or at least 14 or at least 15 or at least 16 contiguous nucleotides complementary to SEQ ID NO 231.

The invention provides an antisense oligonucleotide which comprises a contiguous nucleotide region of at least 10, or at least 12, or at least 13, or at least 14 or at least 15 or 16 contiguous nucleotides present SEQ ID NO 67.

The invention provides an antisense oligonucleotide which comprises a contiguous nucleotide region of at least 10, or at least 12, or at least 13, or at least 14 or at least 15 or 16 contiguous nucleotides present SEQ ID NO 86.

The invention provides an antisense oligonucleotide which comprises a contiguous nucleotide region of at least 10, or at least 12, or at least 13, or at least 14 or at least 15 or at least 16 or at least 17 or 18 contiguous nucleotides present SEQ ID NO 73.

The invention provides an antisense oligonucleotide which comprises a contiguous nucleotide region of at least 10, or at least 12, or at least 13, or at least 14 or at least 15 or 16 contiguous nucleotides complementary to SEQ ID NO 186.

The invention provides an antisense oligonucleotide which comprises a contiguous nucleotide region of at least 10, or at least 12, or at least 13, or at least 14 or at least 15 or 16 contiguous nucleotides complementary to SEQ ID NO 205.

The invention provides an antisense oligonucleotide which comprises a contiguous nucleotide region of at least 10, or at least 12, or at least 13, or at least 14 or at least 15 or at least 16 or at least 17 or 18 contiguous nucleotides complementary to SEQ ID NO 192.

The invention provides for an oligonucleotide comprising or consisting of an oligonucleotide selected from the group consisting of:

$$T_s T_s {}^m C_s t_s a_s t_s c_s t_s a_s {}^m c_s g_s c_s a_s T_s T_s G, \quad \text{(SEQ ID NO 67.1)}$$

$$^m C_s T_s T_s {}^m C_s t_s t_s c_s t_s a_s t_s c_s t_s a_s {}^m c_s g_s c_s A_s T, \quad \text{(SEQ ID NO 73.1)}$$
and $$T_s A_s {}^m C_s T_s t_s t_s a_s a_s t_s a_s g_s c_s T_s {}^m C_s A_s A; \quad \text{(SEQ ID NO 86.1)}$$

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, and $^m c$ represents 5 methyl cytosine DNA nucleosides.

The invention provides for an oligonucleotide of formula:

$$T_s T_s {}^m C_s t_s a_s t_s c_s t_s a_s {}^m c_s g_s c_s a_s T_s T_s G, \quad \text{(SEQ ID NO 67.1)}$$

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, and $^m c$ represents 5 methyl cytosine DNA nucleosides.

The invention provides for an oligonucleotide of formula:

$$^m C_s T_s T_s {}^m C_s t_s t_s c_s t_s a_s t_s c_s t_s a_s {}^m c_s g_s c_s A_s T \quad \text{(SEQ ID NO 73.1)}$$

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, and $^m c$ represents 5 methyl cytosine DNA nucleosides.

The invention provides for an oligonucleotide of formula:

$$T_s A_s {}^m C_s T_s t_s t_s a_s a_s t_s a_s g_s c_s T_s {}^m C_s A_s A \quad \text{(SEQ ID NO 86.1)}$$

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, and $^m c$ represents 5 methyl cytosine DNA nucleosides.

The invention provides for the oligonucleotides provided in the examples.

The invention provides for a conjugate comprising the oligonucleotide according to the invention, and at least one conjugate moiety covalently attached to said oligonucleotide.

The invention provides for a pharmaceutically acceptable salt of the oligonucleotide or conjugate of the invention.

In a further aspect, the invention provides methods for in vivo or in vitro method for modulation of HTRA1 expression in a cell which is expressing HTRA1, by administering an oligonucleotide, conjugate or composition of the invention in an effective amount to said cell.

In a further aspect the invention provides methods for treating or preventing a disease, disorder or dysfunction associated with in vivo activity of HTRA1 comprising administering a therapeutically or prophylactically effective amount of the oligonucleotide of the invention, or conjugate thereof, to a subject suffering from or susceptible to the disease, disorder or dysfunction.

In a further aspect the oligonucleotide or composition of the invention is used for the treatment or prevention of macular degeneration, and other disorders where HTRA1 is implicated.

The invention provides for the oligonucleotide or conjugate of the invention, for use in the treatment of a disease or disorder selected from the list comprising of Duchenne muscular dystrophy, arthritis, such as osteoarthritis, familial ischemic cerebral small-vessel disease, Alzhiemer's disease and Parkinson's disease.

The invention provides for the oligonucleotide or conjugate of the invention, for use in the treatment of macular degeneration, such as wet or dry age related macular degeneration (e.g. wAMD, dAMD, geographic atrophy, early AMD, intermediate AMD) or diabetic retinopathy.

The invention provides for the use of the oligonucleotide, conjugate or composition of the invention, for the manufacture of a medicament for the treatment of macular degeneration, such as wet or dry age related macular degeneration (e.g. wAMD, dAMD, geographic atrophy, intermediate dAMD) or diabetic retinopathy.

The invention provides for the use of the oligonucleotide, conjugate or composition of the invention, for the manufacture of a medicament for the treatment of a disease or disorder selected from the group consisting of Duchenne muscular dystrophy, arthritis, such as osteoarthritis, familial ischemic cerebral small-vessel disease, Alzhiemer's disease and Parkinson's disease.

The invention provides for a method of treatment of a subject suffering from a disease or disorder selected from the group consisting of Duchenne muscular dystrophy, arthritis, such as osteoarthritis, familial ischemic cerebral small-vessel disease, Alzhiemer's disease and Parkinson's disease, said method comprising the step of administering an effective amount of the oligonucleotide, conjugate or composition of the invention to the subject.

The invention provides for a method of treatment of a subject suffering from an ocular disease, such as macular degeneration, such as wet or dry age related macular degeneration (e.g. wAMD, dAMD, geographic atrophy, intermediate dAMD) or diabetic retinopathy, said method comprising the step of administering an effective amount of the oligonucleotide, conjugate or composition of the invention to the subject.

The invention provides for a method of treatment of a subject suffering from an ocular disease, such as macular degeneration, such as wet or dry age related macular degeneration (e.g. wAMD, dAMD, geographic atrophy, intermediate AMD) or diabetic retinopathy, said method comprising administering at least two dosages of the oligonucleotide of the invention, or pharmaceutically acceptable salt thereof, in an intraocular injection in a dosage of from about 10 µg-200 µg, wherein the dosage interval between administration consecutive is at least 4 weeks (i.e. a dosage interval is ≥4 weeks), or at least monthly (i.e. a dosage interval is ≥1 month).

DEFINITIONS

Oligonucleotide

Figure 1:
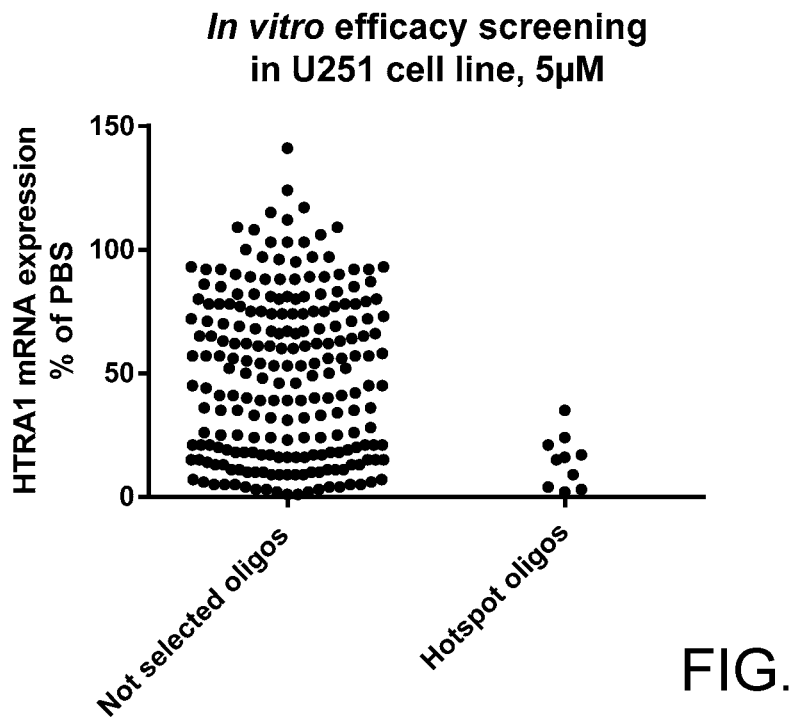
FIG. 1. A library of n=231 HTRA1 LNA oligonucleotides were screened in U251 cell lines at 5 µM. The residual HTRA1 mRNA expression level was measured by qPCR and is shown as % of control (PBS-treated cells). n=10 oligos located between position 53113-53384 were relatively active.

The term "oligonucleotide" as used herein is defined as it is generally understood by the skilled person as a molecule comprising two or more covalently linked nucleosides. Such covalently bound nucleosides may also be referred to as nucleic acid molecules or oligomers.

Oligonucleotides are commonly made in the laboratory by solid-phase chemical synthesis followed by purification. When referring to a sequence of the oligonucleotide, reference is made to the sequence or order of nucleobase moieties, or modifications thereof, of the covalently linked nucleotides or nucleosides. The oligonucleotide of the invention is man-made, and is chemically synthesized, and is typically purified or isolated. The oligonucleotide of the invention may comprise one or more modified nucleosides or nucleotides.

Antisense Oligonucleotides

The term "Antisense oligonucleotide" as used herein is defined as oligonucleotides capable of modulating expression of a target gene by hybridizing to a target nucleic acid, in particular to a contiguous sequence on a target nucleic acid. The antisense oligonucleotides are not essentially double stranded and are therefore not siRNAs. Preferably, the antisense oligonucleotides of the present invention are single stranded.

Contiguous Nucleotide Region

The term "contiguous nucleotide region" refers to the region of the oligonucleotide which is complementary to the target nucleic acid. The term may be used interchangeably herein with the term "contiguous nucleotide sequence" or "contiguous nucleobase sequence" and the term "oligonucleotide motif sequence". In some embodiments all the nucleotides of the oligonucleotide are present in the contiguous nucleotide region. In some embodiments the oligonucleotide comprises the contiguous nucleotide region and may, optionally comprise further nucleotide(s), for example a nucleotide linker region which may be used to attach a functional group to the contiguous nucleotide sequence. The nucleotide linker region may or may not be complementary to the target nucleic acid. In some embodiments the internucleoside linkages present between the nucleotides of the contiguous nucleotide region are all phosphorothioate internucleoside linkages. In some embodiments, the contiguous nucleotide region comprises one or more sugar modified nucleosides.

Nucleotides

Nucleotides are the building blocks of oligonucleotides and polynucleotides, and for the purposes of the present invention include both naturally occurring and non-naturally occurring nucleotides. In nature, nucleotides, such as DNA and RNA nucleotides comprise a ribose sugar moiety, a nucleobase moiety and one or more phosphate groups (which is absent in nucleosides). Nucleosides and nucleotides may also interchangeably be referred to as "units" or "monomers".

Modified Nucleoside

The term "modified nucleoside" or "nucleoside modification" as used herein refers to nucleosides modified as compared to the equivalent DNA or RNA nucleoside by the introduction of one or more modifications of the sugar moiety or the (nucleo)base moiety. In a preferred embodiment the modified nucleoside comprise a modified sugar moiety. The term modified nucleoside may also be used herein interchangeably with the term "nucleoside analogue" or modified "units" or modified "monomers".

Modified Internucleoside Linkage

The term "modified internucleoside linkage" is defined as generally understood by the skilled person as linkages other than phosphodiester (PO) linkages, that covalently couples two nucleosides together. Nucleotides with modified internucleoside linkage are also termed "modified nucleotides". In some embodiments, the modified internucleoside linkage increases the nuclease resistance of the oligonucleotide compared to a phosphodiester linkage. For naturally occurring oligonucleotides, the internucleoside linkage includes phosphate groups creating a phosphodiester bond between adjacent nucleosides. Modified internucleoside linkages are particularly useful in stabilizing oligonucleotides for in vivo use, and may serve to protect against nuclease cleavage at regions of DNA or RNA nucleosides in the oligonucleotide of the invention, for example within the gap region of a gapmer oligonucleotide, as well as in regions of modified nucleosides.

In an embodiment, the oligonucleotide comprises one or more internucleoside linkages modified from the natural phosphodiester to a linkage that is for example more resistant to nuclease attack. Nuclease resistance may be determined by incubating the oligonucleotide in blood serum or by using a nuclease resistance assay (e.g. snake venom phosphodiesterase (SVPD)), both are well known in the art. Internucleoside linkages which are capable of enhancing the nuclease resistance of an oligonucleotide are referred to as nuclease resistant internucleoside linkages. In some embodiments all of the internucleoside linkages of the oligonucleotide, or contiguous nucleotide sequence thereof, are modified. It will be recognized that, in some embodiments the nucleosides which link the oligonucleotide of the invention to a non-nucleotide functional group, such as a conjugate, may be phosphodiester. In some embodiments all of the internucleoside linkages of the oligonucleotide, or contiguous nucleotide sequence thereof, are nuclease resistant internucleoside linkages.

In some embodiments the modified internucleoside linkages may be phosphorothioate internucleoside linkages. In some embodiments, the modified internucleoside linkages are compatible with the RNaseH recruitment of the oligonucleotide of the invention, for example phosphorothioate.

In some embodiments the internucleoside linkage comprises sulphur (S), such as a phosphorothioate internucleoside linkage.

A phosphorothioate internucleoside linkage is particularly useful due to nuclease resistance, beneficial pharmakokinetics and ease of manufacture. In some embodiments all of the internucleoside linkages of the oligonucleotide, or contiguous nucleotide sequence thereof, are phosphorothioate.

Nucleobase

The term nucleobase includes the purine (e.g. adenine and guanine) and pyrimidine (e.g. uracil, thymine and cytosine) moiety present in nucleosides and nucleotides which form hydrogen bonds in nucleic acid hybridization. In the context of the present invention the term nucleobase also encompasses modified nucleobases which may differ from naturally occurring nucleobases, but are functional during nucleic acid hybridization. In this context "nucleobase" refers to both naturally occurring nucleobases such as adenine, guanine, cytosine, thymidine, uracil, xanthine and hypoxanthine, as well as non-naturally occurring variants. Such variants are for example described in Hirao et al (2012) Accounts of Chemical Research vol 45 page 2055 and Bergstrom (2009) Current Protocols in Nucleic Acid Chemistry Suppl. 37 1.4.1.

In a some embodiments the nucleobase moiety is modified by changing the purine or pyrimidine into a modified purine or pyrimidine, such as substituted purine or substituted pyrimidine, such as a nucleobased selected from isocytosine, pseudoisocytosine, 5-methyl cytosine, 5-thiozolo-cytosine, 5-propynyl-cytosine, 5-propynyl-uracil, 5-bromouracil 5-thiazolo-uracil, 2-thio-uracil, 2'thio-thymine, inosine, diaminopurine, 6-aminopurine, 2-aminopurine, 2,6-diaminopurine and 2-chloro-6-aminopurine.

The nucleobase moieties may be indicated by the letter code for each corresponding nucleobase, e.g. A, T, G, C or U, wherein each letter may optionally include modified nucleobases of equivalent function. For example, in the exemplified oligonucleotides, the nucleobase moieties are selected from A, T, G, C, and 5-methyl cytosine. Optionally, for LNA gapmers, 5-methyl cytosine LNA nucleosides may be used. In some embodiments, the cytosine nucleobases in a 5'cg3' motif is 5-methyl cytosine.

Modified Oligonucleotide

The term modified oligonucleotide describes an oligonucleotide comprising one or more sugar-modified nucleosides and/or modified internucleoside linkages. The term chimeric" oligonucleotide is a term that has been used in the literature to describe oligonucleotides with modified nucleosides.

Complementarity

The term complementarity describes the capacity for Watson-Crick base-pairing of nucleosides/nucleotides. Watson-Crick base pairs are guanine (G)-cytosine (C) and adenine (A)-thymine (T)/uracil (U). It will be understood that oligonucleotides may comprise nucleosides with modified nucleobases, for example 5-methyl cytosine is often used in place of cytosine, and as such the term complementarity encompasses Watson Crick base-paring between non-modified and modified nucleobases (see for example Hirao et al (2012) Accounts of Chemical Research vol 45 page 2055 and Bergstrom (2009) Current Protocols in Nucleic Acid Chemistry Suppl. 37 1.4.1).

The term "% complementary" as used herein, refers to the number of nucleotides in percent of a contiguous nucleotide region or sequence in a nucleic acid molecule (e.g. oligonucleotide) which, at a given position, are complementary to (i.e. form Watson Crick base pairs with) a contiguous nucleotide sequence, at a given position of a separate nucleic acid molecule (e.g. the target nucleic acid). The percentage is calculated by counting the number of aligned bases that form pairs between the two sequences, dividing by the total number of nucleotides in the oligonucleotide and multiplying by 100. In such a comparison a nucleobase/nucleotide which does not align (form a base pair) is termed a mismatch.

It will be understood that when referring to complementarity between two sequences, the determination of complementarity is measured across the length of the shorter of the two sequences, such as the length of the contiguous nucleotide region or sequence.

The term "fully complementary", refers to 100% complementarity. In the absence of a % term value or indication of a mismatch, complementary means fully complementary.

Identity

The term "Identity" as used herein, refers to the number of nucleotides in percent of a contiguous nucleotide sequence in a nucleic acid molecule (e.g. oligonucleotide) which, at a given position, are identical to (i.e. in their ability to form Watson Crick base pairs with the complementary nucleoside) a contiguous nucleotide sequence, at a given position of a separate nucleic acid molecule (e.g. the target nucleic acid). The percentage is calculated by counting the number of aligned bases that are identical between the two sequences, including gaps, dividing by the total number of nucleotides in the oligonucleotide and multiplying by 100. Percent Identity=(Matches×100)/Length of aligned region (with gaps).

When determining the identity of the contiguous nucleotide region of an oligonucleotide, the identity is calculated across the length of the contiguous nucleotide region. In embodiments where the entire contiguous nucleotide sequence of the oligonucleotide is the contiguous nucleotide region, identity is therefore calculated across the length of the nucleotide sequence of the oligonucleotide. In this respect the contiguous nucleotide region may be identical to a region of the reference nucleic acid sequence, or in some embodiments may be identical to the entire reference nucleic acid. Unless otherwise indicated a sequence which has 100% identity to a reference sequence is referred to as being identical.

For example, the reference sequence may be selected from the group consisting of any one of SEQ ID NOs 5-111.

However, if the oligonucleotide comprises additional nucleotide(s) flanking the contiguous nucleotide region, for example region D' or D", these additional flanking nucleotides may be disregarded when determining identity. In some embodiments, identity may be calculated across the entire oligonucleotide sequence.

In some embodiments, the antisense oligonucleotide oligonucleotide of the invention comprises a contiguous nucleotide region of at least 10 contiguous nucleotides which are identical to a sequence selected from the group consisting of SEQ ID NO 5-111.

In some embodiments, the antisense oligonucleotide oligonucleotide of the invention comprises a contiguous nucleotide region of at least 12 contiguous nucleotides which are identical to a sequence selected from the group consisting of SEQ ID NO 5-111.

In some embodiments, the antisense oligonucleotide oligonucleotide of the invention comprises a contiguous nucleotide region of at least 13 contiguous nucleotides which are identical to a sequence selected from the group consisting of SEQ ID NO 5-111.

In some embodiments, the antisense oligonucleotide oligonucleotide of the invention comprises a contiguous nucleotide region of at least 14 contiguous nucleotides which are identical to a sequence selected from the group consisting of SEQ ID NO 5-111.

In some embodiments, the antisense oligonucleotide oligonucleotide of the invention comprises a contiguous nucleotide region of at least 15 contiguous nucleotides which are identical to a sequence selected from the group consisting of SEQ ID NO 5-111.

In some embodiments, the antisense oligonucleotide oligonucleotide of the invention comprises a contiguous nucleotide region of at least 16 contiguous nucleotides which are identical to a sequence selected from the group consisting of SEQ ID NO 5-111.

In some embodiments, the contiguous nucleotide region consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of a sequence selected form the group consisting of SEQ ID NO 113-118, or SEQ ID NO 5-111 . . . In some embodiments, the entire contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO In some embodiments, the contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO 119.

In some embodiments, the contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO 120.

In some embodiments, the contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO 121.

In some embodiments, the contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO 122.

In some embodiments, the contiguous sequence of the oligonucleotide consists or comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides of SEQ ID NO 123.

The invention provides an antisense oligonucleotide which comprises a contiguous nucleotide region of at least 10, or at least 12, or at least 13, or at least 14 or at least 15 or at least 16 or at least 17 or at least 18 contiguous nucleotides present SEQ ID NO 118: 5' CTTCTTCTATCTACGCATTG 3'.

In some embodiments, the contiguous nucleotide region comprises 10, 11, 12, 13, 14, 15 or 16 contiguous nucleotides which are identical to SEQ ID NO 67.

In some embodiments, the contiguous nucleotide region comprises 10, 11, 12, 13, 14, 15, 16, 17 or 18 contiguous nucleotides which are identical to SEQ ID NO 73.

In some embodiments, the contiguous nucleotide region comprises 10, 11, 12, 13, 14, 15 or 16 contiguous nucleotides which are identical to SEQ ID NO 86.

The invention provides for an antisense oligonucleotide 11-30 nucleotides in length, such as 12-20 nucleotides in length, wherein the oligonucleotide comprises a contiguous nucleotide sequence identical to a sequence selected from the group consisting of SEQ ID NO 5-111.

The invention provides for an antisense oligonucleotide comprising or consisting of a contiguous nucleotide sequence, wherein the contiguous nucleotide sequence is identical to a reference sequence selected from the group consisting of SEQ ID NO 5-111 across at least 10 contiguous nucleotide of the reference sequence.

The invention provides for an antisense oligonucleotide comprising or consisting of a contiguous nucleotide sequence, wherein the contiguous nucleotide sequence is identical to a reference sequence selected from the group consisting of SEQ ID NO 5-111 across at least 12 contiguous nucleotide of the reference sequence.

The invention provides for an antisense oligonucleotide comprising or consisting of a contiguous nucleotide sequence, wherein the contiguous nucleotide sequence is identical to a reference sequence selected from the group consisting of SEQ ID NO 5-111 across at least 14 contiguous nucleotide of the reference sequence.

The invention provides for an antisense oligonucleotide comprising or consisting of a contiguous nucleotide sequence, wherein the contiguous nucleotide sequence is identical to a reference sequence selected from the group consisting of SEQ ID NO 5-111 across the length of the reference sequence.

Hybridization

The term "hybridizing" or "hybridizes" as used herein is to be understood as two nucleic acid strands (e.g. an oligonucleotide and a target nucleic acid) forming hydrogen bonds between base pairs on opposite strands thereby forming a duplex. The affinity of the binding between two nucleic acid strands is the strength of the hybridization. It is often described in terms of the melting temperature ($T_m$) defined as the temperature at which half of the oligonucleotides are duplexed with the target nucleic acid. At physiological conditions $T_m$ is not strictly proportional to the affinity (Mergny and Lacroix, 2003, *Oligonucleotides* 13:515-537). The standard state Gibbs free energy $\Delta G°$ is a more accurate representation of binding affinity and is related to the dissociation constant ($K_d$) of the reaction by $\Delta G°=-RTln(K_d)$, where R is the gas constant and T is the absolute temperature. Therefore, a very low $\Delta G°$ of the reaction between an oligonucleotide and the target nucleic acid reflects a strong hybridization between the oligonucleotide and target nucleic acid. $\Delta G°$ is the energy associated with a reaction where aqueous concentrations are 1M, the pH is 7, and the temperature is 37° C. The hybridization of oligonucleotides to a target nucleic acid is a spontaneous reaction and for spontaneous reactions $\Delta G°$ is less than zero. $\Delta G°$ can be measured experimentally, for example, by use of the isothermal titration calorimetry (ITC) method as described in Hansen et al., 1965, *Chem. Comm.* 36-38 and Holdgate et al., 2005, *Drug Discov Today*. The skilled person will know that commercial equipment is available for $\Delta G°$ measurements. $\Delta G°$ can also be estimated numerically by using the nearest neighbor model as described by SantaLucia, 1998, *Proc Natl Acad Sci USA*. 95: 1460-1465 using appropriately derived thermodynamic parameters described by Sugimoto et al., 1995, *Biochemistry* 34:11211-11216 and McTigue et al., 2004, *Biochemistry* 43:5388-5405. In order to have the possibility of modulating its intended nucleic acid target by hybridization, oligonucleotides of the present invention hybridize to a target nucleic acid with estimated $\Delta G°$ values below −10 kcal for oligonucleotides that are 10-30 nucleotides in length. In some embodiments the degree or strength of hybridization is measured by the standard state Gibbs free energy $\Delta G°$. The oligonucleotides may hybridize to a target nucleic acid with estimated $\Delta G°$ values below the range of −10 kcal, such as below −15 kcal, such as below −20 kcal and such as below −25 kcal for oligonucleotides that are 8-30 nucleotides in length. In some embodiments the oligonucleotides hybridize to a target nucleic acid with an estimated $\Delta G°$ value of −10 to −60 kcal, such as −12 to −40, such as from −15 to −30 kcal or −16 to −27 kcal such as −18 to −25 kcal.

Target Sequence

The oligonucleotide comprises a contiguous nucleotide region which is complementary to or hybridizes to a subsequence of the target nucleic acid molecule. The term "target sequence" as used herein refers to a sequence of nucleotides present in the target nucleic acid which comprises the nucleobase sequence which is complementary to the contiguous nucleotide region or sequence of the oligonucleotide of the invention. In some embodiments, the target sequence consists of a region on the target nucleic acid which is complementary to the contiguous nucleotide region or sequence of the oligonucleotide of the invention. In some embodiments the target sequence is longer than the complementary sequence of a single oligonucleotide, and may, for example represent a preferred region of the target nucleic acid which may be targeted by several oligonucleotides of the invention.

The oligonucleotide of the invention comprises a contiguous nucleotide region which is complementary to the target nucleic acid, such as a target sequence.

The oligonucleotide comprises a contiguous nucleotide region of at least 10 nucleotides which is complementary to or hybridizes to a target sequence present in the target nucleic acid molecule. The contiguous nucleotide region (and therefore the target sequence) comprises of at least 10 contiguous nucleotides, such as 11, 12, 13, 14, 15, 16, 17, 18, 19, 20, 21, 22, contiguous nucleotides, such as from 12-22, such as from 14-18 contiguous nucleotides.

In some embodiments the target sequence is present within a sequence selected from the group consisting of SEQ ID NO 113, 114, 115, 116, 117 and 118.

Target Cell

The term a target cell as used herein refers to a cell which is expressing the target nucleic acid. In some embodiments the target cell may be in vivo or in vitro. In some embodiments the target cell is a mammalian cell such as a primate cell such as a monkey cell or a human cell. In some embodiments the target cell may be a retinal cell, such as a retinal pigment epithelium (PRE) cell. In some embodiments the cell is selected from the group consisting of RPE cells, Bipolar Cell, Amacrine cells, Endothelial cells, Ganglion cells and Microglia cells. For in vitro assessment, the target cell may be a primary cell or an established cell line, such as U251, ARPE19 . . .

Target Nucleic Acid

According to the present invention, the target nucleic acid is a nucleic acid which encodes mammalian HTRA1 and may for example be a gene, a RNA, a mRNA, and pre-mRNA, a mature mRNA or a cDNA sequence. The target may therefore be referred to as an HTRA1 target nucleic acid.

Suitably, the target nucleic acid encodes an HTRA1 protein, in particular mammalian HTRA1, such as human HTRA1 (See for example tables 1 & 2 which provides the mRNA and pre-mRNA sequences for human and rat HTRA1).

In some embodiments, the target nucleic acid is selected from the group consisting of SEQ ID NO: 1, 2, 3, and 4, or naturally occurring variants thereof (e.g. sequences encoding a mammalian HTRA1 protein.

A target cell is a cell which is expressing the HTRA1 target nucleic acid. In preferred embodiments the target nucleic acid is the HTRA1 mRNA, such as the HTRA1 pre-mRNA or HTRA1 mature mRNA. The poly A tail of HTRA1 mRNA is typically disregarded for antisense oligonucleotide targeting.

If employing the oligonucleotide of the invention in research or diagnostics the target nucleic acid may be a cDNA or a synthetic nucleic acid derived from DNA or RNA.

The target sequence may be a sub-sequence of the target nucleic acid. In some embodiments the oligonucleotide or contiguous nucleotide region is fully complementary to, or only comprises one or two mismatches to an HTRA1 sub-sequence, such as a sequence selected from the group consisting of SEQ ID NO 113, 114, 115, 116, 117 or 231.

The target sequence may be a sub-sequence of the target nucleic acid. In some embodiments the oligonucleotide or contiguous nucleotide region is fully complementary to, or only comprises one or two mismatches to an HTRA1 sub-sequence, such as a sequence selected from the group consisting of SEQ ID NO 124-230. In some embodiments the oligonucleotide or contiguous nucleotide region is fully complementary to, or only comprises one or two mismatches to an HTRA1 sub-sequence SEQ ID NO 231.

Complementarity to the target or sub-sequence thereof is measured over the length of the oligonucleotide, or contiguous nucleotide region thereof.

For in vivo or in vitro application, the oligonucleotide of the invention is typically capable of inhibiting the expression of the HTRA1 target nucleic acid in a cell which is expressing the HTRA1 target nucleic acid. The contiguous sequence of nucleobases of the oligonucleotide of the invention is typically complementary to the HTRA1 target nucleic acid, as measured across the length of the oligonucleotide, optionally with the exception of one or two mismatches, and optionally excluding nucleotide based linker regions which may link the oligonucleotide to an optional functional group such as a conjugate, or other non-complementary terminal nucleotides (e.g. region D). The target nucleic acid may, in some embodiments, be a RNA or DNA, such as a messenger RNA, such as a mature mRNA or a pre-mRNA. In some embodiments the target nucleic acid is a RNA or DNA which encodes mammalian HTRA1 protein, such as human HTRA1, e.g. the human HTRA1 mRNA sequence, such as that disclosed as SEQ ID NO 1 (NM_002775.4, GI:190014575). Further information on exemplary target nucleic acids is provided in tables 1 & 2.

TABLE 2

Sequence details for human and Cyno HTRA1.

| Species | RNA type | Length (nt) | SEQ ID NO |
|---|---|---|---|
| Human | mRNA | 2138 | 1 |
| Human | premRNA | 53384 | 2 |
| Cyno | mRNA | 2123 | 3 |
| Cyno | premRNA | 52575 | 4 |

Naturally Occurring Variant

The term "naturally occurring variant" refers to variants of HTRA1 gene or transcripts which originate from the same genetic loci as the target nucleic acid, but may differ for example, by virtue of degeneracy of the genetic code causing a multiplicity of codons encoding the same amino acid, or due to alternative splicing of pre-mRNA, or the presence of polymorphisms, such as single nucleotide polymorphisms, and allelic variants. Based on the presence of the sufficient complementary sequence to the oligonucleotide, the oligonucleotide of the invention may therefore target the target nucleic acid and naturally occurring variants thereof. In some embodiments, the naturally occurring variants have at least 95% such as at least 98% or at least 99% homology to a mammalian HTRA1 target nucleic acid, such as a target nucleic acid selected form the group consisting of SEQ ID NO 1, 2, 3, or 4.

Modulation of Expression

The term "modulation of expression" as used herein is to be understood as an overall term for an oligonucleotide's ability to alter the amount of HTRA1 when compared to the amount of HTRA1 before administration of the oligonucleotide. Alternatively modulation of expression may be determined by reference to a control experiment where the oligonucleotide of the invention is not administered. One type of modulation is an oligonucleotide's ability to inhibit, down-regulate, reduce, suppress, remove, stop, block, prevent, lessen, lower, avoid or terminate expression of HTRA1, e.g. by degradation of mRNA or blockage of transcription. The antisense oligonucleotide of the invention are capable of inhibiting, down-regulating, reduce, suppress, remove, stop, block, prevent, lessen, lower, avoid or terminate expression of HTRA1.

High Affinity Modified Nucleosides

A high affinity modified nucleoside is a modified nucleotide which, when incorporated into the oligonucleotide enhances the affinity of the oligonucleotide for its comple-

TABLE 1

Genome and assembly information for human and Cyno HTRA1.

| Species | Chr. | Strand | Genomic coordinates | | | NCBI reference sequence* accession number for mRNA |
|---|---|---|---|---|---|---|
| | | | Start | End | Assembly | |
| Human | 10 | fwd | 122461525 | 122514908 | GRCh38.p2 release 107 | NM_002775.4 |
| Cyno | 9 | fwd | 121764994 | 121817518 | Macaca_fascicularis_5.0 | NC_022280.1** |

Fwd = forward strand. The genome coordinates provide the pre-mRNA sequence (genomic sequence).
The NCBI reference provides the mRNA sequence (cDNA sequence).
*The National Center for Biotechnology Information reference sequence database is a comprehensive, integrated, non-redundant, well-annotated set of reference sequences including genomic, transcript, and protein. It is hosted at www.ncbi.nlm.nih.gov/refseq.
**In the NCBI reference sequence there is a stretch of 100 nucleotides from position 126 to position 227 whose identity is not known. In SEQ ID NO 3 & 4, this stretch has been replaced by the nucleotides appearing in both human and Macaca mulatta HTRA1 premRNA sequences in this region.

mentary target, for example as measured by the melting temperature ($T_m$). A high affinity modified nucleoside of the present invention preferably result in an increase in melting temperature between +0.5 to +12° C., more preferably between +1.5 to +10° C. and most preferably between +3 to +8° C. per modified nucleoside. Numerous high affinity modified nucleosides are known in the art and include for example, many 2' substituted nucleosides as well as locked nucleic acids (LNA) (see e.g. Freier & Altmann; Nucl. Acid Res., 1997, 25, 4429-4443 and Uhlmann; Curr. Opinion in Drug Development, 2000, 3(2), 293-213).

Sugar Modifications

The oligomer of the invention may comprise one or more nucleosides which have a modified sugar moiety, i.e. a modification of the sugar moiety when compared to the ribose sugar moiety found in DNA and RNA.

Numerous nucleosides with modification of the ribose sugar moiety have been made, primarily with the aim of improving certain properties of oligonucleotides, such as affinity and/or nuclease resistance.

Such modifications include those where the ribose ring structure is modified, e.g. by replacement with a hexose ring (HNA), or a bicyclic ring, which typically have a biradicle bridge between the C2 and C4 carbons on the ribose ring (LNA), or an unlinked ribose ring which typically lacks a bond between the C2 and C3 carbons (e.g. UNA). Other sugar modified nucleosides include, for example, bicyclohexose nucleic acids (WO2011/017521) or tricyclic nucleic acids (WO2013/154798). Modified nucleosides also include nucleosides where the sugar moiety is replaced with a non-sugar moiety, for example in the case of peptide nucleic acids (PNA), or morpholino nucleic acids.

Sugar modifications also include modifications made via altering the substituent groups on the ribose ring to groups other than hydrogen, or the 2'—OH group naturally found in DNA and RNA nucleosides. Substituents may, for example be introduced at the 2', 3', 4' or 5' positions. Nucleosides with modified sugar moieties also include 2' modified nucleosides, such as 2' substituted nucleosides. Indeed, much focus has been spent on developing 2' substituted nucleosides, and numerous 2' substituted nucleosides have been found to have beneficial properties when incorporated into oligonucleotides, such as enhanced nucleoside resistance and enhanced affinity.

2' Modified Nucleosides.

A 2' sugar modified nucleoside is a nucleoside which has a substituent other than H or —OH at the 2' position (2' substituted nucleoside) or comprises a 2' linked biradicle, and includes 2' substituted nucleosides and LNA (2'-4' biradicle bridged) nucleosides. For example, the 2' modified sugar may provide enhanced binding affinity and/or increased nuclease resistance to the oligonucleotide. Examples of 2' substituted modified nucleosides are 2'-O-alkyl-RNA, 2'-O-methyl-RNA, 2'-alkoxy-RNA, 2'-O-methoxyethyl-RNA (MOE), 2'-amino-DNA, 2'-Fluoro-RNA, and 2'-F-ANA nucleoside. For further examples, please see e.g. Freier & Altmann; Nucl. Acid Res., 1997, 25, 4429-4443 and Uhlmann; Curr. Opinion in Drug Development, 2000, 3(2), 293-213, and Deleavey and Damha, Chemistry and Biology 2012, 19, 937. Below are illustrations of some 2' substituted modified nucleosides.

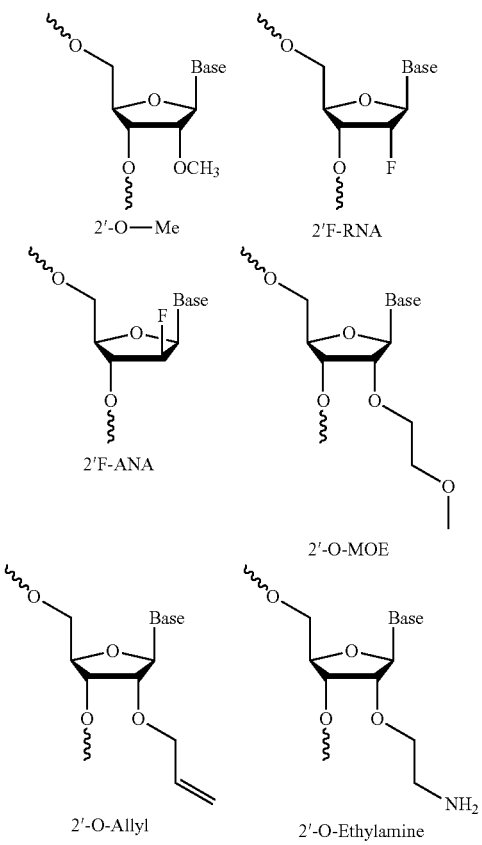

Locked Nucleic Acid Nucleosides (LNA).

LNA nucleosides are modified nucleosides which comprise a linker group (referred to as a biradicle or a bridge) between C2' and C4' of the ribose sugar ring of a nucleotide. These nucleosides are also termed bridged nucleic acid or bicyclic nucleic acid (BNA) in the literature.

In some embodiments, the modified nucleoside or the LNA nucleosides of the oligomer of the invention has a general structure of the formula I or II:

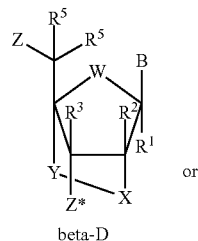

Formula I

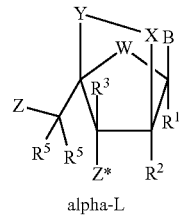

Formula II wherein W is selected from —O—, —S—, —N($R^a$)—, —C($R^a R^b$)—, such as, in some embodiments —O—;

B designates a nucleobase moiety;

Z designates an internucleoside linkage to an adjacent nucleoside, or a 5'-terminal group;

Z* designates an internucleoside linkage to an adjacent nucleoside, or a 3'-terminal group;

X designates a group selected from the list consisting of —C($R^a R^b$)—, —C($R^a$)=C($R^b$)—, —C($R^a$)=N—, —O—, —Si($R^a$)$_2$—, —S—, —SO$_2$—, —N($R^a$)—, and >C=Z In some embodiments, X is selected from the group consisting of: —O—, —S—, NH—, N$R^a R^b$, —CH$_2$—, C$R^a R^b$, —C(=CH$_2$)—, and —C(=C$R^a R^b$)—

In some embodiments, X is —O—

Y designates a group selected from the group consisting of —C($R^a R^b$)—, —C($R^a$)=C($R^b$)—, —C($R^a$)=N—, —O—, —Si($R^a$)$_2$—, —S—, —SO$_2$—, —N($R^a$)—, and >C=Z In some embodiments, Y is selected from the group consisting of: —CH$_2$—, —C($R^a R^b$)—, —CH$_2$CH$_2$—, —C($R^a R^b$)—C($R^a R^b$)—, —CH$_2$CH$_2$CH$_2$—, —C($R^a R^b$)C($R^a R^b$)C($R^a R^b$)—, —C($R^a$)=C($R^b$)—, and —C($R^a$)=N—

In some embodiments, Y is selected from the group consisting of: —CH$_2$—, —CHR$^a$—, —CHCH$_3$—, C$R^a R^b$— or —X—Y— together designate a bivalent linker group (also referred to as a radical) together designate a bivalent linker group consisting of 1, 2, or 3 groups/atoms selected from the group consisting of —C($R^a R^b$)—, —C($R^a$)=C ($R^b$)—, —C($R^a$)=N—, —O—, —Si($R^a$)$_2$—, —S—, —SO$_2$—, —N($R^a$)—, and >C=Z, In some embodiments, —X—Y— designates a biradicle selected from the groups consisting of: —X—CH$_2$—, —X—C$R^a R^b$—, —X—CHR$^a$—, —O—Y—, —O—CH$_2$—, —S—CH$_2$—, —NH—CH$_2$—, —O—CHCH$_3$—, —CH$_2$—O—CH$_2$, —O—CH(CH$_3$CH$_3$)—, —O—CH$_2$—CH$_2$—, OCH$_2$—CH$_2$—CH$_2$—, —O—CH$_2$OCH$_2$—, —O—NCH$_2$—, —C(=CH$_2$)—CH$_2$—, —NR$^a$—CH$_2$—, N—O—CH$_2$, —S—C$R^a R^b$— and —S—CHR$^a$—.

In some embodiments —X—Y— designates —O—CH$_2$— or —O—CH(CH$_3$)—.

wherein Z is selected from —O—, —S—, and —N($R^a$)—, and $R^a$ and, when present $R^b$, each is independently selected from hydrogen, optionally substituted C$_{1-6}$-alkyl, optionally substituted C$_{2-6}$-alkenyl, optionally substituted C$_{2-6}$-alkynyl, hydroxy, optionally substituted C$_{1-6}$-alkoxy, C$_{2-6}$-alkoxyalkyl, C$_{2-6}$-alkenyloxy, carboxy, C$_{1-6}$-alkoxycarbonyl, C$_{1-6}$-alkylcarbonyl, formyl, aryl, aryloxy-carbonyl, aryloxy, arylcarbonyl, heteroaryl, heteroaryloxy-carbonyl, heteroaryloxy, heteroarylcarbonyl, amino, mono- and di(C$_{1-6}$-alkyl)amino, carbamoyl, mono- and di(C$_{1-6}$-alkyl)-amino-carbonyl, amino-C$_{1-6}$-alkyl-aminocarbonyl, mono- and di(C$_{1-6}$-alkyl)amino-C$_{1-6}$-alkyl-aminocarbonyl, C$_{1-6}$-alkyl-carbonylamino, carbamido, C$_{1-6}$-alkanoyloxy, sulphono, C$_{1-6}$-alkylsulphonyloxy, nitro, azido, sulphanyl, C$_{1-6}$-alkylthio, halogen, where aryl and heteroaryl may be optionally substituted and where two geminal substituents $R^a$ and $R^b$ together may designate optionally substituted methylene (=CH$_2$), wherein for all chiral centers, asymmetric groups may be found in either R or S orientation.

wherein $R^1$, $R^2$, $R^3$, $R^5$ and $R^{5*}$ are independently selected from the group consisting of: hydrogen, optionally substituted C$_{1-6}$-alkyl, optionally substituted C$_{2-6}$-alkenyl, optionally substituted C$_{2-6}$-alkynyl, hydroxy, C$_{1-6}$-alkoxy, C$_{2-6}$-alkoxyalkyl, C$_{2-6}$-alkenyloxy, carboxy, C$_{1-6}$-alkoxycarbonyl, C$_{1-6}$-alkylcarbonyl, formyl, aryl, aryloxy-carbonyl, aryloxy, arylcarbonyl, heteroaryl, heteroaryloxy-carbonyl, heteroaryloxy, heteroarylcarbonyl, amino, mono- and di(C$_{1-6}$-alkyl)amino, carbamoyl, mono- and di(C$_{1-6}$-alkyl)-amino-carbonyl, amino-C$_{1-6}$-alkyl-aminocarbonyl, mono- and di(C$_{1-6}$-alkyl)amino-C$_{1-6}$-alkyl-aminocarbonyl, C$_{1-6}$-alkyl-carbonylamino, carbamido, C$_{1-6}$-alkanoyloxy, sulphono, C$_{1-6}$-alkylsulphonyloxy, nitro, azido, sulphanyl, C$_{1-6}$-alkylthio, halogen, where aryl and heteroaryl may be optionally substituted, and where two geminal substituents together may designate oxo, thioxo, imino, or optionally substituted methylene.

In some embodiments $R^1$, $R^2$, $R^3$, $R^5$ and $R^{5*}$ are independently selected from C$_{1-6}$ alkyl, such as methyl, and hydrogen.

In some embodiments $R^1$, $R^2$, $R^3$, $R^5$ and $R^{5*}$ are all hydrogen.

In some embodiments $R^1$, $R^2$, $R^3$, are all hydrogen, and either $R^5$ and $R^{5*}$ is also hydrogen and the other of $R^5$ and $R^{5*}$ is other than hydrogen, such as C$_{1-6}$ alkyl such as methyl.

In some embodiments, $R^a$ is either hydrogen or methyl. In some embodiments, when present, $R^b$ is either hydrogen or methyl.

In some embodiments, one or both of $R^a$ and $R^b$ is hydrogen

In some embodiments, one of $R^a$ and $R^b$ is hydrogen and the other is other than hydrogen In some embodiments, one of $R^a$ and $R^b$ is methyl and the other is hydrogen In some embodiments, both of $R^a$ and $R^b$ are methyl.

In some embodiments, the biradicle —X—Y— is —O—CH$_2$—, W is O, and all of $R^1$, $R^2$, $R^3$, $R^5$ and $R^{5*}$ are all hydrogen. Such LNA nucleosides are disclosed in WO99/014226, WO00/66604, WO98/039352 and WO2004/046160 which are all hereby incorporated by reference, and include what are commonly known as beta-D-oxy LNA and alpha-L-oxy LNA nucleosides.

In some embodiments, the biradicle —X—Y— is —S—CH$_2$—, W is O, and all of $R^1$, $R^2$, $R^3$, $R^5$ and $R^{5*}$ are all hydrogen. Such thio LNA nucleosides are disclosed in WO99/014226 and WO2004/046160 which are hereby incorporated by reference.

In some embodiments, the biradicle —X—Y— is —NH—CH$_2$—, W is O, and all of $R^1$, $R^2$, $R^3$, $R^5$ and $R^{5*}$ are all hydrogen. Such amino LNA nucleosides are disclosed in WO99/014226 and WO2004/046160 which are hereby incorporated by reference.

In some embodiments, the biradicle —X—Y— is —O—CH$_2$—CH$_2$— or —O—CH$_2$—CH$_2$—CH$_2$—, W is O, and all of $R^1$, $R^2$, $R^3$, $R^5$ and $R^{5*}$ are all hydrogen. Such LNA nucleosides are disclosed in WO00/047599 and Morita et al, Bioorganic & Med. Chem. Lett. 12 73-76, which are hereby incorporated by reference, and include what are commonly known as 2'-O-4'C-ethylene bridged nucleic acids (ENA).

In some embodiments, the biradicle —X—Y— is —O—CH$_2$—, W is O, and all of $R^1$, $R^2$, $R^3$, and one of $R^5$ and $R^{5*}$ are hydrogen, and the other of $R^5$ and $R^{5*}$ is other than hydrogen such as C$_{1-6}$ alkyl, such as methyl. Such 5' substituted LNA nucleosides are disclosed in WO2007/134181 which is hereby incorporated by reference.

In some embodiments, the biradicle —X—Y— is —O—C$R^a R^b$—, wherein one or both of $R^a$ and $R^b$ are other than hydrogen, such as methyl, W is O, and all of $R^1$, $R^2$, $R^3$, and one of $R^5$ and $R^{5*}$ are hydrogen, and the other of $R^5$ and $R^{5*}$ is other than hydrogen such as C$_{1-6}$ alkyl, such as methyl. Such bis modified LNA nucleosides are disclosed in WO2010/077578 which is hereby incorporated by reference.

In some embodiments, the biradicle —X—Y— designate the bivalent linker group —O—CH(CH$_2$OCH$_3$)— (2' O-methoxyethyl bicyclic nucleic acid—Seth at al., 2010, J. Org. Chem. Vol 75(5) pp. 1569-81). In some embodiments, the biradicle —X—Y— designate the bivalent linker group —O—CH(CH$_2$CH$_3$)— (2'O-ethyl bicyclic nucleic acid—Seth at al., 2010, J. Org. Chem. Vol 75(5) pp. 1569-81). In some embodiments, the biradicle —X—Y— is —O—CHR$^a$—, W is O, and all of R$^1$, R$^2$, R$^3$, R$^5$ and R$^{5*}$ are all hydrogen. Such 6' substituted LNA nucleosides are disclosed in WO10036698 and WO07090071 which are both hereby incorporated by reference.

In some embodiments, the biradicle —X—Y— is —O—CH(CH$_2$OCH$_3$)—, W is O, and all of R$^1$, R$^2$, R$^3$, R$^5$ and R$^{5*}$ are all hydrogen. Such LNA nucleosides are also known as cyclic MOEs in the art (cMOE) and are disclosed in WO07090071.

In some embodiments, the biradicle —X—Y— designate the bivalent linker group —O—CH(CH$_3$)—.— in either the R- or S-configuration. In some embodiments, the biradicle —X—Y— together designate the bivalent linker group —O—CH$_2$—O—CH$_2$— (Seth at al., 2010, J. Org. Chem). In some embodiments, the biradicle —X—Y— is —O—CH(CH$_3$)—, W is O, and all of R$^1$, R$^2$, R$^3$, R$^5$ and R$^{5*}$ are all hydrogen. Such 6' methyl LNA nucleosides are also known as cET nucleosides in the art, and may be either (S)cET or (R)cET stereoisomers, as disclosed in WO07090071 (beta-D) and WO2010/036698 (alpha-L) which are both hereby incorporated by reference).

In some embodiments, the biradicle —X—Y— is —O—CR$^a$R$^b$—, wherein in neither R$^a$ or R$^b$ is hydrogen, W is O, and all of R$^1$, R$^2$, R$^3$, R$^5$ and R$^{5*}$ are all hydrogen. In some embodiments, R$^a$ and R$^b$ are both methyl. Such 6' di-substituted LNA nucleosides are disclosed in WO 2009006478 which is hereby incorporated by reference.

In some embodiments, the biradicle —X—Y— is —S—CHR$^a$—, W is O, and all of R$^1$, R$^2$, R$^3$, R$^5$ and R$^{5*}$ are all hydrogen. Such 6' substituted thio LNA nucleosides are disclosed in WO11156202 which is hereby incorporated by reference. In some 6' substituted thio LNA embodiments R$^a$ is methyl.

In some embodiments, the biradicle —X—Y— is —C(=CH$_2$)—C(R$^a$R$^b$)—, such as —C(=CH$_2$)—CH$_2$—, or —C(=CH$_2$)—CH(CH$_3$)—W is O, and all of R$^1$, R$^2$, R$^3$, R$^5$ and R$^{5*}$ are all hydrogen. Such vinyl carbo LNA nucleosides are disclosed in WO08154401 and WO09067647 which are both hereby incorporated by reference.

In some embodiments the biradicle —X—Y— is —N(—OR$^a$)—, W is O, and all of R$^1$, R$^2$, R$^3$, R$^5$ and R$^{5*}$ are all hydrogen. In some embodiments R$^a$ is C$_{1-6}$ alkyl such as methyl. Such LNA nucleosides are also known as N substituted LNAs and are disclosed in WO2008/150729 which is hereby incorporated by reference. In some embodiments, the biradicle —X—Y— together designate the bivalent linker group —O—NR$^a$—CH$_3$— (Seth at al., 2010, J. Org. Chem). In some embodiments the biradicle —X—Y— is —N(R$^a$)—, W is O, and all of R$^1$, R$^2$, R$^3$, R$^5$ and R$^{5*}$ are all hydrogen. In some embodiments R$^a$ is C$_{1-6}$ alkyl such as methyl.

In some embodiments, one or both of R$^5$ and R$^{5*}$ is hydrogen and, when substituted the other of R$^5$ and R$^{5*}$ is C$_{1-6}$ alkyl such as methyl. In such an embodiment, R$^1$, R$^2$, R$^3$, may all be hydrogen, and the biradicle —X—Y— may be selected from —O—CH2— or —O—C(HCR$^a$)—, such as —O—C(HCH3)—.

In some embodiments, the biradicle is —CR$^a$R$^b$—O—CR$^a$R$^b$—, such as CH$_2$—O—CH$_2$—, W is O and all of R$^1$, R$^2$, R$^3$, R$^5$ and R$^{5*}$ are all hydrogen. In some embodiments R$^a$ is C1-6 alkyl such as methyl. Such LNA nucleosides are also known as conformationally restricted nucleotides (CRNs) and are disclosed in WO2013036868 which is hereby incorporated by reference.

In some embodiments, the biradicle is —O—CR$^a$R$^b$—O—CR$^a$R$^b$—, such as O—CH$_2$—O—CH$_2$—, W is O and all of R$^1$, R$^2$, R$^3$, R$^5$ and R$^{5*}$ are all hydrogen. In some embodiments R$^a$ is C$_{1-6}$alkyl such as methyl. Such LNA nucleosides are also known as COC nucleotides and are disclosed in Mitsuoka et al., Nucleic Acids Research 2009 37(4), 1225-1238, which is hereby incorporated by reference.

It will be recognized than, unless specified, the LNA nucleosides may be in the beta-D or alpha-L stereoisoform.

Examples of LNA nucleosides are presented in Scheme 1.

Scheme 1

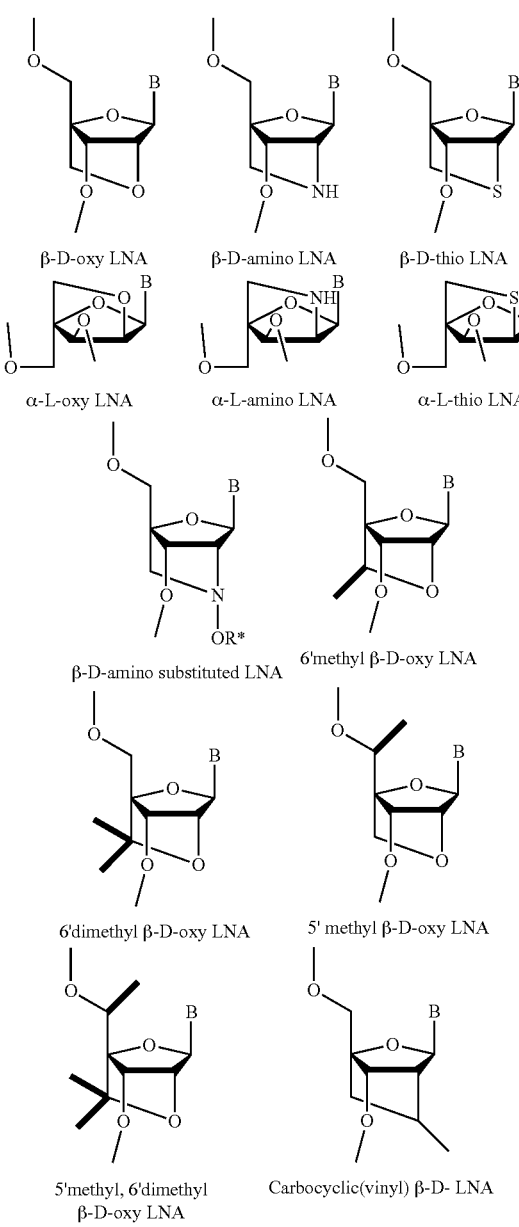

β-D-oxy LNA    β-D-amino LNA    β-D-thio LNA

α-L-oxy LNA    α-L-amino LNA    α-L-thio LNA

β-D-amino substituted LNA    6'methyl β-D-oxy LNA

6'dimethyl β-D-oxy LNA    5' methyl β-D-oxy LNA

5'methyl, 6'dimethyl β-D-oxy LNA    Carbocyclic(vinyl) β-D- LNA

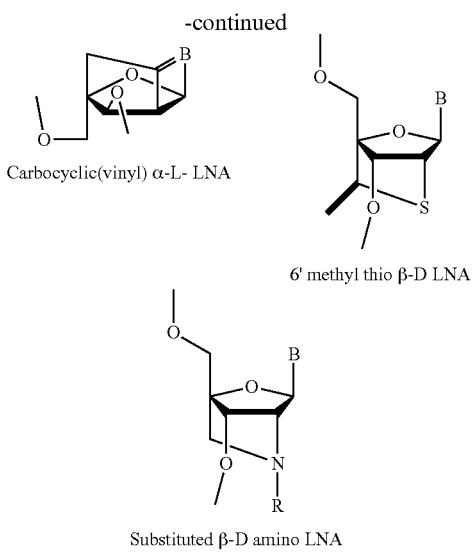

Carbocyclic(vinyl) α-L-LNA

6' methyl thio β-D LNA

Substituted β-D amino LNA

As illustrated in the examples, in some embodiments of the invention the LNA nucleosides in the oligonucleotides are beta-D-oxy-LNA nucleosides.

Nuclease Mediated Degradation

Nuclease mediated degradation refers to an oligonucleotide capable of mediating degradation of a complementary nucleotide sequence when forming a duplex with such a sequence.

In some embodiments, the oligonucleotide may function via nuclease mediated degradation of the target nucleic acid, where the oligonucleotides of the invention are capable of recruiting a nuclease, particularly and endonuclease, preferably endoribonuclease (RNase), such as RNase H. Examples of oligonucleotide designs which operate via nuclease mediated mechanisms are oligonucleotides which typically comprise a region of at least 5 or 6 DNA nucleosides and are flanked on one side or both sides by affinity enhancing nucleosides, for example gapmers, headmers and tailmers.

RNase H Activity and Recruitment

The RNase H activity of an antisense oligonucleotide refers to its ability to recruit RNase H when in a duplex with a complementary RNA molecule. WO01/23613 provides in vitro methods for determining RNaseH activity, which may be used to determine the ability to recruit RNaseH. Typically an oligonucleotide is deemed capable of recruiting RNase H if it, when provided with a complementary target nucleic acid sequence, has an initial rate, as measured in pmol/l/min, of at least 5%, such as at least 10% or more than 20% of the of the initial rate determined when using a oligonucleotide having the same base sequence as the modified oligonucleotide being tested, but containing only DNA monomers, with phosphorothioate linkages between all monomers in the oligonucleotide, and using the methodology provided by Example 91-95 of WO01/23613 (hereby incorporated by reference).

Gapmer

The term gapmer as used herein refers to an antisense oligonucleotide which comprises a region of RNase H recruiting oligonucleotides (gap) which is flanked 5' and 3' by regions which comprise one or more affinity enhancing modified nucleosides (flanks or wings). Various gapmer designs are described herein. Headmers and tailmers are oligonucleotides capable of recruiting RNase H where one of the flanks is missing, i.e. only one of the ends of the oligonucleotide comprises affinity enhancing modified nucleosides. For headmers the 3' flank is missing (i.e. the 5' flank comprises affinity enhancing modified nucleosides) and for tailmers the 5' flank is missing (i.e. the 3' flank comprises affinity enhancing modified nucleosides).

LNA Gapmer

The term LNA gapmer is a gapmer oligonucleotide wherein at least one of the affinity enhancing modified nucleosides is an LNA nucleoside. In some embodiments the LNA nucleoside(s) in an LNA gapmer are beta-D-oxy LNA nucleosides and/or 6'methyl beta-D-oxy LNA nucleosides (such as (S)cET nucleosides.

Mixed Wing Gapmer

The term mixed wing gapmer refers to a LNA gapmer wherein the flank regions comprise at least one LNA nucleoside and at least one non-LNA modified nucleoside, such as at least one DNA nucleoside or at least one 2' substituted modified nucleoside, such as, for example, 2'-O-alkyl-RNA, 2'-O-methyl-RNA, 2'-alkoxy-RNA, 2'-O-methoxyethyl-RNA (MOE), 2'-amino-DNA, 2'-Fluoro-RNA and 2'-F-ANA nucleoside(s). In some embodiments the mixed wing gapmer has one flank which comprises LNA nucleosides (e.g. 5' or 3') and the other flank (3' or 5' respectfully) comprises 2' substituted modified nucleoside(s). In some embodiments the LNA nucleoside(s) in an mixed wing gapmer are beta-D-oxy LNA nucleosides and/or 6'methyl beta-D-oxy LNA nucleosides (such as (S)cET nucleosides.

Conjugate

The term conjugate as used herein refers to an oligonucleotide which is covalently linked to a non-nucleotide moiety (conjugate moiety or region C or third region).

The term conjugate as used herein refers to an oligonucleotide which is covalently linked to a non-nucleotide moiety (conjugate moiety or region C or third region).

In some embodiments, the non-nucleotide moiety selected from the group consisting of a protein, such as an enzyme, an antibody or an antibody fragment or a peptide; a lipophilic moiety such as a lipid, a phospholipid, a sterol; a polymer, such as polyethyleneglycol or polypropylene glycol; a receptor ligand; a small molecule; a reporter molecule; and a non-nucleosidic carbohydrate.

Linkers

A linkage or linker is a connection between two atoms that links one chemical group or segment of interest to another chemical group or segment of interest via one or more covalent bonds. Conjugate moieties can be attached to the oligonucleotide directly or through a linking moiety (e.g. linker or tether). Linkers serve to covalently connect a third region, e.g. a conjugate moiety to an oligonucleotide (e.g. the termini of region A or C).

In some embodiments of the invention the conjugate or oligonucleotide conjugate of the invention may optionally, comprise a linker region which is positioned between the oligonucleotide and the conjugate moiety. In some embodiments, the linker between the conjugate and oligonucleotide is biocleavable.

Biocleavable linkers comprising or consisting of a physiologically labile bond that is cleavable under conditions normally encountered or analogous to those encountered within a mammalian body. Conditions under which physiologically labile linkers undergo chemical transformation (e.g., cleavage) include chemical conditions such as pH, temperature, oxidative or reductive conditions or agents, and salt concentration found in or analogous to those encountered in mammalian cells. Mammalian intracellular conditions also include the presence of enzymatic activity normally present in a mammalian cell such as from proteolytic enzymes or hydrolytic enzymes or nucleases. In one embodiment the biocleavable linker is susceptible to S1 nuclease cleavage. In a preferred embodiment the nuclease susceptible linker comprises between 1 and 10 nucleosides, such as 1, 2, 3, 4, 5, 6, 7, 8, 9 or 10 nucleosides, more preferably between 2 and 6 nucleosides and most preferably between 2 and 4 linked nucleosides comprising at least two consecutive phosphodiester linkages, such as at least 3 or 4 or 5 consecutive phosphodiester linkages. Preferably the nucleosides are DNA or RNA. Phosphodiester containing biocleavable linkers are described in more detail in WO 2014/076195 (hereby incorporated by reference), and may be referred to as region D herein.

Conjugates may also be linked to the oligonucleotide via non biocleavable linkers, or in some embodiments the conjugate may comprise a non-cleavable linker which is covalently attached to the biocleavable linker. Linkers that are not necessarily biocleavable but primarily serve to covalently connect a conjugate moiety to an oligonucleotide or biocleavable linker. Such linkers may comprise a chain structure or an oligomer of repeating units such as ethylene glycol, amino acid units or amino alkyl groups. In some embodiments the linker (region Y) is an amino alkyl, such as a $C_2$-$C_{36}$ amino alkyl group, including, for example $C_6$ to $C_{12}$ amino alkyl groups. In some embodiments the linker (region Y) is a $C_6$ amino alkyl group. Conjugate linker groups may be routinely attached to an oligonucleotide via use of an amino modified oligonucleotide, and an activated ester group on the conjugate group.

Treatment

The term 'treatment' as used herein refers to both treatment of an existing disease (e.g. a disease or disorder as herein referred to), or prevention of a disease, i.e. prophylaxis. It will therefore be recognized that treatment as referred to herein may, in some embodiments, be prophylactic.

DETAILED DESCRIPTION OF THE INVENTION

The Oligonucleotides of the Invention

The invention relates to oligonucleotides capable of inhibiting the expression of HTRA1. The modulation is may achieved by hybridizing to a target nucleic acid encoding HTRA1 or which is involved in the regulation of HTRA1. The target nucleic acid may be a mammalian HTRA 1 sequence, such as a sequence selected from the group consisting of SEQ ID 1, 2, 3 or 4.

The oligonucleotide of the invention is an antisense oligonucleotide which targets HTRA1, such as a mammalian HTRA1.

In some embodiments the antisense oligonucleotide of the invention is capable of modulating the expression of the target by inhibiting or down-regulating it. Preferably, such modulation produces an inhibition of expression of at least 20% compared to the normal expression level of the target, such as at least 30%, 40%, 50%, 60%, 70%, 80%, or 90% inhibition compared to the normal expression level of the target. In some embodiments compounds of the invention may be capable of inhibiting expression levels of HTRA1 mRNA by at least 60% or 70% in vitro using ARPE-19 cells. In some embodiments compounds of the invention may be capable of inhibiting expression levels of HTRA1 mRNA by at least 60% or 70% in vitro using ARPE-19 cells. In some embodiments compounds of the invention may be capable of inhibiting expression levels of HTRA1 protein by at least 50% in vitro using ARPE-19 cells. Suitably, the examples provide assays which may be used to measure HTRA1 RNA or protein inhibition. The target modulation is triggered by the hybridization between a contiguous nucleotide sequence of the oligonucleotide and the target nucleic acid. In some embodiments the oligonucleotide of the invention comprises mismatches between the oligonucleotide and the target nucleic acid. Despite mismatches hybridization to the target nucleic acid may still be sufficient to show a desired modulation of HTRA1 expression. Reduced binding affinity resulting from mismatches may advantageously be compensated by increased number of nucleotides in the oligonucleotide and/or an increased number of modified nucleosides capable of increasing the binding affinity to the target, such as 2' modified nucleosides, including LNA, present within the oligonucleotide sequence.

An aspect of the present invention relates to an antisense oligonucleotide which comprises a contiguous nucleotide region of 10 to 30 nucleotides in length with at least 90% complementarity to HTRA1 target sequence, such as fully complementary to an HTRA1 target sequence, e.g. a nucleic acid selected from the group consisting SEQ ID NO 1, 2, 3 & 4.

In some embodiments, the oligonucleotide comprises a contiguous sequence which is at least 90% complementary, such as at least 91%, such as at least 92%, such as at least 93%, such as at least 94%, such as at least 95%, such as at least 96%, such as at least 97%, such as at least 98%, or 100% complementary with a region of the target nucleic acid.

In some embodiments, the oligonucleotide of the invention, or a contiguous nucleotide sequence thereof is fully complementary (100% complementary) to a region of the target nucleic acid, or in some embodiments may comprise one or two mismatches between the oligonucleotide and the target nucleic acid.

In some embodiments the oligonucleotide, or a contiguous nucleotide sequence of at least 12 nucleotides thereof, is at least 90% complementary, such as fully (or 100%) complementary to a region of a sequence selected from the group consisting of SEQ ID NO 119, 120, 121, 122 or 123.

In some embodiments the oligonucleotide, or a contiguous nucleotide sequence of at least 12 nucleotides thereof, is at least 90% complementary, such as fully (or 100%) complementary to a region of a sequence selected from the group consisting of SEQ ID NOs 124-230.

In some embodiments the oligonucleotide, or a contiguous nucleotide sequence of at least 12 nucleotides thereof, is at least 90% complementary, such as fully (or 100%) complementary to a region of SEQ ID NO 186.

In some embodiments the oligonucleotide, or a contiguous nucleotide sequence of at least 12 nucleotides thereof, is at least 90% complementary, such as fully (or 100%) complementary to a region of SEQ ID NO 192.

In some embodiments the oligonucleotide, or a contiguous nucleotide sequence of at least 12 nucleotides thereof, is at least 90% complementary, such as fully (or 100%) complementary to a region of SEQ ID NO 205.

In some embodiments the oligonucleotide, or a contiguous nucleotide sequence of at least 13 nucleotides thereof, is at least 90% complementary, such as fully (or 100%) complementary to a region of SEQ ID NO 186.

In some embodiments the oligonucleotide, or a contiguous nucleotide sequence of at least 13 nucleotides thereof, is at least 90% complementary, such as fully (or 100%) complementary to a region of SEQ ID NO 192.

In some embodiments the oligonucleotide, or a contiguous nucleotide sequence of at least 13 nucleotides thereof, is at least 90% complementary, such as fully (or 100%) complementary to a region of SEQ ID NO 205.

In some embodiments the oligonucleotide, or a contiguous nucleotide sequence of at least 14 nucleotides thereof, is fully (or 100%) complementary to a sequence selected from the group consisting of SEQ ID NO 113, 114, 115, 116, 117 and 231.

In some embodiments the oligonucleotide, or a contiguous nucleotide sequence of at least 14 nucleotides thereof, is at least 90% complementary, such as fully (or 100%) complementary to a region of SEQ ID NO 186.

In some embodiments the oligonucleotide, or a contiguous nucleotide sequence of at least 14 nucleotides thereof, is at least 90% complementary, such as fully (or 100%) complementary to a region of SEQ ID NO 192.

In some embodiments the oligonucleotide, or a contiguous nucleotide sequence of at least 14 nucleotides thereof, is at least 90% complementary, such as fully (or 100%) complementary to a region of SEQ ID NO 205.

In some embodiments the oligonucleotide, or a contiguous nucleotide sequence of at least 15 nucleotides thereof, is at least 90% complementary, such as fully (or 100%) complementary to a region of SEQ ID NO 186.

In some embodiments the oligonucleotide, or a contiguous nucleotide sequence of at least 15 nucleotides thereof, is at least 90% complementary, such as fully (or 100%) complementary to a region of SEQ ID NO 192.

In some embodiments the oligonucleotide, or a contiguous nucleotide sequence of at least 15 nucleotides thereof, is at least 90% complementary, such as fully (or 100%) complementary to a region of SEQ ID NO 205.

In some embodiments the oligonucleotide, or a contiguous nucleotide sequence of at least 16 nucleotides thereof, is fully (or 100%) complementary to a sequence selected from the group consisting of SEQ ID NO SEQ ID NO 113, 114, 115, 116, 117 and 231.

In some embodiments the oligonucleotide, or a contiguous nucleotide sequence of at least 16 nucleotides thereof, is at least 90% complementary, such as fully (or 100%) complementary to a region of SEQ ID NO 186.

In some embodiments the oligonucleotide, or a contiguous nucleotide sequence of at least 16, such as 16, 17 or 18 nucleotides thereof, is at least 90% complementary, such as fully (or 100%) complementary to a region of SEQ ID NO 192.

In some embodiments the oligonucleotide, or a contiguous nucleotide sequence of at least 16 nucleotides thereof, is at least 90% complementary, such as fully (or 100%) complementary to a region of SEQ ID NO 205.

In some embodiments the oligonucleotide, or contiguous nucleotide region thereof is fully (or 100%) complementary to a sequence selected from the group consisting of a sequence selected from the group consisting of SEQ ID NO SEQ ID NO 113, 114, 115, 116, 117 and 231.

In some embodiments the oligonucleotide, or contiguous nucleotide region thereof is fully (or 100%) complementary to a sequence selected from the group consisting of a sequence selected from the group consisting of SEQ ID NO 124-230.

In some embodiments the oligonucleotide, or contiguous nucleotide region thereof is fully (or 100%) complementary to SEQ ID NO 186.

In some embodiments the oligonucleotide, or contiguous nucleotide region thereof is fully (or 100%) complementary to SEQ ID NO 192.

In some embodiments the oligonucleotide, or contiguous nucleotide region thereof is fully (or 100%) complementary to SEQ ID NO 205.

It is understood that the oligonucleotide motif sequences can be modified to for example increase nuclease resistance and/or binding affinity to the target nucleic acid. Modifications are described in the definitions and in the "Oligonucleotide design" section.

In some embodiments, the oligonucleotide of the invention, or contiguous nucleotide region thereof is fully complementary (100% complementary) to a region of the target nucleic acid, or in some embodiments may comprise one or two mismatches between the oligonucleotide and the target nucleic acid. In some embodiments the oligonucleotide, or contiguous nucleotide sequence of at least 12 nucleotides thereof, is at least 90% complementary, such as fully (or 100%) complementary to the target nucleic acid sequence.

In some embodiments the oligonucleotide, or a contiguous nucleotide sequence of at least 12 nucleotides thereof, has 100% identity to a sequence selected from the group consisting of SEQ ID NOs 5-111.

In some embodiments the oligonucleotide, or a contiguous nucleotide sequence of at least 14 nucleotides thereof, has 100% identity to a sequence selected from the group consisting of SEQ ID NOs 5-111

In some embodiments the oligonucleotide, or contiguous nucleotide sequence of at least 16 nucleotides thereof, has 100% identity to a sequence selected from the group consisting of SEQ ID NOs 5-111

In some embodiments the oligonucleotide, or contiguous nucleotide region thereof, comprises or consists of a sequence selected from SEQ ID NOs 5-111.

In some embodiments the oligonucleotide of the invention is selected from the following group (Note the target subsequence is the reverse complement of the oligonucleotide motif):

| SEQ ID NO | Motif | Compound Design | Target subsequence SEQ ID | Target subsequence |
|---|---|---|---|---|
| 5 | agttaaaggaggagacaaat | AGTTaaaggaggagacAAAT | 124 | atttgtctcctcctttaact |
| 6 | tcagttaaaggaggagacaa | TCAgttaaaggaggagaCAA | 125 | ttgtctcctcctttaactga |
| 7 | ctcagttaaaggaggagaca | CTCagttaaaggaggagaCA | 126 | tgtctcctcctttaactgag |
| 8 | ctcagttaaaggaggagac | CTCagttaaaggaggaGAC | 127 | gtctcctcctttaactgag |
| 9 | actcagttaaaggaggagac | ACTCagttaaaggaggagAC | 128 | gtctcctcctttaactgagt |
| 10 | actcagttaaaggaggaga | ACTCagttaaaggaggaGA | 129 | tctcctcctttaactgagt |

-continued

| SEQ ID NO | Motif | Compound Design | Target subsequence SEQ ID | Target subsequence |
|---|---|---|---|---|
| 11 | actcagttaaaggaggag | ACtcagttaaaggaGGAG | 130 | ctcctcctttaactgagt |
| 12 | gatgactcagttaaaggagg | GAtgactcagttaaaggAGG | 131 | cctcctttaactgagtcatc |
| 13 | atgatgactcagttaaagga | ATGAtgactcagttaaagGA | 132 | tcctttaactgagtcatcat |
| 14 | tgatgactcagttaaagg | TGAtgactcagttaAAGG | 133 | cctttaactgagtcatca |
| 15 | gatgatgactcagttaaagg | GAtgatgactcagttaAAGG | 134 | cctttaactgagtcatcatc |
| 16 | gatgatgactcagttaaag | GATgatgactcagttaAAG | 135 | ctttaactgagtcatcatc |
| 17 | tatcgactgcattagttgg | TATcgactgcattagttGG | 136 | ccaactaatgcagtcgata |
| 18 | gtatcgactgcattagttgg | Gtatcgactgcattagttgg | 137 | ccaactaatgcagtcgatac |
| 19 | tcgactgcattagttg | TCGactgcattagTTG | 138 | caactaatgcagtcga |
| 19 | tcgactgcattagttg | TCGactgcattagtTG | 138 | caactaatgcagtcga |
| 19 | tcgactgcattagttg | TCGActgcattaGTTG | 138 | caactaatgcagtcga |
| 20 | tatcgactgcattagttg | TAtcgactgcattaGTTG | 139 | caactaatgcagtcgata |
| 21 | gtatcgactgcattagttg | GTAtcgactgcattagtTG | 140 | caactaatgcagtcgatac |
| 22 | tgtatcgactgcattagttg | TGtatcgactgcattagtTG | 141 | caactaatgcagtcgataca |
| 23 | atcgactgcattagtt | ATCgactgcattaGTT | 142 | aactaatgcagtcgat |
| 23 | atcgactgcattagtt | ATCGactgcattAGTT | 142 | aactaatgcagtcgat |
| 23 | atcgactgcattagtt | ATCGactgcattaGTT | 142 | aactaatgcagtcgat |
| 24 | tatcgactgcattagtt | TATCgactgcattaGTT | 143 | aactaatgcagtcgata |
| 25 | gtatcgactgcattagtt | GTATcgactgcattagTT | 144 | aactaatgcagtcgatac |
| 26 | tgtatcgactgcattagtt | TGTatcgactgcattagTT | 145 | aactaatgcagtcgataca |
| 27 | ttgtatcgactgcattagtt | TTGtatcgactgcattagTT | 146 | aactaatgcagtcgatacaa |
| 28 | tatcgactgcattagt | TATcgactgcattaGT | 147 | actaatgcagtcgata |
| 28 | tatcgactgcattagt | TATCgactgcatTAGT | 147 | actaatgcagtcgata |
| 29 | gtatcgactgcattagt | GTATcgactgcattaGT | 148 | actaatgcagtcgatac |
| 30 | tgtatcgactgcattagt | TGTatcgactgcattaGT | 149 | actaatgcagtcgataca |
| 31 | gtatcgactgcattag | GTAtcgactgcatTAG | 150 | ctaatgcagtcgatac |
| 31 | gtatcgactgcattag | GTAtcgactgcattAG | 150 | ctaatgcagtcgatac |
| 31 | gtatcgactgcattag | GTATcgactgcaTTAG | 150 | ctaatgcagtcgatac |
| 32 | tgtatcgactgcattag | TGtatcgactgcaTTAG | 151 | ctaatgcagtcgataca |
| 33 | ttgtatcgactgcattag | TTGtatcgactgcatTAG | 152 | ctaatgcagtcgatacaa |
| 34 | attgtatcgactgcattag | ATtgtatcgactgcaTTAG | 153 | ctaatgcagtcgatacaat |
| 35 | tgtatcgactgcatta | TGTatcgactgcaTTA | 154 | taatgcagtcgataca |
| 35 | tgtatcgactgcatta | TGTAtcgactgcATTA | 154 | taatgcagtcgataca |
| 36 | attgtatcgactgcatta | ATTGtatcgactgcaTTA | 155 | taatgcagtcgatacaat |
| 37 | ttgtatcgactgcatt | TTGtatcgactgcaTT | 156 | aatgcagtcgatacaa |
| 37 | ttgtatcgactgcatt | TTGtatcgactgCATT | 156 | aatgcagtcgatacaa |
| 38 | attgtatcgactgcat | ATTgtatcgactgCAT | 157 | atgcagtcgatacaat |
| 38 | attgtatcgactgcat | ATTgtatcgactgcAT | 157 | atgcagtcgatacaat |

-continued

| SEQ ID NO | Motif | Compound Design | Target subsequence SEQ ID | Target subsequence |
|---|---|---|---|---|
| 38 | attgtatcgactgcat | ATTGtatcgactGCAT | 157 | atgcagtcgatacaat |
| 39 | acgcattgtatcgact | ACGcattgtatcgACT | 158 | agtcgatacaatgcgt |
| 39 | acgcattgtatcgact | ACGCattgtatcGACT | 158 | agtcgatacaatgcgt |
| 40 | tacgcattgtatcgac | TACgcattgtatcGAC | 159 | gtcgatacaatgcgta |
| 40 | tacgcattgtatcgac | TACGcattgtatCGAC | 159 | gtcgatacaatgcgta |
| 41 | ctacgcattgtatcgac | CTacgcattgtatCGAC | 160 | gtcgatacaatgcgtag |
| 42 | tctacgcattgtatcgac | TCTAcgcattgtatcgAC | 161 | gtcgatacaatgcgtaga |
| 43 | atctacgcattgtatcgac | ATCtacgcattgtatcgAC | 162 | gtcgatacaatgcgtagat |
| 44 | tatctacgcattgtatcgac | TAtctacgcattgtatcGAC | 163 | gtcgatacaatgcgtagata |
| 45 | ctacgcattgtatcga | CTAcgcattgtatCGA | 164 | tcgatacaatgcgtag |
| 45 | ctacgcattgtatcga | CTACgcattgtaTCGA | 164 | tcgatacaatgcgtag |
| 46 | tatctacgcattgtatcga | TAtctacgcattgtatCGA | 165 | tcgatacaatgcgtagata |
| 47 | tctacgcattgtatcg | TCTacgcattgtaTCG | 166 | cgatacaatgcgtaga |
| 47 | tctacgcattgtatcg | TCTacgcattgtatCG | 166 | cgatacaatgcgtaga |
| 47 | tctacgcattgtatcg | TCTAcgcattgtATCG | 166 | cgatacaatgcgtaga |
| 48 | atctacgcattgtatcg | ATCTacgcattgtaTCG | 167 | cgatacaatgcgtagat |
| 49 | tatctacgcattgtatcg | TATCtacgcattgtatCG | 168 | cgatacaatgcgtagata |
| 50 | tctatctacgcattgtatcg | TCtatctacgcattgtatCG | 169 | cgatacaatgcgtagataga |
| 51 | atctacgcattgtatc | ATCtacgcattgtATC | 170 | gatacaatgcgtagat |
| 51 | atctacgcattgtatc | ATCTacgcattgTATC | 170 | gatacaatgcgtagat |
| 52 | tatctacgcattgtatc | TATctacgcattgTATC | 171 | gatacaatgcgtagata |
| 53 | ctatctacgcattgtatc | CTatctacgcattgTATC | 172 | gatacaatgcgtagatag |
| 54 | tctatctacgcattgtatc | TCTatctacgcattgtaTC | 173 | gatacaatgcgtagataga |
| 55 | ttctatctacgcattgtatc | TTCtatctacgcattgtaTC | 174 | gatacaatgcgtagatagaa |
| 56 | tatctacgcattgtat | TATctacgcattgTAT | 175 | atacaatgcgtagata |
| 56 | tatctacgcattgtat | TATCtacgcattGTAT | 175 | atacaatgcgtagata |
| 57 | ctatctacgcattgtat | CTAtctacgcattGTAT | 176 | atacaatgcgtagatag |
| 58 | tctatctacgcattgtat | TCtatctacgcattGTAT | 177 | atacaatgcgtagataga |
| 59 | ttctatctacgcattgtat | TTCtatctacgcattgTAT | 178 | atacaatgcgtagatagaa |
| 60 | ctatctacgcattgta | CTAtctacgcattGTA | 179 | tacaatgcgtagatag |
| 60 | ctatctacgcattgta | CTATctacgcatTGTA | 179 | tacaatgcgtagatag |
| 61 | tctatctacgcattgta | TCTatctacgcattGTA | 180 | tacaatgcgtagataga |
| 62 | ttctatctacgcattgta | TTCtatctacgcattGTA | 181 | tacaatgcgtagatagaa |
| 63 | ttctatctacgcattgt | TTCtatctacgcatTGT | 182 | acaatgcgtagatagaa |
| 64 | tcttctatctacgcattgt | TCttctatctacgcattGT | 183 | acaatgcgtagatagaaga |
| 65 | ttcttctatctacgcattgt | Ttcttctatctacgcattgt | 184 | acaatgcgtagatagaagaa |
| 66 | ttcttctatctacgcattg | TTCttctatctacgcatTG | 185 | caatgcgtagatagaagaa |
| 67 | ttctatctacgcattg | TTCtatctacgcaTTG | 186 | caatgcgtagatagaa |

| SEQ ID NO | Motif | Compound Design | Target subsequence SEQ ID | Target subsequence |
|---|---|---|---|---|
| 68 | cttctatctacgcatt | CTTCtatctacgCATT | 187 | aatgcgtagatagaag |
| 69 | tcttctatctacgcatt | TCTtctatctacgCATT | 188 | aatgcgtagatagaaga |
| 70 | ttcttctatctacgcatt | TTCTtctatctacgATT | 189 | aatgcgtagatagaagaa |
| 71 | tcttctatctacgcat | TCTTctatctacgCAT | 190 | atgcgtagatagaaga |
| 72 | ttcttctatctacgcat | TTCTtctatctacgCAT | 191 | atgcgtagatagaagaa |
| 73 | cttcttctatctacgcat | CTTCttctatctacgcAT | 192 | atgcgtagatagaagaag |
| 74 | ttcttctatctacgca | TTCttctatctacGCA | 193 | tgcgtagatagaagaa |
| 75 | cttcttctatctacgca | CTTCttctatctacgCA | 194 | tgcgtagatagaagaag |
| 76 | gcttcttctatctacgca | GcttcttctatctacgCA | 195 | tgcgtagatagaagaagc |
| 77 | cttcttctatctacgc | CTtcttctatctACGC | 196 | gcgtagatagaagaag |
| 78 | gcttcttctatctacg | GCTtcttctatctACG | 197 | cgtagatagaagaagc |
| 79 | cgtggggcttcttcta | CGTggggcttcttCTA | 198 | tagaagaagccccacg |
| 80 | tgacttggagaaaagcacaa | TGacttggagaaaagcacAA | 199 | ttgtgcttttctccaagtca |
| 81 | ctgacttggagaaaagcac | CtgacttggagaaaagcAC | 200 | gtgcttttctccaagtcag |
| 82 | agagtcatcgtgctcc | AGAgtcatcgtgcTCC | 201 | ggagcacgatgactct |
| 83 | aagtactttaatagctcaaa | AAGTactttaatagctCAAA | 202 | tttgagctattaaagtactt |
| 84 | aagtactttaatagctcaa | AAGTactttaatagcTCAA | 203 | ttgagctattaaagtactt |
| 85 | gaagtactttaatagctcaa | GAAGtactttaatagctCAA | 204 | ttgagctattaaagtacttc |
| 86 | tactttaatagctcaa | TACTttaatagcTCAA | 205 | ttgagctattaaagta |
| 87 | aagtactttaatagctca | AAGTactttaatagcTCA | 206 | tgagctattaaagtactt |
| 88 | gaagtactttaatagctca | GAAGtactttaatagcTCA | 207 | tgagctattaaagtacttc |
| 89 | agaagtactttaatagctc | AGAagtactttaatagCTC | 208 | gagctattaaagtacttct |
| 90 | aagaagtactttaatagctc | AAGAagtactttaatagCTC | 209 | gagctattaaagtacttctt |
| 91 | gaagtactttaatagct | GAAGtactttaatAGCT | 210 | agctattaaagtacttc |
| 92 | taagaagtactttaatagct | TAAgaagtactttaatAGCT | 211 | agctattaaagtacttctta |
| 93 | agaagtactttaatagc | AGAAgtactttaaTAGC | 212 | gctattaaagtacttct |
| 94 | taagaagtactttaatagc | TAAGaagtactttaaTAGC | 213 | gctattaaagtacttctta |
| 95 | gtaagaagtactttaatagc | GTaagaagtactttaaTAGC | 214 | gctattaaagtacttcttac |
| 96 | taagaagtactttaatag | TAAGaagtactttaATAG | 215 | ctattaaagtacttctta |
| 97 | gtaagaagtactttaatag | GTAAgaagtactttaATAG | 216 | ctattaaagtacttcttac |
| 98 | tgtaagaagtactttaatag | TGTAagaagtactttaATAG | 217 | ctattaaagtacttcttaca |
| 99 | aatgtgtaagaagtacttt | AATGtgtaagaagtaCTTT | 218 | aaagtacttcttacacatt |
| 100 | caatgtgtaagaagtacttt | CAATgtgtaagaagtaCTTT | 219 | aaagtacttcttacacattg |
| 101 | atgtgtaagaagtactt | ATGTgtaagaagtACTT | 220 | aagtacttcttacacat |
| 102 | aatgtgtaagaagtactt | AATGtgtaagaagtACTT | 221 | aagtacttcttacacatt |
| 103 | caatgtgtaagaagtactt | CAATgtgtaagaagtACTT | 222 | aagtacttcttacacattg |
| 104 | gcaatgtgtaagaagtactt | GCaatgtgtaagaagtACTT | 223 | aagtacttcttacacattgc |
| 105 | atgtgtaagaagtact | ATGtgtaagaagtACT | 224 | agtacttcttacacat |

| SEQ ID NO | Motif | Compound Design | Target subsequence SEQ ID | Target subsequence |
|---|---|---|---|---|
| 105 | atgtgtaagaagtact | ATGTgtaagaagTACT | 224 | agtacttcttacacat |
| 106 | gcaatgtgtaagaagtact | GCAAtgtgtaagaagtACT | 225 | agtacttcttacacattgc |
| 107 | aatgtgtaagaagtac | AATGtgtaagaaGTAC | 226 | gtacttcttacacatt |
| 107 | aatgtgtaagaagtac | AATgtgtaagaaGTAC | 226 | gtacttcttacacatt |
| 108 | caatgtgtaagaagtac | CAATgtgtaagaaGTAC | 227 | gtacttcttacacattg |
| 109 | gcaatgtgtaagaagtac | GCAatgtgtaagaaGTAC | 228 | gtacttcttacacattgc |
| 110 | caatgtgtaagaagta | CAAtgtgtaagaaGTA | 229 | tacttcttacacattg |
| 110 | caatgtgtaagaagta | CAAtgtgtaagaAGTA | 229 | tacttcttacacattg |
| 110 | caatgtgtaagaagta | CAATgtgtaagaAGTA | 229 | tacttcttacacattg |
| 111 | gcaatgtgtaagaagta | GCAatgtgtaagaAGTA | 230 | tacttcttacacattgc | or conjugate thereof; wherein for the column entitled compound design, capital letters are LNA nucleosides, lower case letters are DNA nucleosides, cytosine nucleosides are optionally 5 methyl cytosine, and internucleoside linkages are at least 80%, such as at least 90% or 100% modified internucleoside linkages, such as phosphorothioate internucleoside linkages. In some embodiments all internucleoside linkages of the compounds in the compound design column in the above table are phosphorothioate internucleoside linkages. The motif and target subsequence sequences are nucleobase sequences.

The invention provides the following oligonucleotides:

| CMP ID NO | Compound |
|---|---|
| 5.1 | AGTTaaaggaggagacAAAT |
| 6.1 | TCAgttaaaggaggagaCAA |
| 7.1 | CTCagttaaaggaggagaCA |
| 8.1 | CTCagttaaaggaggaGAC |
| 9.1 | ACTCagttaaaggaggagAC |
| 10.1 | ACTCagttaaaggaggaGA |
| 11.1 | ACtcagttaaaggaGGAG |
| 12.1 | GAtgactcagttaaaggAGG |
| 13.1 | ATGAtgactcagttaaagGA |
| 14.1 | TGAtgactcagttaAAGG |
| 15.1 | GAtgatgactcagttaAAGG |
| 16.1 | GATGatgactcagttaAAG |
| 17.1 | TAT$^m$cgactgcattagttGG |
| 18.1 | Gtat$^m$cgactgcattagttGG |
| 19.1 | TCGactgcattagTTG |
| 19.2 | TCGactgcattagtTG |
| 19.3 | TCGActgcattaGTTG |
| 20.1 | TAt$^m$cgactgcattaGTTG |
| 21.1 | GTAt$^m$cgactgcattagtTG |
| 22.1 | TGtat$^m$cgactgcattagtTG |
| 23.1 | ATCgactgcattaGTT |
| 23.2 | ATCGactgcattAGTT |
| 23.3 | ATCGactgcattaGTT |
| 24.1 | TATCgactgcattaGTT |
| 25.1 | GTAT$^m$cgactgcattagTT |
| 26.1 | TGTat$^m$cgactgcattagTT |
| 27.1 | TTGtat$^m$cgactgcattagTT |
| 28.1 | TAT$^m$cgactgcattaGT |
| 28.2 | TATCgactgcatTAGT |
| 29.1 | GTAT$^m$cgactgcattaGT |
| 30.1 | TGTat$^m$cgactgcattaGT |
| 31.1 | GTAt$^m$cgactgcatTAG |
| 31.2 | GTAT$^m$cgactgcattAG |
| 31.3 | GTAT$^m$cgactgcaTTAG |
| 32.1 | TGtat$^m$cgactgcaTTAG |
| 33.1 | TTGtat$^m$cgactgcatTAG |
| 34.1 | ATtgtat$^m$cgactgcaTTAG |
| 35.1 | TGTat$^m$cgactgcaTTA |
| 35.2 | TGTAt$^m$cgactgcATTA |
| 36.1 | ATTGtat$^m$cgactgcaTTA |
| 37.1 | TTGtat$^m$cgactgcaTT |
| 37.2 | TTGtat$^m$cgactgCATT |
| 38.1 | ATTgtat$^m$cgactgCAT |

-continued

| CMP ID NO | Compound |
|---|---|
| 38.2 | ATTgtat$^m$cgactgcAT |
| 38.3 | ATTGtat$^m$cgactGCAT |
| 39.1 | ACGcattgtat$^m$cgACT |
| 39.2 | ACGCattgtat$^m$cGACT |
| 40.1 | TACgcattgtat$^m$cGAC |
| 40.2 | TACGcattgtatCGAC |
| 41.1 | CTa$^m$cgcattgtatCGAC |
| 42.1 | TCTA$^m$cgcattgtat$^m$cgAC |
| 43.1 | ATCta$^m$cgcattgtat$^m$cgAC |
| 44.1 | TAtcta$^m$cgcattgtatcGAC |
| 45.1 | CTA$^m$cgcattgtatCGA |
| 45.2 | CTACgcattgtaTCGA |
| 46.1 | TAtcta$^m$cgcattgtatCGA |
| 47.1 | TCTa$^m$cgcattgtaTCG |
| 47.2 | TCTa$^m$cgcattgtatCG |
| 47.3 | TCTA$^m$cgcattgtATCG |
| 48.1 | ATCta$^m$cgcattgtaTCG |
| 49.1 | TATCta$^m$cgcattgtatCG |
| 50.1 | TCtatcta$^m$cgcattgtatCG |
| 51.1 | ATCta$^m$cgcattgtATC |
| 51.2 | ATCta$^m$cgcattgTATC |
| 52.1 | TATcta$^m$cgcattgTATC |
| 53.1 | CTatcta$^m$cgcattgTATC |
| 54.1 | TCTatcta$^m$cgcattgtaTC |
| 55.1 | TTCtatcta$^m$cgcattgtaTC |
| 56.1 | TATcta$^m$cgcattgTAT |
| 56.2 | TATCta$^m$cgcattGTAT |
| 57.1 | CTAtcta$^m$cgcattGTAT |
| 58.1 | TCTatcta$^m$cgcattGTAT |
| 59.1 | TTCtatcta$^m$cgcattgTAT |
| 60.1 | CTAtcta$^m$cgcattGTA |
| 60.2 | CTATcta$^m$cgcatTGTA |
| 61.1 | TCTatcta$^m$cgcattGTA |
| 62.1 | TTCtatcta$^m$cgcattGTA |
| 63.1 | TTCtatcta$^m$cgcatTGT |
| 64.1 | TCttctatcta$^m$cgcattGT |
| 65.1 | Ttcttctatcta$^m$cgcattGT |
| 66.1 | TTCttctatcta$^m$cgcatTG |

-continued

| CMP ID NO | Compound |
|---|---|
| 67.1 | TTCtatcta$^m$cgcaTTG |
| 68.1 | CTTCtatcta$^m$cgCATT |
| 69.1 | TCTtctatcta$^m$cgCATT |
| 70.1 | TTCTtctatcta$^m$cgcATT |
| 71.1 | TCTTctatcta$^m$cgCAT |
| 72.1 | TTCTtctatcta$^m$cgCAT |
| 73.1 | CTTCttctatcta$^m$cgcAT |
| 74.1 | TTCttctatctacGCA |
| 75.1 | CTTCttctatcta$^m$cgCA |
| 76.1 | Gcttcttctatcta$^m$cgCA |
| 77.1 | CTtcttctatctACGC |
| 78.1 | GCTtcttctatctACG |
| 79.1 | CGTggggcttcttCTA |
| 80.1 | TGacttggagaaaagcacAA |
| 81.1 | CtgacttggagaaaagcAC |
| 82.1 | AGAgtcat$^m$cgtgcTCC |
| 83.1 | AAGTactttaatagctCAAA |
| 84.1 | AAGTactttaatagcTCAA |
| 85.1 | GAAGtactttaatagctCAA |
| 86.1 | TACTttaatagcTCAA |
| 87.1 | AAGTactttaatagcTCA |
| 88.1 | GAAGtactttaatagcTCA |
| 89.1 | AGAAgtactttaatagCTC |
| 90.1 | AAGAagtactttaatagCTC |
| 91.1 | GAAGtactttaatAGCT |
| 92.1 | TAAgaagtactttaatAGCT |
| 93.1 | AGAAgtactttaaTAGC |
| 94.1 | TAAGaagtactttaaTAGC |
| 95.1 | GTaagaagtactttaaTAGC |
| 96.1 | TAAGaagtactttaATAG |
| 97.1 | GTAAgaagtactttaATAG |
| 98.1 | TGTAagaagtactttaATAG |
| 99.1 | AATgtgtaagaagtaCTTT |
| 100.1 | CAATgtgtaagaagtaCTTT |
| 101.1 | ATGTgtaagaagtACTT |
| 102.1 | AATGtgtaagaagtACTT |
| 103.1 | CAATgtgtaagaagtACTT |
| 104.1 | GCaatgtgtaagaagtACTT |
| 105.1 | ATGtgtaagaagtACT |

-continued

| CMP ID NO | Compound |
|---|---|
| 105.2 | ATGTgtaagaagTACT |
| 106.1 | GCAAtgtgtaagaagtACT |
| 107.1 | AATGtgtaagaaGTAC |
| 107.2 | AATgtgtaagaaGTAC |
| 108.1 | CAATgtgtaagaaGTAC |
| 109.1 | GCAatgtgtaagaaGTAC |
| 110.1 | CAAtgtgtaagaaGTA |
| 110.2 | CAAtgtgtaagaAGTA |
| 110.3 | CAATgtgtaagaAGTA |
| 111.1 | GCAatgtgtaagaAGTA | or a conjugate thereof; wherein in the compounds of the above table, capital letters represent beta-D-oxy LNA nucleosides, all LNA cytosines are 5-methyl cytosine (as indicated by the superscript m), lower case letters represent DNA nucleosides, superscript m before a lower case c represents a 5 methyl cytosine DNA nucleoside. All internucleoside linkages are phosphorothioate internucleoside linkages.

Oligonucleotide Design

Oligonucleotide design refers to the pattern of nucleoside sugar modifications in the oligonucleotide sequence. The oligonucleotides of the invention comprise sugar-modified nucleosides and may also comprise DNA or RNA nucleosides. In some embodiments, the oligonucleotide comprises sugar-modified nucleosides and DNA nucleosides. Incorporation of modified nucleosides into the oligonucleotide of the invention may enhance the affinity of the oligonucleotide for the target nucleic acid. In that case, the modified nucleosides can be referred to as affinity enhancing modified nucleotides.

In an embodiment, the oligonucleotide comprises at least 1 modified nucleoside, such as at least 2, at least 3, at least 4, at least 5, at least 6, at least 7, at least 8, at least 9, at least 10, at least 11, at least 12, at least 13, at least 14, at least 15 or at least 16 modified nucleosides. In an embodiment the oligonucleotide comprises from 1 to 10 modified nucleosides, such as from 2 to 9 modified nucleosides, such as from 3 to 8 modified nucleosides, such as from 4 to 7 modified nucleosides, such as 6 or 7 modified nucleosides. In an embodiment, the oligonucleotide of the invention may comprise modifications, which are independently selected from these three types of modifications (modified sugar, modified nucleobase and modified internucleoside linkage) or a combination thereof. Preferably the oligonucleotide comprises one or more sugar modified nucleosides, such as 2' sugar modified nucleosides. Preferably the oligonucleotide of the invention comprise the one or more 2' sugar modified nucleoside independently selected from the group consisting of 2'-O-alkyl-RNA, 2'-O-methyl-RNA, 2'-alkoxy-RNA, 2'-O-methoxyethyl-RNA, 2'-amino-DNA, 2'-fluoro-DNA, arabino nucleic acid (ANA), 2'-fluoro-ANA and LNA nucleosides. Even more preferably the one or more modified nucleoside is LNA.

In some embodiments, at least 1 of the modified nucleosides is a locked nucleic acid (LNA), such as at least 2, such as at least 3, at least 4, at least 5, at least 6, at least 7, or at least 8 of the modified nucleosides are LNA. In a still further embodiment all the modified nucleosides are LNA.

In a further embodiment the oligonucleotide comprises at least one modified internucleoside linkage. In a preferred embodiment the the internucleoside linkages within the contiguous nucleotide sequence are phosphorothioate or boranophosphate internucleoside linkages. In some embodiments all the internucleotide linkages in the contiguous sequence of the oligonucleotide are phosphorothioate linkages.

In some embodiments, the oligonucleotide of the invention comprise at least one modified nucleoside which is a 2'-MOE-RNA, such as 2, 3, 4, 5, 6, 7, 8, 9 or 10 2'-MOE-RNA nucleoside units. In some embodiments, at least one of said modified nucleoside is 2'-fluoro DNA, such as 2, 3, 4, 5, 6, 7, 8, 9 or 10 2'-fluoro-DNA nucleoside units.

In some embodiments, the oligonucleotide of the invention comprises at least one LNA unit, such as 1, 2, 3, 4, 5, 6, 7, or 8 LNA units, such as from 2 to 6 LNA units, such as from 3 to 7 LNA units, 4 to 8 LNA units or 3, 4, 5, 6 or 7 LNA units. In some embodiments, all the modified nucleosides are LNA nucleosides. In some embodiments, all LNA cytosine units are 5-methyl-cytosine. In some embodiments the oligonucleotide or contiguous nucleotide region thereof has at least 1 LNA unit at the 5' end and at least 2 LNA units at the 3' end of the nucleotide sequence. In some embodiments all cytosine nucleobases present in the oligonucleotide of the invention are 5-methyl-cytosine.

In some embodiments, the oligonucleotide of the invention comprises at least one LNA unit and at least one 2' substituted modified nucleoside.

In some embodiments of the invention, the oligonucleotide comprise both 2' sugar modified nucleosides and DNA units.

In an embodiment of the invention the oligonucleotide of the invention is capable of recruiting RNase H.

In some embodiments, the oligonucleotide of the invention or contiguous nucleotide region thereof is a gapmers oligonucleotide.

Gapmer Design

In some embodiments the oligonucleotide of the invention, or contiguous nucleotide region thereof, has a gapmer design or structure also referred herein merely as "Gapmer". In a gapmer structure the oligonucleotide comprises at least three distinct structural regions a 5'-flank, a gap and a 3'-flank, F-G-F' in '5->3' orientation. In this design, flanking regions F and F' (also termed wing regions) comprise at least one sugar modified nucleoside which is adjacent to region G, and may in some embodiments comprise a contiguous stretch of 2-7 sugar modified nucleoside, or a contiguous stretch of sugar modified and DNA nucleosides (mixed wings comprising both sugar modified and DNA nucleosides). Consequently, the nucleosides of the 5' flanking region and the 3' flanking region which are adjacent to the gap region are sugar modified nucleosides, such as 2' modified nucleosides. The gap region, G, comprises a contiguous stretch of nucleotides which are capable of recruiting RNase H, when the oligonucleotide is in duplex with the HTRA1 target nucleic acid. In some embodiments, region G comprises a contiguous stretch of 5-16 DNA nucleosides. The gapmer region F-G-F' is complementary to the HTRA1 target nucleic acid, and may therefore be the contiguous nucleotide region of the oligonucleotide.

Regions F and F', flanking the 5' and 3' ends of region G, may comprise one or more affinity enhancing modified nucleosides. In some embodiments, the 3' flank comprises at least one LNA nucleoside, preferably at least 2 LNA nucleosides. In some embodiments, the 5' flank comprises at least one LNA nucleoside. In some embodiments both the 5' and 3' flanking regions comprise a LNA nucleoside. In some embodiments all the nucleosides in the flanking regions are LNA nucleosides. In other embodiments, the flanking regions may comprise both LNA nucleosides and other nucleosides (mixed flanks), such as DNA nucleosides and/or non-LNA modified nucleosides, such as 2' substituted nucleosides. In this case the gap is defined as a contiguous sequence of at least 5 RNase H recruiting nucleosides (such as 5-16 DNA nucleosides) flanked at the 5' and 3' end by an affinity enhancing modified nucleoside, such as an LNA, such as beta-D-oxy-LNA.

Region F

Region F (5' flank or 5' wing) attached to the '5 end of region G comprises, contains or consists of at least one sugar modified nucleoside such as at least 2, at least 3, at least 4, at least 5, at least 6, at least 7 modified nucleosides. In some embodiments region F comprises or consists of from 1 to 7 modified nucleosides, such as from 2 to 6 modified nucleosides, such as from 2 to 5 modified nucleosides, such as from 2 to 4 modified nucleosides, such as from 1 to 3 modified nucleosides, such as 1, 2, 3 or 4 modified nucleosides.

In an embodiment, one or more or all of the modified nucleosides in region F are 2' modified nucleosides.

In a further embodiment one or more of the 2' modified nucleosides in region F are selected from 2'-O-alkyl-RNA units, 2'-O-methyl-RNA, 2'-amino-DNA units, 2'-fluoro-DNA units, 2'-alkoxy-RNA, MOE units, LNA units, arabino nucleic acid (ANA) units and 2'-fluoro-ANA units.

In one embodiment of the invention all the modified nucleosides in region F are LNA nucleosides. In a further embodiment the LNA nucleosides in region F are independently selected from the group consisting of oxy-LNA, thio-LNA, amino-LNA, cET, and/or ENA, in either the beta-D or alpha-L configurations or combinations thereof. In a preferred embodiment region F has at least 1 beta-D-oxy LNA unit, at the 5' end of the contiguous sequence.

Region G

Region G (gap region) may comprise, contain or consist of at 5-16 consecutive DNA nucleosides capable of recruiting RNaseH. In a further embodiment region G comprise, contain or consist of from 5 to 12, or from 6 to 10 or from 7 to 9, such as 8 consecutive nucleotide units capable of recruiting RNaseH.

In a still further embodiment at least one nucleoside unit in region G is a DNA nucleoside unit, such as from 4 to 20 or or 6 to 18 DNA units, such as 5 to 16, In some embodiments, all of the nucleosides of region G are DNA units.

In further embodiments the region G may consist of a mixture of DNA and other nucleosides capable of mediating RNase H cleavage. In some embodiments, at least 50% of the nucleosides of region G are DNA, such as at least 60%, at least 70% or at least 80%, or at least 90% DNA.

Region F'

Region F' (3' flank or 3' wing) attached to the '3 end of region G comprises, contains or consists of at least one sugar modified nucleoside such as at least 2, at least 3, at least 4, at least 5, at least 6, at least 7 modified nucleosides. In some embodiments region F' comprises or consists of from 1 to 7 modified nucleosides, such as from 2 to 6 modified nucleosides, such as from 2 to 5 modified nucleosides, such as from 2 to 4 modified nucleosides, such as from 1 to 3 modified nucleosides, such as 1, 2, 3 or 4 modified nucleosides.

In an embodiment, one or more or all of the modified nucleosides in region F' are 2' modified nucleosides.

In a further embodiment one or more of the 2' modified nucleosides in region F' are selected from 2'-O-alkyl-RNA units, 2'-O-methyl-RNA, 2'-amino-DNA units, 2'-fluoro-DNA units, 2'-alkoxy-RNA, MOE units, LNA units, arabino nucleic acid (ANA) units and 2'-fluoro-ANA units.

In one embodiment of the invention all the modified nucleosides in region F' are LNA nucleosides. In a further embodiment the LNA nucleosides in region F' are independently selected from the group consisting of oxy-LNA, thio-LNA, amino-LNA, cET, and/or ENA, in either the beta-D or alpha-L configurations or combinations thereof. In a preferred embodiment region F' has at least 1 beta-D-oxy LNA unit, at the 5' end of the contiguous sequence.

Region D, D' and D"

The oligonucleotide of the invention comprises a contiguous nucleotide region which is complementary to the target nucleic acid. In some embodiments, the oligonucleotide may further comprise additional nucleotides positioned 5' and/or 3' to the contiguous nucleotide region, which are referred to as region D herein. Region D' and D" can be attached to the 5' end of region F or the 3' end of region F', respectively. The D regions (region D' or D") may in some embodiments form part of the contiguous nucleotide sequence which is complementary to the target nucleic acid, or in other embodiments the D region(s) may be non-complementary to the target nucleic acid.

In some embodiments the oligonucleotide of the invention consists or comprises of the contiguous nucleotide region and optionally 1-5 additional 5' nucleotides (region D').

In some embodiments the oligonucleotide of the invention consists or comprises of the contiguous nucleotide region and optionally 1-5 additional 3' nucleotides (region D").

Region D' or D" may independently comprise 1, 2, 3, 4 or 5 additional nucleotides, which may be complementary or non-complementary to the target nucleic acid. In this respect the oligonucleotide of the invention, may in some embodiments comprise a contiguous nucleotide sequence capable of modulating the target which is flanked at the 5' and/or 3' end by additional nucleotides. Such additional nucleotides may serve as a nuclease susceptible biocleavable linker, and may therefore be used to attach a functional group such as a conjugate moiety to the oligonucleotide of the invention. In some embodiments the additional 5' and/or 3' end nucleotides are linked with phosphodiester linkages, and may be DNA or RNA. In another embodiment, the additional 5' and/or 3' end nucleotides are modified nucleotides which may for example be included to enhance nuclease stability or for ease of synthesis. In some embodiments the oligonucleotide of the invention comprises a region D' and/or D" in addition to the contiguous nucleotide region.

In some embodiments, the gapmer oligonucleotide of the present invention can be represented by the following formulae:

F-G-F'; in particular $F_{1-7}$-$G_{4-12}$-$F'_{1-7}$

D'-F-G-F', in particular $D'_{1-3}$-$F_{1-7}$-$G_{4-12}$-$F'_{1-7}$

F-G-F'-D", in particular $F_{1-7}$-$G_{4-12}$-$F'_{1-7}$-$D''_{1-3}$

D'-F-G-F'-D", in particular $D'_{1-3}$-$F_{1-7}$-$G_{4-12}$-$F'_{1-7}$-$D''_{1-3}$ Method of Manufacture In a further aspect, the invention provides methods for manufacturing the oligonucleotides of the invention comprising reacting nucleotide units and thereby forming covalently linked contiguous nucleotide units comprised in the oligonucleotide. Preferably, the method uses phophoramidite chemistry (see for example Caruthers et al, 1987, Methods in Enzymology vol. 154, pages 287-313). In a further embodiment the method further comprises reacting the contiguous nucleotide sequence with a conjugating moiety (ligand). In a further aspect a method is provided for manufacturing the composition of the invention, comprising mixing the oligonucleotide or conjugated oligonucleotide of the invention with a pharmaceutically acceptable diluent, solvent, carrier, salt and/or adjuvant.

Pharmaceutical Salts

For use as a therapeutic, the oligonucleotide of the invention may be provided as a suitable pharmaceutical salt, such as a sodium or potassium salt. In some embodiments the oligonucleotide of the invention is a sodium salt.

Pharmaceutical Composition

In a further aspect, the invention provides pharmaceutical compositions comprising any of the aforementioned oligonucleotides and/or oligonucleotide conjugates and a pharmaceutically acceptable diluent, carrier, salt and/or adjuvant. A pharmaceutically acceptable diluent includes phosphate-buffered saline (PBS) and pharmaceutically acceptable salts include, but are not limited to, sodium and potassium salts. In some embodiments the pharmaceutically acceptable diluent is sterile phosphate buffered saline. In some embodiments the oligonucleotide is used in the pharmaceutically acceptable diluent at a concentration of 50-300 µM solution. In some embodiments, the oligonucleotide of the invention is administered at a dose of 10-1000 µg.

WO 2007/031091 provides suitable and preferred examples of pharmaceutically acceptable diluents, carriers and adjuvants (hereby incorporated by reference). Suitable dosages, formulations, administration routes, compositions, dosage forms, combinations with other therapeutic agents, pro-drug formulations are also provided in WO2007/031091.

Oligonucleotides or oligonucleotide conjugates of the invention may be mixed with pharmaceutically acceptable active or inert substances for the preparation of pharmaceutical compositions or formulations. Compositions and methods for the formulation of pharmaceutical compositions are dependent upon a number of criteria, including, but not limited to, route of administration, extent of disease, or dose to be administered.

In some embodiments, the oligonucleotide or oligonucleotide conjugate of the invention is a prodrug. In particular with respect to oligonucleotide conjugates the conjugate moiety is cleaved of the oligonucleotide once the prodrug is delivered to the site of action, e.g. the target cell.

Applications

The oligonucleotides of the invention may be utilized as research reagents for, for example, diagnostics, therapeutics and prophylaxis.

In research, such oligonucleotides may be used to specifically modulate the synthesis of HTRA1 protein in cells (e.g. in vitro cell cultures) and experimental animals thereby facilitating functional analysis of the target or an appraisal of its usefulness as a target for therapeutic intervention. Typically the target modulation is achieved by degrading or inhibiting the mRNA producing the protein, thereby prevent protein formation or by degrading or inhibiting a modulator of the gene or mRNA producing the protein.

In diagnostics the oligonucleotides may be used to detect and quantitate HTRA1 expression in cell and tissues by northern blotting, in-situ hybridisation or similar techniques.

For therapeutics, an animal or a human, suspected of having a disease or disorder, which can be treated by modulating the expression of HTRA1.

The invention provides methods for treating or preventing a disease, comprising administering a therapeutically or prophylactically effective amount of an oligonucleotide, an oligonucleotide conjugate or a pharmaceutical composition of the invention to a subject suffering from or susceptible to the disease.

The invention also relates to an oligonucleotide, a composition or a conjugate as defined herein for use as a medicament.

The oligonucleotide, oligonucleotide conjugate or a pharmaceutical composition according to the invention is typically administered in an effective amount.

The invention also provides for the use of the oligonucleotide or oligonucleotide conjugate of the invention as described for the manufacture of a medicament for the treatment of a disorder as referred to herein, or for a method of the treatment of as a disorder as referred to herein.

The disease or disorder, as referred to herein, is associated with expression of HTRA1. In some embodiments disease or disorder may be associated with a mutation in the HTRA1 gene or a gene whose protein product is associated with or interacts with HTRA1. Therefore, in some embodiments, the target nucleic acid is a mutated form of the HTRA1 sequence and in other embodiments, the target nucleic acid is a regulator of the HTRA1 sequence.

The methods of the invention are preferably employed for treatment or prophylaxis against diseases caused by abnormal levels and/or activity of HTRA1.

The invention further relates to use of an oligonucleotide, oligonucleotide conjugate or a pharmaceutical composition as defined herein for the manufacture of a medicament for the treatment of abnormal levels and/or activity of HTRA1.

In one embodiment, the invention relates to oligonucleotides, oligonucleotide conjugates or pharmaceutical compositions for use in the treatment of diseases or disorders selected from eye disorders, such as macular degeneration, including age related macular degeneration (AMD), such as dry AMD or wet AMD, and diabetic retinopathy. In some embodiments the oligonucleotide conjugates or pharmaceutical compositions of the invention may be for use in the treatment of geographic atrophy or intermediate dAMD. HTRA1 has also been indicated in Alzheimer's and Parkinson's disease, and therefore in some embodiments, the oligonucleotide conjugates or pharmaceutical compositions of the invention may be for use in the treatment of Alzheimer's or Parkinson's. HTRA1 has also been indicated in Duchenne muscular dystrophy, arthritis, such as osteoarthritis, familial ischemic cerebral small-vessel disease, and therefore in some embodiments, the oligonucleotide conjugates or pharmaceutical compositions of the invention may be for use in the treatment of Duchenne muscular dystrophy, arthritis, such as osteoarthritis, or familial ischemic cerebral small-vessel disease.

Administration

The oligonucleotides or pharmaceutical compositions of the present invention may be administered topical (such as, to the skin, inhalation, ophthalmic or otic) or enteral (such as, orally or through the gastrointestinal tract) or parenteral (such as, intravenous, subcutaneous, intra-muscular, intracerebral, intracerebroventricular or intrathecal).

In some embodiments the oligonucleotide, conjugate or pharmaceutical compositions of the present invention are administered by a parenteral route including intravenous, intraarterial, subcutaneous, intraperitoneal or intramuscular injection or infusion, intrathecal or intracranial, e.g. intracerebral or intraventricular, administration. In some embodiments the active oligonucleotide or oligonucleotide conjugate is administered intravenously. In another embodiment the active oligonucleotide or oligonucleotide conjugate is administered subcutaneously.

For use in treating eye disorders, such as macular degeneration, e.g. AMD (wet or dry), intraocular injection may be used.

In some embodiments, the compound of the invention, or pharmaceutically acceptable salt thereof, is administered via an intraocular injection in a dose from about 10 μg to about 200 μg per eye, such as about 50 μg to about 150 μg per eye, such as about 100 μg per eye. In some embodiments, the dosage interval, i.e. the period of time between consecutive dosings is at least monthly, such as at least bi monthly or at least once every three months.

Combination Therapies

In some embodiments the oligonucleotide, oligonucleotide conjugate or pharmaceutical composition of the invention is for use in a combination treatment with another therapeutic agent. The therapeutic agent can for example be the standard of care for the diseases or disorders described above

EXAMPLES

Materials and Methods
Oligonucleotide Synthesis

Oligonucleotide synthesis is generally known in the art. Below is a protocol which may be applied. The oligonucleotides of the present invention may have been produced by slightly varying methods in terms of apparatus, support and concentrations used.

Oligonucleotides are synthesized on uridine universal supports using the phosphoramidite approach on an Oligomaker 48 at 1 μmol scale. At the end of the synthesis, the oligonucleotides are cleaved from the solid support using aqueous ammonia for 5-16 hours at 60° C. The oligonucleotides are purified by reverse phase HPLC (RP-HPLC) or by solid phase extractions and characterized by UPLC, and the molecular mass is further confirmed by ESI-MS.

Elongation of the Oligonucleotide:

The coupling of β-cyanoethyl-phosphoramidites (DNA-A(Bz), DNA-G(ibu), DNA-C(Bz), DNA-T, LNA-5-methyl-C(Bz), LNA-A(Bz), LNA-G(dmf), LNA-T) is performed by using a solution of 0.1 M of the 5'-O-DMT-protected amidite in acetonitrile and DCI (4,5-dicyanoimidazole) in acetonitrile (0.25 M) as activator. For the final cycle a phosphoramidite with desired modifications can be used, e.g. a C6 linker for attaching a conjugate group or a conjugate group as such. Thiolation for introduction of phosphorthioate linkages is carried out by using xanthane hydride (0.01 M in acetonitrile/pyridine 9:1). Phosphordiester linkages can be introduced using 0.02 M iodine in THF/Pyridine/water 7:2:1. The rest of the reagents are the ones typically used for oligonucleotide synthesis.

For post solid phase synthesis conjugation a commercially available C6 aminolinker phorphoramidite can be used in the last cycle of the solid phase synthesis and after deprotection and cleavage from the solid support the aminolinked deprotected oligonucleotide is isolated. The conjugates are introduced via activation of the functional group using standard synthesis methods.

Purification by RP-HPLC:

The crude compounds are purified by preparative RP-HPLC on a Phenomenex Jupiter C18 10p 150×10 mm column. 0.1 M ammonium acetate pH 8 and acetonitrile is used as buffers at a flow rate of 5 mL/min. The collected fractions are lyophilized to give the purified compound typically as a white solid.

Abbreviations

DCI: 4,5-Dicyanoimidazole
DCM: Dichloromethane
DMF: Dimethylformamide
DMT: 4,4'-Dimethoxytrityl
THF: Tetrahydrofurane
Bz: Benzoyl
Ibu: Isobutyryl
RP-HPLC: Reverse phase high performance liquid chromatography $T_m$ Assay:

Oligonucleotide and RNA target (phosphate linked, PO) duplexes are diluted to 3 mM in 500 ml RNase-free water and mixed with 500 ml 2×$T_m$-buffer (200 mM NaCl, 0.2 mM EDTA, 20 mM Naphosphate, pH 7.0). The solution is heated to 95° C. for 3 min and then allowed to anneal in room temperature for 30 min. The duplex melting temperatures ($T_m$) is measured on a Lambda 40 UV/VIS Spectrophotometer equipped with a Peltier temperature programmer PTP6 using PE Templab software (Perkin Elmer). The temperature is ramped up from 20° C. to 95° C. and then down to 25° C., recording absorption at 260 nm. First derivative and the local maximums of both the melting and annealing are used to assess the duplex $T_m$.

Oligonucleotides Used:

| SEQ ID NO | Motif | CMP ID NO | Compound |
|---|---|---|---|
| 5 | agttaaaggaggagacaaat | 5.1 | AGTTaaaggaggagacAAAT |
| 6 | tcagttaaaggaggagacaa | 6.1 | TCAgttaaaggaggagaCAA |
| 7 | ctcagttaaaggaggagaca | 7.1 | CTCagttaaaggaggagaCA |
| 8 | ctcagttaaaggaggagac | 8.1 | CTCagttaaaggaggaGAC |
| 9 | actcagttaaaggaggagac | 9.1 | ACTCagttaaaggaggagAC |
| 10 | actcagttaaaggaggaga | 10.1 | ACTCagttaaaggaggaGA |
| 11 | actcagttaaaggaggag | 11.1 | ACtcagttaaaggaGGAG |

-continued

| SEQ ID NO | Motif | CMP ID NO | Compound |
|---|---|---|---|
| 12 | gatgactcagttaaaggagg | 12.1 | GAtgactcagttaaaggAGG |
| 13 | atgatgactcagttaaagga | 13.1 | ATGAtgactcagttaaagGA |
| 14 | tgatgactcagttaaagg | 14.1 | TGAtgactcagttaAAGG |
| 15 | gatgatgactcagttaaagg | 15.1 | GAtgatgactcagttaAAGG |
| 16 | gatgatgactcagttaaag | 16.1 | GATgatgactcagttaAAG |
| 17 | tatcgactgcattagttgg | 17.1 | TAT$^m$cgactgcattagttGG |
| 18 | gtatcgactgcattagttgg | 18.1 | Gtat$^m$cgactgcattagttGG |
| 19 | tcgactgcattagttg | 19.1 | TCGactgcattagTTG |
| 19 | tcgactgcattagttg | 19.2 | TCGactgcattagtTG |
| 19 | tcgactgcattagttg | 19.3 | TCGActgcattaGTTG |
| 20 | tatcgactgcattagttg | 20.1 | TAt$^m$cgactgcattaGTTG |
| 21 | gtatcgactgcattagttg | 21.1 | GTAt$^m$cgactgcattagtTG |
| 22 | tgtatcgactgcattagttg | 22.1 | TGtat$^m$cgactgcattagtTG |
| 23 | atcgactgcattagtt | 23.1 | ATCgactgcattaGTT |
| 23 | atcgactgcattagtt | 23.2 | ATCGactgcattAGTT |
| 23 | atcgactgcattagtt | 23.3 | ATCGactgcattaGTT |
| 24 | tatcgactgcattagtt | 24.1 | TATCgactgcattaGTT |
| 25 | gtatcgactgcattagtt | 25.1 | GTAT$^m$cgactgcattagTT |
| 26 | tgtatcgactgcattagtt | 26.1 | TGTat$^m$cgactgcattagTT |
| 27 | ttgtatcgactgcattagtt | 27.1 | TTGtat$^m$cgactgcattagTT |
| 28 | tatcgactgcattagt | 28.1 | TAT$^m$cgactgcattaGT |
| 28 | tatcgactgcattagt | 28.2 | TATCgactgcatTAGT |
| 29 | gtatcgactgcattagt | 29.1 | GTAT$^m$cgactgcattaGT |
| 30 | tgtatcgactgcattagt | 30.1 | TGTat$^m$cgactgcattaGT |
| 31 | gtatcgactgcattag | 31.1 | GTAt$^m$cgactgcatTAG |
| 31 | gtatcgactgcattag | 31.2 | GTAt$^m$cgactgcattAG |
| 31 | gtatcgactgcattag | 31.3 | GTAT$^m$cgactgcaTTAG |
| 32 | tgtatcgactgcattag | 32.1 | TGtat$^m$cgactgcaTTAG |
| 33 | ttgtatcgactgcattag | 33.1 | TTGtat$^m$cgactgcatTAG |
| 34 | attgtatcgactgcattag | 34.1 | ATtgtat$^m$cgactgcaTTAG |
| 35 | tgtatcgactgcatta | 35.1 | TGTat$^m$cgactgcaTTA |
| 35 | tgtatcgactgcatta | 35.2 | TGTAt$^m$cgactgcATTA |
| 36 | attgtatcgactgcatta | 36.1 | ATTGtat$^m$cgactgcaTTA |
| 37 | ttgtatcgactgcatt | 37.1 | TTGtat$^m$cgactgcaTT |
| 37 | ttgtatcgactgcatt | 37.2 | TTGtat$^m$cgactgCATT |
| 38 | attgtatcgactgcat | 38.1 | ATTgtat$^m$cgactgCAT |
| 38 | attgtatcgactgcat | 38.2 | ATTgtat$^m$cgactgcAT |
| 38 | attgtatcgactgcat | 38.3 | ATTGtat$^m$cgactGCAT |
| 39 | acgcattgtatcgact | 39.1 | ACGcattgtat$^m$cgACT |

-continued

| SEQ ID NO | Motif | CMP ID NO | Compound |
|---|---|---|---|
| 39 | acgcattgtatcgact | 39.2 | ACGCattgtat$^m$cGACT |
| 40 | tacgcattgtatcgac | 40.1 | TACgcattgtat$^m$cGAC |
| 40 | tacgcattgtatcgac | 40.2 | TACGcattgtatCGAC |
| 41 | ctacgcattgtatcgac | 41.1 | CTa$^m$cgcattgtatCGAC |
| 42 | tctacgcattgtatcgac | 42.1 | TCTA$^m$cgcattgtat$^m$cgAC |
| 43 | atctacgcattgtatcgac | 43.1 | ATCta$^m$cgcattgtat$^m$cgAC |
| 44 | tatctacgcattgtatcgac | 44.1 | TAtcta$^m$cgcattgtatcGAC |
| 45 | ctacgcattgtatcga | 45.1 | CTA$^m$cgcattgtatCGA |
| 45 | ctacgcattgtatcga | 45.2 | CTACgcattgtaTCGA |
| 46 | tatctacgcattgtatcga | 46.1 | TAtcta$^m$cgcattgtatCGA |
| 47 | tctacgcattgtatcg | 47.1 | TCTa$^m$cgcattgtaTCG |
| 47 | tctacgcattgtatcg | 47.2 | TCTa$^m$cgcattgtatCG |
| 47 | tctacgcattgtatcg | 47.3 | TCTA$^m$cgcattgtATCG |
| 48 | atctacgcattgtatcg | 48.1 | ATCTa$^m$cgcattgtaTCG |
| 49 | tatctacgcattgtatcg | 49.1 | TATCta$^m$cgcattgtatCG |
| 50 | tctatctacgcattgtatcg | 50.1 | TCtatcta$^m$cgcattgtatCG |
| 51 | atctacgcattgtatc | 51.1 | ATCta$^m$cgcattgtATC |
| 51 | atctacgcattgtatc | 51.2 | ATCTa$^m$cgcattgTATC |
| 52 | tatctacgcattgtatc | 52.1 | TATcta$^m$cgcattgTATC |
| 53 | ctatctacgcattgtatc | 53.1 | CTatcta$^m$cgcattgTATC |
| 54 | tctatctacgcattgtatc | 54.1 | TCTatcta$^m$cgcattgtaTC |
| 55 | ttctatctacgcattgtatc | 55.1 | TTCtatcta$^m$cgcattgtaTC |
| 56 | tatctacgcattgtat | 56.1 | TATcta$^m$cgcattgTAT |
| 56 | tatctacgcattgtat | 56.2 | TATCta$^m$cgcattGTAT |
| 57 | ctatctacgcattgtat | 57.1 | CTAtcta$^m$cgcattGTAT |
| 58 | tctatctacgcattgtat | 58.1 | TCtatcta$^m$cgcattGTAT |
| 59 | ttctatctacgcattgtat | 59.1 | TTCtatcta$^m$cgcattgTAT |
| 60 | ctatctacgcattgta | 60.1 | CTAtcta$^m$cgcattGTA |
| 60 | ctatctacgcattgta | 60.2 | CTATcta$^m$cgcatTGTA |
| 61 | tctatctacgcattgta | 61.1 | TCTatcta$^m$cgcattGTA |
| 62 | ttctatctacgcattgta | 62.1 | TTCtatcta$^m$cgcattGTA |
| 63 | ttctatctacgcattgt | 63.1 | TTCtatcta$^m$cgcatTGT |
| 64 | tcttctatctacgcattgt | 64.1 | TCttctatcta$^m$cgcattGT |
| 65 | ttcttctatctacgcattgt | 65.1 | Ttcttctatcta$^m$cgcattGT |
| 66 | ttcttctatctacgcattg | 66.1 | TTCttctatcta$^m$cgcatTG |
| 67 | ttctatctacgcattg | 67.1 | TTCtatcta$^m$cgcaTTG |
| 68 | cttctatctacgcatt | 68.1 | CTTCtatcta$^m$cgCATT |
| 69 | tcttctatctacgcatt | 69.1 | TCTtctatcta$^m$cgCATT |

-continued

| SEQ ID NO | Motif | CMP ID NO | Compound |
|---|---|---|---|
| 70 | ttcttctatctacgcatt | 70.1 | TTCTtctatcta*m*cgATT |
| 71 | tcttctatctacgcat | 71.1 | TCTTctatcta*m*cgCAT |
| 72 | ttcttctatctacgcat | 72.1 | TTCTtctatcta*m*cgCAT |
| 73 | cttcttctatctacgcat | 73.1 | CTTCttctatcta*m*cgCAT |
| 74 | ttcttctatctacgca | 74.1 | TTCttctatctacGCA |
| 75 | cttcttctatctacgca | 75.1 | CTTCttctatcta*m*cgCA |
| 76 | gcttcttctatctacgca | 76.1 | Gcttcttctatcta*m*cgCA |
| 77 | cttcttctatctacgc | 77.1 | CTtcttctatctACGC |
| 78 | gcttcttctatctacg | 78.1 | GCTtcttctatctACG |
| 79 | cgtggggcttcttcta | 79.1 | CGTggggcttcttCTA |
| 80 | tgacttggagaaaagcacaa | 80.1 | TGacttggagaaaagcacAA |
| 81 | ctgacttggagaaaagcac | 81.1 | CtgacttggagaaaagcAC |
| 82 | agagtcatcgtgctcc | 82.1 | AGAgtcat*m*cgtgcTCC |
| 83 | aagtactttaatagctcaaa | 83.1 | AAGTactttaatagctCAAA |
| 84 | aagtactttaatagctcaa | 84.1 | AAGTactttaatagcTCAA |
| 85 | gaagtactttaatagctcaa | 85.1 | GAAGtactttaatagctCAA |
| 86 | tactttaatagctcaa | 86.1 | TACTttaatagcTCAA |
| 87 | aagtactttaatagctca | 87.1 | AAGTactttaatagcTCA |
| 88 | gaagtactttaatagctca | 88.1 | GAAGtactttaatagcTCA |
| 89 | agaagtactttaatagctc | 89.1 | AGAAgtactttaatagCTC |
| 90 | aagaagtactttaatagctc | 90.1 | AAGAgtactttaatagCTC |
| 91 | gaagtactttaatagct | 91.1 | GAAGtactttaatAGCT |
| 92 | taagaagtactttaatagct | 92.1 | TAAgaagtactttaatAGCT |
| 93 | agaagtactttaatagc | 93.1 | AGAAgtactttaaTAGC |
| 94 | taagaagtactttaatagc | 94.1 | TAAgaagtactttaaTAGC |
| 95 | gtaagaagtactttaatagc | 95.1 | GTaagaagtactttaaTAGC |
| 96 | taagaagtactttaatag | 96.1 | TAAGaagtactttaATAG |
| 97 | gtaagaagtactttaatag | 97.1 | GTAAgaagtactttaATAG |
| 98 | tgtaagaagtactttaatag | 98.1 | TGTAagaagtactttaATAG |
| 99 | aatgtgtaagaagtacttt | 99.1 | AATGtgtaagaagtaCTTT |
| 100 | caatgtgtaagaagtacttt | 100.1 | CAATgtgtaagaagtaCTTT |
| 101 | atgtgtaagaagtactt | 101.1 | ATGTgtaagaagtACTT |
| 102 | aatgtgtaagaagtactt | 102.1 | AATgtgtaagaagtACTT |
| 103 | caatgtgtaagaagtactt | 103.1 | CAATgtgtaagaagtACTT |
| 104 | gcaatgtgtaagaagtactt | 104.1 | GCaatgtgtaagaagtACTT |
| 105 | atgtgtaagaagtact | 105.1 | ATGtgtaagaagtACT |
| 105 | atgtgtaagaagtact | 105.2 | ATGTgtaagaagTACT |
| 106 | gcaatgtgtaagaagtact | 106.1 | GCAatgtgtaagaagtACT |
| 107 | aatgtgtaagaagtac | 107.1 | AATGtgtaagaaGTAC |

-continued

| SEQ ID NO | Motif | CMP ID NO | Compound |
|---|---|---|---|
| 107 | aatgtgtaagaagtac | 107.2 | AATgtgtaagaaGTAC |
| 108 | caatgtgtaagaagtac | 108.1 | CAATgtgtaagaaGTAC |
| 109 | gcaatgtgtaagaagtac | 109.1 | GCAatgtgtaagaaGTAC |
| 110 | caatgtgtaagaagta | 110.1 | CAAtgtgtaagaaGTA |
| 110 | caatgtgtaagaagta | 110.2 | CAAtgtgtaagaAGTA |
| 110 | caatgtgtaagaagta | 110.3 | CAATgtgtaagaAGTA |
| 111 | gcaatgtgtaagaagta | 111.1 | GCAatgtgtaagaAGTA |
| 112 | gcaatgtgtaagaagt | 112.1 | GCAatgtgtaagaAGT |
| | | A | See below |
| | | B | See below |

For Compounds: Capital letters represent LNA nucleosides (beta-D-oxy LNA nucleosides were used), all LNA cytosines are 5-methyl cytosine, lower case letters represent DNA nucleosides, DNA cytosines preceded with a superscript $^m$ represent a 5-methyl C-DNA nucleoside. All internucleoside linkages are phosphorothioate internucleoside linkages. Compound A is disclosed as compound 143.1 and compound B is disclosed as compound 145.1 in EP16177508.5 and EP17170129.5, and are used as positive control compounds.

Example 1

Testing In Vitro Efficacy of LNA Oligonucleotides in U251 Cell Line at a Single Concentration Identification of promising "hot spot" region for HTRA1. A library of n=231 HTRA1 LNA oligonucleotides were screened in U251 cell line at 5 µM, 6 days of treatment. From this library, we identified a series of active oligonucleotides targeting human HTRA1 pre-mRNA between position 53113-53384 as shown in FIG. 1 (SEQ ID NO 116 or 117).

Human glioblastoma U251 cell line was purchased from ECACC and maintained as recommended by the supplier in a humidified incubator at 37° C. with 5% $CO_2$. For assays, 15000 U251 cells/well were seeded in a 96 multi well plate in starvation media (media recommended by the supplier with the exception of 1% FBS instead of 10%). Cells were incubated for 24 hours before addition of oligonucleotides dissolved in PBS. Concentration of oligonucleotides: 5 µM. 3-4 days after addition of oligonucleotides, media was removed and new media (without oligonucleotide) was added. 6 days after addition of oligonucleotides, the cells were harvested. RNA was extracted using the PureLink Pro 96 RNA Purification kit (Ambion, according to the manufacturer's instructions). cDNA was then synthesized using M-MLT Reverse Transcriptase, random decamers RETROscript, RNase inhibitor (Ambion, according the manufacturer's instruction) with 100 mM dNTP set PCR Grade (Invitrogen) and DNase/RNase free Water (Gibco). For gene expressions analysis, qPCR was performed using TagMan Fast Advanced Master Mix (2×) (Ambion) in a doublex set up. Following TaqMan primer assays were used for qPCR: HTRA1, Hs01016151_m1 (FAM-MGB) and house keeping gene, TBP, Hs4326322E (VIC-MGB) from Life Technologies. n=2 independent biological replicates. The residual HTRA1 mRNA expression level in the table is shown as % of control (PBS-treated cells).

| SEQ ID NO | CMP ID NO | mRNA level |
|---|---|---|
| 19 | 19.1 | 16 |
| 31 | 31.1 | 2 |
| 38 | 38.1 | 9 |
| 47 | 47.1 | 3 |
| 78 | 78.1 | 4 |
| 79 | 79.1 | 21 |
| 82 | 82.1 | 35 |
| 107 | 107.1 | 17 |
| 110 | 110.1 | 24 |
| 112 | 112.1 | 15 |

Example 2

Figure 2:
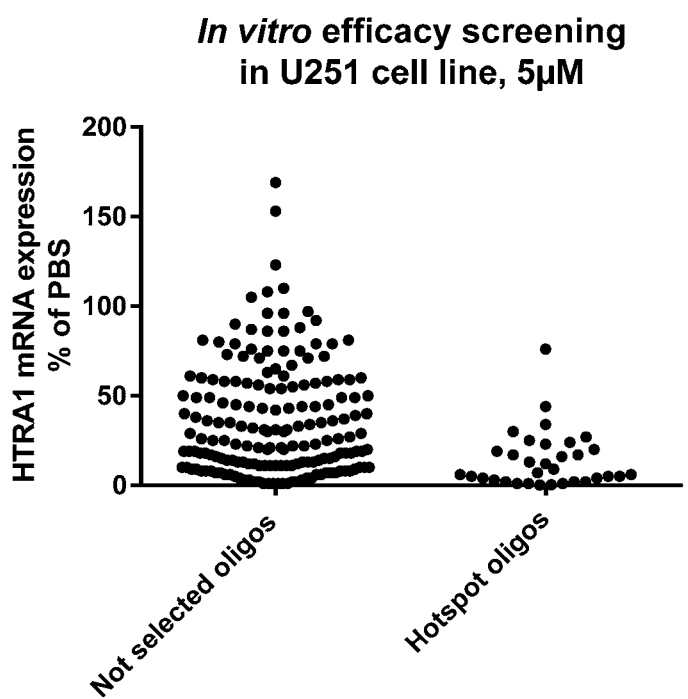
FIG. 2. A library of n=210 HTRA1 LNA oligonucleotides were screened in U251 cell lines at 5 µM. The residual HTRA1 mRNA expression level was measured by qPCR and is shown as % of control (PBS-treated cells). n=33 oligos located between position 53113-53384 were relatively active.

Testing In Vitro Efficacy of LNA Oligonucleotides in U251 Cell Line at a Single Concentration The "hot spot" region 53113-53384 described in Example 1 was further validated in a new library of n=210 HTRA1 LNA oligonucleotides that were screened in U251 cell line at 5 µM. n=33 LNA oligonucleotides were targeting human HTRA1 pre-mRNA between position 53113-53384 and these oligos were relatively active in comparison to the rest as shown in FIG. 2. The assay was performed as described in example 1. n=2 independent biological replicates. The residual HTRA1 mRNA expression level is shown in the table as % of control (PBS-treated cells).

| SEQ ID NO | CMP ID NO | mRNA level |
|---|---|---|
| 19 | 19.2 | 3 |
| 19 | 19.3 | 16 |
| 23 | 23.1 | 1 |
| 23 | 23.2 | 44 |
| 28 | 28.1 | 2 |
| 28 | 28.2 | 19 |
| 31 | 31.2 | 0.4 |
| 31 | 31.3 | 9 |
| 35 | 35.1 | 24 |
| 35 | 35.2 | 5 |
| 37 | 37.1 | 0.3 |
| 37 | 37.2 | 7 |

-continued

| SEQ ID NO | CMP ID NO | mRNA level |
|---|---|---|
| 38 | 38.2 | 1 |
| 38 | 38.3 | 17 |
| 39 | 39.1 | 5 |
| 39 | 39.2 | 17 |
| 40 | 40.1 | 6 |
| 40 | 40.2 | 34 |
| 45 | 45.1 | 4 |
| 45 | 45.2 | 23 |
| 47 | 47.2 | 1 |
| 47 | 47.3 | 4 |
| 51 | 51.1 | 6 |
| 51 | 51.2 | 13 |
| 56 | 56.1 | 2 |
| 56 | 56.2 | 12 |
| 60 | 60.1 | 2 |
| 60 | 60.2 | 5 |
| 105 | 105.1 | 30 |
| 105 | 105.2 | 76 |
| 107 | 107.2 | 25 |
| 110 | 110.2 | 27 |
| 110 | 110.3 | 20 |

Example 3

Figure 3:
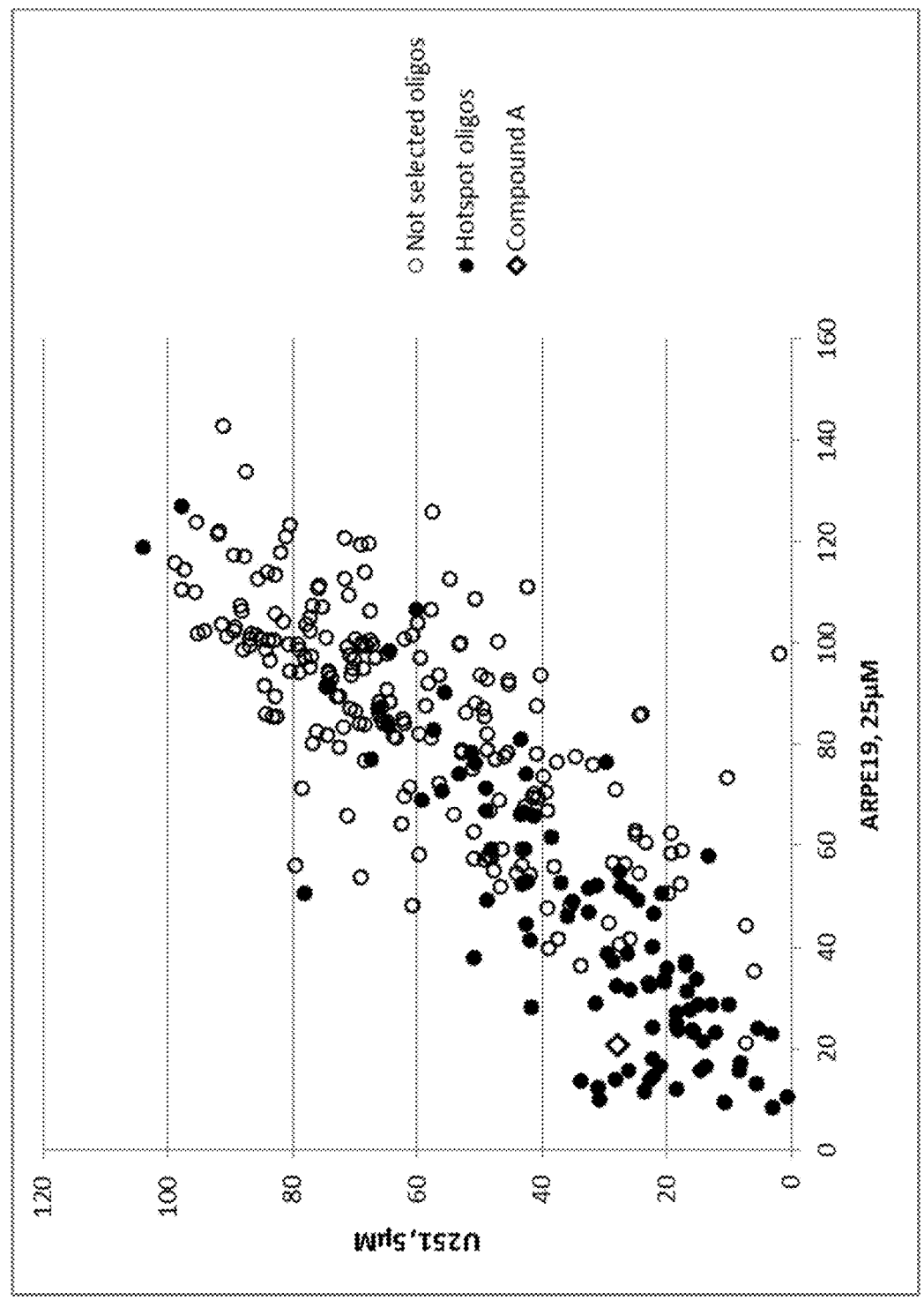
FIG. 3. A library of n=305 HTRA1 LNA oligonucleotides were screened in U251 and ARPE19 cell lines at 5 and 25 µM, respectively. The residual HTRA1 mRNA expression level was measured by qPCR and is shown as % of control (PBS-treated cells). n=95 oligos located between position 53113-53384 were relatively active in comparison to the rest.

Testing In Vitro Efficacy of LNA Oligonucleotides in U251 and ARPE19 Cell Lines at a Single Concentration The "hot spot" region 53113-53384 described in Example 1 and 2 was further validated in a new library of n=305 HTRA1 LNA oligonucleotides that were screened in U251 and ARPE19 cell lines at 5 μM and 25 μM, respectively. n=95 LNA oligonucleotides were targeting human HTRA1 pre-mRNA between position 53113-53384 and these oligos were relatively active in comparison to the rest as shown in FIG. 3.

Human retinal pigmented epithelium ARPE19 cell line was purchased by from ATCC and maintained in DMEM-F12 (Sigma, D8437), 10% FBS, 1% pen/strep in a humidified incubator at 37° C. with 5% CO$_2$. The U251 cell line was described in example 1. For assays, 2000 U251 or ARPE19 cells/well were seeded in a 96 multi well plate in culture media recommended by the supplier. Cells were incubated for 2 hours before addition of oligonucleotides dissolved in PBS. Concentration of oligo was 5 and 25 μM in U251 and ARPE19 cells, respectively. 4 days after addition of oligonucleotides, the cells were harvested. RNA extraction was performed as described in example 1, cDNA synthesis and qPCR were performed using qScript XLT one-step RT-qPCR ToughMix Low ROX, 95134-100 (Quanta Biosciences). Following TaqMan primer assays were used for U251 and ARPE19 cells in a douplex set up: HTRA1, Hs01016151_m1 (FAM-MGB) and house keeping gene, GAPDH, Hs4310884E (VIC-MGB). All primer sets were purchased from Life Technologies. n=1 biological replicate. The relative HTRA1 mRNA expression level in the table is shown as % of control (PBS-treated cells).

| SEQ ID NO | CMP ID NO | ARPE19 mRNA level | U251 mRNA level |
|---|---|---|---|
| 5 | 5.1 | 90 | 56 |
| 6 | 6.1 | 107 | 60 |
| 7 | 7.1 | 92 | 74 |
| 8 | 8.1 | 83 | 57 |
| 9 | 9.1 | 98 | 64 |
| 10 | 10.1 | 77 | 67 |
| 11 | 11.1 | 71 | 56 |
| 12 | 12.1 | 81 | 43 |
| 13 | 13.1 | 84 | 65 |
| 14 | 14.1 | 36 | 20 |
| 15 | 15.1 | 37 | 29 |
| 16 | 16.1 | 55 | 28 |
| 17 | 17.1 | 53 | 43 |
| 18 | 18.1 | 69 | 59 |
| 20 | 20.1 | 41 | 42 |
| 21 | 21.1 | 24 | 22 |
| 22 | 22.1 | 38 | 51 |
| 23 | 23.3 | 53 | 37 |
| 24 | 24.1 | 52 | 27 |
| 25 | 25.1 | 27 | 18 |
| 26 | 26.1 | 16 | 26 |
| 27 | 27.1 | 28 | 42 |
| 29 | 29.1 | 24 | 16 |
| 30 | 30.1 | 18 | 22 |
| 31 | 31.2 | 23 | 3 |
| 32 | 32.1 | 14 | 23 |
| 33 | 33.1 | 11 | 23 |
| 34 | 34.1 | 14 | 34 |
| 35 | 35.1 | 8 | 3 |
| 36 | 36.1 | 12 | 18 |
| 37 | 37.1 | 24 | 5 |
| 41 | 41.1 | 51 | 26 |
| 42 | 42.1 | 39 | 26 |
| 43 | 43.1 | 53 | 42 |
| 44 | 44.1 | 67 | 49 |
| 46 | 46.1 | 59 | 43 |
| 47 | 47.2 | 16 | 8 |
| 48 | 48.1 | 23 | 15 |
| 49 | 49.1 | 39 | 29 |
| 50 | 50.1 | 45 | 42 |
| 51 | 51.1 | 14 | 28 |
| 52 | 52.1 | 15 | 22 |
| 53 | 53.1 | 32 | 23 |
| 54 | 54.1 | 12 | 31 |
| 55 | 55.1 | 46 | 36 |
| 56 | 56.1 | 9 | 11 |
| 57 | 57.1 | 62 | 38 |
| 58 | 58.1 | 77 | 30 |
| 59 | 59.1 | 29 | 31 |
| 60 | 60.1 | 47 | 22 |
| 61 | 61.1 | 25 | 18 |
| 62 | 62.1 | 32 | 26 |
| 63 | 63.1 | 32 | 17 |
| 64 | 64.1 | 67 | 43 |
| 65 | 65.1 | 51 | 78 |
| 66 | 66.1 | 24 | 18 |
| 67 | 67.1 | 11 | 0.7 |
| 68 | 68.1 | 37 | 17 |
| 69 | 69.1 | 36 | 17 |
| 70 | 70.1 | 23 | 12 |
| 71 | 71.1 | 34 | 15 |
| 72 | 72.1 | 16 | 15 |
| 73 | 73.1 | 16 | 14 |
| 74 | 74.1 | 17 | 8 |
| 75 | 75.1 | 29 | 13 |
| 76 | 76.1 | 74 | 43 |
| 77 | 77.1 | 58 | 13 |
| 80 | 80.1 | 127 | 98 |
| 81 | 81.1 | 119 | 104 |
| 83 | 83.1 | 49 | 49 |
| 84 | 84.1 | 52 | 31 |
| 85 | 85.1 | 29 | 10 |
| 86 | 86.1 | 13 | 5 |
| 87 | 87.1 | 32 | 28 |
| 88 | 88.1 | 29 | 15 |
| 89 | 89.1 | 28 | 16 |
| 90 | 90.1 | 21 | 14 |
| 91 | 91.1 | 74 | 53 |
| 92 | 92.1 | 76 | 51 |
| 93 | 93.1 | 40 | 22 |
| 94 | 94.1 | 33 | 20 |
| 95 | 95.1 | 10 | 31 |

-continued

| SEQ ID NO | CMP ID NO | ARPE19 mRNA level | U251 mRNA level |
|---|---|---|---|
| 96 | 96.1 | 49 | 35 |
| 97 | 97.1 | 34 | 20 |
| 98 | 98.1 | 16 | 21 |
| 99 | 99.1 | 66 | 43 |
| 100 | 100.1 | 51 | 21 |
| 101 | 101.1 | 87 | 66 |
| 102 | 102.1 | 52 | 32 |
| 103 | 103.1 | 49 | 24 |
| 104 | 104.1 | 79 | 51 |
| 106 | 106.1 | 71 | 49 |
| 108 | 108.1 | 47 | 32 |
| 109 | 109.1 | 59 | 48 |
| 111 | 111.1 | 66 | 41 |
| A | A | 21 | 28 |

Example 4

Testing In Vitro Potency and Efficacy of Selected Compounds in U251 and ARPE19 Cell Lines in a Dose Response Curve The U251 and ARPE19 cell lines were described in example 1 and 3, respectively. The U251 assay was performed as described in Example 1. The ARPE19 assay was performed as follows: 5000 ARPE19 cells/well were seeded in a 96 multi well plate in culture media recommended by the supplier (with the exception of 5% FBS instead of 10%). Cells were incubated for 2 hour before addition of oligonucleotides dissolved in PBS. Concentration of oligonucleotides: from 50 µM, half-log dilution, 8 points. 4 days after addition of oligonucleotides, the cells were harvested. RNA extraction, cDNA synthesis and qPCR were performed as described in Example 1. n=2 independent biological replicates. The EC50 value and the residual HTRA1 mRNA level at 50 µM are shown in the table as % of control (PBS).

| SEQ ID NO | CMP ID NO | ARPE19 | | U251 | |
|---|---|---|---|---|---|
| | | EC50 (µM) | mRNA level at max KD | EC50 (µM) | mRNA level at max KD |
| 19 | 19.2 | 2.3 | 54 | 0.6 | 3 |
| 31 | 31.2 | 2.3 | 12 | 0.40 | 0.2 |
| 37 | 37.1 | 4.0 | 11 | 0.46 | 0.2 |
| 38 | 38.2 | 7.4 | 19 | 0.70 | 0.2 |
| 47 | 47.2 | 4.6 | 8 | 0.62 | 0.2 |
| 23 | 23.1 | 6.8 | 25 | 0.80 | 1 |
| 35 | 35.1 | 3.5 | 4 | 0.38 | 0.1 |

Example 5

Testing In Vitro Potency and Efficacy of Selected Compounds in U251 and ARPE19 Cell Lines in a Dose Response Curve The assays were performed as described in Example 3. Concentration of oligonucleotides: from 50 µM, half-log dilution, 8 points. n=2 and n=1 independent biological replicates for U251 and ARPE19, respectively. The EC50 value and the residual HTRA1 mRNA level at 50 µM are shown in the table as % of control (PBS).

| SEQ ID NO | CMP ID NO | ARPE19 | | U251 | |
|---|---|---|---|---|---|
| | | EC50 (µM) | mRNA level at max KD | EC50 (µM) | mRNA level at max KD |
| 31 | 31.2 | 3.2 | 15 | 0.90 | 0.38 |
| 37 | 37.1 | 11 | 22 | 1.3 | 0.75 |
| 47 | 47.2 | 2.8 | 13 | 0.89 | 0.83 |
| 35 | 35.1 | 2.6 | 8.3 | 0.79 | 0.40 |
| 85 | 85.1 | 8.2 | 24 | 0.48 | 3.6 |
| 90 | 90.1 | 3.3 | 16 | 0.50 | 2.2 |
| 95 | 95.1 | 0.55 | 28 | 1.0 | 4.1 |
| 98 | 98.1 | 1.7 | 24 | 0.86 | 4.5 |
| 30 | 30.1 | 1.2 | 20 | 1.00 | 2.2 |
| 32 | 32.1 | 1.7 | 22 | 1.6 | 1.4 |
| 26 | 26.1 | 1.1 | 14 | 1.4 | 0.45 |
| 33 | 33.1 | 0.75 | 28 | 0.66 | 0.63 |
| 34 | 34.1 | 0.44 | 21 | 0.80 | 0.35 |
| 36 | 36.1 | 5.2 | 28 | 1.1 | 0.80 |
| 52 | 52.1 | 2.1 | 28 | 1.1 | 1.1 |
| 54 | 54.1 | 0.79 | 25 | 0.62 | 1.4 |
| 72 | 72.1 | 2.9 | 33 | 0.71 | 1.7 |
| 70 | 70.1 | 1.9 | 36 | 0.52 | 1.5 |
| 74 | 74.1 | 0.78 | 24 | 0.35 | 1.1 |
| 73 | 73.1 | 0.78 | 11 | 0.59 | 0.33 |
| 75 | 75.1 | 1.7 | 22 | 0.60 | 0.80 |
| 86 | 86.1 | 1.7 | 6.5 | 0.47 | 0.65 |
| 67 | 67.1 | 0.59 | 4.3 | 0.38 | 0.23 |
| A | A | 6.5 | 24 | 1.2 | 3.6 |
| B | B | 8.1 | 30 | 0.79 | 4.2 |

Example 6

Testing In Vitro Potency and Efficacy of Selected Compounds in U251 Cell Line in a Dose Response Curve The assay was performed as described in Example 3. Concentration of oligonucleotides: from 50 µM, half-log dilution, 8 points. n=2 independent biological replicates. The EC50 value and the residual HTRA1 mRNA level at 50 µM are shown in the table as % of control (PBS).

| SEQ ID NO | CMP ID NO | U251 | |
|---|---|---|---|
| | | EC50 (µM) | mRNA level at max KD |
| 38 | 38.1 | 3.3 | 3 |
| 78 | 78.1 | 0.58 | 2 |
| 31 | 31.2 | 1.2 | 0.4 |
| 37 | 37.1 | 1.6 | 0.6 |
| 47 | 47.2 | 0.91 | 0.6 |
| 35 | 35.1 | 0.52 | 0.3 |
| 39 | 39.1 | 0.82 | 3 |
| 40 | 40.1 | 1.3 | 4 |
| 45 | 45.1 | 0.89 | 3 |
| 51 | 51.1 | 2.7 | 2 |
| 56 | 56.1 | 2.7 | 1 |
| 60 | 60.1 | 2.1 | 1 |
| 37 | 37.2 | 8.0 | 24 |
| 31 | 31.3 | 2.8 | 10 |
| 35 | 35.2 | 1.3 | 4 |
| 47 | 47.3 | 0.86 | 4 |
| 60 | 60.2 | 1.3 | 3 |
| 26 | 26.1 | 0.52 | 1 |
| 73 | 73.1 | 0.24 | 0.7 |
| 86 | 86.1 | 0.27 | 0.9 |
| 67 | 67.1 | 0.46 | 0.2 |
| A | A | 1.1 | 3.1 |
| B | B | 1.2 | 3.3 |

Example 7

Testing In Vitro Potency and Efficacy of Selected Compounds in U251 Cell Line in a Dose Response Curve The ARPE19 cell line was described in example 3. For assays, ARPE19 cells, 24000 cells/well were seeded in 100 µL in a 96 multi well plate in starvation media (culture media as recommended by the supplier with the exception of 1% FBS instead of 10%). Cells were incubated for 2 hour before addition of oligonucleotides dissolved in PBS. Concentration of oligonucleotides: from 50 µM, half-log dilution, 8 points. At day 4 and 7 after addition of oligonucleotide compounds 75 µL fresh starvation media without oligonucleotides was added to the cells (without removing the old media). RNA extraction, cDNA synthesis and qPCR were performed as described in Example 3. n=2 independent biological replicates. The EC50 value and the residual HTRA1 mRNA level at 50 µM are shown in the table as % of control (PBS).

| | | ARPE19 | |
|---|---|---|---|
| SEQ ID NO | CMP ID NO | EC50 (µM) | mRNA level at max KD |
| 30 | 30.1 | 0.31 | 1 |
| 33 | 33.1 | 0.60 | 0.5 |
| 35 | 35.1 | 0.58 | 1 |
| 35 | 35.2 | 2.7 | 4 |
| 36 | 36.1 | 0.97 | 2 |
| 37 | 37.1 | 1.0 | 4 |
| 40 | 40.1 | 3.8 | 21 |
| 45 | 45.1 | 1.6 | 3 |
| 56 | 56.1 | 5.8 | 2 |
| 67 | 67.1 | 0.84 | 1 |
| 73 | 73.1 | 0.36 | 2 |
| 86 | 86.1 | 0.59 | 4 |
| 90 | 90.1 | 0.75 | 5 |
| 95 | 95.1 | 0.74 | 3 |
| A | A | 1.3 | 1.9 |
| B | B | 0.84 | 1.5 |

Example 8

Testing In Vitro Efficacy in Human Primary RPE Cells

Human primary Retinal Pigmented Epithelium (hpRPE) cells were purchased from Sciencell (Cat #6540). For assays, 5000 hpRPE cells/well were seeded in a Laminin (Laminin 521, BioLamina Cat# LN521-03) coated 96 multi well plate in culture media (EpiCM, Sciencell Cat #4101). They were expanded with this media for one week and differentiated using the following media for 2 weeks: MEM Alpha media (Sigma Cat # M-4526) supplemented with N1 supplement (Sigma Cat # N-6530), Glutamine-Penicillin-Streptomycin (Sigma Cat # G-1146), Non Essential Amino Acid (NEAA, Sigma Cat # M-7145), Taurine (Sigma Cat # T-0625), Hydrocortisone (Sigma Cat # H-03966), Triiodo-thyronin (Sigma Cat # T-5516) and Bovine Serum Albumin (BSA, Sigma Cat # A-9647). Cells were cultured in a humidified incubator at 37° C. with 5% $CO_2$.

Figure 4:
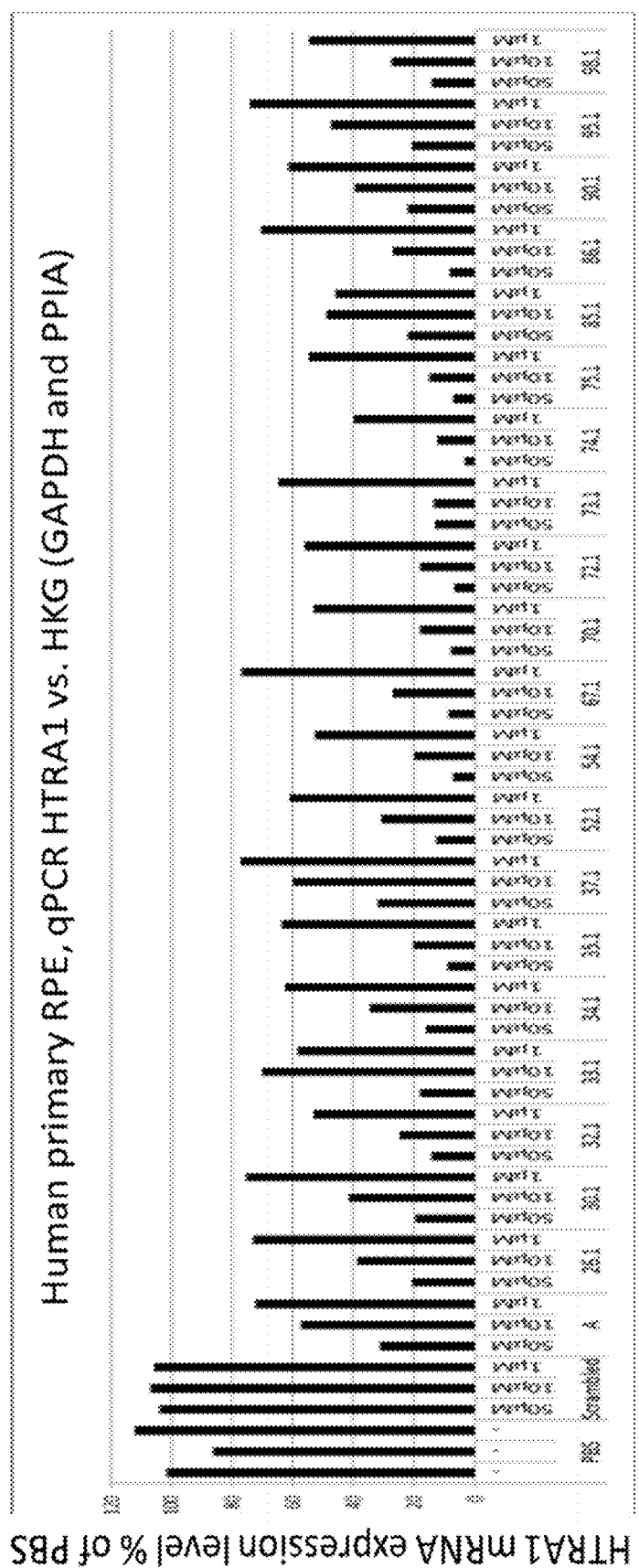
FIG. 4. Dose response of HTRA1 mRNA level upon treatment of human primary RPE cells with LNA oligonucleotides, 10 days of treatment. Scrambled is a control oligo with a scrambled sequence not related to the Htra1 target sequence.
Figure 5A:
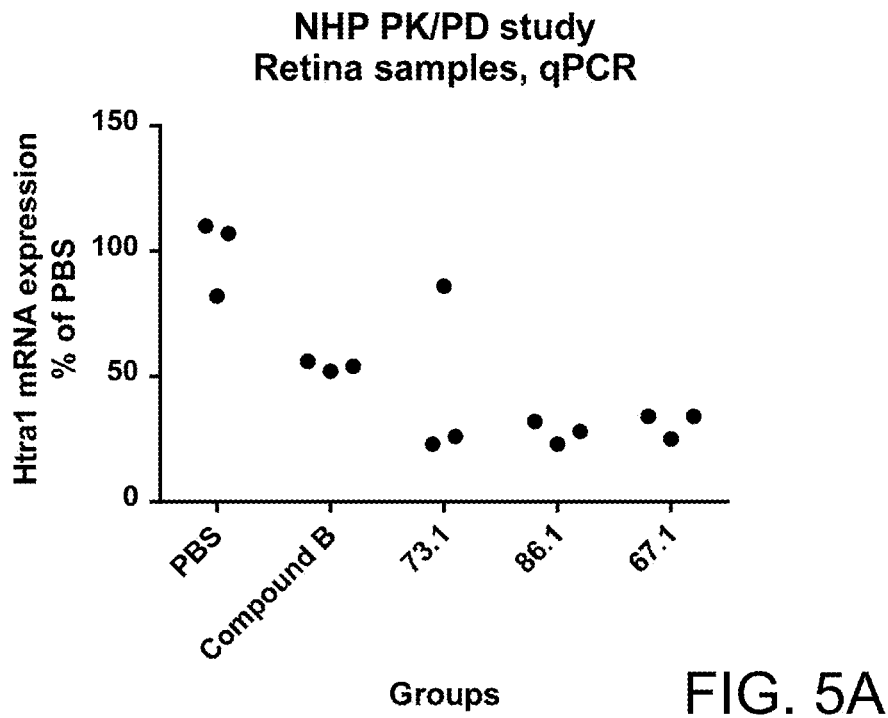
FIGS. 5A-5G. NHP PK/PD study, IVT administration, 25 µg/eye. A) HTRA1 mRNA level measured in the retina by qPCR. B) oligo content in the retina measured by oligo ELISA. C) HTRA1 mRNA level illustrated by ISH. D-E) Quantification of HTRA1 protein level in retina and vitreous, respectively, by IP-MS. Dots show data for individual animals. Error bars show standard errors for technical replicates (n=3). F-G) Reduction in HTRA1 protein level in retina and vitreous, respectively illustrated by western blot.
Figure 5B:
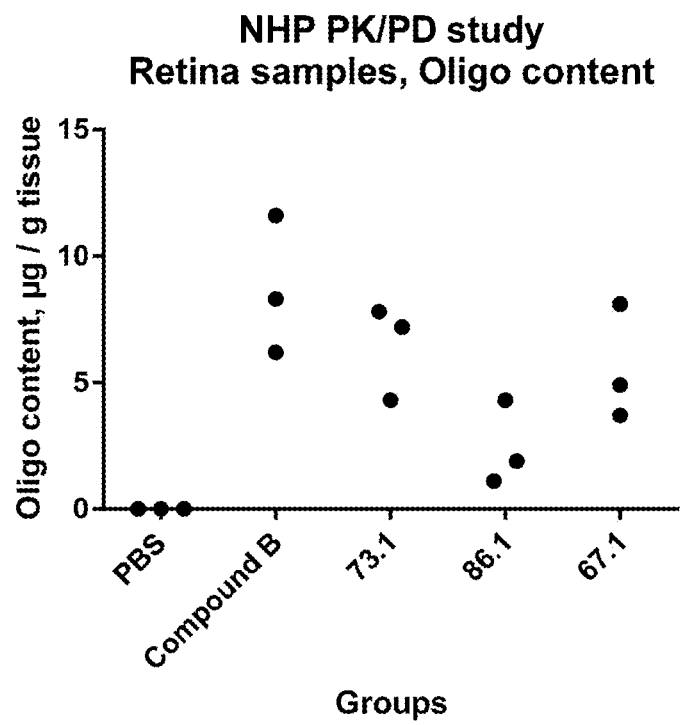
Figure 5C:
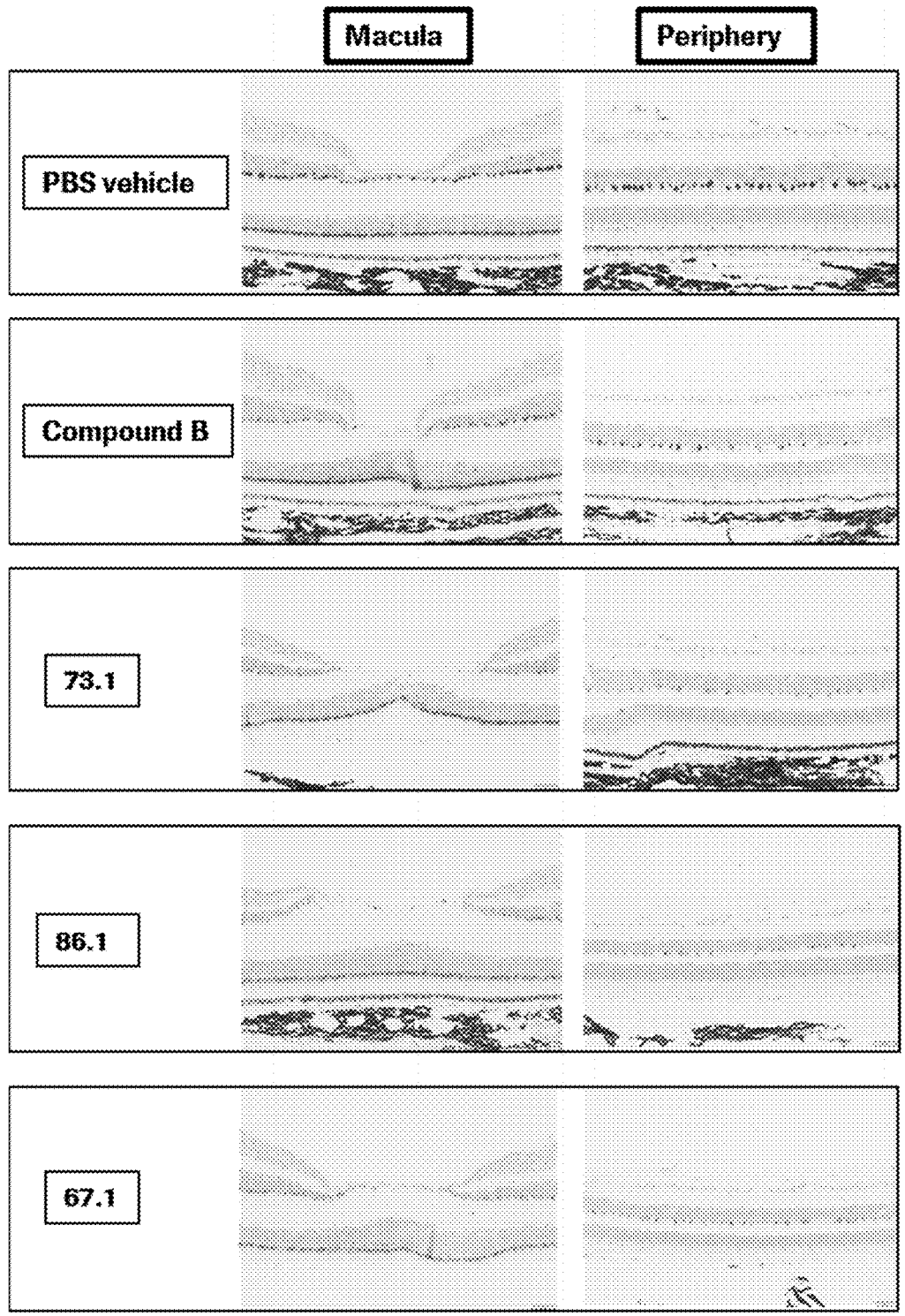
Figure 5D:
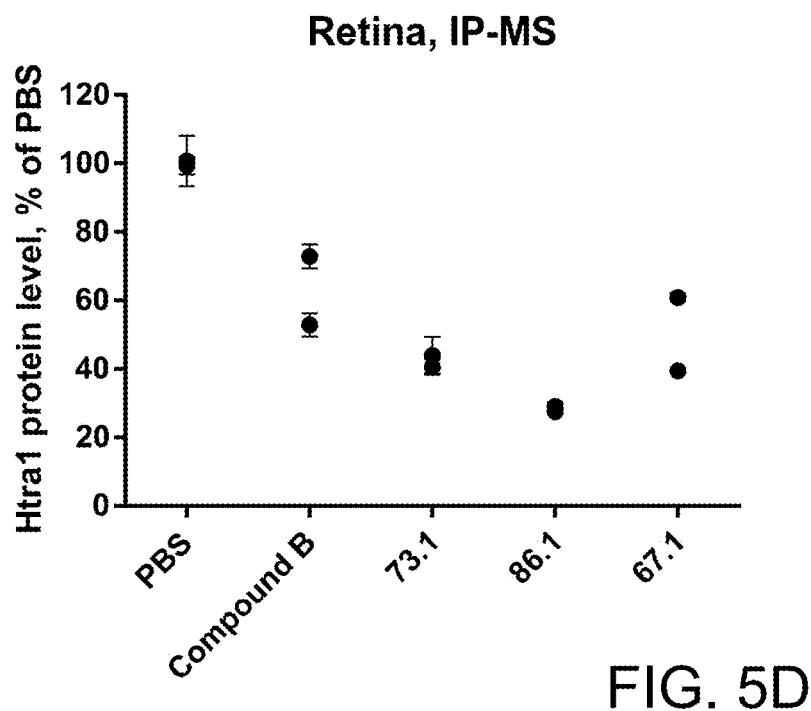
Figure 5E:
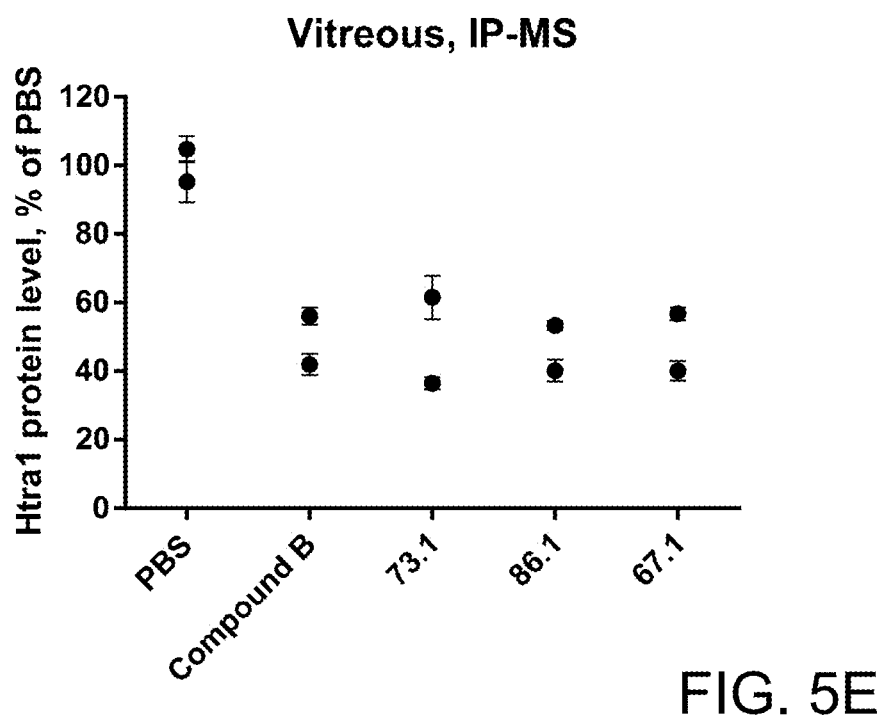
Figure 5F:
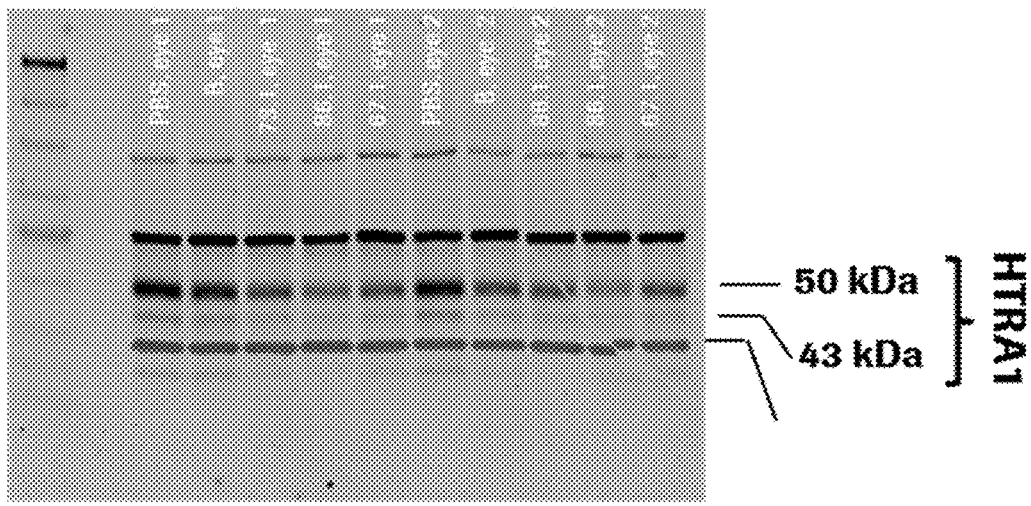
Figure 5G:
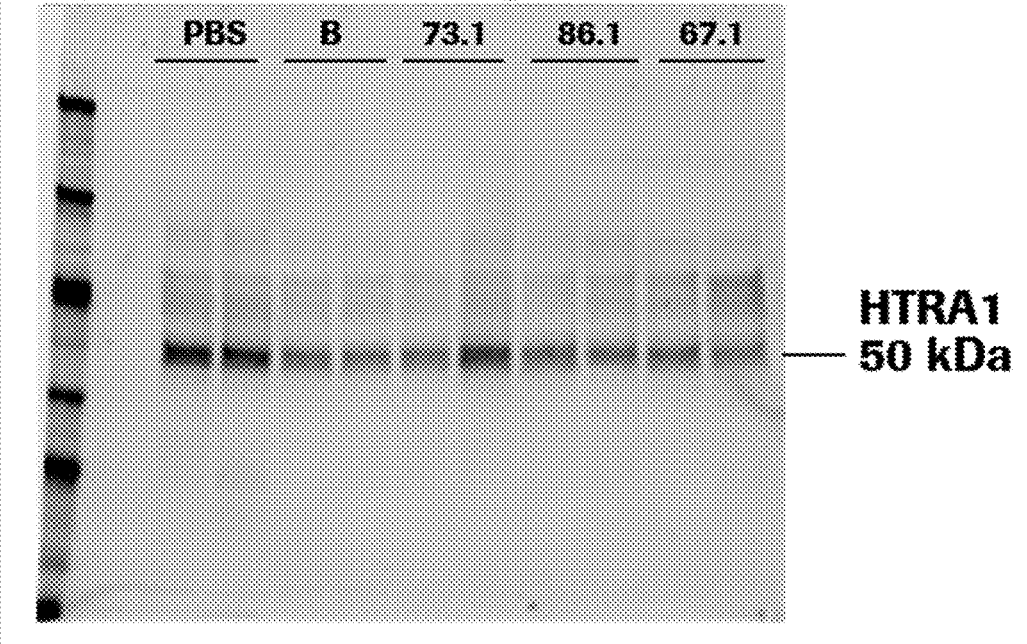
Figure 6:
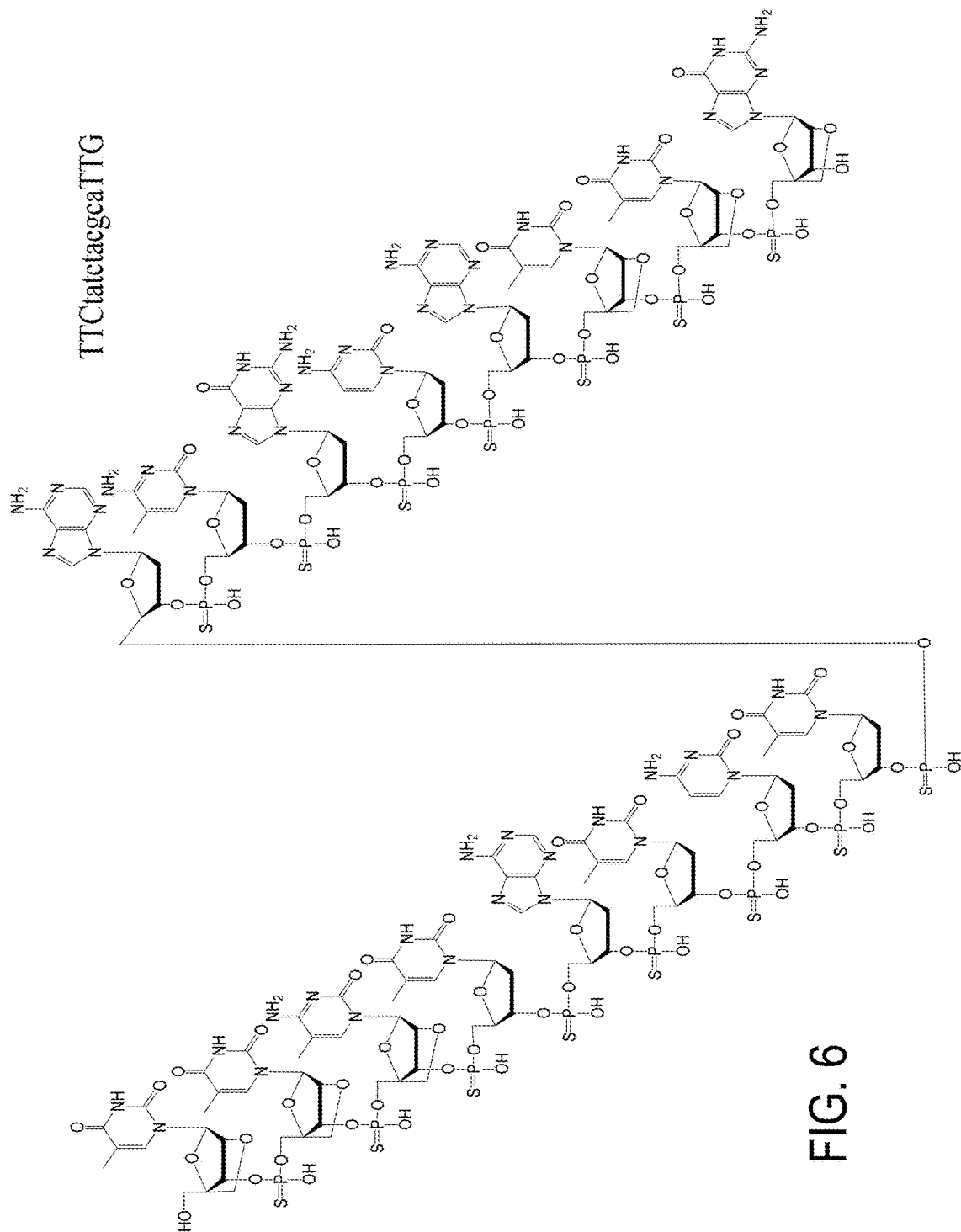
FIG. 6. A Compound of the invention (Compound ID NO 67,1). The compound may be in the form of a pharmaceutical salt, such as a sodium salt or a potassium salt.
Figure 7:
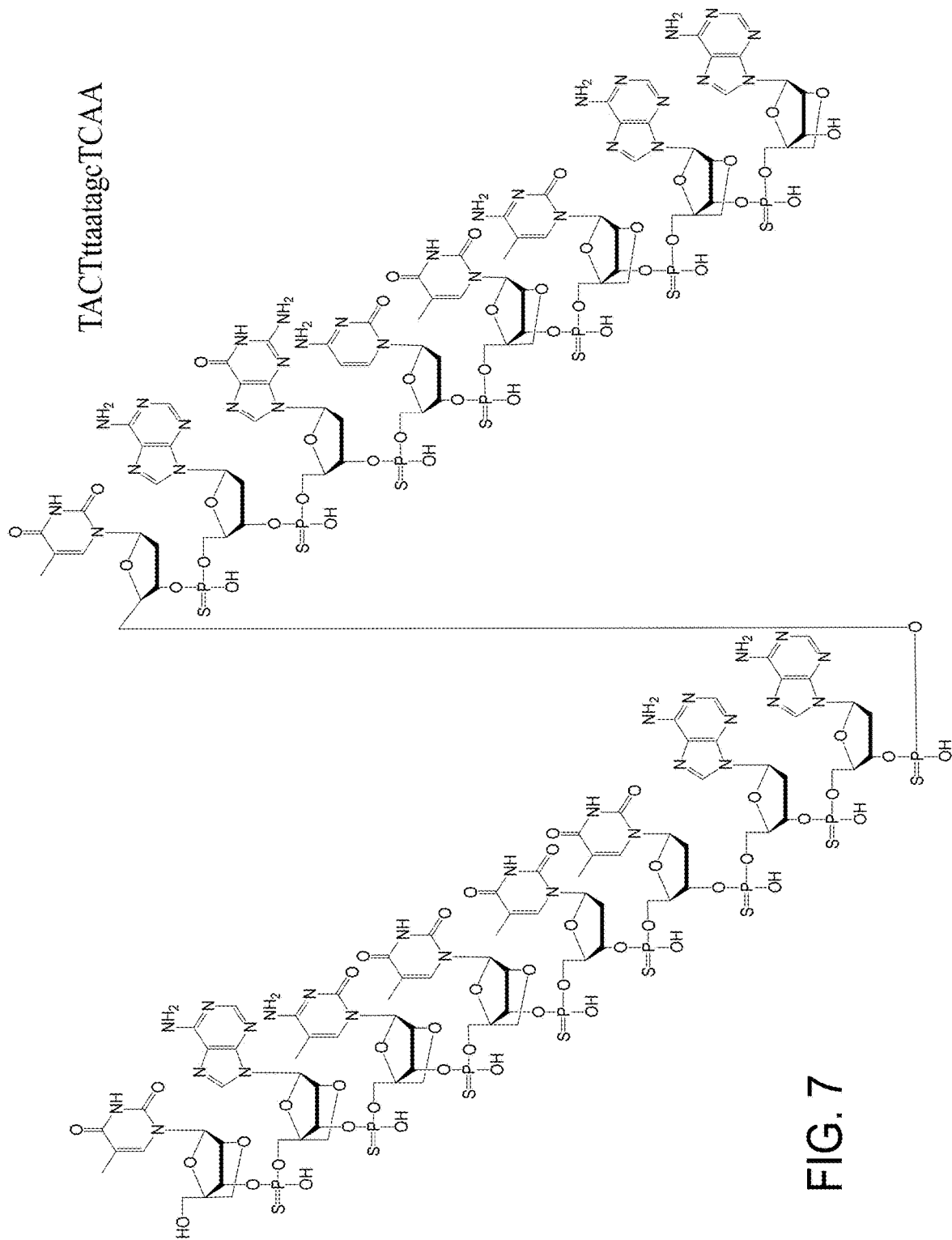
FIG. 7. A Compound of the invention (Compound ID NO 86,1). The compound may be in the form of a pharmaceutical salt, such as a sodium salt or a potassium salt.
Figure 8:
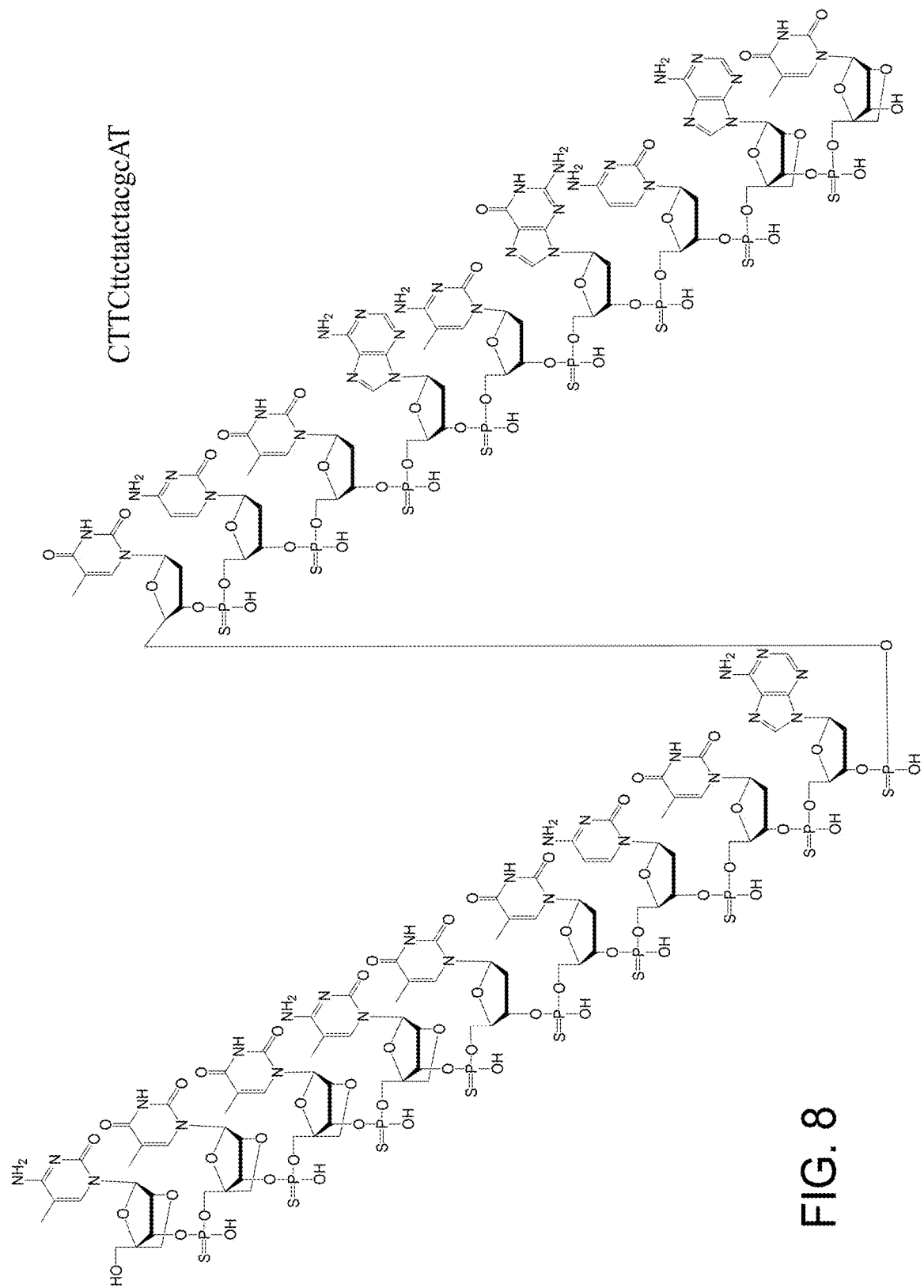
FIG. 8. A Compound of the invention (Compound ID NO 73,1). The compound may be in the form of a pharmaceutical salt, such as a sodium salt or a potassium salt.
Figure 9:
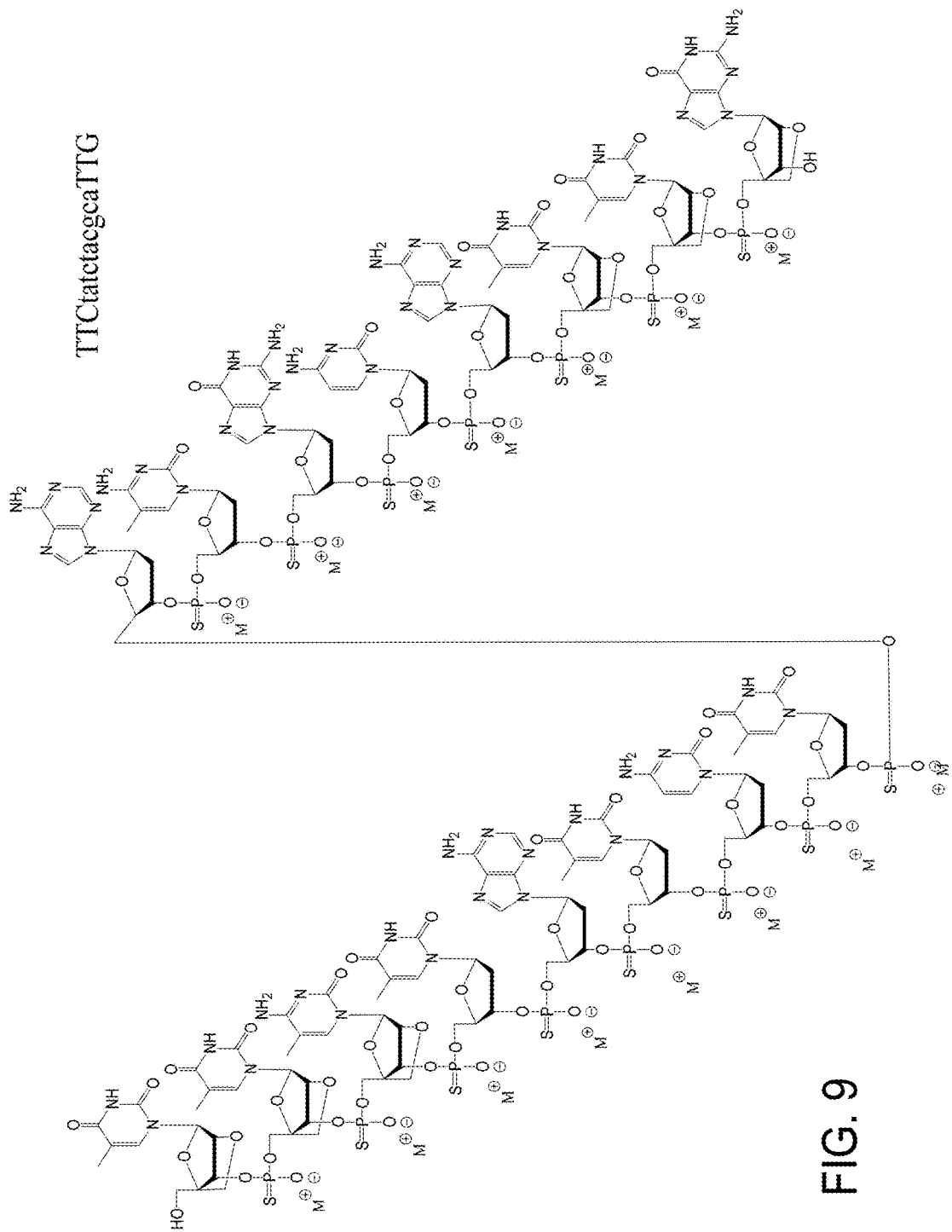
FIG. 9. An example of a pharmaceutical salt of compound 67,1: M+ is a suitable cation, typically a positive metal ion, such as a sodium or potassium ion. The stoichiometric ratio of the cation to the oligonucleotide anion will depend on the charge of the cation used. Suitably, cations with one, two or three positive charge ($M^+$, $M^{++}$, or $M^{+++}$, may be used). For illustrative purpose, twice as many single+charged cations (monovalent), such as $Na^+$ or $K^+$ are needed as compared to a divalent cation such as $Ca^{2+}$.
Figure 10:
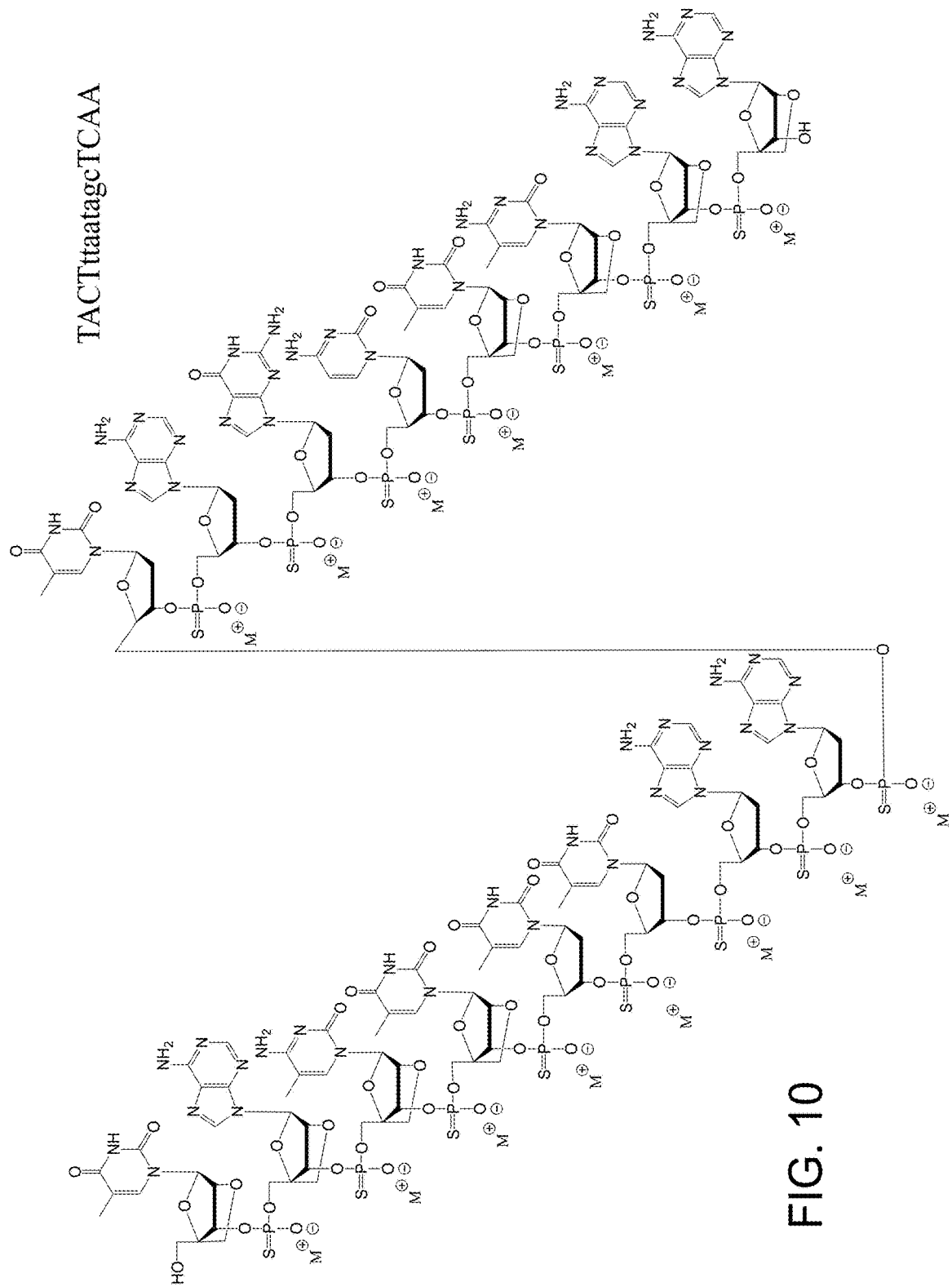
FIG. 10. An example of a pharmaceutical salt of compound 86,1: See the figure legend for FIG. 9 for the description of the cation $M^+$.
Figure 11:
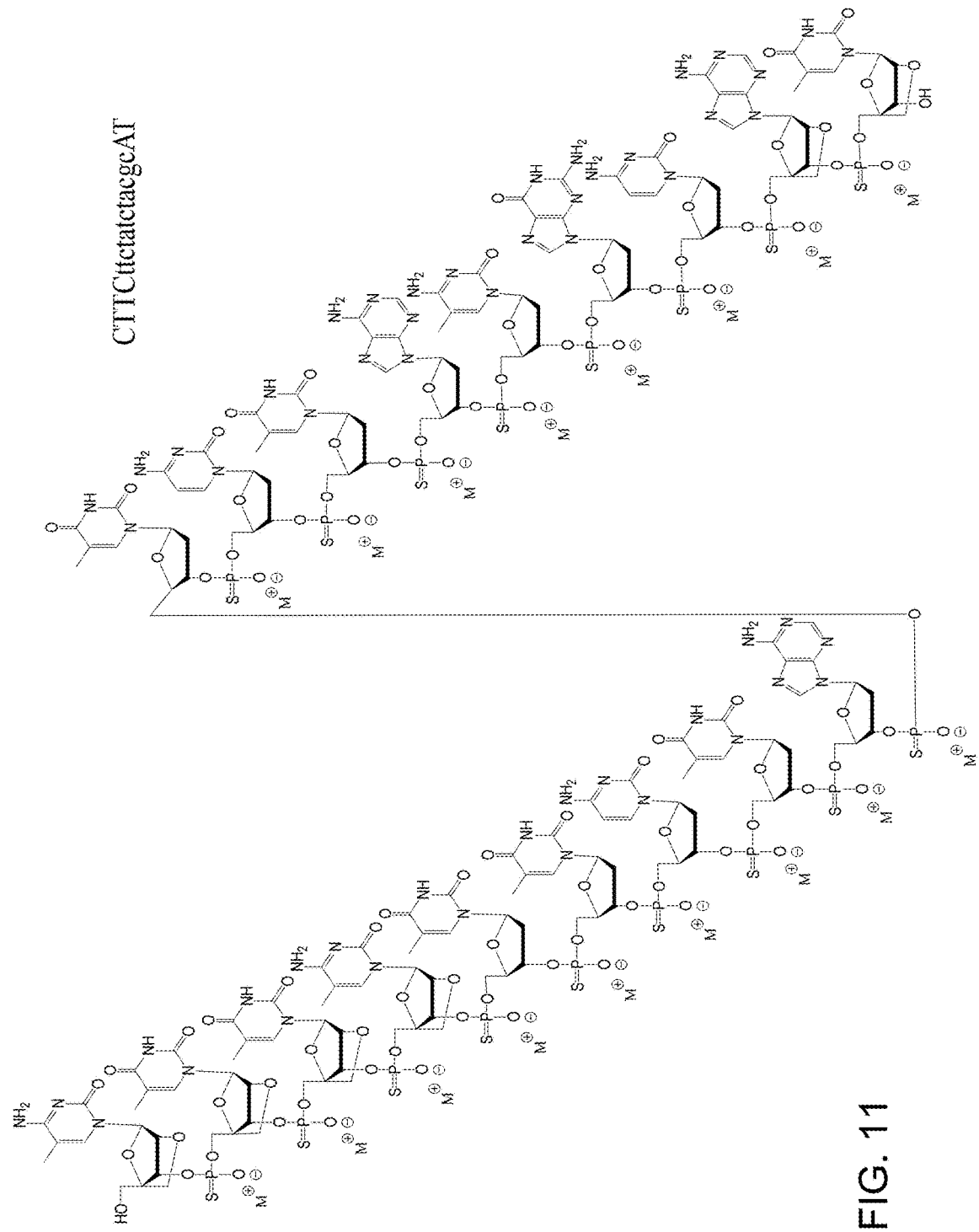
FIG. 11. An example of a pharmaceutical salt of compound 73,1: See the figure legend for FIG. 9 for the description of the cation $M^+$.

On the day of the experiment, cells were incubated for 1 hour with fresh differentiation media before addition of oligonucleotides. These were dissolved in PBS and applied on cells at day 0 and day 4. On day 7, the media was changed, and on day 10 cells were harvested with 50 µl of RLT buffer with β-mercapto-ethanol (Qiagen Cat #79216). The extraction of the RNA was performed according to the user's manual of the Qiagen RNeasy Mini Kit (Cat #74104; Lot 151048073) including DNase I treatment (Cat #79254; Lot 151042674). RNA quality control was performed with the Agilent Bioanalyzer Nano Kit (Agilent; Cat #5067-1511; Lot 1446). Reverse transcription of total RNA into cDNA (cDNA synthesis) was performed using the High Capacity cDNA Reverse Transcription Kit (based on random hexamer oligonucleotides), according to the manufacturer's instructions (Thermo Fisher Scientific, Cat #4368814; Lot 00314158). The measurement of the cDNA samples was carried out in triplicates, in a 384-well plate format on the 7900HT real-time PCR instrument (Thermo Fisher Scientific). The following TaqMan primer assays were used for qPCR: HTRA1, Hs01016151_m1 and Hs00170197_m1, housekeeping genes, GAPDH, Hs99999905_m1 and PPIA, Hs99999904_m1, from Life Technologies. n=3 biological replicates. The residual HTRA1 mRNA expression level is shown in FIG. 4 and the following table as % of control (PBS).

| | | mRNA level | | |
|---|---|---|---|---|
| SEQ ID NO | CMP ID NO | 50 µM | 10 µM | 1 µM |
| 37 | 37.1 | 32 | 60 | 77 |
| 35 | 35.1 | 9 | 20 | 64 |
| 85 | 85.1 | 22 | 49 | 46 |
| 90 | 90.1 | 22 | 39 | 61 |
| 95 | 95.1 | 20 | 47 | 74 |
| 98 | 98.1 | 14 | 27 | 55 |
| 30 | 30.1 | 19 | 41 | 75 |
| 32 | 32.1 | 14 | 25 | 53 |
| 26 | 26.1 | 21 | 39 | 73 |
| 33 | 33.1 | 18 | 70 | 58 |
| 34 | 34.1 | 16 | 35 | 63 |
| 52 | 52.1 | 13 | 31 | 61 |
| 54 | 54.1 | 7 | 20 | 53 |
| 72 | 72.1 | 7 | 18 | 56 |
| 70 | 70.1 | 8 | 18 | 53 |
| 74 | 74.1 | 3 | 12 | 40 |
| 73 | 73.1 | 13 | 13 | 65 |
| 75 | 75.1 | 7 | 15 | 55 |
| 86 | 86.1 | 8 | 27 | 70 |
| 67 | 67.1 | 8 | 27 | 77 |
| A | A | 31 | 57 | 72 |

Example 9

Cynomolgus Monkey In Vivo Pharmacokinetics and Pharmacodynamics Study, 21 Days of Treatment, Intravitreal (IVT) Injection, Single Dose Knock down was observed for 3 HTRA1 LNA oligonucleotides targeting the "hotspot" in human HTRA1 pre-mRNA between position 53113-53384 both at mRNA in the retina and at protein level in the retina and in the vitreous (see FIG. 5)

Animals

All experiments were performed on Cynomolgus monkeys (*Macaca fascicularis*).

Four animals were included in each group of the study, 20 in total.

Compounds and Dosing Procedures

Buprenorphine analgesia was administered prior to, and two days after test compound injection. The animals were anesthetized with an intramuscular injection of ketamine and xylazine. The test item and negative control (PBS) were administered intravitreally in both eyes of anesthetized animals (50 μL per administration) on study day 1 after local application of tetracaine anesthetic.

Euthanasia

At the end of the in-life phase (Day 22) all monkeys were euthanized by intraperitoneal an overdose injection of pentobarbital.

Oligo Content Measurement and Quantification of Htra1 RNA Expression by qPCR

Immediately after euthanasia, eye tissues were quickly and carefully dissected out on ice and stored at −80° C. until shipment. Retina sample was lysed in 700 μL MagNa Pure 96 LC RNA Isolation Tissue buffer and homogenized by adding 1 stainless steel bead per 2 ml tube 2×1.5 min using a precellys evolution homogenizer followed by 30 min incubation at RT. The samples were centrifuged, 13000 rpm, 5 min. Half was set aside for bioanalysis and for the other half, RNA extraction was continued directly.

For bioanalysis, the samples were diluted 10-50 fold for oligo content measurements with a hybridization ELISA method. A biotinylated LNA-capture probe and a digoxigenin-conjugated LNA-detection probe (both 35 nM in 5×SSCT, each complementary to one end of the LNA oligonucleotide to be detected) was mixed with the diluted homogenates or relevant standards, incubated for 30 minutes at RT and then added to a streptavidine-coated ELISA plates (Nunc cat. no. 436014).

The plates were incubated for 1 hour at RT, washed in 2×SSCT (300 mM sodium chloride, 30 mM sodium citrate and 0.05% v/v Tween-20, pH 7.0) The captured LNA duplexes were detected using an anti-DIG antibodies conjugated with alkaline phosphatase (Roche Applied Science cat. No. 11093274910) and an alkaline phosphatase substrate system (Blue Phos substrate, KPL product code 50-88-00). The amount of oligo complexes was measured as absorbance at 615 nm on a Biotek reader.

For RNA extraction, cellular RNA large volume kit (05467535001, Roche) was used in the MagNA Pure 96 system with the program: Tissue FF standard LV3.1 according to the instructions of the manufacturer, including DNAse treatment. RNA quality control and concentration were measured with an Eon reader (Biotek). The RNA concentration was normalized across samples, and subsequent cDNA synthesis and qPCR was performed in a one-step reaction using qScript XLT one-step RT-qPCR ToughMix Low ROX, 95134-100 (Quanta Biosciences). The following TaqMan primer assays were used in singplex reactions: Htra1, Mf01016150_, Mf01016152_m1 and Rh02799527_m1 and housekeeping genes, ARFGAP2, Mf01058488_g1 and Rh01058485_m1, and ARL1, Mf02795431_m1, from Life Technologies. The qPCR analyses were run on a ViiA7 machine (Life Technologies).

Eyes/group: n=3 eyes. Each eye was treated as an individual sample. The relative Htra1 mRNA expression level is shown as % of control (PBS).

Histology

Eyeballs were removed and fixed in 10% neutral buffered formalin for 24 hours, trimmed and embedded in paraffin. For ISH analysis, sections of formalin-fixed, paraffin-embedded cyno retina tissue 4 μm thick were processed using the fully automated Ventana Dicovery ULTRA Staining Module (Procedure: mRNA Discovery Ultra Red 4.0-v0.00.0152) using the RNAscope 2.5 VS Probe-Mmu-HTRA1, REF 486979, Advanced Cell Diagnostics, Inc., Chromogen used is Fastred, Hematoxylin H counterstain.

HTRA1 Protein Quantification Using a Plate-Based Immunoprecipitation Mass Spectrometry (IP-MS) Approach Sample Preparation, Retina Retinas were homogenized in 4 volumes (w/v) of RIPA buffer (50 mM Tris-HCl, pH 7.4, 150 mM NaCl, 0.25% deoxycholic acid, 1% NP-40, 1 mM EDTA, Millipore) with protease inhibitors (Complete EDTA-free, Roche) using a Precellys 24 (5500, 15 s, 2 cycles). Homogenates were centrifuged (13,000 rpm, 3 min) and the protein contents of the supernatants determined (Pierce BCA protein assay)

Sample Preparation, Vitreous

Vitreous humors (300 μl) were diluted with 5×RIPA buffer (final concentration: 50 mM Tris-HCl, pH 7.4, 150 mM NaCl, 0.25% deoxycholic acid, 1% NP-40, 1 mM EDTA) with protease inhibitors (Complete EDTA-free, Roche) and homogenized using a Precellys 24 (5500, 15 s, 2 cycles). Homogenates were centrifuged (13,000 rpm, 3 min) and the protein contents of the supernatants determined (Pierce BCA protein assay)

Plate-Based HTRA1 Immunoprecipitation and Tryptic Digest

A 96 well plate (Nunc MaxiSorp) was coated with anti-HTRA1 mouse monoclonal antibody (R&D MAB2916, 500 ng/well in 50 μl PBS) and incubated overnight at 4° C. The plate was washed twice with PBS (200 μl) and blocked with 3% (w/v) BSA in PBS for 30 min at 20° C. followed by two PBS washes. Samples (75 μg retina, 100 μg vitreous in 50 μl PBS) were randomized and added to the plate followed by overnight incubation at 4° C. on a shaker (150 rpm). The plate was then washed twice with PBS and once with water. 10 mM DTT in 50 mM TEAB (30 μl) were then added to each well followed by incubation for 1 h at 20° C. to reduce cysteine sulfhydryls. 150 mM iodoacetamide in 50 mM TEAB (5 μl) were then added to each well followed by incubation for 30 min at 20° C. in the dark in order to block cysteine sulfhydryls. 10 μl Digestion solution were added to each well (final concentrations: 1.24 ng/μl trypsin, 20 fmol/μl BSA peptides, 26 fmol/μl isotope-labeled HTRA1 peptides, 1 fmol/μl iRT peptides, Biognosys) followed by incubation overnight at 20° C.

HTRA1 Peptide Quantification by Targeted Mass Spectrometry (Selected Reaction Monitoring, SRM)

Mass spectrometry analysis was performed on an Ultimate RSLCnano LC coupled to a TSQ Quantiva triple quadrupole mass spectrometer (Thermo Scientific). Samples (20 μL) were injected directly from the 96 well plate used for IP and loaded at 5 μL/min for 6 min onto a Acclaim Pepmap 100 trap column (100 μm×2 cm, C18, 5 μm, 100 Å, Thermo Scientific) in loading buffer (0.5% v/v formic acid, 2% v/v ACN). Peptides were then resolved on a PepMap Easy-SPRAY analytical column (75 μm×15 cm, 3 μm, 100 Å, Thermo Scientific) with integrated electrospray emitter heated to 40° C. using the following gradient at a flow rate of 250 nL/min: 6 min, 98% buffer A (2% ACN, 0.1% formic acid), 2% buffer B (ACN+0.1% formic acid); 36 min, 30% buffer B; 41 min, 60% buffer B; 43 min, 80% buffer B; 49 min, 80% buffer B; 50 min, 2% buffer B. The TSQ Quantiva was operated in SRM mode with the following parameters: cycle time, 1.5 s; spray voltage, 1800 V; collision gas pressure, 2 mTorr; Q1 and Q3 resolution, 0.7 FWHM; ion transfer tube temperature 300° C. SRM transitions were acquired for the HTRA1 peptide "LHRPPVIVLQR" and an isotope labelled (L-[U-13C, U-15N]R) synthetic version, which was used an internal standard.

Data analysis was performed using Skyline version 3.6.
Western Blot

Dissected retina sample in 0.5 Precellyses tubes (CK14_0.5 ml, Bertin Technologies) were lysed and homogenized in RIPA lysis buffer (20-188, Milipore) with protease inhibitors (Complete EDTA-free Proteases-Inhibitor Mini, 11 836 170 001, Roche).

Vitreous sample were added to a 0.5 Precellyses tubes (CK14_0.5 ml, Bertin Technologies) were lysed and homogenized in ¼×RIPA lysis buffer (20-188, Milipore) with protease inhibitors (Complete EDTA-free Proteases-Inhibitor Mini, 11 836 170 001, Roche).

Samples (retina 20 μg protein, vitreous 40 μg protein) were analyzed on 4-15% gradient gel (#567-8084 Bio-Rad) under reducing conditions and transferred on Nitrocellulose (#170-4159 Bio-Rad) using a Trans-Blot Turbo Device from Bio-Rad.

Primary antibodies: Rabbit anti human HTRA1 (SF1) was a kind gift of Sascha Fauser (University of Cologne), mouse anti human Gapdh (#98795 Sigma-Aldrich). Secondary antibody: goat anti rabbit 800CW and goat anti mouse 680RD were from Li-Cor Blot was imaged and analyzed on an Odyssee CLX from Li-Cor.

Example 10

Cynomolgus Monkey In Vivo Assessment: HTRA1 Protein Determination in Aqueous Humor and Comparison to HTRA1 mRNA and Protein Inhibition in Retina Experimental Methodology: See above example. Aqueous humor samples were taken and samples were prepared as according to example 9 vitreous humor samples. Cynomolgus Monkey Aqueous humor samples (AH) were analyzed with a size-based assay on a Analytical Methodology: Capillary Electrophoresis System (Peggy Sue™, Proteinsimple)

Samples were thawed on ice and used undiluted. For quantification, recombinant HTRA1-S328A mutant (Origene #TP700208). Preparation was as described by the provider. Primary rabbit anti-human HTRA Antibody SF1 was provided by Prof. Dr. Sascha Fauser and used diluted 1:300. All other reagents were from Proteinsimple.

Samples were processed in technical triplicate, calibration curve in duplicate using a 12-230 kDa Separation module. Area under the peak was computed and analyzed using Xlfit (IDBS software).

Results

| FIG. numbering | Compound ID | mRNA_retina | protein_retina | protein_AH |
|---|---|---|---|---|
| PBS | — | 82 | 101 | 95 |
| PBS | — | 107 | 99 | 118 |
| # 15.3 | B | 56 | 73 | 51 |
| # 15.3 | B | 52 | 53 | 68 |
| # 17 | # 73.1 | 23 | 41 | 47 |
| # 17 | # 73.1 | 26 | 44 | 44 |
| # 18 | # 86.1 | 32 | 29 | 44 |
| # 18 | # 86.1 | 23 | 28 | 64 |
| # 19 | # 67.1 | 34 | 39 | 44 |
| # 19 | # 67.1 | 34 | 61 | 42 |

Figure 12A:
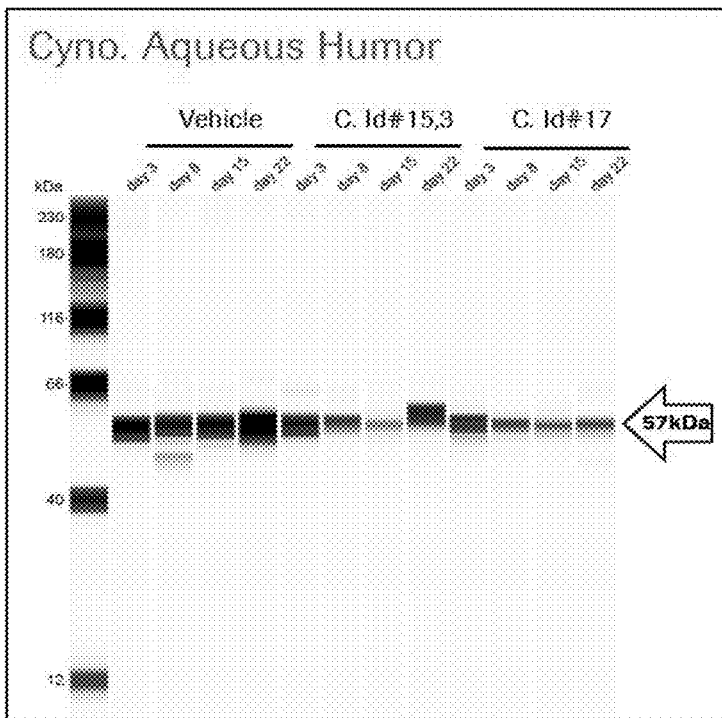
FIG. 12A. Compounds #15,3 and #17 were administered intravitreally in cynomolgus monkeys, and aqueous humor samples were collected at days 3, 8, 15, and 22 post-injection. Proteins from undiluted samples were analyzed by capillary electrophoresis using a Peggy Sue device (Protein Simple). HTRA1 was detected using a custom-made polyclonal rabbit antiserum. Data from animals #J60154 (Vehicle), J60158 (C. Id #15,3), J60162 (C. Id #17) are presented.
Figure 12B:
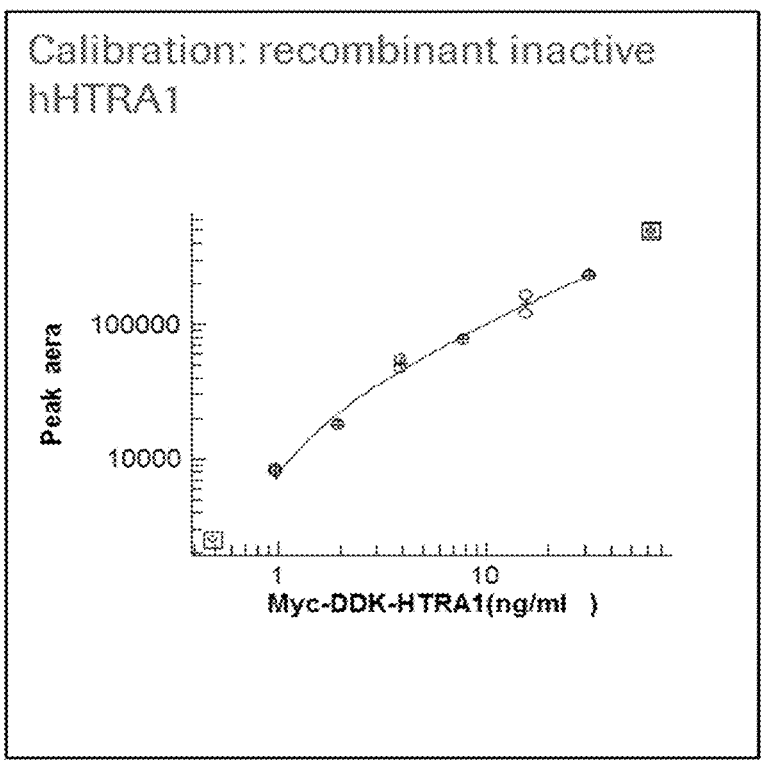
FIG. 12B. Signal intensities were quantified by comparison to purified recombinant (S328A mutant) HTRA1 protein (Origene, #TP700208). The calibration curve is shown here.
Figure 12C:
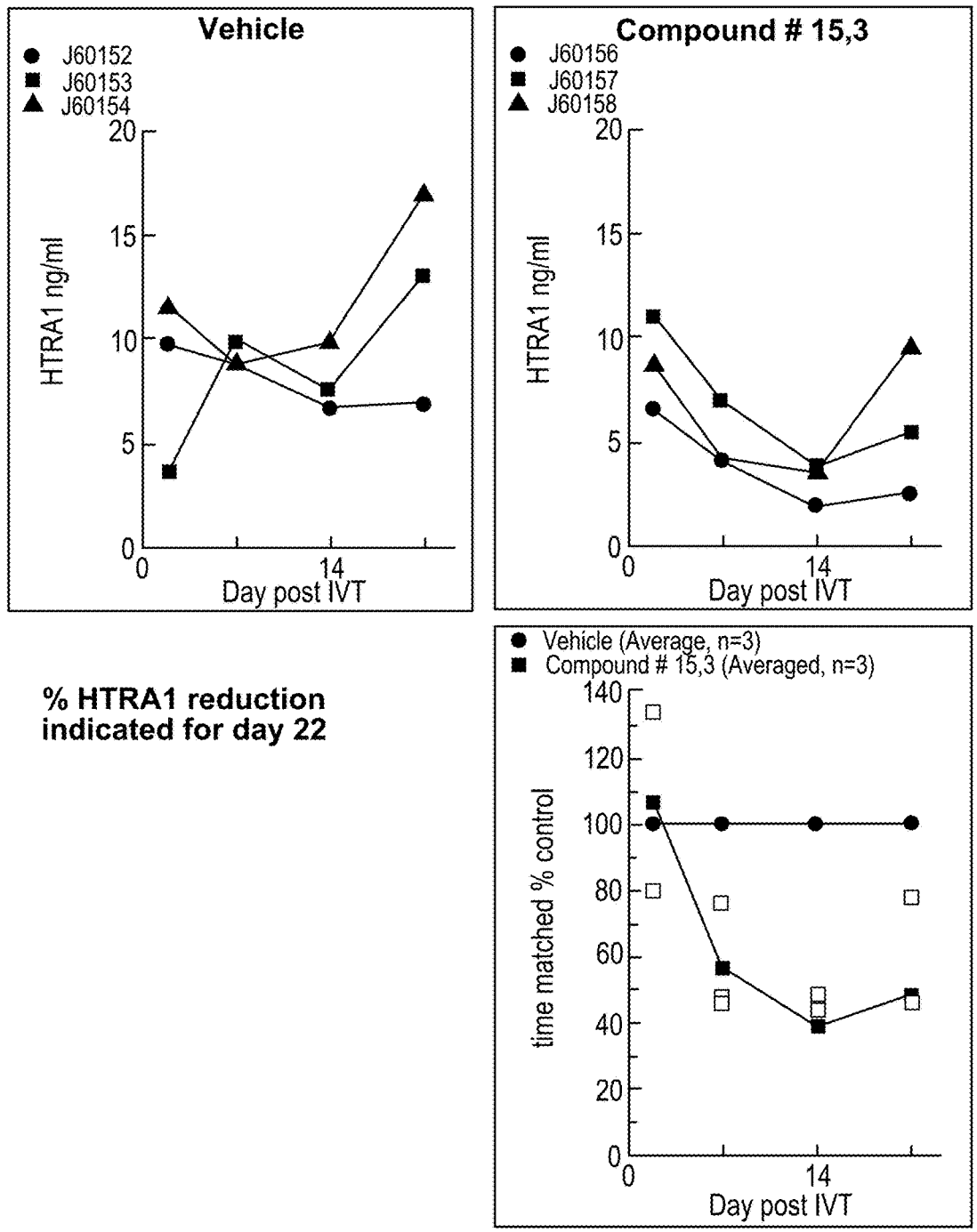
FIG. 12C. Top panel: Calculated HTRA1 aqueous humor concentration from individual animal was plotted against time post injection. Bottom panel: average HTRA1 concentration for the vehicle group at each time point was determined and corresponding relative concentration in treated animals calculated. Open circle: individual value, closed circle: group average. HTRA1 reduction for day 22 is indicated.
Figure 12C:
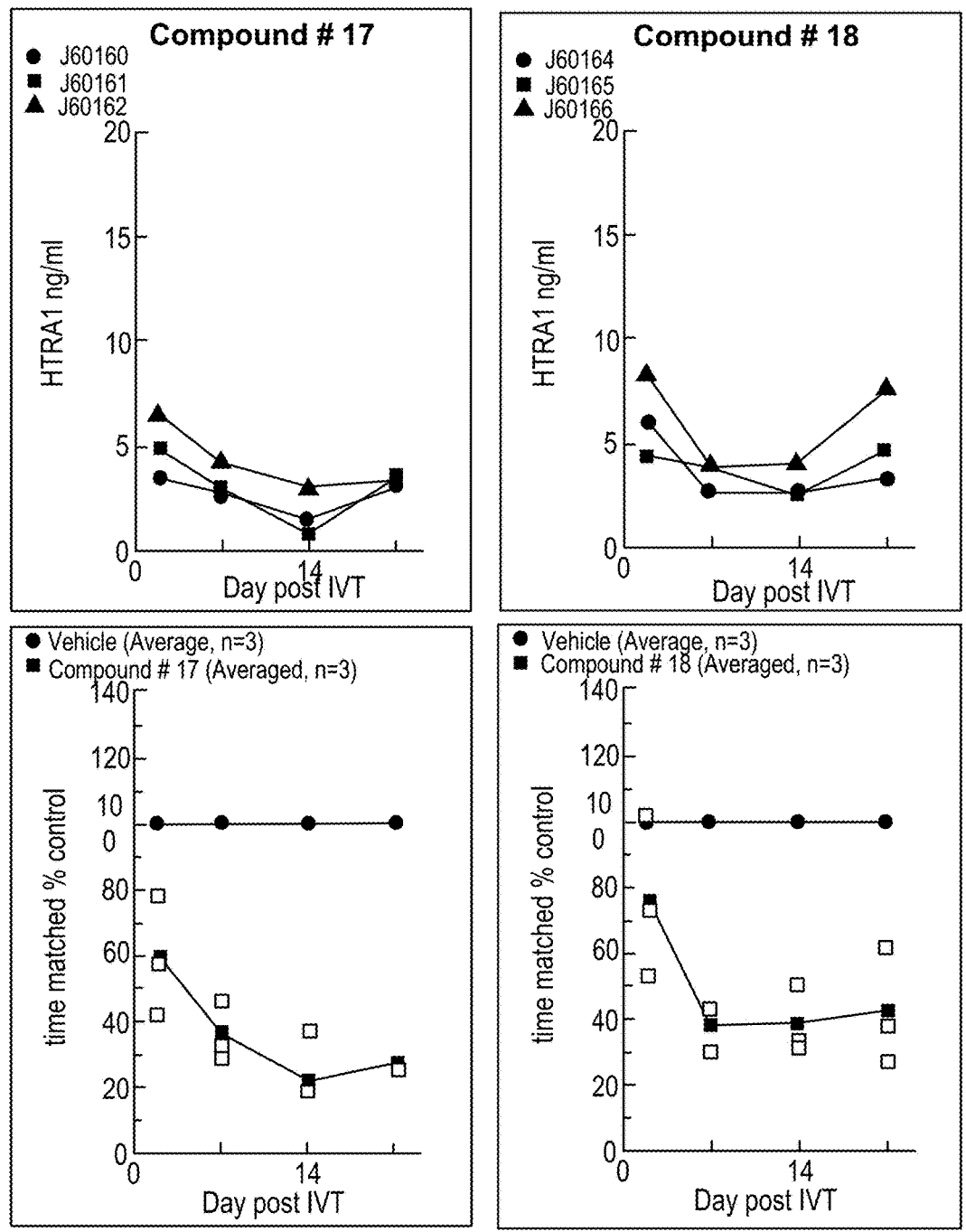
Figure 12C:
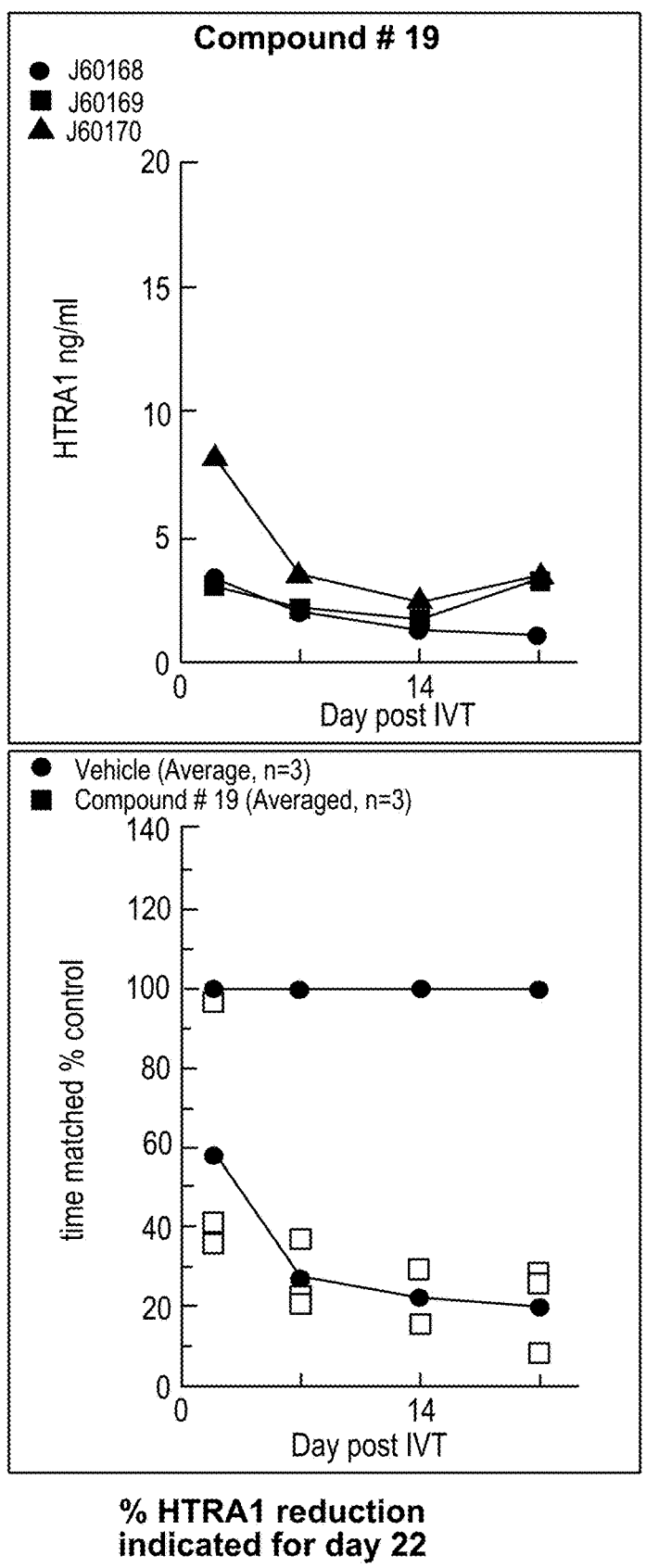
Figure 13:
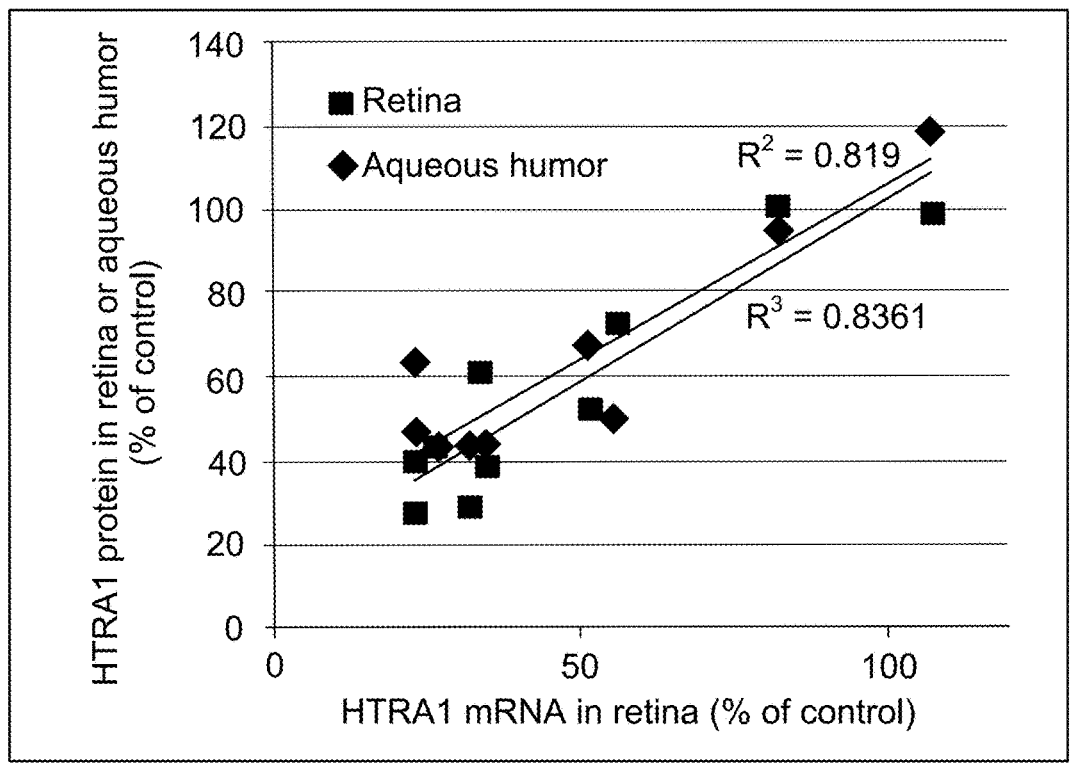
FIG. 13. HTRA1 mRNA plotted against HTRA1 protein levels in aqueous humor (blue diamonds) or in retina (red squares) in cynomolgus monkeys treated with various LNA molecules targeting the HTRA1 transcript. Values are expressed as percentage normalized to PBS controls.
Figure 14:
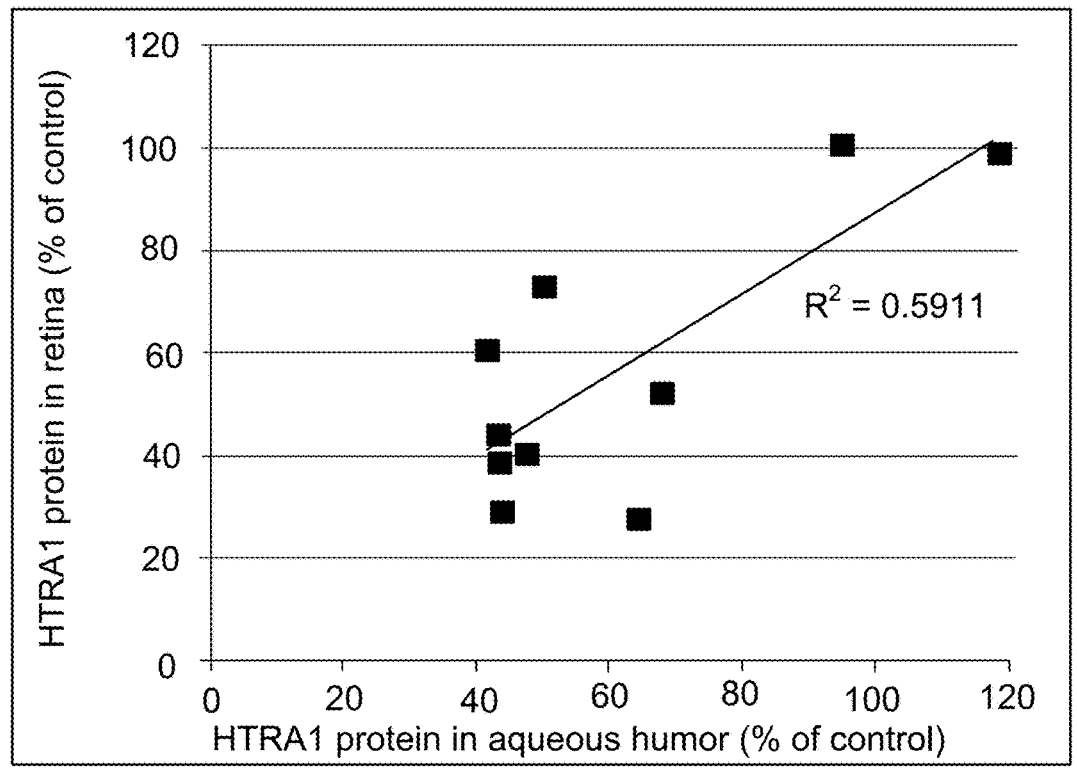
FIG. 14. Correlation of HTRA1 protein in aqueous humor with (A) HTRA1 protein in retina and (B) HTRA1 mRNA in retina in cynomolgus monkeys treated with various LNA molecules targeting the HTRA1 transcript. Values are expressed as percentage normalized to PBS controls.

Note-
the compound IDs shown in FIGS. 12-14 utilize a different numbering system as the rest of the examples. The above table provides the key to the numbering used FIGS. 12-14 as compared to that used in the previous examples and elsewhere herein.

FIG. 12A shows a visualization of the HTRA1 protein levels in the aqueous humor of monkeys administered with compounds B and #73,1, with samples taken at days 3, 8, 15, and 22 post-injection. FIG. 12B provides the calibration curve used in calculating HTRA1 protein levels.

FIG. 12C provides the calculated HTRA1 levels from aqueous humor from individual animal was plotted against time post injection.

FIG. 13 illustrates a direct correlation between the level of HTRA1 protein in the aqueous humor and the level of HTRA1 mRNA in the retina. Aqueous humor HTRA1 protein levels may therefore be used as a biomarker for HTRA1 retina mRNA levels or HTRA1 retinal mRNA inhibition.

FIG. 14 illustrates that there is also a correlation between HTRA1 protein levels in retina and the HTRA1 protein levels in aqueous humor, although the correlation was not, in this experiment, as strong as the correlation between HTRA1 mRNA inhibition in the retina and HTRA1 protein levels in the aqueous humor, indicating that aqueous humor HTRA1 protein levels are particularly suited as biomarker for HTRA1 mRNA antagonists.

The invention claimed is:

1. An antisense oligonucleotide of no more than 30 nucleotides comprising a nucleotide sequence selected from the group consisting of:

TTCtatctacgcaTTG, (SEQ ID NO 67)

CTTCttctatctacgcAT, (SEQ ID NO 73) and

TACTttaatagcTCAA; (SEQ ID NO 86)

wherein capital letters are LNA nucleotides, and lower case letters are DNA nucleosides, and cytosine residues are optionally 5-methyl cytosine.

2. The antisense oligonucleotide according to claim 1, wherein the LNA nucleosides are beta-D-oxy LNA nucleosides.

3. The antisense oligonucleotide according to claim 1, wherein the internucleoside linkages between the nucleotides of the contiguous nucleotide region are all phosphorothioate internucleoside linkages.

4. An oligonucleotide comprising or consisting of an oligonucleotide selected from the group consisting of:

$T_s T_s {}^m C_s t_s a_s t_s c_s t_s a_s {}^m c_s g_s c_s a_s T_s T_s G$, (SEQ ID NO 67)

${}^m C_s T_s T_s {}^m C_s t_s t_s c_s t_s a_s t_s c_s t_s a_s {}^m c_s g_s c_s A_s T$, (SEQ ID NO 73) and $T_s A_s {}^m C_s T_s t_s t_s a_s a_s t_s a_s g_s c_s T_s {}^m C_s A_s A$; (SEQ ID NO 86)

wherein capital letters represent beta-D-oxy LNA nucleosides, lower case letters represent DNA nucleosides, subscript s represents a phosphorothioate internucleoside linkage, and $^m C$ represent 5 methyl cytosine beta-D-oxy LNA nucleosides, and $^m c$ represents 5 methyl cytosine DNA nucleosides.

5. A pharmaceutically acceptable salt of the oligonucleotide of claim 1.

6. A conjugate comprising the oligonucleotide of claim 1, and at least one conjugate moiety covalently attached to said oligonucleotide.

7. A pharmaceutical composition comprising the oligonucleotide of claim 1 and a pharmaceutically acceptable diluent, solvent, carrier, salt and/or adjuvant.

8. An oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides.

9. A pharmaceutically acceptable salt of the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides.

10. A pharmaceutically acceptable salt of the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, wherein the pharmaceutically acceptable salt is a potassium salt.

11. A pharmaceutically acceptable salt of the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides, wherein the pharmaceutically acceptable salt is a sodium salt.

12. A pharmaceutical composition comprising the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides; and a pharmaceutically acceptable diluent, carrier, salt and/or adjuvant.

13. A pharmaceutical composition comprising the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^m C$ represent 5 methyl cytosine beta-D-oxy LNA nucleosides; and a pharmaceutically acceptable diluent, wherein the pharmaceutically acceptable diluent is phosphate buffered saline.

14. A pharmaceutical composition comprising a pharmaceutically acceptable salt of the oligonucleotide of formula:

$T_s A_s {}^m C_s T_s t_s t_s a_s a_s t_s a_s g_s c_s T_s {}^m C_s A_s A$ (SEQ ID NO 86)

wherein capital letters represent beta-D-oxy LNA nucleosides, lower case letters are DNA nucleosides, subscript s represents a phosphorothioate internucleoside linkage, and $^mC$ represent 5 methyl cytosine beta-D-oxy LNA nucleosides; and a pharmaceutically acceptable diluent, carrier, salt and/or adjuvant.

15. A pharmaceutical composition comprising a pharmaceutically acceptable salt of the oligonucleotide of formula:

$T_sA_s{}^mC_sT_st_st_sa_sa_st_sa_sg_sc_sT_s{}^mC_sA_sA$ (SEQ ID NO 86)

wherein capital letters represent beta-D-oxy LNA nucleosides, lower case letters are DNA nucleosides, subscript s represents a phosphorothioate internucleoside linkage, and $^mC$ represent 5 methyl cytosine beta-D-oxy LNA nucleosides, wherein the pharmaceutically acceptable salt is a sodium salt; and a pharmaceutically acceptable diluent or carrier.

16. A pharmaceutical composition comprising a pharmaceutically acceptable salt of the oligonucleotide of formula:

$T_sA_s{}^mC_sT_st_st_sa_sa_st_sa_sg_sc_sT_s{}^mC_sA_sA$ (SEQ ID NO 86)

wherein capital letters represent beta-D-oxy LNA nucleosides, lower case letters are DNA nucleosides, subscript s represents a phosphorothioate internucleoside linkage, and $^mC$ represent 5 methyl cytosine beta-D-oxy LNA nucleosides, wherein the pharmaceutically acceptable salt is a potassium salt; and a pharmaceutically acceptable diluent or carrier.

17. A pharmaceutical composition comprising a pharmaceutically acceptable salt of the oligonucleotide of formula:

$T_sA_s{}^mC_sT_st_st_sa_sa_st_sa_sg_sc_sT_s{}^mC_sA_sA$ (SEQ ID NO 86)

wherein capital letters represent beta-D-oxy LNA nucleosides, lower case letters are DNA nucleosides, subscript s represents a phosphorothioate internucleoside linkage, and $^mC$ represent 5 methyl cytosine beta-D-oxy LNA nucleosides, and $^mc$ represents 5 methyl cytosine DNA nucleosides, wherein the pharmaceutically acceptable salt is a sodium salt; and a pharmaceutically acceptable diluent, wherein the pharmaceutically acceptable diluent is phosphate buffered saline.

18. An oligonucleotide of formula

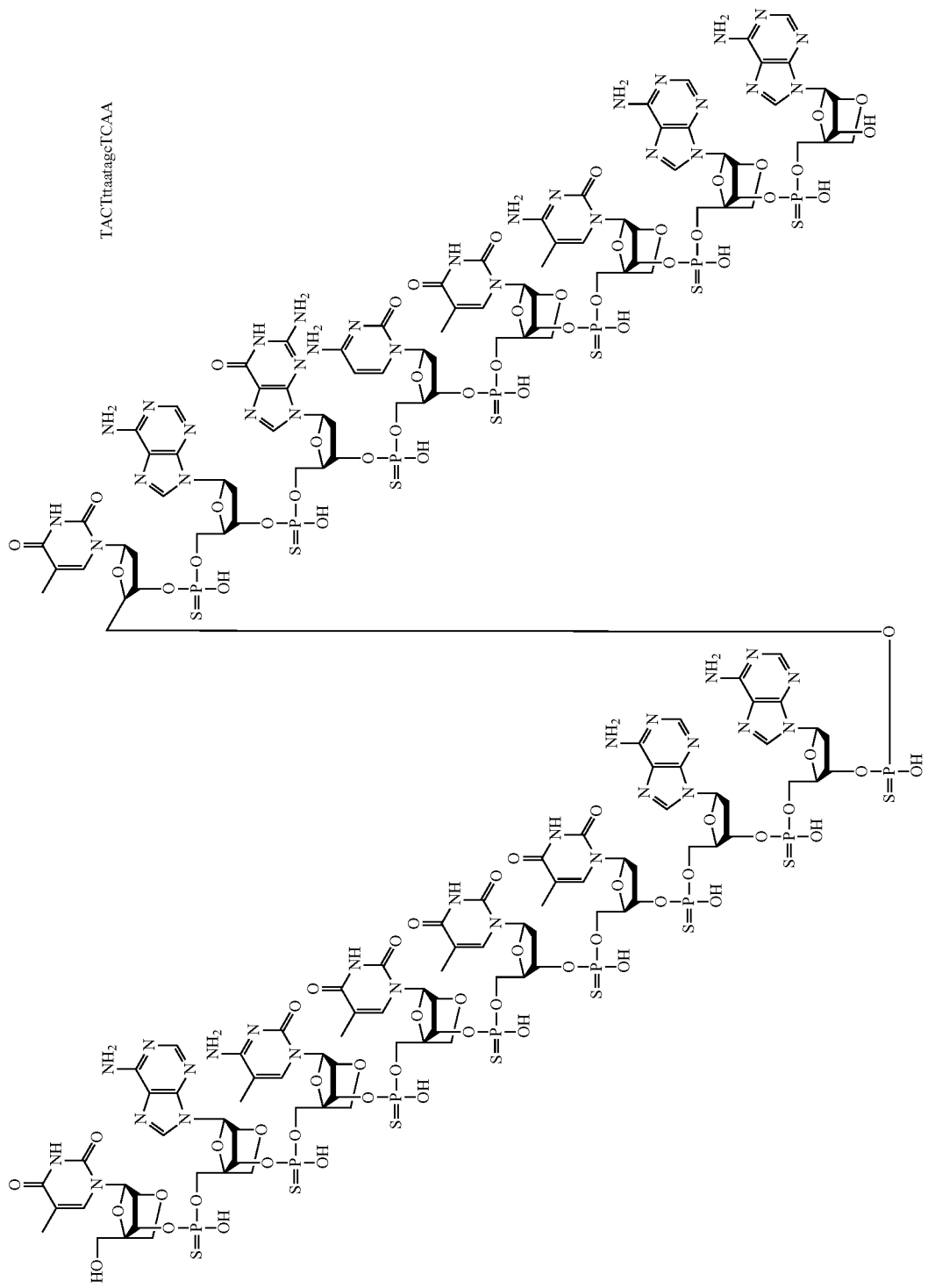

or a pharmaceutically acceptable salt thereof.

19. A pharmaceutical composition comprising a pharmaceutically acceptable salt of the oligonucleotide of formula:

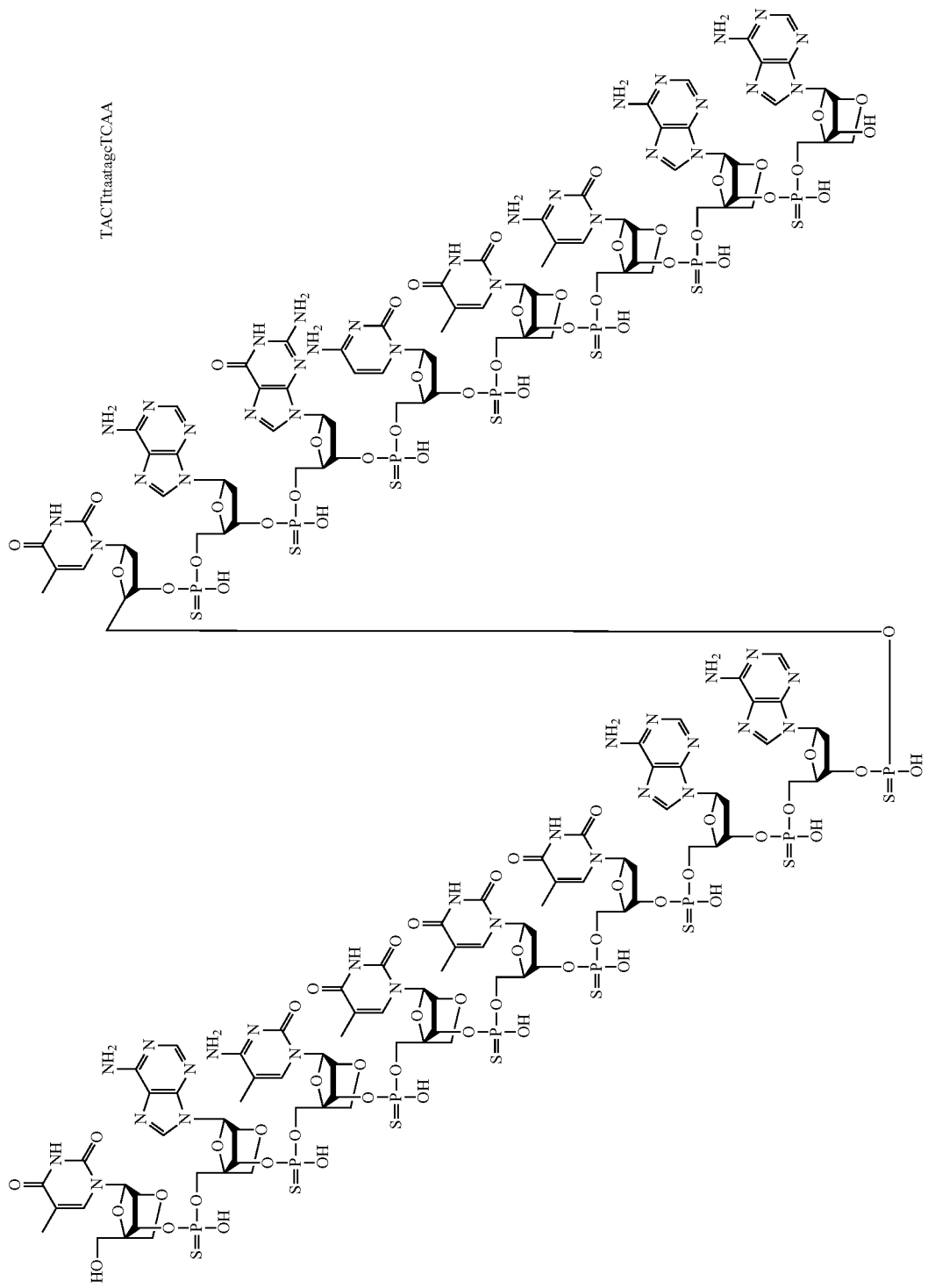

and a pharmaceutically acceptable diluent or carrier.

20. A pharmaceutical composition comprising a pharmaceutically acceptable sodium salt of the oligonucleotide of formula

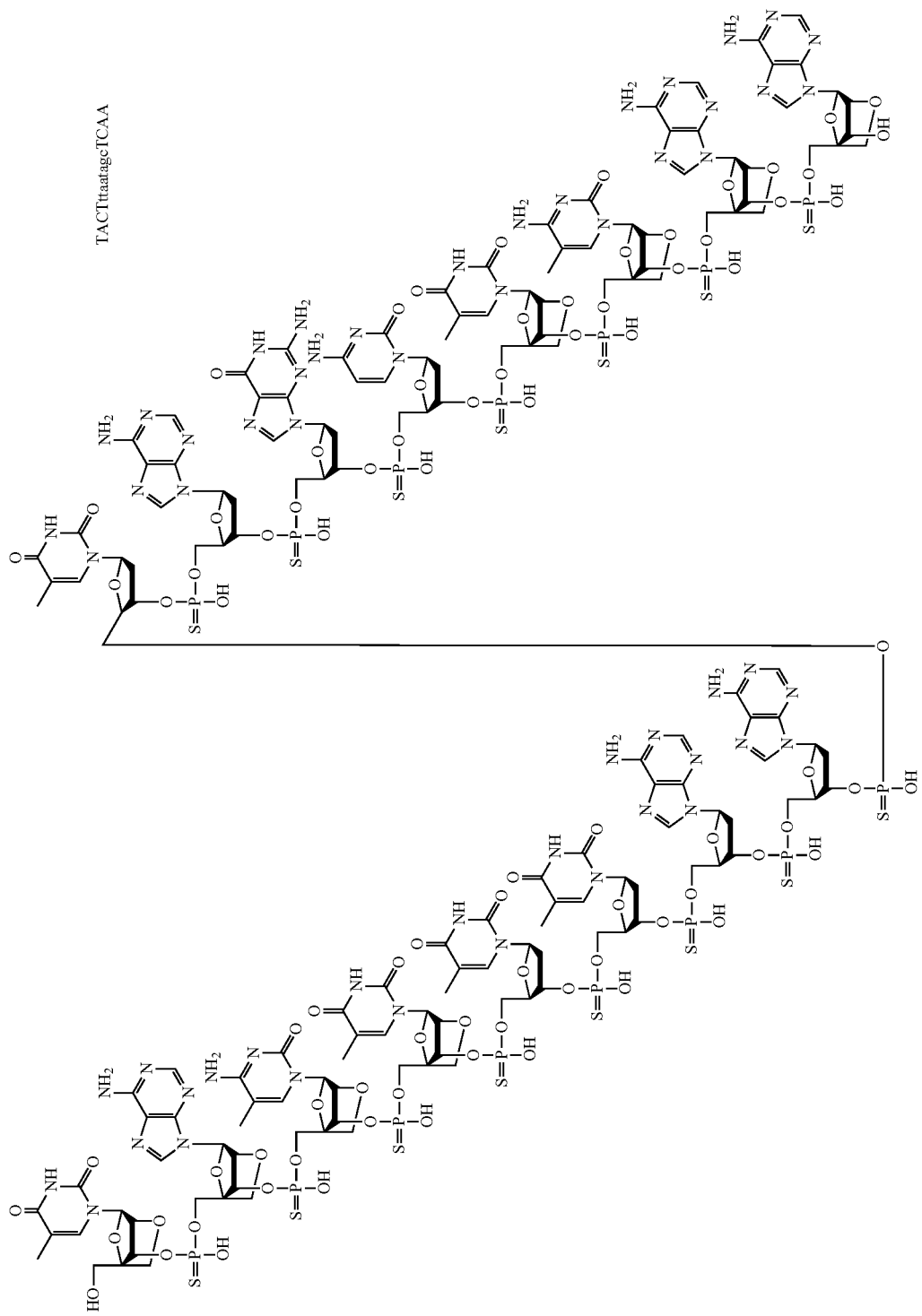

and a pharmaceutically acceptable diluent, wherein the pharmaceutically acceptable diluent is phosphate buffered saline.

21. An oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$c represent 5 methyl cytosine beta-D-oxy LNA nucleosides.

22. A pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$c represent 5 methyl cytosine beta-D-oxy LNA nucleosides.

23. A pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides, wherein the pharmaceutically acceptable salt is a potassium salt.

24. A pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, and $^m$c represent 5 methyl cytosine beta-D-oxy LNA nucleosides, wherein the pharmaceutically acceptable salt is a sodium salt.

25. A pharmaceutical composition comprising the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides; and a pharmaceutically acceptable diluent, carrier, salt and/or adjuvant.

26. A pharmaceutical composition comprising the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides; and a pharmaceutically acceptable diluent, wherein the pharmaceutically acceptable diluent is phosphate buffered saline.

27. A pharmaceutical composition comprising a pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides; and a pharmaceutically acceptable diluent, carrier, salt and/or adjuvant.

28. A pharmaceutical composition comprising a pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides $^m$c represents 5 methyl cytosine DNA nucleosides and $^m$C represent 5 methyl cytosine beta-D-oxy LNA nucleosides, wherein the pharmaceutically acceptable salt is a sodium salt; and a pharmaceutically acceptable diluent or carrier.

29. A pharmaceutical composition comprising a pharmaceutically acceptable salt of the oligonucleotide of formula $T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides, wherein the pharmaceutically acceptable salt is a potassium salt; and a pharmaceutically acceptable diluent or carrier.

30. A pharmaceutical composition comprising a pharmaceutically acceptable salt of the oligonucleotide of formula:

$T_sT_s{}^mC_st_sa_st_sc_st_sa_s{}^mc_sg_sc_sa_sT_sT_sG$ (SEQ ID NO 67)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides, and $^m$c represents 5 methyl cytosine DNA nucleosides, wherein the pharmaceutically acceptable salt is a sodium salt; and a pharmaceutically acceptable diluent, wherein the pharmaceutically acceptable diluent is phosphate buffered saline.

31. An oligonucleotide of formula:

$^mC_sT_sT_s{}^mC_st_st_sc_st_sa_st_sc_st_sa_s{}^mc_sg_sc_sA_sT$ (SEQ IS NO 73)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides.

32. A pharmaceutically acceptable salt of the oligonucleotide of formula:

$^mC_sT_sT_s{}^mC_st_st_sc_st_sa_st_sc_st_sa_s{}^mc_sg_sc_sA_sT$ (SEQ IS NO 73)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^m$C represent 5 methyl cytosine beta-D-oxy LNA nucleosides.

33. A pharmaceutically acceptable salt of the oligonucleotide of formula:

$^mC_sT_sT_s{}^mC_st_st_sc_st_sa_st_sc_st_sa_s{}^mc_sg_sc_sA_sT$ (SEQ IS NO 73)

wherein capital letters represent beta-D-oxy LNA nucleosides, lower case letters are DNA nucleosides, subscript s represents a phosphorothioate internucleoside linkage, $^m$c represents 5 methyl cytosine DNA nucleosides and $^mC$ represent 5 methyl cytosine beta-D-oxy LNA nucleosides, wherein the pharmaceutically acceptable salt is a potassium salt.

34. A pharmaceutically acceptable salt of the oligonucleotide of formula:

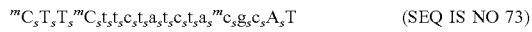   (SEQ IS NO 73)

wherein capital letters represent beta-D-oxy LNA nucleosides, lower case letters are DNA nucleosides, subscript s represents a phosphorothioate internucleoside linkage, and $^mC$ represent 5 methyl cytosine beta-D-oxy LNA nucleosides, wherein the pharmaceutically acceptable salt is a sodium salt.

35. A pharmaceutical composition comprising the oligonucleotide of formula:

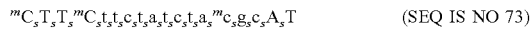   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides and $^mC$ represent 5 methyl cytosine beta-D-oxy LNA nucleosides; and a pharmaceutically acceptable diluent, carrier, salt and/or adjuvant.

36. A pharmaceutical composition comprising the oligonucleotide of formula:

   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides and $^mC$ represent 5 methyl cytosine beta-D-oxy LNA nucleosides; and a pharmaceutically acceptable diluent, wherein the pharmaceutically acceptable diluent is phosphate buffered saline.

37. A pharmaceutical composition comprising a pharmaceutically acceptable salt of the oligonucleotide of formula:

   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides and $^mC$ represent 5 methyl cytosine beta-D-oxy LNA nucleosides; and a pharmaceutically acceptable diluent, carrier, salt and/or adjuvant.

38. A pharmaceutical composition comprising a pharmaceutically acceptable salt of the oligonucleotide of formula:

   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides $^mc$ represents 5 methyl cytosine DNA nucleosides and $^mC$ represent 5 methyl cytosine beta-D-oxy LNA nucleosides, wherein the pharmaceutically acceptable salt is a sodium salt; and a pharmaceutically acceptable diluent or carrier.

39. A pharmaceutical composition comprising a pharmaceutically acceptable salt of the oligonucleotide of formula

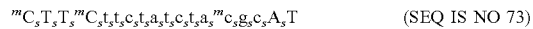   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides and $^mC$ represent 5 methyl cytosine beta-D-oxy LNA nucleosides, wherein the pharmaceutically acceptable salt is a potassium salt; and a pharmaceutically acceptable diluent or carrier.

40. A pharmaceutical composition comprising a pharmaceutically acceptable salt of the oligonucleotide of formula:

   (SEQ IS NO 73)

wherein capital letters represent beta-D-oxy LNA nucleosides, lower case letters are DNA nucleosides, subscript s represents a phosphorothioate internucleoside linkage, $^mc$ represents 5 methyl cytosine DNA nucleosides and $^mC$ represent 5 methyl cytosine beta-D-oxy LNA nucleosides, and $^mc$ represents 5 methyl cytosine DNA nucleosides, wherein the pharmaceutically acceptable salt is a sodium salt; and a pharmaceutically acceptable diluent, wherein the pharmaceutically acceptable diluent is phosphate buffered saline.

* * * * *